(12) United States Patent
Kobayashi et al.

(10) Patent No.: US 8,995,660 B2
(45) Date of Patent: *Mar. 31, 2015

(54) CRYPTOGRAPHIC SYSTEM, CRYPTOGRAPHIC COMMUNICATION METHOD, ENCRYPTION APPARATUS, KEY GENERATION APPARATUS, DECRYPTION APPARATUS, CONTENT SERVER, PROGRAM, AND STORAGE MEDIUM

(75) Inventors: Tetsutaro Kobayashi, Tokyo (JP); Kaku Takeuchi, Tokyo (JP); Sakae Chikara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 13/810,797

(22) PCT Filed: Jul. 22, 2011

(86) PCT No.: PCT/JP2011/066716
§ 371 (c)(1),
(2), (4) Date: Jan. 17, 2013

(87) PCT Pub. No.: WO2012/011575
PCT Pub. Date: Jan. 26, 2012

(65) Prior Publication Data
US 2013/0114810 A1    May 9, 2013

(30) Foreign Application Priority Data

Jul. 23, 2010  (JP) .................................. 2010-166401

(51) Int. Cl.
H04L 9/00   (2006.01)
H04L 9/14   (2006.01)
(Continued)

(52) U.S. Cl.
CPC ................ *H04L 9/14* (2013.01); *H04L 9/0836* (2013.01); *H04L 9/085* (2013.01); *H04L 9/0861* (2013.01); *H04L 9/3073* (2013.01); *H04L 9/0847* (2013.01)
USPC .......................................................... 380/47

(58) Field of Classification Search
CPC ........ H04L 9/14; H04L 9/0847; H04L 9/0836
USPC .......................................................... 380/47
See application file for complete search history.

(56) References Cited

U.S. PATENT DOCUMENTS

2008/0016341 A1    1/2008  Staddon et al.
2009/0080658 A1    3/2009  Waters et al.
2012/0027210 A1    2/2012  Takeuchi et al.

OTHER PUBLICATIONS

Extended Search Report issued Jul. 22, 2013 in European Patent Application No. 11809745.0.
(Continued)

*Primary Examiner* — Mohammad W Reza
(74) *Attorney, Agent, or Firm* — Oblon, McClelland, Maier & Neustadt, L.L.P.

(57) ABSTRACT

A cryptographic communication technology that is based on functional encryption and that can operate flexibly is provided. A conversion rule information pair is determined in advance, which has attribute conversion rule information prescribing a conversion rule for converting attribute designation information to attribute information used in a functional encryption algorithm and logical expression conversion rule information prescribing a conversion rule for converting logical expression designation information to logic information used in the functional encryption algorithm. One kind of conversion rule information included in the conversion rule information pair is used to obtain first attribute information or first logic information from input information. The first attribute information or the first logic information is used for encryption. Encryption information is decrypted with a decryption key generated by using second attribute information or second logic information obtained from user information by using the other kind of conversion rule information.

38 Claims, 82 Drawing Sheets

(51) Int. Cl.
*H04L 9/08* (2006.01)
*H04L 9/30* (2006.01)

(56) References Cited

OTHER PUBLICATIONS

Katz, J., et al., "Predicate Encryption Supporting Disjunctions, Polynomial Equations, and Inner Products," Cryptology ePrint Archive, 2007/404, pp. 1-29, (Jul. 7, 2008).
Attrapadung, N., et al., "Dual-Policy Attribute Based Encryption," ACNS-LNCS, vol. 5536, pp. 168-185, (2009).
Lewko, A., et al., "Fully Secure Functional Encryption: Attribute-Based Encryption and (Hierarchical) Inner Product Encryption," Cryptology ePrint Archive, 2010/110, pp. 1-56, (Mar. 29, 2010).
Boneh, D., et al., "Functional Encryption: Definitions and Challenges," Cryptology ePrint Archive, 2010/543, pp. 1-23, (Jan. 4, 2011).
Aoki, K., et al., "Camellia: A 128-Bit Block Cipher Suitable for Multiple Platforms," NTT and Mitsubishi Electric Corporation, Total 43 Pages, (2000-2001).
Katz, J., et al., "Predicate Encryption Supporting Disjunctions, Polynomial Equations, and Inner Products," EUROCRYPT-LNCS, vol. 4965, pp. 146-162, (2008).
Okamoto, T., et al., "Fully Secure Functional Encryption with General Relations from the Decisional Linear Assumption," Advances in Cryptology-CRYPTO-LNCS, vol. 6223, pp. 191-208, (Dec. 22, 2011).
Okamoto, T., et al., "Hierarchical Predicate Encryption for Inner-Products," ASIACRYPT-LNCS, vol. 5912, pp. 214-231, (Dec. 2009).

International Search Report Issued Sep. 20, 2011 in PCT/JP11/66716 Filed Jul. 22, 2011.
Shamir, A., "How to Share a Secret," Communications of the ACM, vol. 22, No. 11, pp. 612-613, (Nov. 1979).
Groth, J., et al., "Efficient Non-interactive Proof Systems for Bilinear Groups," EUROCRYPT-LNCS, vol. 4965, pp. 415-432, (2008).
ISO/IEC, "Information technology-Security techniques-Encryption algorithms-Part 2: Asymmetric ciphers," ISO, vol. 2006, No. 18033-2, pp. 10-11, (2006).
Boyen, X., et al., "Identity-Based Cryptography Standard (IBCS) #1: Supersingular Curve Implementations of the BF and BB1 Cryptosystems," Network Working Group, pp. 1-63, (Dec. 2007).
Blake, I., et al. "Elliptic Curves in Cryptography," London Mathematical Society, vol. 265, pp. 30-35, (Dec. 20, 2001).
Menezes, A., "Elliptic Curve Public Key Cryptosystems," The Kluwer International Series in Engineering and Computer Science, pp. 61-81, (1993).
Miller, V., et al., "Short Programs for Functions on Curves," http:/crypto.stanford.edu/miller/miller.pdf, pp. 1-7, (May 6, 1986).
Miyaji, A., et al., "New Explicit Conditions of Elliptic Curve Traces for FR-Reduction," !INICE Trans Fundamentals, vol. E84-A, No. 5, pp. 1234-1243, (May 2001).
Barreto, P., et al., "Constructing Elliptic Curves with Prescribed Embedding Degrees," SCN, vol. 2576, pp. 257-267, (2003).
Dupont, R., et al., "Building curves with arbitrary small MOV degree over finite prime fields," http:/eprint.iacr.org/2002/094, pp. 1-13, (Jul. 18, 2002).
Kurosawa, K., et al., "Introduction to Modern Cryptography," Lecture Series in Electronics, Information and Communication Engineers D-8, pp. 116-119 (Mar. 2004).

FIG.13

EXAMPLE OF PREDICATE SCHEMA

| ELEMENT NUMBER | ATTRIBUTE NAME | TYPE CONVERSION FUNCTION |
|---|---|---|
| 0 | NAME | HASH FUNCTION |
| 1 | BLOOD TYPE | 0 : 0<br>1 : A<br>2 : B<br>3 : AB |
| 2,3 | DATE OF BIRTH | ELEMENT 2: HASH(YEAR)<br>ELEMENT 3: HASH(MONTH AND DAY) |
| 4~104 | AGE | VALUE OF ELEMENT X<br>1 : AGE > x -4<br>0 : AGE =< x -4 |

EXAMPLE OF PREDICATE
DESIGNATION INFORMATION

NAME = TARO TANAKA IN KANJI
AND AGE = 20 OR MORE

→ POLYNOMIALIZATION → VECTORIZATION

EXAMPLE OF POLYNOMIAL
$f = r_1(X_0 - \text{HASH}(\text{TARO TANAKA IN KANJI})) + r_2(X_{23} - 1)$ $r_1, r_2$: RANDOM NUMBERS $X = (-r_1 \text{HASH}(\text{TARO TANAKA IN KANJI}) - r_2, r_1, 0, 0, 0, \ldots, r_2, 0, 0, 0, \ldots)$
EXAMPLE OF PREDICATE INFORMATION (VECTOR INFORMATION)

FIG.14

EXAMPLE: POLICY LIST LIMITED TO CIPHER_TEXT_POLICY

| ITEM NUMBER | POLICY |
|---|---|
| 1 | CIPHER_TEXT_POLICY |

EXAMPLE: POLICY LIST LIMITED TO KEY_POLICY

| ITEM NUMBER | POLICY |
|---|---|
| 1 | KEY_POLICY |

EXAMPLE: POLICY LIST FOR CIPHER_TEXT_POLICY AND KEY_POLICY

| ITEM NUMBER | POLICY |
|---|---|
| 1 | CIPHER_TEXT_POLICY |
| 2 | KEY_POLICY |

FIG.15

| IDENTIFIER OF KEY GENERATION APPARATUS | PUBLIC PARAMETER | SCHEMA PAIR | DECRYPTION KEY TARGET | PREDICATE DESIGNATION INFORMATION | DECRYPTION KEY |
|---|---|---|---|---|---|
| KEY GENERATION APPARATUS 20-1 | PUBLIC PARAMETER 1 | SCHEMA PAIR 1 | | | DECRYPTION KEY 1 |
| KEY GENERATION APPARATUS 20-2 | PUBLIC PARAMETER 2 | SCHEMA PAIR 2 | | | DECRYPTION KEY 2 |
| ... | ... | ... | | | ... |
| KEY GENERATION APPARATUS 20-N | PUBLIC PARAMETER N | SCHEMA PAIR N | | | DECRYPTION KEY N |

FIG.16

| USER ID | PASSWORD |
|---|---|
| USER 1 | PASSWORD 1 |
| USER 2 | PASSWORD 2 |
| ... | ... |
| USER N | PASSWORD N |

FIG.17

| USER ID | ATTRIBUTE NAME | ATTRIBUTE VALUE |
|---|---|---|
| USER 1 | ATTRIBUTE NAME 1 | ATTRIBUTE VALUE 1 |
| USER 1 | ATTRIBUTE NAME 2 | ATTRIBUTE VALUE 2 |
| ⋮ | ⋮ | ⋮ |
| USER 1 | ATTRIBUTE NAME N | ATTRIBUTE VALUE N |
| ⋮ | ⋮ | ⋮ |
| USER M | ATTRIBUTE NAME K | ATTRIBUTE VALUE K |
| ⋮ | ⋮ | ⋮ |

| USER ID | PREDICATE |
|---|---|
| USER 1 | PREDICATE 1 |
| USER 2 | PREDICATE 2 |
| ⋮ | ⋮ |
| USER N | PREDICATE N |

FIG.59

| |
|---|
| S/MIME EMAIL HEADER<br>From: ALICE<br>TO: BOB<br>SUBJECT:~<br>SENT:~ |
| START POSITION MARKER FOR ENCRYPTED MESSAGE |
| ALGORITHM IDENTIFIER BLOCK<br>- PREDICATE ENCRYPTION ALGORITHM FOR PRIVATE KEY<br>- PRIVATE KEY ENCRYPTION ALGORITHM FOR MESSAGE PAYLOAD |
| DIGITAL SIGNATURE BLOCK |
| PUBLIC PARAMETER INFORMATION BLOCK |
| POLICY FIELD |
| SCHEMA FIELD |
| ENCRYPTION INFORMATION FIELD |
| CIPHERTEXT FIELD |
| ATTRIBUTE FIELD |
| PREDICATE FIELD |
| END POSITION MARKER FOR ENCRYPTED MESSAGE |
| ATTACHMENT FIELD (RSA ENCRYPTION ATTACHMENT, FOR EXAMPLE) |

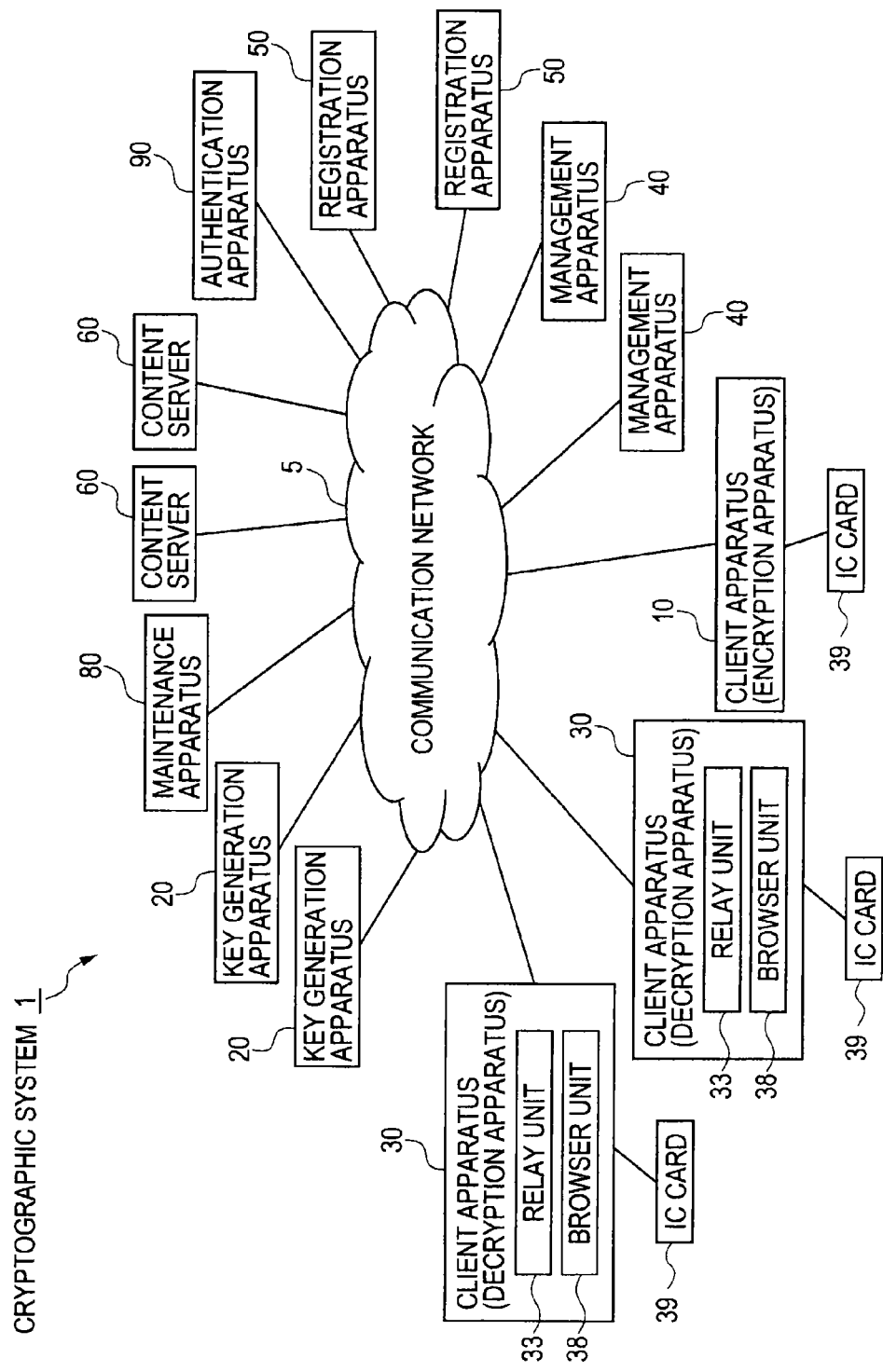

FIG.82

```
<html>
<!--
```

| ALGORITHM IDENTIFIER BLOCK<br>- PREDICATE ENCRYPTION ALGORITHM FOR PRIVATE KEY<br>- PRIVATE KEY ENCRYPTION ALGORITHM FOR CONTENT |
|---|
| DIGITAL SIGNATURE BLOCK |
| PUBLIC PARAMETER INFORMATION BLOCK |
| POLICY FIELD |
| SCHEMA FIELD |
| ENCRYPTION INFORMATION FIELD |
| CONTENT FILE NAME |
| CONTENT TYPE |
| CONTENT FILE SIZE |
| ATTRIBUTE FIELD |
| PREDICATE FIELD |
| ENCRYPTED CONTENT |

```
-->
```

(ANY HTML SENTENCE FOLLOWS)

```
</html>
```

US 8,995,660 B2

CRYPTOGRAPHIC SYSTEM, CRYPTOGRAPHIC COMMUNICATION METHOD, ENCRYPTION APPARATUS, KEY GENERATION APPARATUS, DECRYPTION APPARATUS, CONTENT SERVER, PROGRAM, AND STORAGE MEDIUM

TECHNICAL FIELD

The present invention relates to a cryptographic communication technology, and more specifically, to a cryptographic communication technology based on functional encryption.

BACKGROUND ART

Known cryptographic technologies include a common key cryptosystem and a public key cryptosystem.

In the common key cryptosystem, a message sender encrypts a message with a common key to obtain an encrypted message, and the receiver decrypts the encrypted message with the same common key to obtain the original message. Therefore, it is necessary to establish a procedure for the sender and receiver to possess the common key securely.

In the public key cryptosystem, (1) a receiver prepares a public key and a private key corresponding thereto, (2) a sender encrypts a message with the public key to obtain an encrypted message, and (3) the receiver decrypts the encrypted message with the private key to obtain the original message. Therefore, the sender needs to obtain the public key prepared by the receiver before encrypting the message. In other words, encryption is impossible unless the receiver generates the public key.

Predicate encryption has been proposed recently. In the predicate encryption, information X is embedded in an encrypted message during encryption by the sender, the receiver who has information Y having a specific relationship with the information X can decrypt the encrypted message or obtain information related to the message without knowing the message. The sender does not necessarily need to know the information Y possessed by the receiver during encryption. In addition, the sender does not necessarily need to determine the receiver before encryption. The sender can determine the information X actively, freely and with initiative. In theory, the information X is called an attribute I (variable) and the information Y is called a predicate f (propositional function or Boolean function). The specific relationship which the information X and the information Y need to satisfy during decryption is, for example, f(I)=true.

PRIOR ART LITERATURE

Non-Patent Literature

Non-patent literature 1: Information Security Project of NTT Information Sharing Platform Laboratories, "NTT Cryptographic Primitives", URL: http://info.isl.ntt.co.jp/crypt/camellia/technology.html, retrieved on Jul. 15, 2010

Non-patent literature 2: J. Katz, A. Sahai, and B. Waters, "Predicate Encryption Supporting Disjunction, Polynomial Equations, and Inner Products", Eurocrypt 2008, pp. 146-162

SUMMARY OF THE INVENTION

Problems to be Solved by the Invention

An object of the present invention is to provide a cryptographic communication technology that is based on functional encryption and that can operate flexibly.

Means to Solve the Problems

A first aspect of the present invention will be outlined below.

A cryptographic system that uses functional encryption includes, at least, one or a plurality of encryption apparatuses, one or a plurality of key generation apparatuses, and one or a plurality of decryption apparatuses.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logical information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus, to obtain a common key and encryption information corresponding to the common key or corresponding to information used to generate the common key, according to the functional encryption algorithm.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encryption information.

Each of the one or the plurality of decryption apparatuses uses the decryption key to apply a decryption process to the encryption information according to the functional encryption algorithm.

Alternatively, the first aspect of the present invention will be outlined below.

A cryptographic system that uses functional encryption includes, at least, one or a plurality of encryption apparatuses, one or a plurality of key generation apparatuses, and one or a plurality of decryption apparatuses.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus, to obtain a common key and encryption information corresponding to the common key or corresponding to information used to generate the common key, according to the functional encryption algorithm;

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and uses a decryption key sent from the key generation apparatus to apply a decryption process to the encryption information according to the functional encryption algorithm.

Each of the one or the plurality of key generation apparatuses performs a key generation process of using the second attribute information or the second logic information, together with the private key of the key generation apparatus, to generate the decryption key used to decrypt the encryption information.

Alternatively, the first aspect of the present invention will be outlined below.

A cryptographic system that uses functional encryption includes, at least, one or a plurality of encryption apparatuses, one or a plurality of key generation apparatuses, and one or a plurality of decryption apparatuses.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and plaintext, to obtain encryption information corresponding to the plaintext according to the functional encryption algorithm.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encryption information.

Each of the one or the plurality of decryption apparatuses uses the decryption key to apply a decryption process to the encryption information according to the functional encryption algorithm.

Alternatively, the first aspect of the present invention will be outlined below.

A cryptographic system that uses functional encryption includes, at least, one or a plurality of encryption apparatuses, one or a plurality of key generation apparatuses, and one or a plurality of decryption apparatuses.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and plaintext, to obtain encryption information corresponding to the plaintext according to the functional encryption algorithm.

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and uses a decryption key sent from the key generation apparatus to apply a decryption process to the encryption information according to the functional encryption algorithm.

Each of the one or the plurality of key generation apparatuses performs a key generation process of using the second attribute information or the second logic information, together with the private key of the key generation apparatus, to generate the decryption key used to decrypt the encryption information.

A second aspect of the present invention will be outlined below.

In a cryptographic system that uses functional encryption and includes, at least, one or a plurality of encryption apparatuses, one or a plurality of key generation apparatuses, and a plurality of decryption apparatuses, a private key and a public key corresponding to the private key are determined in advance for each of the one or the plurality of key generation apparatuses; one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus, to obtain a common key and encryption information corresponding to the common key or corresponding to information used to generate the common key, according to the functional encryption algorithm.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encryption information.

Each of the one or the plurality of decryption apparatuses uses the decryption key to apply a decryption process to the encryption information according to the functional encryption algorithm. The decryption apparatus also performs a transfer process of transferring the encryption information to another decryption apparatus. The encryption information to be transferred may be sent from the encryption apparatus or may be transferred from another decryption apparatus. At least a part of the decryption apparatuses included in the cryptographic system has a function of performing the transfer process, but all of the decryption apparatuses are not required to have this function. A decryption apparatus that has received the transferred encryption information asks the key generation apparatus to generate the decryption key, if necessary, and performs the decryption process.

Alternatively, the second aspect of the present invention will be outlined below.

In a cryptographic system that uses functional encryption and includes, at least, one or a plurality of encryption apparatuses, one or a plurality of key generation apparatuses, and a plurality of decryption apparatuses, a private key and a public key corresponding to the private key are determined in advance for each of the one or the plurality of key generation apparatuses; one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus, to obtain a common key and encryption information corresponding to the common key or corresponding to information used to generate the common key, according to the functional encryption algorithm;

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and uses a decryption key sent from the key generation apparatus to apply a decryption process to the encryption information according to the functional encryption algorithm.

Each of the one or the plurality of key generation apparatuses performs a key generation process of using the second attribute information or the second logic information, together with the private key of the key generation apparatus, to generate the decryption key used to decrypt the encryption information.

The decryption apparatus also performs a transfer process of transferring the encryption information to another decryption apparatus. The encryption information to be transferred may be sent from the encryption apparatus or may be transferred from another decryption apparatus. At least a part of the decryption apparatuses included in the cryptographic system has a function of performing the transfer process, but all of the decryption apparatuses are not required to have this function. A decryption apparatus that has received the transferred encryption information asks the key generation apparatus to generate the decryption key, if necessary, and performs the decryption process.

Alternatively, the second aspect of the present invention will be outlined below.

In a cryptographic system that uses functional encryption and includes, at least, one or a plurality of encryption apparatuses, one or a plurality of key generation apparatuses, and a plurality of decryption apparatuses, a private key and a public key corresponding to the private key are determined in advance for each of the one or the plurality of key generation apparatuses; one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and plaintext, to obtain encryption information corresponding to the plaintext according to the functional encryption algorithm.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encryption information.

Each of the one or the plurality of decryption apparatuses uses the decryption key to apply a decryption process to the encryption information according to the functional encryption algorithm. The decryption apparatus also performs a transfer process of transferring the encryption information to another decryption apparatus. The encryption information to be transferred may be sent from the encryption apparatus or may be transferred from another decryption apparatus. At least a part of the decryption apparatuses included in the cryptographic system has a function of performing the transfer process, but all of the decryption apparatuses are not required to have this function. A decryption apparatus that has received the transferred encryption information asks the key generation apparatus to generate the decryption key, if necessary, and performs the decryption process.

Alternatively, the second aspect of the present invention will be outlined below.

In a cryptographic system that uses functional encryption and includes, at least, one or a plurality of encryption apparatuses, one or a plurality of key generation apparatuses, and a plurality of decryption apparatuses, a private key and a public key corresponding to the private key are determined in advance for each of the one or the plurality of key generation apparatuses; one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and plaintext, to obtain encryption information corresponding to the plaintext according to the functional encryption algorithm.

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and uses a decryption key sent from the key generation apparatus to apply a decryption process to the encryption information according to the functional encryption algorithm.

Each of the one or the plurality of key generation apparatuses performs a key generation process of using the second attribute information or the second logic information, together with the private key of the key generation apparatus, to generate the decryption key used to decrypt the encryption information.

The decryption apparatus also performs a transfer process of transferring the encryption information to another decryption apparatus. The encryption information to be transferred may be sent from the encryption apparatus or may be transferred from another decryption apparatus. At least a part of the decryption apparatuses included in the cryptographic system has a function of performing the transfer process, but all of the decryption apparatuses are not required to have this function. A decryption apparatus that has received the transferred encryption information asks the key generation apparatus to generate the decryption key, if necessary, and performs the decryption process.

A third aspect of the present invention will be outlined below.

A cryptographic system that uses functional encryption includes, at least, one or a plurality of encryption apparatuses, one or a plurality of key generation apparatuses, one or a plurality of decryption apparatuses, and one or a plurality of content servers.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm.

Each of the one or the plurality of content servers stores the encryption information and the encrypted content sent from each of the one or the plurality of encryption apparatuses; and transmits the encrypted content and the encryption information corresponding thereto, in response to a request sent from the decryption apparatus, to the decryption apparatus.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encryption information.

Each of the one or the plurality of decryption apparatuses performs a process of an acquisition request of the encrypted content for the content server; uses the decryption key to apply a decryption process to the encryption information obtained from the content server, according to the functional encryption algorithm; performs a content acquisition process of decrypting the encrypted content obtained from the content server with the common key obtained in the decryption process; and displays content obtained by decrypting the encrypted content.

Alternatively, the third aspect of the present invention will be outlined below.

A cryptographic system that uses functional encryption includes, at least, one or a plurality of encryption apparatuses, one or a plurality of key generation apparatuses, one or a plurality of decryption apparatuses, and one or a plurality of content servers.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm.

Each of the one or the plurality of content servers stores the encryption information and the encrypted content sent from each of the one or the plurality of encryption apparatuses; and transmits the encrypted content and the encryption information corresponding thereto, in response to a request sent from the decryption apparatus, to the decryption apparatus.

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; uses a decryption key to apply a decryption process to the encryption information obtained from the content server, according to the functional encryption algorithm; performs a content acquisition process of decrypting the encrypted content obtained from the content server, with the common key obtained in the decryption process; and displays content obtained by decrypting the encrypted content.

Each of the one or the plurality of key generation apparatuses performs a key generation process of using the second attribute information or the second logic information, together with the private key of the key generation apparatus, to generate the decryption key used to decrypt the encryption information.

Alternatively, the third aspect of the present invention will be outlined below.

A cryptographic system that uses functional encryption includes, at least, one or a plurality of encryption apparatuses, one or a plurality of key generation apparatuses, one or a plurality of decryption apparatuses, and one or a plurality of content servers.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and content, to encrypt the content to obtain encrypted content, according to the functional encryption algorithm.

Each of the one or the plurality of content servers stores the encrypted content sent from each of the one or the plurality of encryption apparatuses; and transmits the encrypted content, in response to a request sent from the decryption apparatus, to the decryption apparatus.

Each of the one or the plurality of key generation apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation process of using the second attribute information or the second logic information, together with the private key of the key generation apparatus, to generate a decryption key used to decrypt the encrypted content.

Each of the one or the plurality of decryption apparatuses performs a process of an acquisition request of the encrypted content for the content server; uses the decryption key to apply a decryption process to the encrypted content obtained from the content server, according to the functional encryption algorithm; and displays content obtained by decrypting the encrypted content.

Alternatively, the third aspect of the present invention will be outlined below.

A cryptographic system that uses functional encryption includes, at least, one or a plurality of encryption apparatuses, one or a plurality of key generation apparatuses, one or a plurality of decryption apparatuses, and one or a plurality of content servers.

A private key and a public key corresponding to the private key are determined in advance for each of the one or the plurality of key generation apparatuses.

One or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm.

Policy information that identifies one of the attribute conversion rule information and the logical expression conversion rule information is determined in advance.

Each of the one or the plurality of encryption apparatuses performs a first propositional logic information acquisition process of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption process of using the first attribute information or the first logic information, together with the public key of the key generation apparatus and content, to encrypt the content to obtain encrypted content, according to the functional encryption algorithm.

Each of the one or the plurality of content servers stores the encrypted content sent from each of the one or the plurality of encryption apparatuses; and transmits the encrypted content, in response to a request sent from the decryption apparatus, to the decryption apparatus.

Each of the one or the plurality of decryption apparatuses performs a second propositional logic information acquisition process of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; uses a decryption key to apply a decryption process to the encrypted content obtained from the content server, according to the functional encryption algorithm; and displays content obtained by decrypting the encrypted content.

Each of the one or the plurality of key generation apparatuses performs a key generation process of using the second attribute information or the second logic information, together with the private key of the key generation apparatus, to generate the decryption key used to decrypt the encrypted content.

Effects of the Invention

According to the present invention, by using one piece of conversion rule information selected based on whether input information input to an encryption apparatus is attribute designation information or logical expression designation information, where the one piece of conversion rule information is either one of attribute conversion rule information and logical expression conversion rule information contained in one conversion rule information pair selected from conversion rule information pairs, the attribute information or the logic information is obtained from the input information; therefore, cryptographic communication based on functional encryption can be operated in a flexible manner.

BRIEF DESCRIPTION OF THE DRAWINGS

FIG. 13 is a view showing how to obtain predicate information from predicate designation information by using a predicate schema;

FIG. 14 is a view showing examples of policies;

FIG. 15 is a view showing an example decryption key table;

FIG. 16 is a view showing an example authentication table;

FIG. 17 is a view showing an example user information tables;

FIG. 59 is a view showing an example structure of data exchanged when the present invention is applied to an email system or an instant messaging system;

FIG. 60 is a structural view of a cryptographic system according to each embodiment in a third aspect of the present invention;

FIG. 82 is a view showing an example structure of data exchanged when the present invention is applied to a content delivery system;

DETAILED DESCRIPTION OF THE EMBODIMENTS

<Outline of Functional Encryption>

Figure 1:
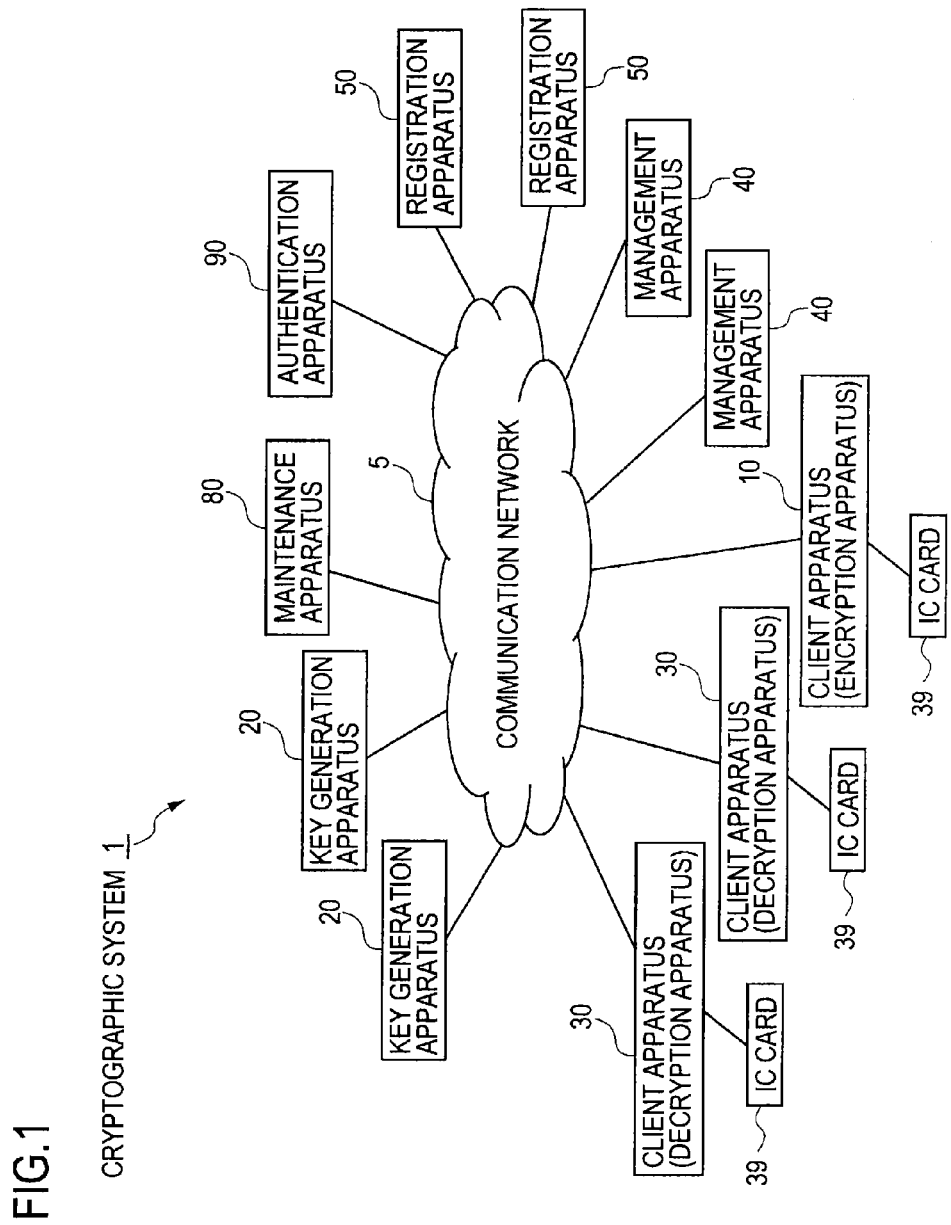
FIG. 1 is a structural view of a cryptographic system according to each embodiment in a first aspect of the present invention.
Figure 2:
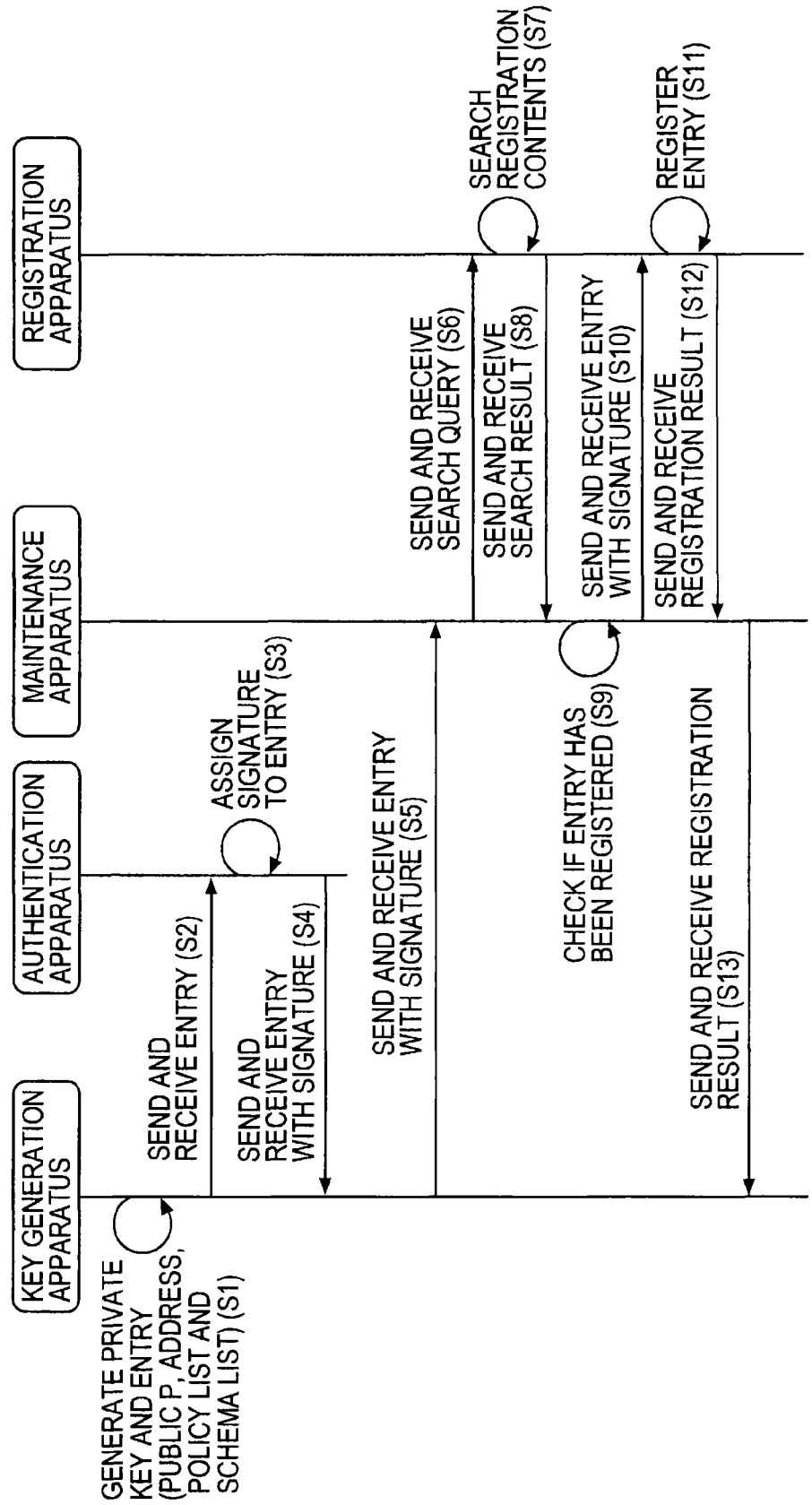
FIG. 2 is a view (No. 1) showing a processing procedure of a cryptographic communication method according to each embodiment in the first aspect.
Figure 3:
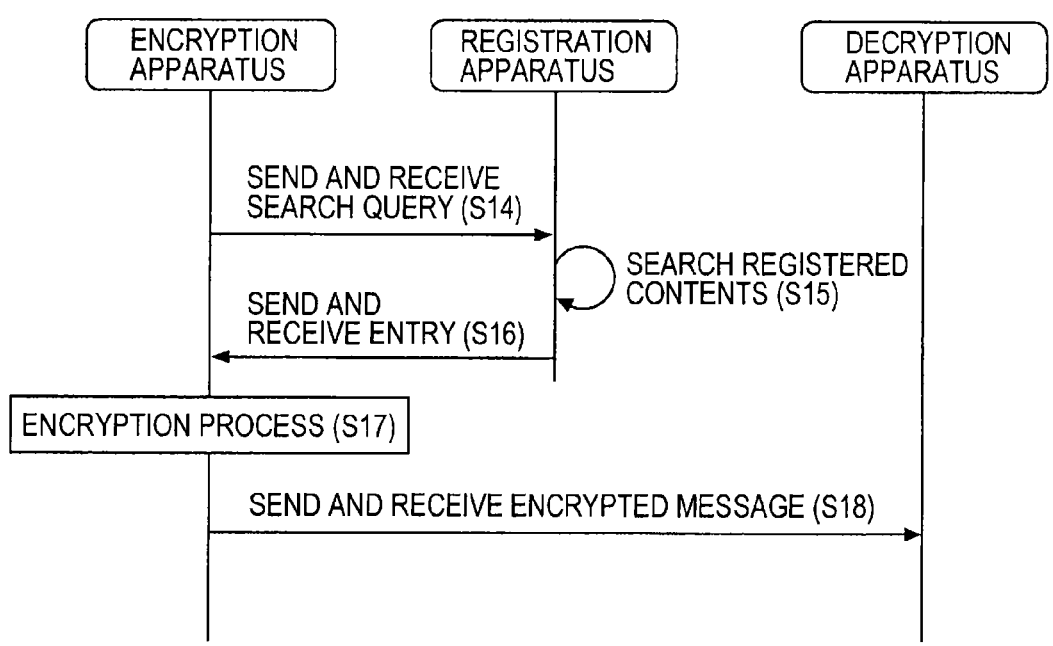
FIG. 3 is a view (No. 2) showing the processing procedure of the cryptographic communication method according to each embodiment in the first aspect.
Figure 4:
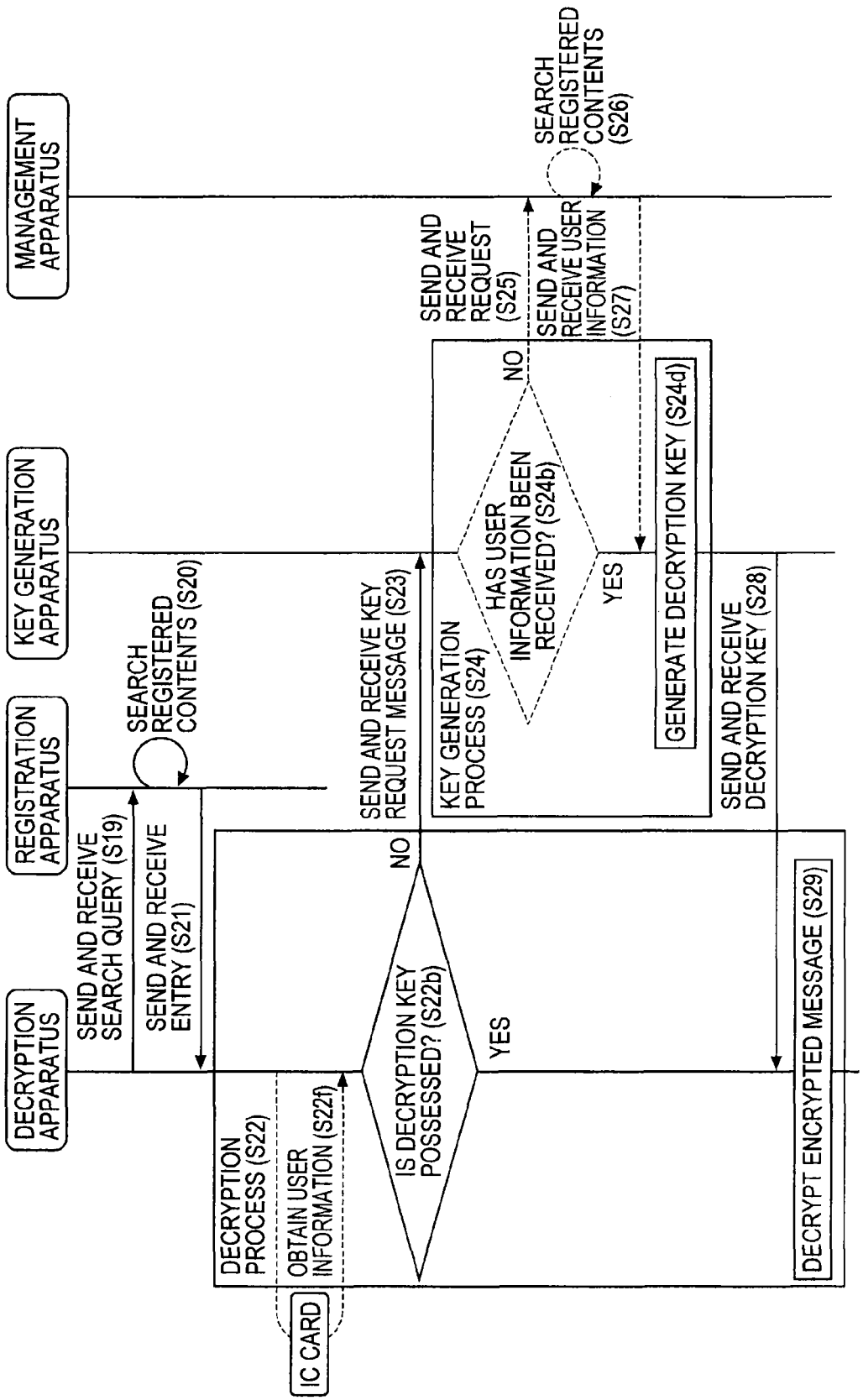
FIG. 4 is a view (No. 3) showing the processing procedure of the cryptographic communication method according to each embodiment in the first aspect.
Figure 5:
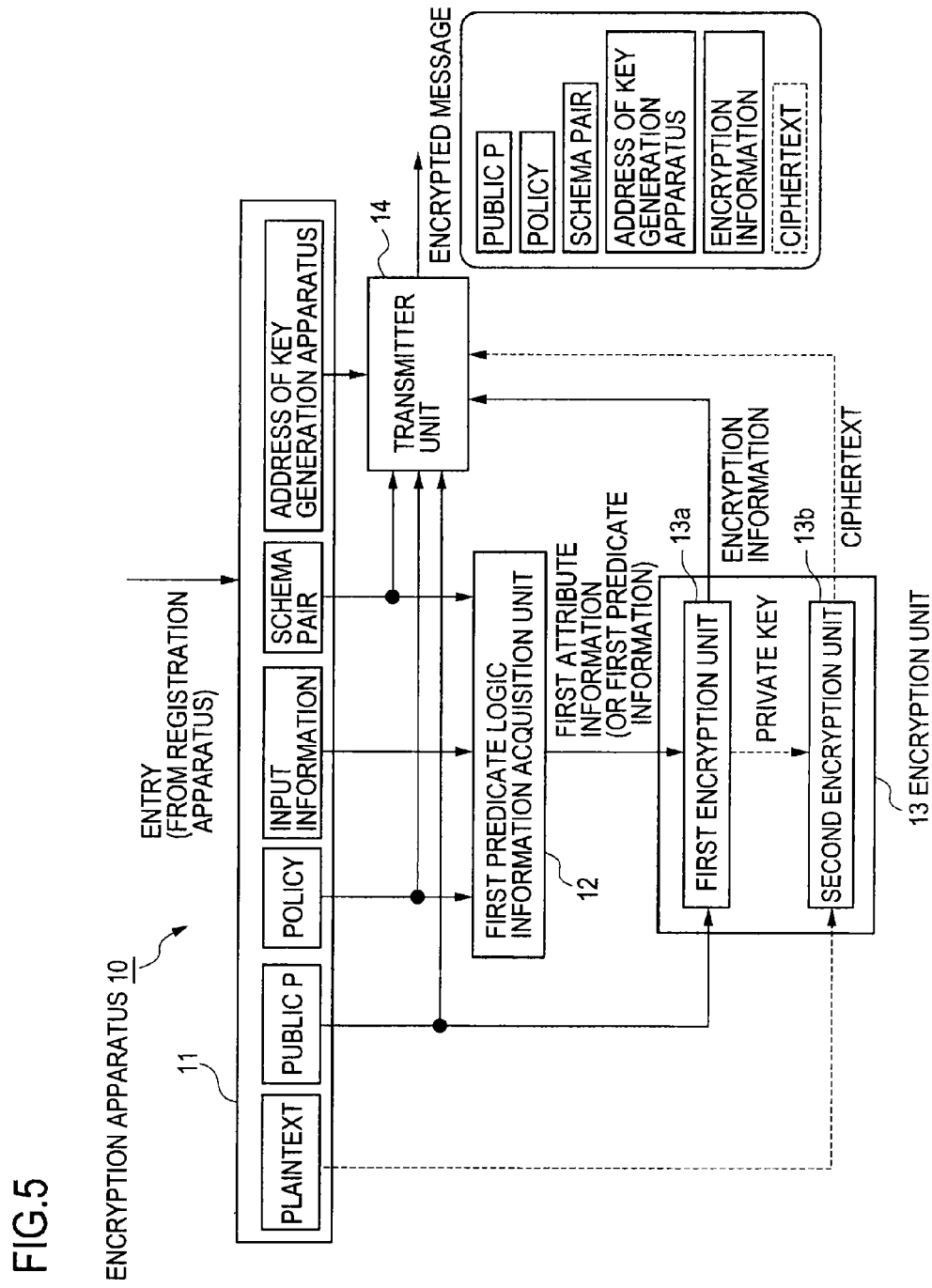
FIG. 5 is a functional block diagram of an encryption apparatus according to a first embodiment of the first aspect.
Figure 6:
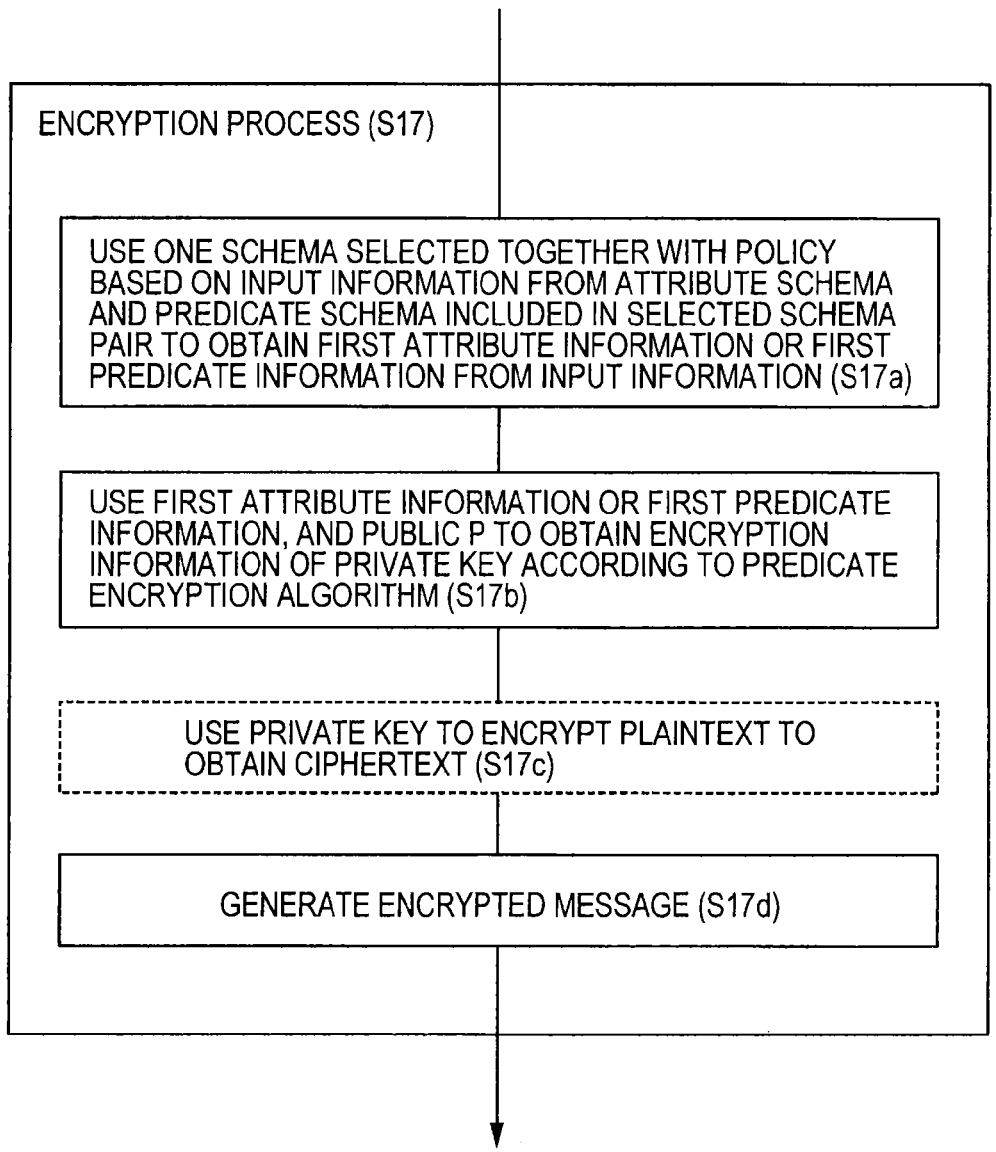
FIG. 6 is a view showing a detailed processing procedure of an encryption process according to the first embodiment of the first aspect.
Figure 7:
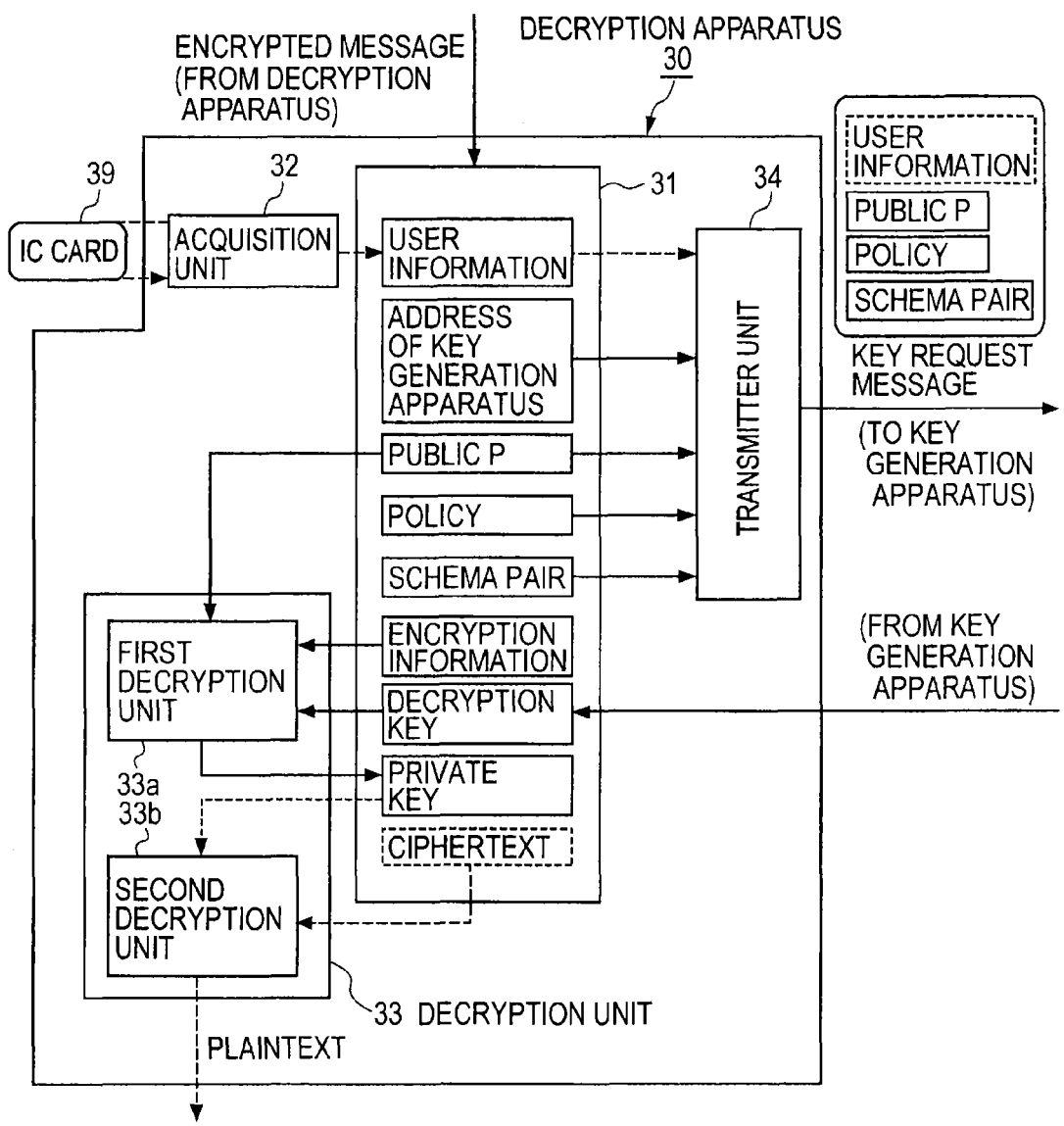
FIG. 7 is a functional block diagram of a decryption apparatus according to the first embodiment of the first aspect.
Figure 8:
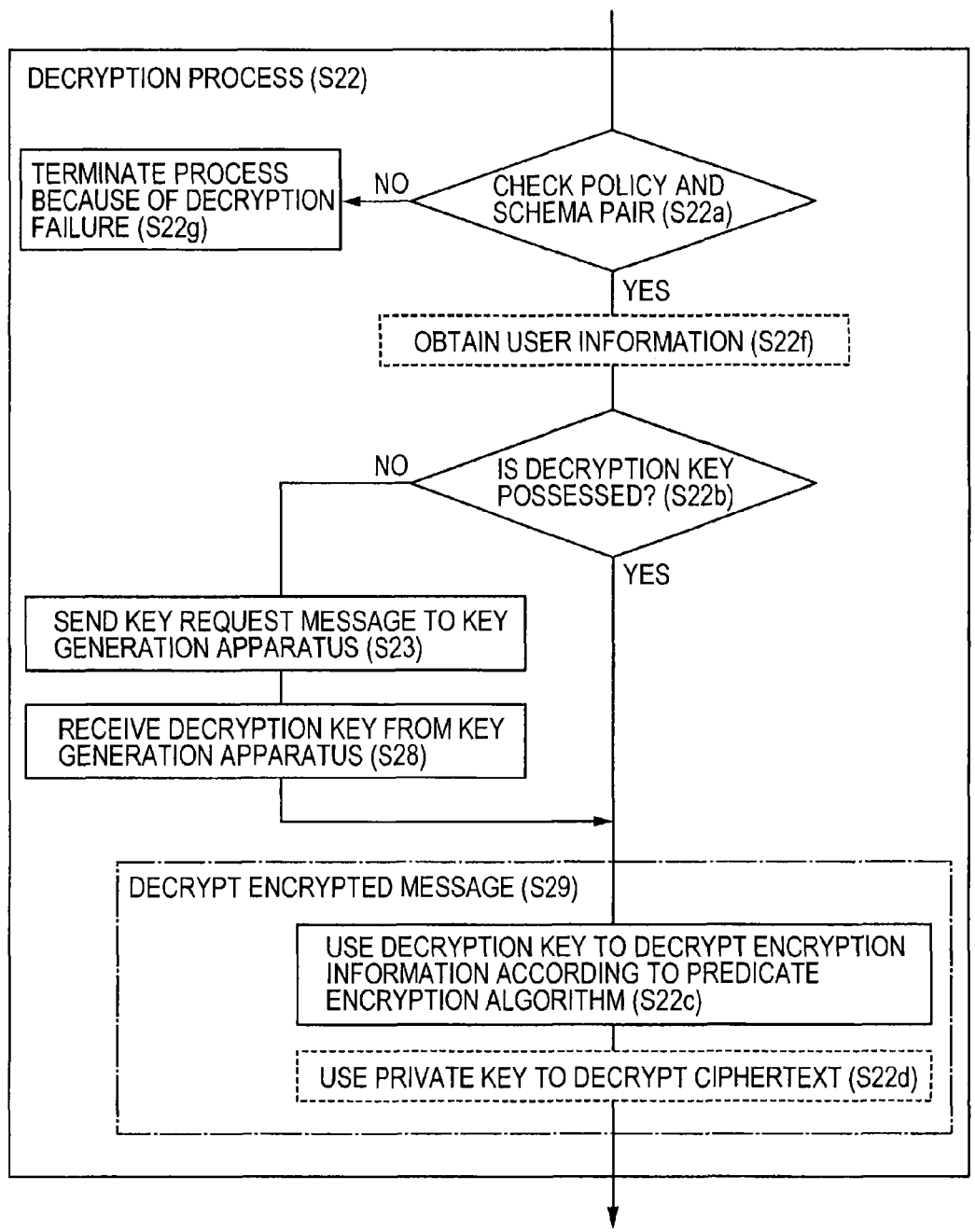
FIG. 8 is a view showing a detailed processing procedure of a decryption process according to the first embodiment of the first aspect.
Figure 9:
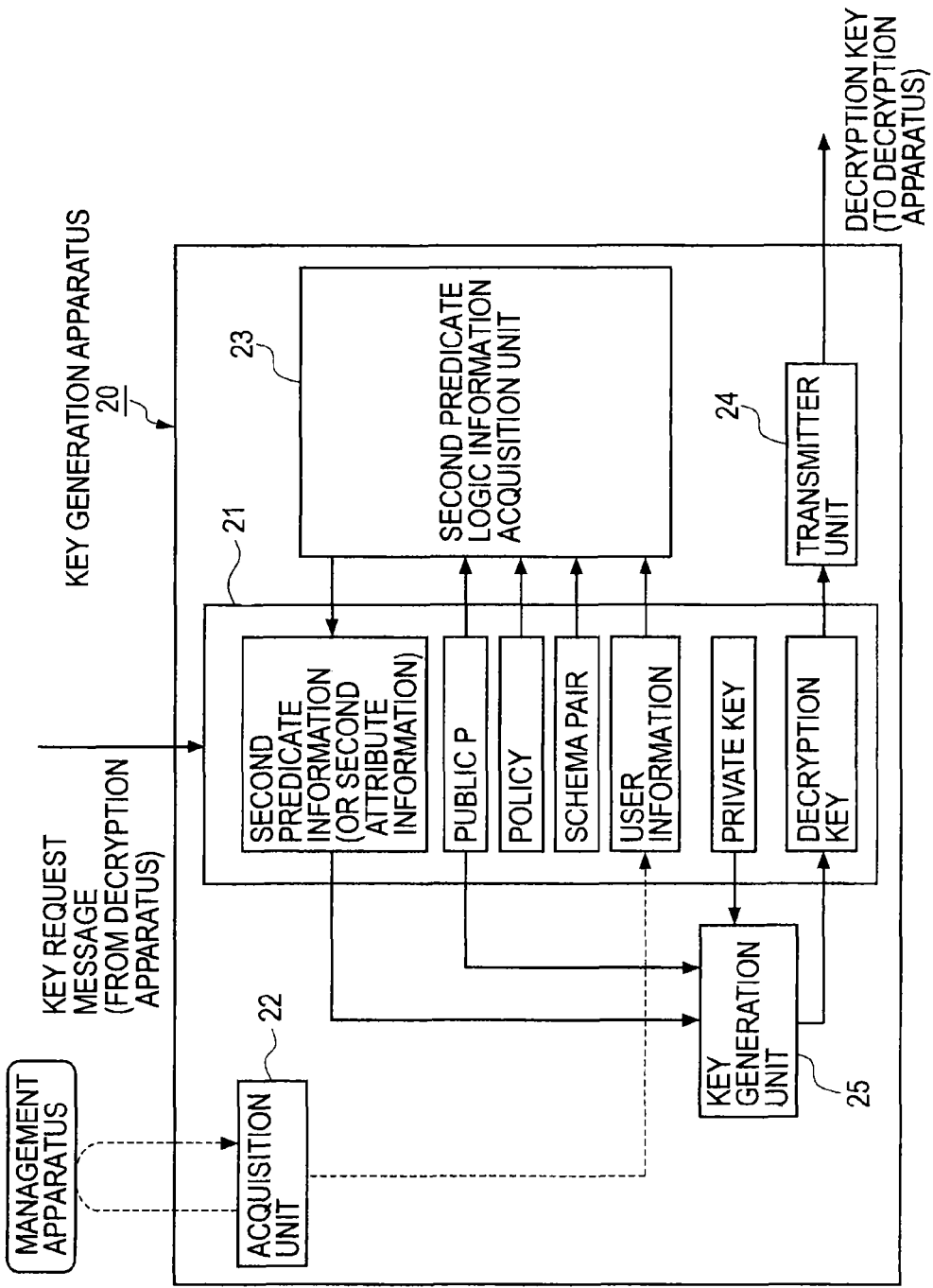
FIG. 9 is a functional block diagram of a key generation apparatus according to the first embodiment of the first aspect.
Figure 10:
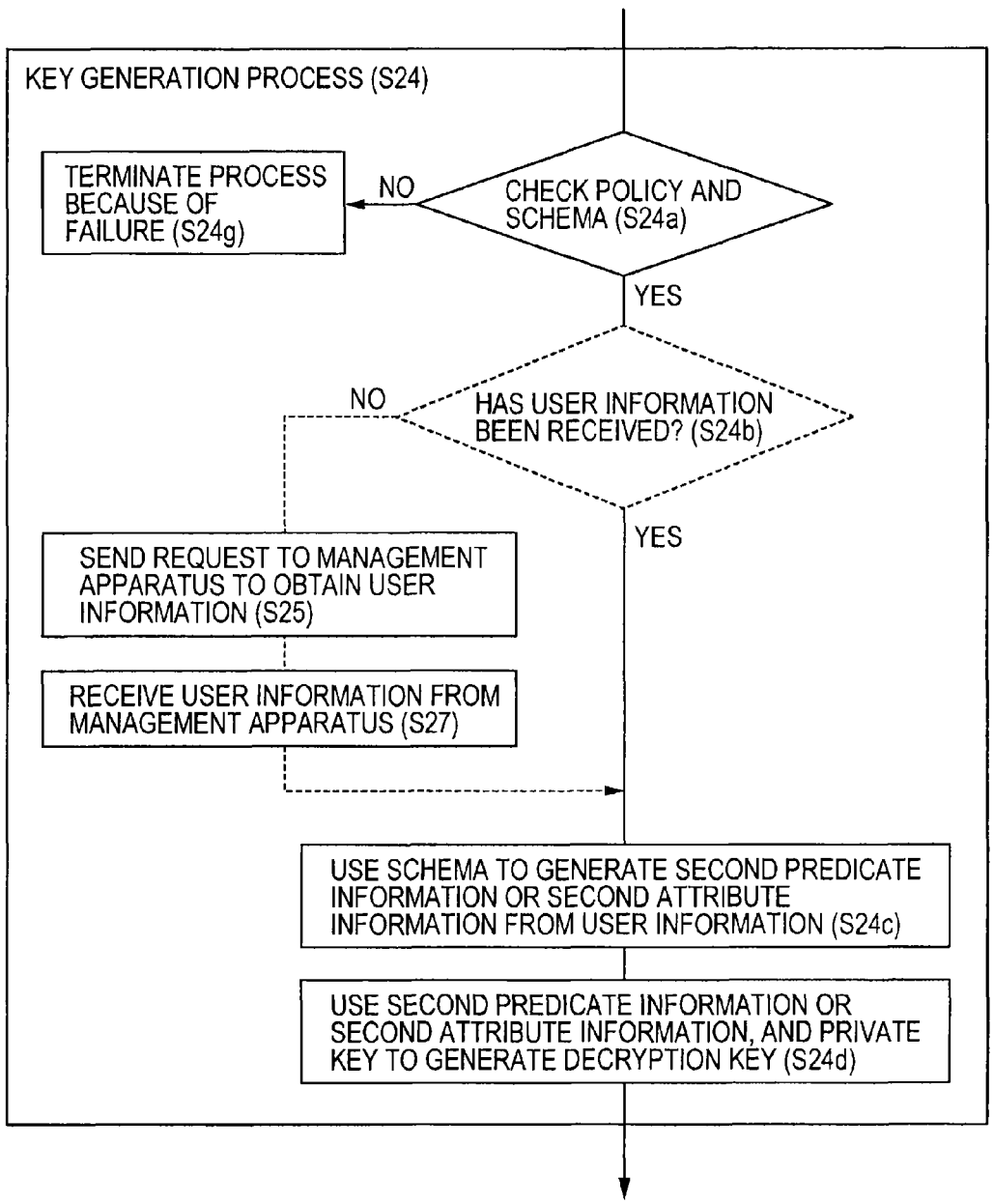
FIG. 10 is a view showing a detailed processing procedure of a key generation process according to the first embodiment of the first aspect.
Figure 11:
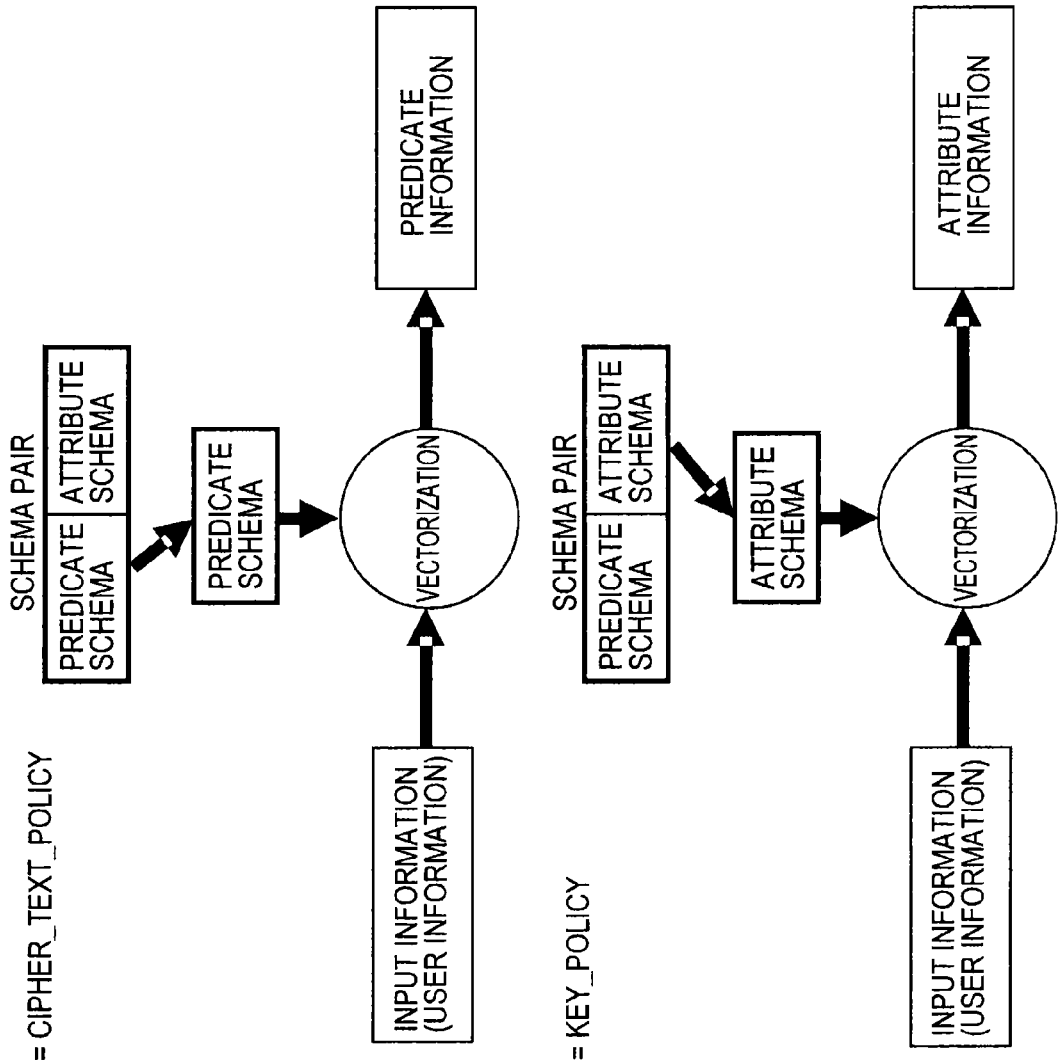
FIG. 11 is a view showing how to obtain attribute information or predicate information from input information or user information by using a schema corresponding to a policy.

In recent years, extended encryption of ID-based encryption called functional encryption is attracting attention. The functional encryption is formed of the following four algorithms (Setup, KeyGen, Enc, Dec). The protocol thereof will be outlined below.

<<Protocol FE>>

Setup $(1^\lambda) \to$ (pk, sk): setup algorithm

A probability polynomial time algorithm that receives a security parameter $1^\lambda$ and outputs a public parameter pk and a master key sk KeyGen (sk, i)$\to sk_i$: key generation algorithm A probability polynomial time algorithm that receives the master key sk and a key identifier i and outputs a private key $sk_i$ corresponding to the key identifier i Enc (pk, j, x)$\to c_j$: encryption algorithm A probability polynomial time algorithm that receives the public parameter pk, a receiver identifier j, and information to be encrypted (plaintext) x and outputs a ciphertext $c_j$ Dec (pk, $sk_i$, $c_c$)$\to$y: decryption algorithm A probability polynomial time algorithm that receives the public parameter pk, the private key $sk_i$, and the ciphertext $c_j$ and outputs a plaintext y In the functional encryption, the validity of the ID-based encryption is extended, and a receiver of a ciphertext can evaluate some function $f_{i,j}(x)$ concerning the plaintext x on the basis of the private key having the key identifier i and the ciphertext having the receiver identifier j. That is, if a given function $f_{i,j}(x)$ exists and if a probability Pr represented by Expression (A) to $\forall i, \forall j, \forall x \in \{0, 1\}^{poly(\lambda)}$ is overwhelming to k (a difference from 1 is negligible), the functional encryption (Setup, KeyGen, Enc, Dec) is regarded as valid. Note that poly($\lambda$) represents the polynomial length determined by $\lambda$.

$$Pr\left[y = f_{i,j}(x) \middle| \begin{array}{l} (pk, sk) \leftarrow Setup(1^\lambda) \\ sk_i \leftarrow KeyGen(sk, i) \\ c_j \leftarrow Enc(pk, j, x) \\ y \leftarrow Dec(pk, sk_i, c_j) \end{array} \right] \quad \text{(A)}$$

In particular, a given relationship R(·, ·) exists, and functional encryption having a function $f_{i,j}(x)$ of type represented by Expression (B) contains various types of encryption (⊥ is a symbol that represents that normal decryption cannot be made).

$$f_{i,j}(x) = \begin{cases} x & (R(i, j): \text{True}) \\ \bot & (R(i, j): \text{False}) \end{cases} \quad \text{(B)}$$

For example, the ID-based encryption can be defined as functional encryption having a function $f_{i,j}(x)$ represented by Expression (C).

$$f_{i,j}(x) = \begin{cases} x & (i = j) \\ \bot & (i \ne j) \end{cases} \quad \text{(C)}$$

Various types of functional encryption having a more advanced relationship R(·, ·) have been studied. The most versatile one of these types of functional encryption, which is called attribute-based encryption (ABE), predicate encryption (PE), or the like, has been actively studied. In 2010, Tatsuaki Okamoto et al. proposed this type of functional encryption that is relatively practical, corresponds to a predicate of a polynomial size and a set of predicate variables, and can prove CCA safety against adaptive identifier attacks under standard cryptologic assumptions (see reference literature R1).

(reference literature R1) Tatsuaki Okamoto and Katsuyuki Takashima, "Fully Secure Functional Encryption with General Relations from the Decisional Linear Assumption", In: Advances in Cryptology CRYPTO 2010, Lecture Notes in Computer Science, Volume 6223, 191-208, Springer-Verlag, 2010, Full paper: http://eprint.iacr.org/2010/563/

Functional encryption having a relationship R(·, ·) that is represented by Expression (D) assuming that the key identifier i and the receiver identifier j are instances of a predicate and a predicate variable, respectively, is called key policy functional encryption. At this time, the case where the ciphertext conceals not only the plaintext x but also the instance j of the predicate variable is called attribute concealment.

$$R(i, j) = \quad \text{(D)}$$
$$\begin{cases} \text{True} & (\text{The receiver identifier } j \text{ satisfies the predicate } i.) \\ \text{False} & (\text{The receiver identifier } j \text{ does not satisfy the predicate } i.) \end{cases}$$

Functional encryption having a relationship R(·, ·) that is represented by Expression (E) assuming that the key identifier i and the receiver identifier j are instances of a predicate variable and a predicate, respectively, is called ciphertext policy functional encryption. At this time, the case where the ciphertext conceals not only the plaintext x but also the predicate j is called predicate concealment.

$$R(i, j) = \begin{cases} \text{True} & \text{(The key identifier } i \text{ satisfies the predicate } j.) \\ \text{False} & \text{(The key identifier } i \text{ does not satisfy the predicate } j.) \end{cases} \quad (E)$$

Key policy functional encryption having attribute concealment or ciphertext policy functional encryption having predicate concealment is called predicate encryption (see reference literature R2).

(reference literature R2) Tatsuaki Okamoto and Katsuyuki Takashima, "Hierarchical Predicate Encryption for Inner-Products", ASIACRYPT 2009: pp. 214-231, 2009.

<Threshold Gate>

The configuration of a threshold gate in the functional encryption is achieved according to a threshold secret sharing scheme, that is, a t-out-of-N secret sharing scheme, in which a secret can be restored if arbitrary t pieces out of N pieces of sharing information are given, whereas the secret cannot be restored even if arbitrary (t−1) or less pieces of sharing information are given. For the t-out-of-N secret sharing, please see reference literature R3 and the like. The threshold gate according to the t-out-of-N secret sharing scheme is called a t-out-of-N threshold gate. The t-out-of-N threshold gate has a gate structure that outputs "true" if t or more conditions out of N conditional expressions of inputs are satisfied, and outputs "false" in the other cases. The negation (of an output) of the t-out-of-N threshold gate is equivalent to an (N−t+1)-out-of-N threshold gate of the negation (of every input).

(reference literature R3) A. Shamir, "How to Share a Secret", Communications of the ACM, November 1979, Volume 22, Number 11, pp. 612-613.

<Private Key Verifiable Functional Encryption>

Functional encryption that can definitely prove that the private key $sk_i$ is created correctly for the key identifier i is called private key verifiable functional encryption. A non-interactive zero-knowledge proof (see reference literature R4) that proves that key generation procedures have been performed correctly is added to the private key, whereby the private key verifiable functional encryption can be configured. The use of the private key verifiable functional encryption proves definitely that the private key $sk_i$ is created correctly for the key identifier i.

(reference literature R4) Jens Groth and Amit Sahai, "Efficient Non-interactive Proof Systems for Bilinear Groups", Advances in Cryptology—EUROCRYPT 2008, LNCS 4965, pp. 415-432, March 2010.

<Ciphertext Publicly Verifiable Functional Encryption>

Functional encryption that can definitely prove that a ciphertext is created correctly even without any key for the ciphertext, the key being obtained according to the KeyGen algorithm, is called ciphertext publicly verifiable functional encryption. A non-interactive zero-knowledge proof (see reference literature R4 given above) that proves that encryption procedures have been performed correctly is added to the ciphertext, whereby the ciphertext publicly verifiable functional encryption can be configured. The use of the ciphertext publicly verifiable functional encryption proves definitely that the same results can be obtained even if any key capable of decryption is used for the ciphertext.

<Electronic Signature>

The electronic signature refers to the following three algorithms (KeyGen$_\Sigma$, Sign$_\Sigma$, Verify$_\Sigma$). The protocol thereof will be outlined below.

<<Protocol ES>>

KeyGen$_\Sigma(1^\lambda) \to (sk_\Sigma, pk_\Sigma)$: key generation algorithm

A probability polynomial time algorithm that receives a security parameter $1^\lambda$ and outputs a public key for electronic signature verification $pk_\Sigma$ and a private key for electronic signature $sk_\Sigma$ Sign$_\Sigma(sk_\Sigma, m) \to \sigma$: signature algorithm A probability polynomial time algorithm that receives the private key for electronic signature $sk_\Sigma$ and signature target information m and outputs a signature $\sigma$ Verify$_\Sigma(pk_\Sigma, m, \sigma) \to 0/1$: signature verification algorithm A probability polynomial time algorithm that receives the public key for electronic signature verification $pk_\Sigma$, the signature target information m, and the signature $\sigma$ and outputs a verification result (Rejection (0) or Acceptance (1))

Note that there is proposed an electronic signature scheme that can prove existential unforgeability against adaptive selected document attacks under appropriate cryptologic assumptions (for example, RSA-PSS (see reference literature R5)).

(reference literature R5) Atsushi Fujioka, Evaluation Report on Cryptographic Algorithm RSA-PSS, Nippon Telegraph and Telephone Corporation, 2001

Next, the outline of the functional encryption will be described. Symbols and the like will be defined prior to the description.

[Definitions]

Matrix: A rectangular arrangement of elements of a set in which a calculation is defined. Not only elements of a ring but also elements of a group can form a matrix.

$(\cdot)^T$: Transposed matrix of ·

$(\cdot)^{-1}$: Inverse matrix of ·

$\wedge$ : Logical symbol representing a logical AND $\vee$ : Logical symbol representing a logical OR $\neg$ : Logical symbol representing a negation (NOT)

Propositional variable: Variable in a set {true, false} having "true" or "false" of a statement as its element. The propositional variable and the negation of the propositional variable are collectively referred to as a literal.

Logical expression: Expression having formal grammar representing a statement in mathematical logic. Specifically, "true" and "false" are logical expressions, a propositional variable is a logical expression, the negation of a logical expression is a logical expression, the logical AND of a logical expression and a logical expression is a logical expression, and the logical OR of a logical expression and a logical expression is a logical expression.

Z: Set of integers sec: Security parameter (sec$\in$Z, sec>0)

0*: Sequence formed of * zeros

1*: Sequence formed of * ones $F_q$: Finite field of order q, where q is an integer equal to or larger than 1. For example, the order q is a prime number or a power of a prime number. In other words, the finite field $F_q$ is a prime field or an extended field of the prime field, for example. When the finite field $F_q$ is a prime field, remainder calculations to modulus q can be easily performed, for example. When the finite field $F_q$ is an extended field, remainder calculations modulo an irreducible polynomial can be easily performed, for example. A specific method for configuring a finite field $F_q$ is disclosed, for example, in reference literature 1 "ISO/IEC 18033-2: Information technology—Security techniques—Encryption algorithms—Part 2: Asymmetric ciphers".

$0_F$: Additive unit element of the finite field $F_q$ $1_F$: Multiplicative unit element of the finite field $F_q$ $\delta(i, j)$: Kronecker's delta function. When $i=j$, $\delta(i, j)=1_F$. When $i \neq j$, $\delta(i, j)=0_F$.

E: Elliptic curve defined on the finite field $F_q$. It is defined as a special point O called the point of infinity plus a set of points $(x, y)$ satisfying $x, y \in F_q$ and the Weierstrass equation in an affine coordinate system $$y^2 + a_1 \cdot x \cdot y + a_3 \cdot y = x^3 + a_2 \cdot x^2 + a_4 \cdot x + a_6$$

where $a_1, a_2, a_3, a_4, a_6 \in F_q$. A binary operation + called an elliptic addition can be defined for any two points on the elliptic curve E, and a unary operation − called an elliptic inverse can be defined for any one point on the elliptic curve E. It is well known that a finite set of rational points on the elliptic curve E forms a group with respect to the elliptic addition. It is also well known that an operation called an elliptic scalar multiplication can be defined with the elliptic addition. A specific operation method of elliptic operations such as the elliptic addition on a computer is also well known. (For example, see reference literature 1; reference literature 2 "RFC 5091: Identity-Based Cryptography Standard (IBCS) #1: Supersingular Curve Implementations of the BF and BB1 Cryptosystems"; and reference literature 3 "Ian F. Blake, Gadiel Seroussi, and Nigel P. Smart, "Elliptic Curves in Cryptography", Pearson Education, ISBN 4-89471-431-0".)

A finite set of rational points on the elliptic curve E has a subgroup of order p ($p \geq 1$). When the number of elements in a finite set of rational points on the elliptic curve E is #E and p is a large prime number that can divide #E without a remainder, for example, a finite set E[p] of p equally divided points on the elliptic curve E forms a subgroup of a finite set of rational points on the elliptic curve E. The p equally divided points on the elliptic curve E are points A on the elliptic curve E which satisfy the elliptic scalar multiplication $p \cdot A = O$.

$G_1, G_2, G_T$: Cyclic groups of order q. Specific examples of the cyclic groups $G_1$ and $G_2$ include the finite set E[p] of p equally divided points on the elliptic curve E and subgroups thereof. $G_1$ may equal $G_2$, or $G_1$ may not equal $G_2$. Specific examples of the cyclic group $G_T$ include a finite set constituting an extended field of the finite field $F_q$. An example thereof is a finite set of the p-th root of 1 in the algebraic closure of the finite field $F_q$. Security is enhanced by making the orders of the cyclic groups $G_1$, $G_2$, and $G_T$ identical with the order of the finite field $F_q$.

In the present embodiment, operations defined on the cyclic groups $G_1$ and $G_2$ are expressed as additions, and an operation defined on the cyclic group $G_T$ is expressed as a multiplication. More specifically, $\chi \cdot \Omega \in G_1$ for $\chi \in F_q$ and $\Omega \in G_1$ means that the operation defined in the cyclic group $G_1$ is applied to $\Omega \in G_1$ $\chi$ times, and $\Omega_1 + \Omega_2 \in G_1$ for $\Omega_1, \Omega_2 \in G_1$ means that the operation defined in the cyclic group $G_1$ is applied to $\Omega_1 \in G_1$ and $\Omega_2 \in G_1$. In the same way, $\chi \cdot \Omega \in G_2$ for $\chi \in F_q$ and $\Omega \in G_2$ means that the operation defined in the cyclic group $G_2$ is applied to $\Omega \in G_2$ $\chi$ times, and $\Omega_1 + \Omega_2 \in G_2$ for $\Omega_1, \Omega_2 \in G_2$ means that the operation defined in the cyclic group $G_2$ is applied to $\Omega_1 \in G_2$ and $\Omega_2 \in G_2$. In contrast, $\Omega^\chi \in G_T$ for $\chi \in F_q$ and $\Omega \in G_T$ means that the operation defined in the cyclic group $G_T$ is applied to $\Omega \in G_T$ $\chi$ times, and $\Omega_1 \cdot \Omega_2 \in G_T$ for $\Omega_1, \Omega_2 \in G_T$ means that the operation defined in the cyclic group $G_T$ is applied to $\Omega_1 \in G_T$ and $\Omega_2 \in G_T$.

$\Psi$: Integer equal to or larger than 1

$\psi$: Integer equal to or larger than 0 and equal to or smaller than $\Psi$. $\psi = 0, \ldots, \Psi$.

$\lambda$: Integer equal to or larger than 1 and equal to or smaller than T. $\lambda = 1, \ldots, \Psi$.

$n(\psi)$: Integer equal to or larger than 1

$\zeta(\psi)$: Integer equal to or larger than 0

$G_1^{n(\psi)+\zeta(\psi)}$: Direct product of $(n(\psi)+\zeta(\psi))$ cyclic groups $G_1$ $G_2^{n(\psi)+\zeta(\psi)}$: Direct product of $(n(\psi)+\zeta(\psi))$ cyclic groups $G_2$ $g_1, g_2, g_T$: Generating elements of the cyclic groups $G, G_1, G_2, G_T$ $V(\psi)$: $(n(\psi)+\zeta(\psi))$-dimensional vector space formed of the direct product of the $(n(\psi)+\zeta(\psi))$ cyclic groups $G_1$ $V^*(\psi)$: $(n(\psi)+\zeta(\psi))$-dimensional vector space formed of the direct product of the $(n(\psi)+\zeta(\psi))$ cyclic groups $G_2$ $e_\psi$: Non-degenerate bilinear map that maps the direct product $G_1^{n(\psi)+\zeta(\psi)} \times G_2^{n(\psi)+\zeta(\psi)}$ of the direct product $G_1^{n(\psi)+\zeta(\psi)}$ and the direct product $G_2^{n(\psi)+\zeta(\psi)}$ to the cyclic group $G_T$. The bilinear map $e_\psi$ receives $(n(\psi)+\zeta(\psi))$ elements $\gamma_\beta$ ($\beta=1, \ldots, n(\psi)+\zeta(\psi)$) of the cyclic group $G_1$ and $(n(\psi)+\zeta(\psi))$ elements $\gamma_\beta^*$ ($\beta=1, \ldots, n(\psi)+\zeta(\psi)$) of the cyclic group $G_2$ and outputs one element of the cyclic group $G_T$.

$$e_\psi : G_1^{n(\psi)+\zeta(\psi)} \times G_2^{n(\psi)+\zeta(\psi)} \to G_T \qquad (1)$$

The bilinear map $e_\psi$ satisfies the following characteristics.

Bilinearity: The following relationship is satisfied for all $\Gamma_1 \in G_1^{n(\psi)+\zeta(\psi)}$, $\Gamma_2 \in G_2^{n(\psi)+\zeta(\psi)}$, and $\nu, \kappa \in F_q$.

$$e_\psi(\nu \cdot \Gamma_1, \kappa \cdot \Gamma_2) = e_\psi(\Gamma_1, \Gamma_2)^{\nu \cdot \kappa} \qquad (2)$$

Non-degeneracy: This map does not map all $\Gamma_1 \in G_1^{n(\psi)+\zeta(\psi)}$, $\Gamma_2 \in G_2^{n(\psi)+\zeta(\psi)}$ onto the unit element of the cyclic group $G_T$.

Computability: There exists an algorithm for efficiently calculating $e_\psi(\Gamma_1, \Gamma_2)$ for all $$\Gamma_1 \in G_1^{n(\psi)+\zeta(\psi)}, \Gamma_2 \in G_2^{n(\psi)+\zeta(\psi)} \qquad (3)$$

In the present embodiment, the following non-degenerate bilinear map that maps the direct product $G_1 \times G_2$ of the cyclic group $G_1$ and the cyclic group $G_2$ to the cyclic group $G_T$ constitutes the bilinear map $e_\psi$.

$$\text{Pair}: G_1 \times G_2 \to G_T \qquad (4)$$

The bilinear map $e_\psi$ of the present embodiment receives an $(n(\psi)+\zeta(\psi))$-dimensional vector $(\gamma_1, \ldots, \gamma_{n(\psi)+\zeta(\psi)})$ formed of $(n(\psi)+\zeta(\psi))$ elements $\gamma_\beta$ ($\beta=1, \ldots, n(\psi)+\zeta(\psi)$) of the cyclic group $G_1$ and an $(n(\psi)+\zeta(\psi))$-dimensional vector $(\gamma_1^*, \ldots, \gamma_{n(\psi)+\zeta(\psi)}^*)$ formed of $(n(\psi)+\zeta(\psi))$ elements $\gamma_\beta^*$ ($\beta=1, \ldots, n(\psi)+\zeta(\psi)$) of the cyclic group $G_2$ and outputs one element of the cyclic group $G_T$.

$$e_\psi : \Pi_{\beta=1}^{n(\psi)+\zeta(\psi)} \text{Pair}(\gamma_\beta, \gamma_\beta^*) \qquad (5)$$

The bilinear map Pair receives a combination of one element of the cyclic group $G_1$ and one element of the cyclic group $G_2$ and outputs one element of the cyclic group $G_T$. The bilinear map Pair satisfies the following characteristics.

Bilinearity: The following relationship is satisfied for all $\Omega_1 \in G_1$, $\Omega_2 \in G_2$, and $\nu, \kappa \in F_q$.

$$\text{Pair}(\nu \cdot \Omega_1, \kappa \cdot \Omega_2) = \text{Pair}(\Omega_1, \Omega_2)^{\nu \cdot \kappa} \qquad (6)$$

Non-degeneracy: This map does not map all $$\Omega_1 \in G_1, \Omega_2 \in G_2 \qquad (7)$$

onto the unit element of the cyclic group $G_T$.

Computability: There exists an algorithm for efficiently calculating $\text{Pair}(\Omega_1, \Omega_2)$ for all $\Omega_1 \in G_1$, $\Omega_2 \in G_2$.

A specific example of the bilinear map Pair is a function for performing a pairing operation such as Weil pairing or Tate pairing. (For example, see reference literature 4 "Alfred. J. Menezes, Elliptic Curve Public Key Cryptosystems, Kluwer Academic Publishers, ISBN 0-7923-9368-6, pp. 61-81".) A modified pairing function $e(\Omega_1, \text{phi}(\Omega_2))$ ($\Omega_1 \in G_1$, $\Omega_2 \in G_2$) obtained by combining a function for performing a pairing operation, such as Tate pairing, and a predetermined function phi according to the type of the elliptic curve E may be used as the bilinear map Pair (for example, see reference literature 2). As the algorithm for performing a pairing operation on a computer, the Miller algorithm (see reference literature 5 "V. S. Miller, "Short Programs for Functions on Curves", 1986, http://crypto.stanford.edu/miller/miller.pdf") or some other known algorithm can be used. Methods for configuring a cyclic group and an elliptic curve used to efficiently perform a pairing operation have been well known. (For example, see reference literature 2; reference literature 6 "A. Miyaji, M. Nakabayashi, and S. Takano, "New Explicit Conditions of Elliptic Curve Traces for FR Reduction", IEICE Trans. Fundamentals, Vol. E84-A, No. 5, pp. 1234-1243, May 2001"; reference literature 7 "P. S. L. M. Barreto, B. Lynn, M. Scott, "Constructing Elliptic Curves with Prescribed Embedding Degrees", Proc. SCN "2002, LNCS 2576, pp. 257-267, Springer-Verlag. 2003"; and reference literature 8 "R. Dupont, A. Enge, F. Morain, "Building Curves with Arbitrary Small MOV Degree over Finite Prime Fields", http://eprint.i-acr.org/2002/094/").

$a_i(\psi)$ (i=1, ..., $n(\psi)+\zeta(\psi)$): $(n(\psi)+\zeta(\psi))$-dimensional basis vector having $(n(\psi)+\zeta(\psi))$ elements of the cyclic group $G_1$ as elements. An example of the basis vector $a_i(\psi)$ is an $(n(\psi)+\zeta(\psi))$-dimensional basis vector having $\kappa_1 \cdot g_1 \in G_1$ as an i-dimensional element and the unit element (expressed as "0" in additive expression) of the cyclic group $G_1$ as the remaining $(n(\psi)+\zeta(\psi)-1)$ elements. In that case, each element of the $(n(\psi)+\zeta(\psi))$-dimensional basis vector $a_i(\psi)$ (i=1, ..., $n(\psi)+\zeta(\psi)$) can be listed as follows.

$$a_1(\psi) = (\kappa_1 \cdot g_1, 0, 0, \ldots, 0) \quad (8)$$
$$a_2(\psi) = (0, \kappa_1 \cdot g_1, 0, \ldots, 0)$$
$$\ldots$$
$$a_{n(\psi)+\zeta(\psi)}(\psi) = (0, 0, 0, \ldots, \kappa_1 \cdot g_1)$$

Here, $\kappa_1$ is a constant formed of the elements of the finite field $F_q$ other than the additive unit element $0_F$. A specific example of $\kappa_1 \in F_q$ is $\kappa_1 = 1_F$. The basis vector $a_i(\psi)$ is an orthogonal basis. Each $(n(\psi)+\zeta(\psi))$-dimensional vector having $(n(\psi)+\zeta(\psi))$ elements of the cyclic group $G_1$ as elements is expressed by a linear sum of $(n(\psi)+(\psi))$-dimensional basis vectors $a_i(\psi)$ (i=1, ..., $n(\psi)+\zeta(\psi)$). Therefore, the $(n(\psi)+\zeta(\psi))$-dimensional basis vectors $a_i(\psi)$ span the vector space $V(\psi)$, described earlier.

$a_i^*(\psi)$ (i=1, ..., $n(\psi)+\zeta(\psi)$): $(n(\psi)+\zeta(\psi))$-dimensional basis vector having $(n(\psi)+\zeta(\psi))$ elements of the cyclic group $G_2$ as elements. An example of the basis vector $a_i^*(\psi)$ is an $(n(\psi)+\zeta(\psi))$-dimensional basis vector having $\kappa_2 \cdot g_2 \in G_2$ as an i-dimensional element and the unit element (expressed as "0" in additive expression) of the cyclic group $G_2$ as the remaining $(n(\psi)+\zeta(\psi)-1)$ elements. In that case, each element of the $(n(\psi)+\zeta(\psi))$-dimensional basis vector $a_i^*(\psi)$ (i=1, ..., $n(\psi)+\zeta(\psi)$) can be listed as follows.

$$a_1^*(\psi) = (\kappa_2 \cdot g_2, 0, 0, \ldots, 0) \quad (9)$$
$$a_2^*(\psi) = (0, \kappa_2 \cdot g_2, 0, \ldots, 0)$$
$$\ldots$$
$$a_{n(\psi)+\zeta(\psi)}^*(\psi) = (0, 0, 0, \ldots, \kappa_2 \cdot g_2)$$

Here, $\kappa_2$ is a constant formed of the elements of the finite field $F_q$ other than the additive unit element $0_F$. A specific example of $\kappa_2 \in F_q$ is $\kappa_2 = 1_F$. The basis vector $a_i^*(\psi)$ is an orthogonal basis. Each $(n(\psi)+\zeta(\psi))$-dimensional vector having $(n(\psi)+\zeta(\psi))$ elements of the cyclic group $G_2$ as elements is expressed by a linear sum of $(n(\psi)+\zeta(\psi))$-dimensional basis vectors $a_i^*(\psi)$ (i=1, ..., $n(\psi)+\zeta(\psi)$). Therefore, the $(n(\psi)+\zeta(\psi))$-dimensional basis vectors $a_i^*(\psi)$ span the vector space $V^*(\psi)$, described earlier.

The basis vector $a_i(\psi)$ and the basis vector $a_i^*(\psi)$ satisfy the following expression for the elements $\tau = \kappa_1 \cdot \kappa_2$ of the finite field $F_q$ other than $0_F$.

$$e_\psi(a_i(\psi), a_j^*(\psi)) = g_T^{\tau \cdot \delta(i,j)} \quad (10)$$

When i=j, the following expression is satisfied from Expressions (5) and (6).

$$e_\psi(a_i(\psi), a_i^*(\psi)) = \text{Pair}(\kappa_1 \cdot g_1, \kappa_2 \cdot g_2) \cdot \text{Pair}(0,0) \cdot \ldots \cdot \text{Pair}(0,0)$$
$$= \text{Pair}(g_1, g_2)^{\kappa_1 \cdot \kappa_2} \cdot$$
$$\text{Pair}(g_1, g_2)^{0 \cdot 0} \cdot \ldots \cdot \text{Pair}(g_1, g_2)^{0 \cdot 0}$$
$$= \text{Pair}(g_1, g_2)^{\kappa_1 \cdot \kappa_2}$$
$$= g_T^\tau$$

Here, superscripts $\kappa 1$ and $\kappa 2$ respectively represent $\kappa_1$ and $\kappa_2$. When i≠j, the right side of $e_\chi(a_i(\psi), a_j^*(\psi)) = \Pi_{i=1}^{n(\psi)+\zeta(\psi)} \text{Pair}(a_i(\psi), a_j^*(\psi))$ does not include $\text{Pair}(\kappa_1 \cdot g_1, \kappa_2 \cdot g_2)$ and is the product of $\text{Pair}(\kappa_1 \cdot g_i, 0)$, $\text{Pair}(0, \kappa_2 \cdot g_2)$, and $\text{Pair}(0, 0)$. In addition, $\text{Pair}(g_1, 0) = \text{Pair}(0, g) = \text{Pair}(g_1, g_2)^0$ is satisfied from Expression (6). Therefore, when i≠j, the following expression is satisfied.

$$e_\psi(a_i(\psi), a_j^*(\psi)) = e_\psi(g_1, g_2)^0 = g_T^0$$

Especially when $\tau = \kappa_1 \cdot \kappa_2 = 1_F$ (for example, $\kappa_1 = \kappa_2 = 1_F$), the following expression is satisfied.

$$e(a_i(\psi), a_j^*(\psi)) = g_T^{\delta(i,j)} \quad (11)$$

Here, $g_T^0 = 1$ is the unit element of the cyclic group $G_T$, and $g_T^1 = g_T$ is a generating element of the cyclic group $G_T$. In that case, the basis vector $a_i(\psi)$ and the basis vector $a_i^*(\psi)$ are a dual normal orthogonal basis, and the vector space $V(\psi)$ and the vector space $V^*(\psi)$ are a dual vector space that can constitute bilinear mapping (dual pairing vector space (DPVS)).

$A(\psi)$: An $(n(\psi)+\zeta(\psi))$ row by $(n(\psi)+\zeta(\psi))$ column matrix having the basis vector $a_i(\psi)$ (i=1, ..., $n(\psi)+\zeta(\psi)$) as elements. When the basis vector $a_i(\psi)$ (i=1, ..., $n(\psi)+\zeta(\psi)$) is expressed by Expression (8), for example, the matrix $A(\psi)$ is as follows.

$$A(\psi) = \begin{pmatrix} a_1(\psi) \\ a_2(\psi) \\ \vdots \\ a_{n(\psi)+\zeta(\psi)}(\psi) \end{pmatrix} \quad (12)$$

$$= \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix}$$

$A^*(\psi)$: An $(n(\psi)+\zeta(\psi))$ row by $(n(\psi)+\zeta(\psi))$ column matrix having the basis vector $a_i^*(\psi)$ (i=1, ..., $n(\psi)+\zeta(\psi)$) as elements. When the basis vector $a_i^*(\psi)$ ($i=1, \ldots, n(\psi)+\zeta(\psi)$) is expressed by Expression (9), for example, the matrix $A^*(\psi)$ is as follows.

$$A^*(\psi) = \begin{pmatrix} a_1^*(\psi) \\ a_2^*(\psi) \\ \vdots \\ a_{n(\psi)+\zeta(\psi)}^*(\psi) \end{pmatrix} \quad (13)$$

$$= \begin{pmatrix} \kappa_2 \cdot g_2 & 0 & \ldots & 0 \\ 0 & \kappa_2 \cdot g_2 & & \vdots \\ \vdots & & \ddots & 0 \\ 0 & \ldots & 0 & \kappa_2 \cdot g_2 \end{pmatrix}$$

$X(\psi)$: An $(n(\psi)+\zeta(\psi))$ row by $(n(\psi)+\zeta(\psi))$ column matrix having elements of the finite field $F_q$ as elements. The matrix $X(\psi)$ is used to apply coordinate conversion to the basis vector $a_i(\psi)$. When the element located at the i-th row and the j-th column ($i=1, \ldots, n(\psi)+\zeta(\psi), j=1, \ldots, n(\psi)+\zeta(\psi)$) in the matrix $X(\psi)$ is $\chi_{i,j}(\psi) \in F_q$, the matrix $X(\psi)$ is as follows.

$$X(\psi) = \begin{pmatrix} \chi_{1,1}(\psi) & \chi_{1,2}(\psi) & \ldots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \ldots & \chi_{n(\psi)+\zeta(\psi),n(\psi)+\zeta(\psi)}(\psi) \end{pmatrix} \quad (14)$$

Here, each element $\chi_{i,j}(\psi)$ of the matrix $X(\psi)$ is called a conversion coefficient.

$X^*(\psi)$: $X^*(\psi)$ and the matrix $X(\psi)$ satisfy the relationship of $X^*(\psi) = \tau' \cdot (X(\psi)^{-1})^T$. Note that $\tau' \in F_q$ is an arbitrary constant belonging to the finite field $F_q$, and $\tau' = 1_F$, for example. The matrix $X^*(\psi)$ is used to apply coordinate conversion to the basis vector $a_i^*(\psi)$. When the element located at the i-th row and the j-th column in the matrix $X^*(\psi)$ is $\chi_{i,j}^*(\psi) \in F_q$, the matrix $X^*(\psi)$ is as follows.

$$X^*(\psi) = \begin{pmatrix} \chi_{1,1}^*(\psi) & \chi_{1,2}^*(\psi) & \ldots & \chi_{1,n(\psi)+\zeta(\psi)}^*(\psi) \\ \chi_{2,1}^*(\psi) & \chi_{2,2}^*(\psi) & & \vdots \\ \vdots & & \ddots & \vdots \\ \chi_{n(\psi)+\zeta(\psi),1}^*(\psi) & \chi_{n(\psi)+\zeta(\psi),2}^*(\psi) & \ldots & \chi_{n(\psi)+\zeta(\psi),n(\psi)+\zeta(\psi)}^*(\psi) \end{pmatrix} \quad (15)$$

Here, each element $\chi_{i,j}^*(\psi)$ of the matrix $X^*(\psi)$ is called a conversion coefficient.

In that case, when an $(n(\psi)+\zeta(\psi))$ row by $(n(\psi)+\zeta(\psi))$ column unit matrix is $I(\psi)$, $X(\psi) \cdot (X^*(\psi))^T = \tau' \cdot I(\psi)$. In other words, for the unit matrix given below, $$I(\psi) = \begin{pmatrix} 1_F & 0_F & \ldots & 0_F \\ 0_F & 1_F & & \vdots \\ \vdots & & \ddots & 0_F \\ 0_F & 0_F & \ldots & 1_F \end{pmatrix} \quad (16)$$

the following expression is satisfied.

$$\begin{pmatrix} \chi_{1,1}(\psi) & \chi_{1,2}(\psi) & \ldots & \chi_{1,n(\psi)+\zeta(\psi)}(\psi) \\ \chi_{2,1}(\psi) & \chi_{2,2}(\psi) & & \vdots \\ \vdots & & \ddots & \vdots \\ \chi_{n(\psi)+\zeta(\psi),1}(\psi) & \chi_{n(\psi)+\zeta(\psi),2}(\psi) & \ldots & \chi_{n(\psi)+\zeta(\psi),n(\psi)+\zeta(\psi)}(\psi) \end{pmatrix} \times \quad (17)$$

$$\begin{pmatrix} \chi_{1,1}^*(\psi) & \chi_{1,2}^*(\psi) & \ldots & \chi_{n(\psi)+\zeta(\psi),1}^*(\psi) \\ \chi_{1,2}^*(\psi) & \chi_{2,2}^*(\psi) & & \vdots \\ \vdots & & \ddots & \vdots \\ \chi_{1,n(\psi)+\zeta(\psi)}^*(\psi) & \chi_{2,n(\psi)+\zeta(\psi)}^*(\psi) & \ldots & \chi_{n(\psi)+\zeta(\psi),n(\psi)+\zeta(\psi)}^*(\psi) \end{pmatrix} =$$

$$\tau' \cdot \begin{pmatrix} 1_F & 0_F & \ldots & 0_F \\ 0_F & 1_F & & \vdots \\ \vdots & & \ddots & 0_F \\ 0_F & 0_F & \ldots & 1_F \end{pmatrix}$$

Here, $(n(\psi)+\zeta(\psi))$-dimensional vectors will be defined below.

$$\vec{\chi_i}(\psi) = (\chi_{i,1}(\psi), \ldots, \chi_{i,n(\psi)+\zeta(\psi)}) \quad (18)$$

$$\vec{\chi_j^*}(\psi) = (\chi_{j,1}(\psi), \ldots, \chi_{j,n(\psi)+\zeta(\psi)}) \quad (19)$$

The inner product of the $(n(\psi)+\zeta(\psi))$-dimensional vectors $\vec{\chi_i}(\psi)$ and $\vec{\chi_j^*}(\psi)$ satisfies the following expression from Expression (17).

$$\vec{\chi_i}(\psi) \cdot \vec{\chi_j^*}(\psi) = \tau' \cdot \delta(i,j) \quad (20)$$

$b_i(\psi)$: $(n(\psi)+\zeta(\psi))$-dimensional basis vector having $(n(\psi)+\zeta(\psi))$ elements of the cyclic group $G_1$ as elements. The basis vector $b_i(\psi)$ is obtained by applying coordinate conversion to the basis vector $a_i(\psi)$ ($i=1, \ldots, n(\psi)+\zeta(\psi)$) by using the matrix $X(\psi)$. Specifically, the basis vector $b_i(\psi)$ is obtained by the following calculation.

$$b_i(\psi) = \sum_{j=1}^{n(\psi)+\zeta(\psi)} \chi_{i,j}(\psi) \cdot a_j(\psi) \quad (21)$$

For example, when the basis vector $a_j(\psi)$ ($j=1, \ldots, n(\psi)+\zeta(\psi)$) is expressed by Expression (8), each element of the basis vector $b_i(\psi)$ can be listed as follows.

$$b_i(\psi) = (\chi_{i,j}(\psi) \cdot \kappa_1 \cdot g_1, \chi_{i,2}(\psi) \cdot \kappa_1 \cdot g_1, \ldots, \chi_{i,n(\psi)+\zeta(\psi)}(\psi) \cdot \kappa_1 \cdot g_1) \quad (22)$$

Each $(n(\psi)+\zeta(\psi))$-dimensional vector having $(n(\psi)+\zeta(\psi))$ elements of the cyclic group $G_1$ as elements is expressed by a linear sum of $(n(\psi)+\zeta(\psi))$-dimensional basis vectors $b_i(\psi)$ ($i=1, \ldots, n(\psi)+\zeta(\psi)$). Therefore, the $(n(\psi)+\zeta(\psi))$-dimensional basis vectors $b_i(\psi)$ span the vector space $V(\psi)$, described earlier.

$b_i^*(\psi)$: $(n(\psi)+\zeta(\psi))$-dimensional basis vector having $(n(\psi)+\zeta(\psi))$ elements of the cyclic group $G_2$ as elements. The basis vector $b_i^*(\psi)$ is obtained by applying coordinate conversion to the basis vector $a_i^*(\psi)$ ($i=1, \ldots, n(\psi)+\zeta(\psi)$) by using the matrix $X^*(\psi)$. Specifically, the basis vector $b_i^*(\psi)$ is obtained by the following calculation.

$$b_i^*(\psi) = \sum_{j=1}^{n(\psi)+\zeta(\psi)} \chi_{i,j}^*(\psi) \cdot a_j^*(\psi) \quad (23)$$

For example, when the basis vector $a_j^*(\psi)$ ($j=1, \ldots, n(\psi)+\zeta(\psi)$) is expressed by Expression (9), each element of the basis vector $b_i^*(\psi)$ can be listed as follows.

$$b_i^*(\psi) = (\chi_{i,1}^*(\psi) \cdot \kappa_2 \cdot g_2, \chi_{i,2}^*(\psi) \cdot \kappa_2 \cdot g_2, \ldots, \chi_{i,n(\psi)+\zeta(\psi)}^*(\psi) \cdot \eta_2 \cdot g_2) \quad (24)$$

Each $(n(\psi)+\zeta(\psi))$-dimensional vector having $(n(\psi)+\zeta(\psi))$ elements of the cyclic group $G_2$ as elements is expressed by a linear sum of $(n(\psi)+\zeta(\psi))$-dimensional basis vectors $b_i^*(\psi)$ ($i=1, \ldots, n(\psi)+\zeta(\psi)$). Therefore, the $(n(\psi)+\zeta(\psi))$-dimensional basis vectors $b_i^*(\psi)$ span the vector space $V^*(\psi)$, described earlier.

The basis vector $b_i(\psi)$ and the basis vector $b_i^*(\psi)$ satisfy the following expression for the elements $i=\kappa_1\cdot\kappa_2$ of the finite field $F_q$ other than $0_F$.

$$e_\psi(b_i(\psi), b_j^*(\psi)) = g_T^{\tau\cdot\tau'\cdot\delta(i,j)} \quad (25)$$

The following expression is satisfied from Expressions (5), (20), (22), and (24).

$$e_\psi(b_i(\psi), b_j^*(\psi)) = \prod_{\beta=1}^{n(\psi)+\zeta(\psi)} \text{Pair}(\chi_{i,\beta}(\psi)\cdot\kappa_1\cdot g_1, \chi_{j,\beta}^*(\psi)\cdot\kappa_2\cdot g_2)$$

$$= \text{Pair}(g_1, g_2)^{\kappa_1\cdot\kappa_2\cdot\vec{\chi_i}(\psi)\cdot\vec{\chi_j}^*(\psi)}$$

$$= \text{Pair}(g_1, g_2)^{\tau\cdot\tau'\cdot\delta(i,j)}$$

$$= g_T^{\tau\cdot\tau'\cdot\delta(i,j)}$$

Especially when $\tau=\kappa_1\cdot\kappa_2=1_F$ (for example, $\kappa_1=\kappa_2=1_F$), the following expression is satisfied.

$$e_\psi(b_i(\psi), b_j^*(\psi)) = g_T^{\delta(i,j)} \quad (26)$$

In that case, the basis vector $b_i(\psi)$ and the basis vector $b_i^*(\psi)$ are the dual normal orthogonal basis of a dual pairing vector space (the vector space $V(\psi)$ and the vector space $V^*(\psi)$).

As long as Expression (25) is satisfied, the basis vectors $a_i(\psi)$ and $a_i^*(\psi)$ other than those shown in Expressions (8) and (9) as examples and the basis vectors $b_i(\psi)$ and $b_i^*(\psi)$ other than those shown in Expressions (21) and (23) as examples may be used.

$B(\psi)$: An $(n(\psi)+\zeta(\psi))$ row by $(n(\psi)+\zeta(\psi))$ column matrix having the basis vector $b_i(\psi)$ ($i=1, \ldots, n(\psi)+\zeta(\psi)$) as elements. $B(\psi)=X(\psi)\cdot A(\psi)$ is satisfied. For example, when the basis vector $b_i(\psi)$ is expressed by Expression (22), the matrix $B(\psi)$ is as follows.

$$B(\varphi) = \begin{pmatrix} b_1(\varphi) \\ b_2(\varphi) \\ \vdots \\ b_{n(\varphi)+\zeta(\varphi)}(\varphi) \end{pmatrix} \quad (27)$$

$$= \begin{pmatrix} \chi_{1,1}(\varphi)\cdot\kappa_1\cdot g_1 & \cdots & \chi_{1,n(\varphi)+\zeta(\varphi)}(\varphi)\cdot\kappa_1\cdot g_1 \\ \vdots & \ddots & \vdots \\ \chi_{n(\varphi)+\zeta(\varphi),1}(\varphi)\cdot\kappa_1\cdot g_1 & \cdots & \chi_{n(\varphi)+\zeta(\varphi),n(\varphi)+\zeta(\varphi)}(\varphi)\cdot\kappa_1\cdot g_1 \end{pmatrix}$$

$B^*(\psi)$: An $(n(\psi)+\zeta(\psi))$ row by $(n(\psi)+\zeta(\psi))$ column matrix having the basis vector $b_i^*(\psi)$ ($i=1, \ldots, n(\psi)+\zeta(\psi)$) as elements. $B^*(\psi)=X^*(\psi)\cdot A^*(\psi)$ is satisfied. For example, when the basis vector $b_i^*(\psi)$ ($i=1,\ldots,n(i)+\zeta(\psi)$) is expressed by Expression (24), the matrix $B^*(\psi)$ is as follows.

$$B^*(\varphi) = \begin{pmatrix} b_1^*(\varphi) \\ b_2^*(\varphi) \\ \vdots \\ b_{n(\varphi)+\zeta(\varphi)}^*(\varphi) \end{pmatrix} \quad (28)$$

$$= \begin{pmatrix} \chi_{1,1}^*(\varphi)\cdot\kappa_1\cdot g_1 & \cdots & \chi_{1,n(\varphi)+\zeta(\varphi)}^*(\varphi)\cdot\kappa_2\cdot g_2 \\ \vdots & \ddots & \vdots \\ \chi_{n(\varphi)+\zeta(\varphi),1}^*(\varphi)\cdot\kappa_1\cdot g_1 & \cdots & \chi_{n(\varphi)+\zeta(\varphi),n(\varphi)+\zeta(\varphi)}^*(\varphi)\cdot\kappa_2\cdot g_2 \end{pmatrix}$$

$v(\lambda)^\rightarrow$: An $n(\lambda)$-dimensional vector having elements of the finite field $F_q$ as elements.

$$v(\lambda)^\rightarrow = (v_1(\lambda), \ldots, v_{n(\lambda)}(\lambda)) \in F_q^{n(\lambda)} \quad (29)$$

$v_\mu(\lambda)$: The $\mu$-th ($\mu=1, \ldots, n(\lambda)$) element of the $n(\lambda)$-dimensional vector $v(\lambda)^\rightarrow$.

$w(\lambda)^\rightarrow$: An $n(\lambda)$-dimensional vector having elements of the finite field $F_q$ as elements.

$$w(\lambda)^\rightarrow = (w_1(\lambda), \ldots, w_{n(\lambda)}(\lambda)) \in F_q^{n(\lambda)} \quad (30)$$

$w_\mu(\lambda)$: The $\mu$-th ($\mu=1, \ldots, n(\lambda)$) element of the $n(\lambda)$-dimensional vector $w(\lambda)^\rightarrow$.

Enc: A common key encryption function that indicates an encryption process of a common key cryptosystem.

$\text{Enc}_K(M)$: Ciphertext obtained by encrypting plaintext M by the common key encryption function Enc with the use of a common key K.

Dec: A common key decryption function that indicates a decryption process of the common key cryptosystem.

$\text{Dec}_K(C)$: A decryption result obtained by decrypting ciphertext C by the common key decryption function Dec with the use of the common key K.

[Function Cryptosystem]

Next, the basic configuration of function cryptosystem will be described below.

In the function cryptosystem, a ciphertext is decoded in the case where the true value of a logical expression determined by the combination of first information and second information is "true". One of the "first information" and the "second information" is embedded in the ciphertext, and the other thereof is embedded in key information. For example, a predicate cryptosystem disclosed in "Predicate Encryption Supporting Disjunctions, Polynomial Equations, and Inner Products", with Amit Sahai and Brent Waters One of 4 papers from Eurocrypt 2008 invited to the Journal of Cryptology" (reference literature 9) is one of function cryptosystems.

There exist various known function cryptosystems other than the one given above, and a new function cryptosystem that has not been published is described below. In the new function cryptosystem to be described below, secrets of a value according to secret information are hierarchically shared in a mode according to a predetermined logical expression. The predetermined logical expression includes a propositional variable whose true value is determined by the combination of the first information and the second information, and further includes all or some of the logical symbols ∧, ∨, and ¬ as needed. Then, in the case where the true value of the predetermined logical expression, which is determined by identifying the true value of each propositional variable, is "true", the value according to the secret information is restored, and the ciphertext is decrypted on the basis of the restored value.

<Relationship Between Logical Expression and Hierarchical Secret Sharing>

The relationship between the predetermined logical expression and the hierarchical secret sharing will be described.

The secret sharing refers to dividing secret information into N ($N \geq 2$) pieces of share information such that the secret information is restored only in the case where $K_t$ ($K_t \leq 1$) or more pieces (threshold value) of share information are obtained. A secret sharing scheme (SSS) that satisfies $K_t = N$ is called an N-out-of-N sharing scheme (or "N-out-of-N threshold sharing scheme"), and a secret sharing scheme that satisfies $K_t < N$ is called a $K_t$-out-of-N sharing scheme (or "$K_t$-out-of-N threshold sharing scheme") (for example, see reference literature 10 "Kaoru Kurosawa, Wakaha Ogata "Basic Mathematics of Modern Cryptography (IEICE Lecture Series)", Corona Publishing Co., Ltd., March 2004, p. 116-119"; and reference literature 11 "A. Shamir, "How to Share a Secret", Communications of the ACM, November 1979, Volume 22, Number 11, pp. 612-613.").

In the N-out-of-N sharing scheme, if all pieces of share information share(1), . . . , share(N) are given, secret information SE can be restored, but even if (N−1) pieces of arbitrary share information share($\phi_1$), . . . , share($\phi_{N-1}$) are given, the secret information SE cannot be obtained at all. An example thereof is given below.

$SH_1$, . . . , $SH_{N-1}$ are randomly selected.
Calculation of $SH_N = SE - (SH_1 + \ldots + SH_{N-1})$ is performed.
$SH_1$, . . . , $SH_N$ are respectively defined as the pieces of share information share(1), . . . , share(N).
If all the pieces of share information share(1), . . . , share(N) are given, the secret information SE can be restored by a restoration process using the following expression.

$$SE = \text{share}(1) + \ldots + \text{share}(N) \quad (31)$$

In the $K_t$-out-of-N sharing scheme, if $K_t$ pieces of arbitrary different share information share($\phi$1), . . . , share($\phi_{Kt}$) are given, the secret information SE can be restored, but even if ($K_t-1$) pieces of arbitrary share information share($\phi_1$), . . . , share($\phi_{Kt-1}$) are given, the secret information SE cannot be obtained at all. Note that the subscript Kt represents $K_t$. An example of the $K_t$-out-of-N sharing scheme is given below.

A ($K_t-1$)-order polynomial $f(x) = \xi_0 + \xi_1 \cdot x + \xi_2 \cdot x^2 + \ldots + \xi_{Kt-1} \cdot x^{Kt-1}$ that satisfies f(0)=SE is randomly selected. That is, assuming that $\xi_0 = SE$, $\xi_1$, . . . , $\xi_{Kt-1}$ are randomly selected. The share information is defined as share($\rho$)= ($\rho$, f($\rho$)) ($\rho=1, \ldots, N$). Note that ($\rho$, f($\rho$)) is information that can extract values of $\rho$ and f($\rho$), and is a bit connecting value of $\rho$ and f($\rho$), for example.

In the case where $K_t$ pieces of arbitrary different share information share($\phi_1$), . . . , share($\phi_{Kt}$) (($\phi_1$, . . . , $\phi_{Kt}$) $\cup$(1, . . . , N)) are obtained, for example, the secret information SE can be restored by a restoration process using the following expression, according to the Lagrange formula for interpolation.

$$SE = f(0) = LA_1 \cdot f(\varphi_1) + \ldots + LA_{K_t} \cdot f(\varphi_{K_t}) \quad (32)$$

$$LA_\rho(x) = \frac{(x - \phi_1) \ldots \overset{\rho}{\vee} \ldots (x - \phi_{K_t})}{(\phi_\rho - \phi_1) \ldots \overset{\rho}{\vee} \ldots (\phi_\rho - \phi_{K_t})} \in F_q \quad (33)$$

where $\lceil \ldots \overset{\rho}{\vee} \ldots \rfloor$ means that a $\rho$-th operand from the beginning, which has a denominator element (($\phi_\rho - \phi_\rho$) and a numerator element ($x - \phi_\rho$), does not exist. That is, the denominator of Expression (33) is as follows.

$(\phi_\rho - \phi_1) \cdot \ldots \cdot (\phi_\rho - \phi_{\rho-1}) \cdot (\phi_\rho - \phi_{\rho+1}) \cdot \ldots \cdot (\phi_\rho - \phi_{Kt})$ The numerator of Expression (33) is as follows.

$(x - \phi_1) \cdot \ldots \cdot (x - \phi_{\rho-1}) \cdot (x - \phi_{\rho+1}) \cdot \ldots \cdot (x - \phi_{Kt})$ Each secret sharing described above can be executed in the field. Further, through extension thereof, secrets of a value according to secret information SE can be shared to pieces of share information share. The value according to the secret information SE refers to the secret information SE itself and a function value of the secret information SE, and the value according to the share information share refers to the share information share itself and a function value of the share information. For example, secrets of elements $g_T^{SE} \in G_T$ of the cyclic group $G_T$ according to the secret information $SE \in F_q$ constituting elements of the finite field $F_q$ can be shared to elements $g_T^{\text{share}(1)}$, $g_T^{\text{share}(2)} \in G_T$ of the cyclic group $G_T$ according to the pieces of share information share(1), share (2) of the secret information SE. Further, the secret information SE described above is a linear combination of the pieces of share information share (Expressions (31) and (32)). Such a secret sharing scheme in which the secret information SE is a linear combination of the pieces of share information share is called a linear secret sharing scheme.

The predetermined logical expression described above can be expressed by tree structure data obtained by hierarchically sharing secrets of the secret information. That is, according to De Morgan's laws, the predetermined logical expression described above can be expressed by a logical expression formed of literals or a logical expression formed of at least part of the logical symbols ∧ and ∨ and literals (these will be called "standard logical expressions"), and such a standard logical expression can be expressed by tree structure data obtained by hierarchically sharing secrets of the secret information.

Tree structure data that expresses a standard logical expression includes a plurality of nodes, at least part of the nodes are defined as a parent node of one or more child nodes, one of the parent nodes is defined as a root node, and at least part of the child nodes are defined as a leaf node. A parent node of the root node and a child node of the leaf node do not exist. A value according to secret information corresponds to the root node, and a value according to share information obtained by sharing secrets of a value corresponding to each parent node corresponds to a child node of this parent node. Secret sharing modes (such as a secret sharing scheme and a threshold value) at each node are determined in accordance with a standard logical expression. Further, each literal constituting the standard logical expression corresponds to each leaf node, and the true value of each literal is determined by the combination of the first information and the second information.

Here, it is assumed that a value according to share information corresponding to a leaf node corresponding to a literal whose true value is "true" can be obtained, whereas a value according to share information corresponding to a leaf node corresponding to a literal whose true value is "false" cannot be obtained. Further, on the basis of the characteristics of the secret sharing described above, a value according to share information corresponding to a parent node (a value according to secret information, if this parent node is the root node) is restored only in the case where a number of values according to share information corresponding to child node(s) of this parent node are obtained, the number being equal to or more than a threshold value corresponding to this parent node. Accordingly, whether or not the value according to the secret information corresponding to the root node can be finally restored is determined in accordance with: the true value of a literal corresponding to which leaf node is "true"; and configurations of the tree structure data (including the secret sharing modes at each node). Then, the tree structure data configured in the following manner expresses a standard logical expression. That is, only in the case where the true value of each literal corresponding to each leaf node makes the true value of the standard logical expression "true", the value according to the secret information corresponding to the root node can be finally restored. Such tree structure data that expresses the standard logical expression can be easily set. A specific example thereof is given below.

Figure 83:
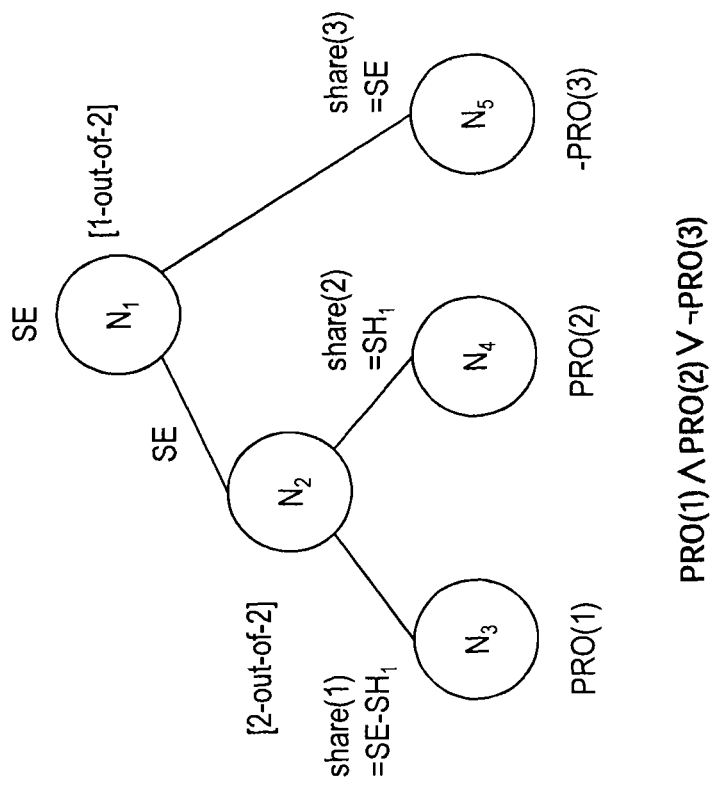
FIG. 83 is a view illustrating tree structure data that expresses a standard logical expression PRO(1)∧ PRO(2) ∨¬ PRO(3) including: propositional variables PRO(1) and PRO(2); a negation ¬ PRO(3) of a propositional variable PRO (3); and logical symbols ∧ and ∨.

FIG. 83 is a view illustrating tree structure data that expresses a standard logical expression PRO(1)∧ PRO(2)

∨¬ PRO(3) including: propositional variables PRO(1) and PRO(2); a negation ¬ PRO(3) of a propositional variable PRO(3); and the logical symbols ∧ and ∨. The tree structure data illustrated in FIG. 83 includes a plurality of nodes $N_1, \ldots, N_5$. The node $N_1$ is the parent node of the nodes $N_2$ and $N_5$, the node $N_2$ is the parent node of the nodes $N_3$ and $N_4$, the node $N_1$ as one of the parent nodes is the root node, and the nodes $N_3$, $N_4$, and $N_5$ as part of the child nodes are the leaf nodes. A value according to secret information SE corresponds to the node $N_1$, and values according to pieces of share information SE, SE obtained by sharing secrets of the value according to the secret information SE using a 1-out-of-2 sharing scheme respectively correspond to the child nodes $N_2$ and $N_5$ of the node $N_1$. Values according to pieces of share information SE−$SH_1$, $SH_1$ obtained by sharing secrets of the value according to the share information SE using a 2-out-of-2 sharing scheme respectively correspond to the child nodes $N_3$ and $N_4$ of the node $N_2$. That is, the value according to the share information share(1)=SE−$SH_1$ corresponds to the leaf node $N_3$, the value according to the share information share(2)=$SH_1$ corresponds to the leaf node $N_4$, and the value according to the share information share(3)=SE corresponds to the leaf node $N_5$. Further, the literals PRO(1), PRO(2), and ¬ PRO(3) constituting the standard logical expression PRO(1)∧ PRO(2)∨¬ PRO(3) respectively correspond to the leaf nodes $N_3$, $N_4$, and $N_5$, and the true values of the literals PRO(1), PRO(2), and ¬ PRO(3) are determined by the combination of the first information and the second information. Here, a value according to share information corresponding to a leaf node corresponding to a literal whose true value is "true" can be obtained, whereas a value according to share information corresponding to a leaf node corresponding to a literal whose true value is "false" cannot be obtained. In this case, only in the case where the combination of the first information and the second information makes the true value of the standard logical expression PRO(1)∧ PRO(2)∨¬ PRO(3) "true", the value according to the secret information SE is restored.

Figure 84:
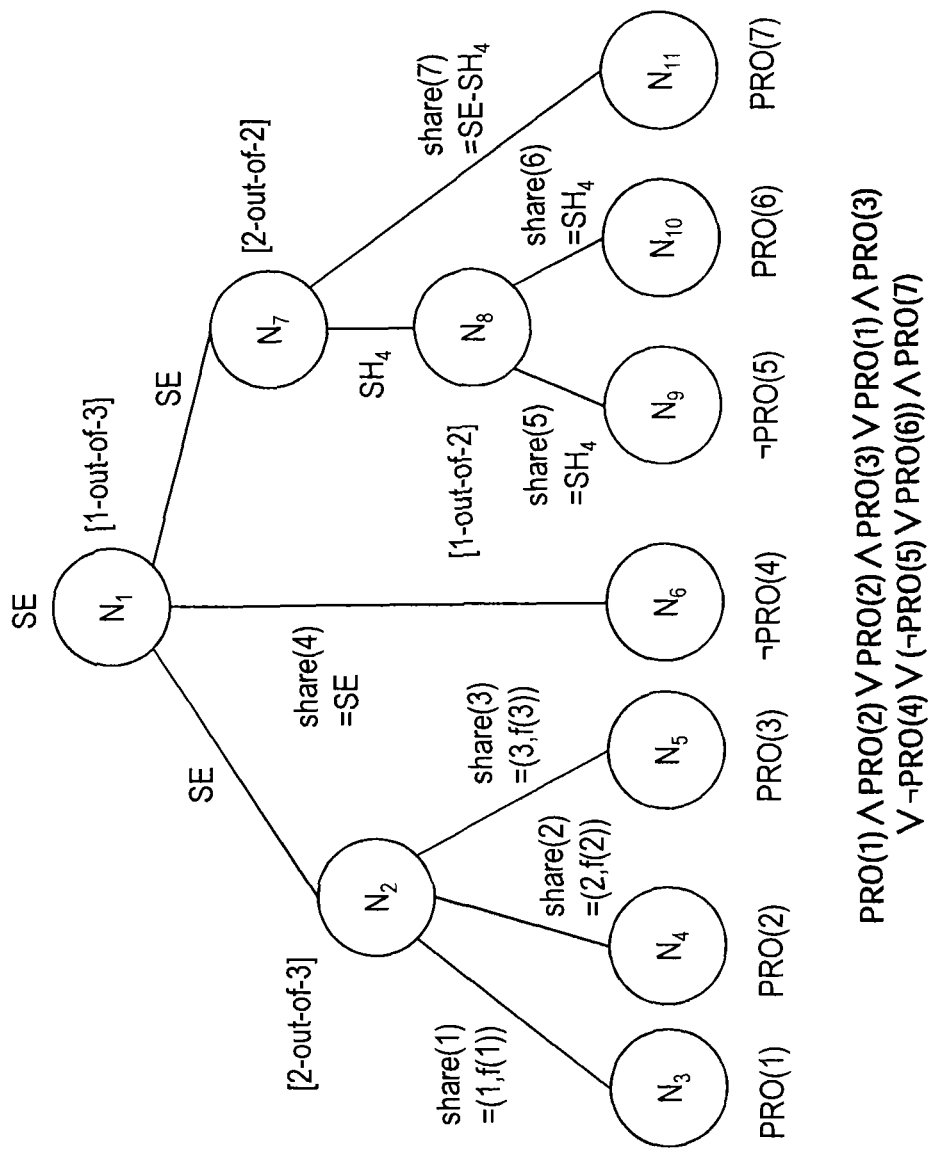
FIG. 84 is a view illustrating tree structure data that expresses a standard logical expression PRO(1)∧ PRO(2) ∨ PRO(2)∧ PRO(3)∨ PRO(1)∧ PRO(3)∨¬ PRO(4)∨ (¬ PRO(5)∧ PRO(6))∧ PRO(7) including: propositional variables PRO(1), PRO(2), PRO(3), PRO(6), and PRO(7); negations ¬ PRO(4) and ¬ PRO(5) of propositional variables PRO(4) and PRO(5); and logical symbols ∧ and ∨.

FIG. 84 is a view illustrating tree structure data that expresses a standard logical expression PRO(1)∧ PRO(2) ∨ PRO(2)∧ PRO(3)∨ PRO(1)∧ PRO(3)∨¬ PRO(4)∨ (¬ PRO(5)∧ PRO(6))∧ PRO(7) including: propositional variables PRO(1), PRO(2), PRO(3), PRO(6), and PRO(7); negations ¬ PRO(4) and ¬ PRO(5) of propositional variables PRO(4) and PRO(5); and the logical symbols ∧ and ∨.

The tree structure data illustrated in FIG. 84 includes a plurality of nodes $N_1, \ldots, N_{11}$. The node $N_1$ is the parent node of the nodes $N_2$, $N_6$, and $N_7$, the node $N_2$ is the parent node of the nodes $N_3$, $N_4$, and $N_5$, the node $N_7$ is the parent node of the nodes $N_8$ and $N_{11}$, the node $N_8$ is the parent node of the nodes $N_9$ and $N_{10}$, the node $N_1$ as one of the parent nodes is the root node, and the nodes $N_3$, $N_4$, $N_5$, $N_6$, $N_9$, $N_{10}$, and $N_{11}$ are the leaf nodes. A value according to secret information SE corresponds to the node $N_1$, and values according to pieces of share information SE, SE, SE obtained by sharing secrets of the value according to the secret information SE using a 1-out-of-3 sharing scheme respectively correspond to the child nodes $N_2$, $N_6$, and $N_7$ of the node $N_1$. Values according to pieces of share information (1, f(1)), (2, f(2)), (3, f(3)) obtained by sharing secrets of the value according to the share information SE using a 2-out-of-3 sharing scheme respectively correspond to the child nodes $N_3$, $N_4$, and $N_5$ of the node $N_2$. Values according to pieces of share information $SH_4$, SE−$SH_4$ obtained by sharing secrets of the value according to the share information SE using a 2-out-of-2 sharing scheme respectively correspond to the child nodes $N_8$ and $N_{11}$ of the node $N_7$. Values according to pieces of share information $SH_4$, $SH_4$ obtained by sharing secrets of the value according to the share information $SH_4$ using a 1-out-of-2 sharing scheme respectively correspond to the child nodes $N_9$ and $N_{10}$ of the node $N_8$. That is, the value according to the share information share(1)=(1, f(1)) corresponds to the leaf node $N_3$, the value according to the share information share(2)=(2, f(2)) corresponds to the leaf node $N_4$, the value according to the share information share(3)=(3, f(3)) corresponds to the leaf node $N_5$, the value according to the share information share(4)=SE corresponds to the leaf node $N_6$, the value according to the share information share(5)=$SH_4$ corresponds to the leaf node $N_9$, the value according to the share information share(6)=$SH_4$ corresponds to the leaf node $N_{10}$, and the value according to the share information share(7)=SE−$SH_4$ corresponds to the leaf node $N_{11}$. Further, the literals PRO(1), PRO(2), PRO(2), PRO(3), PRO(1), PRO(3), ¬ PRO(4), ¬ PRO(5), PRO(6), and PRO(7) constituting the standard logical expression PRO(1)∧ PRO(2)∨ PRO(2)∧ PRO(3) ∨ PRO(1)∧ PRO(3)∨¬ PRO(4)∨ (¬ PRO(5)∧ PRO(6)) ∧ PRO(7) respectively correspond to the leaf nodes $N_3$, $N_4$, $N_5$, $N_6$, $N_9$, $N_{10}$, and $N_{11}$, and the true values of the literals PRO(1), PRO(2), PRO(2), PRO(3), PRO(1), PRO(3), ¬ PRO (4), ¬ PRO(5), PRO(6), and PRO(7) are determined by the combination of the first information and the second information. Here, a value according to share information corresponding to a leaf node corresponding to a literal whose true value is "true" can be obtained, whereas a value according to share information corresponding to a leaf node corresponding to a literal whose true value is "false" cannot be obtained. In this case, only in the case where the combination of the first information and the second information makes the true value of the standard logical expression PRO(1), ∧ PRO(2), ∨ PRO (2), ∧ PRO(3), ∨ PRO(1), ∧ PRO(3), ∨¬ PRO(4), ∨ (¬ PRO (5), ∧ PRO(6), ∧ PRO(7) "true", the value according to the secret information SE is restored.

<Access Structure>

In the case as described above where a predetermined logical expression is expressed by tree structure data obtained by hierarchically sharing secrets of secret information, whether the true value of a logical expression determined by the combination of the first information and the second information is "true" or "false" can be determined depending on whether or not a value according to the secret information can be restored from values according to share information at leaf nodes obtained for the combination of the first information and the second information. Hereinafter, a mechanism is called an access structure, in which: the combination of the first information and the second information is accepted in the case where the true value of the logical expression determined by the combination of the first information and the second information is "true"; and the combination of the first information and the second information is rejected in the case where the true value thereof is "false".

The total number of leaf nodes of the tree structure data that expresses the predetermined logical expression as described above is defined as $\Psi$, and identifiers respectively corresponding to the leaf nodes are defined as $\lambda=1, \ldots, \Psi$. A set $\{v(\lambda)^{\rightarrow}\}_{\lambda=1, \ldots, \Psi}$ of $n(\lambda)$-dimensional vectors $v(\lambda)^{\rightarrow}$ corresponding to the leaf nodes is defined as the first information, and a set $\{w(\lambda)^{\rightarrow}\}_{\lambda=1, \ldots, \Psi}$ of $n(\lambda)$-dimensional vectors $w(\lambda)^{\rightarrow}$ corresponding to the leaf nodes is defined as the second information. Further, the tree structure data described above is mounted as a labeled matrix LMT (MT, LAB).

The labeled matrix LMT (MT, LAB) includes a $\Psi$ row by COL (COL$\geq$1) column matrix $$MT = \begin{pmatrix} mt_{1,1} & \cdots & mt_{1,COL} \\ \vdots & \ddots & \vdots \\ mt_{\Psi,1} & \cdots & mt_{\Psi,COL} \end{pmatrix} \quad (34)$$

and a label LAB($\lambda$) associated with each row $\lambda=1, \ldots, \Psi$ of the matrix MT.

Each element $mt_{\lambda,col}$ (col=1, . . . , COL) of the matrix MT satisfies the following two requirements. Firstly, in the case where a value according to secret information SE$\in F_q$ corresponds to the root node of the tree structure data that expresses the predetermined logical expression as described above, the following expression (37) is established for the following COL-dimensional vector (35) having elements of a predetermined finite field $F_q$ as elements and the following COL-dimensional vector (36) having elements of a finite field $F_q$ according to the secret information SE as elements.

$$GV^{\rightarrow}=(gv_1, \ldots, gv_{COL}) \in F_q^{COL} \quad (35)$$

$$CV^{\rightarrow}=(cv_1, \ldots, cv_{COL}) \in F_q^{COL} \quad (36)$$

$$SE = GV^{\rightarrow} \cdot (CV^{\rightarrow})^T \quad (37)$$

A specific example of the COL-dimensional vector $GV^{\rightarrow}$ is as follows.

$$GV^{\rightarrow}=(1_F, \ldots, 1_F) \in F_q^{COL} \quad (38)$$

The COL-dimensional vector $GV^{\rightarrow}$ may be other COL-dimensional vectors such as $GV^{\rightarrow}=(1_F, 0_F, \ldots, 0_F) \in F_q^{COL}$. Secondly, in the case where a value according to share information share($\lambda$)$\in F_q$ corresponds to a leaf node corresponding to an identifier $\lambda$, the following expression is established.

$$(share(1), \ldots, share(\Psi))^T = MT \cdot (CV^{\rightarrow})^T \quad (39)$$

If the tree structure data that expresses the predetermined logical expression is determined as described above, the matrix MT that satisfies these two requirements is easily selected. Further, even if the secret information SE and the share information share($\lambda$) are variables, the matrix MT that satisfies these two requirements is easily selected. That is, after the determination of the matrix MT, values of the secret information SE and the share information share($\lambda$) may be determined.

Further, the label LAB($\lambda$) associated with each row $\lambda=1, \ldots, \Psi$ of the matrix MT corresponds to a literal (PRO($\lambda$) or $\neg$ PRO($\lambda$)) corresponding to a leaf node corresponding to the identifier $\lambda$. Here, it is assumed that the following first case is equivalent to the following second case. That is, in the first case, the true value of the propositional variable PRO($\lambda$) is "true". In the second case, the inner product $v(\lambda)^{\rightarrow} \cdot w(\lambda)^{\rightarrow}$ of $v(\lambda)^{\rightarrow}$ included in first information VSET1={X, $v(\lambda)^{\rightarrow}|\lambda=1, \ldots, \Psi$} and $w(\lambda)^{\rightarrow}$ included in second information VSET2={$\lambda$, $w(\lambda)^{\rightarrow}|\lambda=1, \ldots, \Psi$} is 0. It is also assumed that the following third case is equivalent to the following fourth case. That is, in the third case, the true value of the propositional variable PRO($\lambda$) is "false". In the fourth case, the inner product $v(\lambda)^{\rightarrow} \cdot w(\lambda)^{\rightarrow}$ is not 0. Then, it is assumed that the label LAB($\lambda$) corresponding to PRO($\lambda$) represents $v(\lambda)^{\rightarrow}$ and that the label LAB($\lambda$) corresponding to $\neg$ PRO($\lambda$) represents $\neg v(\lambda)^{\rightarrow}$. Note that $\neg v(\lambda)^{\rightarrow}$ is a logical expression representing the negation of $v(\lambda)^{\rightarrow}$, and $v(\lambda)^{\rightarrow}$ can be identified from $\neg v(\lambda)^{\rightarrow}$. Further, the case where LAB($\lambda$) represents $v(\lambda)^{\rightarrow}$ is expressed by "LAB($\lambda$)=$v(\lambda)^{\rightarrow}$", and the case where LAB($\lambda$) represents $\neg v(\lambda)^{\rightarrow}$ is expressed by "LAB($\lambda$)=$\neg v(\lambda)^{\rightarrow}$". Further, a set {LAB($\lambda$)}$_{\lambda=1, \ldots, \Psi}$ of LAB($\lambda$) ($\lambda=1, \ldots, \Psi$) is expressed by LAB.

Moreover, the following $\Psi$-dimensional vector is defined.

$$TFV^{\rightarrow}=(tfv(1), \ldots, tfv(\Psi)) \quad (40)$$

An element tfv($\lambda$) is 1 if the inner product $v(\lambda)^{\rightarrow} \cdot w(\lambda)^{\rightarrow}$ is 0, and the element tfv($\lambda$) is 0 if the inner product $v(A)^{\rightarrow} \cdot w(\lambda)^{\rightarrow}$ is other than 0.

$$tfv(\lambda)=1 (PRO(\lambda) \text{ is "true"}) \text{ if } v(\lambda)^{\rightarrow} \cdot w(\lambda)^{\rightarrow}=0 \quad (41)$$

$$tfv(\lambda)=0 (PRO(\lambda) \text{ is "false"}) \text{ if } v(\lambda)^{\rightarrow} \cdot w(\lambda)^{\rightarrow} \neq 0 \quad (42)$$

Moreover, the case where the true value of the following logical expression is "true" is expressed by LIT($\lambda$)=1.

$$\{(LAB(\lambda)=v(\lambda)^{\rightarrow}) \wedge (tfv(\lambda)=1)\} \vee \{(LAB(\lambda)=\neg v(\lambda)^{\rightarrow}) \wedge (tfv(\lambda)=0)\} \quad (43)$$

The case where the true value thereof is "false" is expressed by LIT($\lambda$)=0. That is, the case where the true value of a literal corresponding to a leaf node corresponding to the identifier $\lambda$ is "true" is expressed by LIT($\lambda$)=1, and the case where the true value thereof is "false" is expressed by LIT($\lambda$)=0. Under the circumstances, a submatrix $MT_{TFV}$ formed of only row vectors $mt_{\lambda}^{\rightarrow}=(mt_{\lambda,1}, \ldots, mt_{\lambda,COL})$ whose LIT($\lambda$) is 1, among the row vectors included in the matrix MT, can be expressed as follows.

$$MT_{TFV}=(MT)_{LIT(\lambda)=1} \quad (44)$$

In the case where the secret sharing scheme described above is a linear secret sharing scheme, the following first case is equivalent to the following second case. That is, in the first case, the value according to the secret information SE can be restored from the value according to the share information share($\lambda$) corresponding to the identifier $\lambda$. In the fourth case, the COL-dimensional vector $GV^{\rightarrow}$ belongs to a vector space spanned by the row vectors $mt_{\lambda}^{\rightarrow}$ corresponding to the identifier $\lambda$. That is, whether or not the value according to the secret information SE can be restored from the value according to the share information share($\lambda$) corresponding to the identifier $\lambda$ can be determined by determining whether or not the COL-dimensional vector $GV^{\rightarrow}$ belongs to the vector space spanned by the row vectors $mt_{\lambda}^{\rightarrow}$ corresponding to the identifier $\lambda$. Note that the vector space spanned by the row vectors $mt_{\lambda}^{\rightarrow}$ means a vector space that can be represented by the linear combination of the row vectors $mt_{\lambda}^{\rightarrow}$.

Here, it is assumed that the combination of the first information and the second information is accepted in the case where the COL-dimensional vector $GV^{\rightarrow}$ belongs to a vector space span<$MT_{TFV}$> spanned by the row vectors $mt_{\lambda}^{\rightarrow}$ of the submatrix $MT_{TFV}$ described above and that the combination of the first information and the second information is rejected in the case where the COL-dimensional vector $CV^{\rightarrow}$ does not belong thereto. As a result, the access structure described above is realized. Note that, in the case where the labeled matrix LMT (MT, LAB) corresponds to the first information, the case where the access structure accepts the combination of the first information and the second information is expressed by "the access structure accepts the second information", and the case where the access structure does not accept the combination of the first information and the second information is expressed by "the access structure rejects the second information".

Accepted if $GV^{\rightarrow} \in \text{span}<MT_{TFV}>$

Rejected if $\neg (GV^{\rightarrow} \in \text{span}<MT_{TFV}>)$

Further, in the case where $GV^{\rightarrow} \in \text{span} \langle MT_{TFV} \rangle$, a coefficient $\text{const}(\mu)$ that satisfies the following expression exists.

$$SE = \Sigma_{\mu \in SET} \text{const}(\mu) \cdot \text{share}(\mu) \tag{45}$$

$\{\text{const}(\mu) \in F_q | \mu \in SET\}, SET \subseteq \{1, \ldots, \lambda | LIT(\lambda)=1\}$ The coefficient $\text{const}(\mu)$ can be obtained by the polynomial time of the size of the matrix MT.

<Basic Configuration of Function Cryptosystem Using Access Structure>

Description will be given below of a basic configuration when key encapsulation mechanisms (KEM) are configured according to a function cryptosystem using the access structure. This configuration includes: Setup ($1^{sec}$, ($\Psi$; n(1), ..., n($\Psi$))); GenKey (PK, MSK, LMT (MT, LAB)); Enc (PK, M, $\{\lambda, v(\lambda)^{\rightarrow} | =1, \ldots, \Psi\}$) ($v_1(\lambda)=1_F$); and Dec (PK, SKS, C). Further, the first element $w_1(\lambda)$ of the second information VSET2=$\{\lambda, w(\lambda)^{\rightarrow} | \lambda=1, \ldots, \Psi\}$ is defined as $1_F$.

[Setup($1^{sec}$,($\Psi$;n(1),...,n($\Psi$))):setup]

Input: $1^{sec}$, ($\Psi$; n(1), ..., n($\Psi$))
Output: master key information MSK, public parameter PK In the setup, the following process is executed for each $\psi=0, \ldots, \Psi$.

(Setup-1) With $1^{sec}$ being received as an input, the order q, the elliptic curve E, the cyclic groups $G_1$, $G_2$, and $G_T$, and the bilinear map $e_\psi$ ($\psi=0, \ldots, \Psi$) at the security parameter sec are generated (param=(q, E, $G_1$, $G_2$, $G_T$, $e_\psi$)).

(Setup-2) $\tau' \in F_q$ is selected, and matrixes $X(\psi)$, $X^*(\psi)$ that satisfy $X^*(\psi) = \tau' \cdot (X(\psi)^{-1})^T$ are selected.

(Setup-3) Coordinate conversion is applied to the basis vector $a_i(\psi)$ (i=1, ..., n($\psi$)+$\zeta(\psi)$) according to Expression (21), and the (n($\psi$)+$\zeta(\psi)$)-dimensional basis vector $b_i(\psi)$ (i=1, ..., n($\psi$)+$\zeta(\psi)$) is generated. The (n($\psi$)+$\zeta(\psi)$) row by (n($\psi$)+$\zeta(\psi)$) column matrix B($\psi$) having the basis vector $b_i(\psi)$ (i=1, ..., n($\psi$)+$\zeta(\psi)$) as elements is generated.

(Setup-4) Coordinate conversion is applied to the basis vector $a_i^*(\psi)$ (i=1, ..., n($\psi$)+$\zeta(\psi)$) according to Expression (23), and the (n($\psi$)+$\zeta(\psi)$)-dimensional basis vector $b_i^*(\psi)$ (i=1, ..., n($\psi$)+$\zeta(\psi)$) is generated. The (n($\psi$)+$\zeta(\psi)$) row by (n($\psi$)+$\zeta(\psi)$) column matrix $B^*(\psi)$ having the basis vector $b_i^*(\psi)$ (i=1, ..., n($\psi$)+$\zeta(\psi)$) as elements is generated.

(Setup-5) A set $\{B^*(\psi)^{\char`\^}\}_{\psi=0, \ldots, \Psi}$ of $B^*(\psi)^{\char`\^}$ is defined as the master key information MSK=$\{B^*(\psi)^{\char`\^}\}_{\psi=0, \ldots, \Psi}$. Further, a set $\{B(\psi)^{\char`\^}\}_{\Psi=0, \ldots, \Psi}$ of $B^*(\psi)^{\char`\^}$, $1^{sec}$, and param are defined as the public parameter PK. Note that $B^*(\psi)^{\char`\^}$ is the matrix $B^*(\psi)$ or a submatrix thereof, and B($\psi$)^ is the matrix B($\psi$) or a submatrix thereof. Further, the set $\{B^*(\psi)^{\char`\^}\}_{\psi=0, \ldots, \Psi}$ includes at least $b_1^*(0), b_1^*(\lambda), b_{n(\lambda)}^*(\lambda)$ ($\lambda=1, \ldots, \Psi$). Further, the set $\{B(\psi)^{\char`\^}\}_{\psi=0, \ldots, \Psi}$ includes at least $b_1(0), b_1(\lambda), \ldots, b_{n(\lambda)}(\lambda)$ ($\lambda=1, \ldots, \Psi$). Examples thereof are given below.

$n(0)+\xi(0) \geq 5, \xi(\lambda) = 3 \cdot n(\lambda)$ $B(0)^{\char`\^} = (b_1(0) b_3(0) b_5(0))^T$ $B(\lambda)^{\char`\^} = (b_1(\lambda) \ldots b_{n(\lambda)}(\lambda) b_{3 \cdot n(\lambda)+1}(\lambda) \ldots b_{4 \cdot n(\lambda)}(\lambda))^T$
$(\lambda=1, \ldots, \Psi)$ $B^*(0)^{\char`\^} = (b_1^*(0) b_3^*(0) b_4^*(0))^T$ $B^*(\lambda)^{\char`\^} = (b_1^*(\lambda) \ldots b_{n(\lambda)}^*(\lambda) b_{2 \cdot n(\lambda)+1}^*(\lambda) \ldots b_{3 \cdot n(\lambda)}^*(\lambda))^T (\lambda=1, \ldots, \Psi)$

[GenKey (PK, MSK, LMT (MT, LAB)): key information generation]

Input: public parameter PK, master key information MSK, labeled matrix LMT (MT, LAB) corresponding to first information VSET1=$\{\lambda, v(\lambda)^{\rightarrow} | \lambda=1, \ldots, \Psi\}$ Output: key information SKS (GenKey-1) The following process is executed for the secret information SE that satisfies Expressions (35) to (39).

$$D^*(0) = -SE \cdot b_1^*(0) + \Sigma_{\iota=2}^I \text{coef}_\iota(0) \cdot b_\iota^*(0) \tag{46}$$

Note that I is a constant equal to or more than 2 and equal to or less than n(0)+$\zeta$(0). $\text{coef}_\iota(0) \in F_q$ is a constant or a random number. The "random number" means a true random number and a pseudorandom number. An example of $D^*(0)$ is given below. Note that $\text{coef}_4(0)$ in Expression (47) is a random number.

$$D^*(0) = -SE \cdot b_1^*(0) + b_3^*(0) + \text{coef}_4(0) \cdot b_4^*(0) \tag{47}$$

(GenKey-2) The following process is executed for share($\lambda$) ($\lambda=1, \ldots, \Psi$) that satisfies Expressions (35) to (39).

The following expression is generated for $\lambda$ that satisfies LAB($\lambda$)=$v(\lambda)^{\rightarrow}$.

$$D^*(\lambda) = (\text{share}(\lambda) + \text{coef}(\lambda) \cdot v_1(\lambda)) \cdot b_1^*(\lambda) + \sum_{\iota=2}^{n(\lambda)} \text{coef}(\lambda) \cdot v_\iota(\lambda) \cdot b_\iota^*(\lambda) + \sum_{\iota=n(\lambda)+1}^{n(\lambda)+\zeta(\lambda)} \text{coef}_\iota(\lambda) \cdot b_\iota^*(\lambda) \tag{48}$$

The following expression is generated for $\lambda$ that satisfies LAB($\lambda$)=$\neg v(\lambda)^{\rightarrow}$.

$$D^*(\lambda) = \text{share}(\lambda) \cdot \Sigma_{\iota=1}^{n(\lambda)} v_\iota(\lambda) \cdot b_\iota^*(\lambda) + \Sigma_{\iota=n(\lambda)+1}^{n(\lambda)+\zeta(\lambda)} \text{coef}_\iota(\lambda) \cdot b_\iota^*(\lambda) \tag{49}$$

Note that $\text{coef}(\lambda)$, $\text{coef}_\iota(\lambda) \in F_q$ are a constant or a random number. An example thereof is given below.

The following expression is generated for $\lambda$ that satisfies LAB($\lambda$)=$v(\lambda)^{\rightarrow}$.

$$D^*(\lambda) = (\text{share}(\lambda) + \text{coef}(\lambda) \cdot v_1(\lambda)) \cdot b_1^*(\lambda) + \sum_{\iota=2}^{n(\lambda)} \text{coef}(\lambda) \cdot v_\iota(\lambda) \cdot b_\iota^*(\lambda) + \sum_{\iota=2 \cdot n(\lambda)+1}^{3 \cdot n(\lambda)} \text{coef}_\iota(\lambda) \cdot b_\iota^*(\lambda) \tag{50}$$

The following expression is generated for $\lambda$ that satisfies LAB($\lambda$)=$\neg v(\lambda)^{\rightarrow}$.

$$D^*(\lambda) = \text{share}(\lambda) \cdot \Sigma_{\iota=1}^{n(\lambda)} v_\iota(\lambda) \cdot b_\iota^*(\lambda) + \Sigma_{\iota=2 \cdot n(\lambda)+1}^{3 \cdot n(\lambda)} \text{coef}_\iota(\lambda) \cdot b_\iota^*(\lambda) \tag{51}$$

Note that $\text{coef}(\lambda)$ and $\text{coef}_\iota(\lambda)$ in Expressions (50) and (51) are a random number.

(GenKey-3) Key information
The following expression is generated.

$$SKS = (LMT(MT, LAB), D^*(0), D^*(1), D(\Psi)) \tag{52}$$

[Enc (PK, M, VSET2): encryption]

Input: public parameter PK, plaintext M, second information VSET2=$\{\lambda, w(\lambda)^{\rightarrow} | \lambda=1, \ldots, \Psi\}$ ($w_1(\lambda)=1_F$)

Output: ciphertext C (Enc-1) Through the following process, the ciphertext C($\psi$) ($\psi=0, \ldots, \Psi$) of the common key K is generated.

$$C(0) = \upsilon \cdot b_1(0) + \Sigma_{\iota=2}^I \upsilon_\iota(0) \cdot b_\iota(0) \tag{53}$$

$$C(\lambda) = \upsilon \cdot \Sigma_{\iota=1}^{n(\lambda)} w_\iota(\lambda) \cdot b_\iota(\lambda) + \Sigma_{\iota=n(\lambda)+1}^{n(\lambda)+\zeta(\lambda)} \upsilon_\iota(\lambda) \cdot b_\iota(\lambda) \tag{54}$$

Note that $\upsilon, \upsilon_\iota(\psi) \in F_q (\psi=0, \ldots, \Psi)$ are a constant or a random number, and satisfy the following expressions.

$$(\text{coef}_2(0), \ldots, \text{coef}_I(0)) \cdot (v_2(0), \ldots, v_I(0)) = v' \quad (55)$$

$$\text{coef}_\iota(\lambda) \cdot v_\iota(\lambda) = 0_F (\iota = n(\lambda)+1, \ldots, n(\lambda)+\zeta(\lambda)) \quad (56)$$

$v'$ is, for example, any one of $v_2(0), v_I(0)$. For example, $v$, $v_3(0), v_5(0), v_{3 \cdot n(\lambda)+1}(\lambda), \ldots, v_{4 \cdot n(\lambda)}(\lambda)$ are a random number, $\zeta(\lambda) = 3 \cdot n(\lambda)$, and $I = 5$. Further, the following expressions are satisfied.

$$(v_2(0), \ldots, v_I(0)) = (0_F, v_3(0), 0_F, v_5(0))$$

$$v' = v_3(0)$$

$$(v_{n(\lambda)+1}(\lambda), \ldots, v_{3 \cdot n(\lambda)}(\lambda)) = (0_F, \ldots, 0_F)$$

(Enc-2) Common key
The following expression is generated.

$$K = g_T^{\tau \cdot \tau' \cdot v'} \epsilon G_T \quad (57)$$

For example, in the case where $\tau = \tau' = 1_F$, the following expression is satisfied.

$$K = g_T^{v'} \epsilon G_T \quad (58)$$

(Enc-3) With the use of the common key K, the following ciphertext of the plaintext M is generated.

$$C(\Psi+1) = Enc_K(M) \quad (59)$$

Note that a common key cryptosystem Enc may be, for example, Camellia (registered trademark) that is configured so as to be encryptable using the common key K, AES, and the exclusive OR of the common key and the plaintext. For another simple example, $Enc_K(M)$ may be generated in the following manner.

$$C(\Psi+1) = g_T^{v'} \cdot M \quad (60)$$

where $M \epsilon G_T$.

(Enc-4) Ciphertext
The following expression is generated.

$$C = (VSET2, C(0), \{C(\lambda)\}_{(\lambda, w(\lambda) \to) \epsilon VSET2}, C(\Psi+1)) \quad (61)$$

Note that the subscript "$w(\lambda) \to$" represents "$w(\lambda)^\to$".

[Dec (PK, SKS, C): decryption]
Input: public parameter PK, key information SKS, ciphertext C
Output: plaintext M'

(Dec-1) For $\lambda = 1, \ldots, \Psi$, it is determined whether or not the inner product $v(\lambda)^\to \cdot w(\lambda)^\to$ of the $n(\lambda)$-dimensional vector $v(\lambda)^\to$ and the $n(\lambda)$-dimensional vector $w(\lambda)^\to$ is 0, the $n(\lambda)$-dimensional vector $v(\lambda)^\to$ being each label $LAB(\lambda)$ of the labeled matrix LMT (MT, LAB) included in the key information SKS, the $n(\lambda)$-dimensional vector $w(\lambda)^\to$ being included in VSET2 of the ciphertext C. Then, whether or not $GV^\to \epsilon span<MT_{TFV}>$ is determined by the result of this determination. If $GV^\to \notin span<MT_{TFV}>$, the ciphertext C is rejected. If $GV^\to \epsilon span<MT_{TFV}>$, the ciphertext C is accepted.

(Dec-2) If the ciphertext C is accepted, $SET \subseteq \{1, \ldots, \lambda | LIT(\lambda) = 1\}$ and the coefficient $const(\mu)$ ($\mu \epsilon SET$) that satisfies Expression (45) are calculated.

(Dec-3) Common key
The following expression is generated.

$$K = e_0(C(0), D^*(0)) \cdot \prod_{\mu \in SET \wedge LAB(\mu) = v(\mu)^\to} e_\mu(C(\mu), D^*(\mu))^{const(\mu)} \cdot \quad (62)$$

$$\prod_{\mu \in SET \wedge LAB(\mu) = \neg v(\mu)^\to} e_\mu(C(\mu), D^*(\mu))^{const(\mu)/(v(\mu)^\to \cdot w(\mu)^\to)}$$

Here, the following expression is satisfied on the basis of Expressions (6), (25), and (55).

$$\begin{aligned} e_0(C(0), D^*(0)) &= e_0\left(v \cdot b_1(0) + \sum_{\iota=2}^{I} v_\iota(0) \cdot b_\iota(0), -SE \cdot b_1^*(0) + \sum_{\iota=2}^{I} \text{coef}_\iota(0) \cdot b_\iota^*(0)\right) \\ &= e_0(v \cdot b_1(0), -SE \cdot b_1^*(0)) \cdot \\ &\quad \prod_{\iota=2}^{I} e_0(v_\iota(0) \cdot b_\iota(0), \text{coef}_\iota(0) \cdot b_\iota^*(0)) \\ &= e_0(b_1(0), b_1^*(0))^{-SE \cdot v} \cdot \prod_{\iota=2}^{I} e_0(b_\iota(0), b_\iota^*(0))^{v_\iota(0) \cdot \text{coef}_\iota(0)} \\ &= g_T^{\tau \cdot \tau' \cdot \delta(1,1) \cdot (-SE \cdot v)} \cdot \prod_{\iota=2}^{I} g_T^{\tau \cdot \tau' \cdot \delta(\iota,\iota) \cdot v_\iota(0) \cdot \text{coef}_\iota(0)} \\ &= g_T^{\tau \cdot \tau' \cdot (-SE \cdot v + v')} \end{aligned} \quad (63)$$

Further, the following expression is satisfied on the basis of Expressions (6), (25), (41), (48), (54), and (56) and $w_1(\lambda) = 1_F$.

$$\prod_{\mu \in SET \wedge LAB(\mu) = v(\mu)^\to} e_\mu(C(\mu), D^*(\mu))^{const(\mu)} = \prod_{\mu \in SET \wedge LAB(\mu) = v(\mu)^\to} \quad (64)$$

$$e_\mu\left(v \cdot \sum_{\iota=1}^{n(\mu)} w_\iota(\mu) \cdot b_\iota(\mu) + \sum_{\iota=n(\mu)+1}^{n(\mu)+\zeta(\mu)} v_\iota(\mu) \cdot b_\iota(\mu), \text{share}(\mu) \cdot b_1^*(\mu) + \sum_{\iota=1}^{n(\mu)} \text{coef}(\mu) \cdot v_\iota(\mu) \cdot b_\iota^*(\mu) + \sum_{\iota=n(\mu)+1}^{n(\mu)+\zeta(\mu)} \text{coef}_\iota(\mu) \cdot b_\iota^*(\mu)\right)^{const(\mu)} =$$

$$\prod_{\mu \in SET \wedge LAB(\mu) = v(\mu)^\to} \left\{e_\mu\left(v \cdot \sum_{\iota=1}^{n(\mu)} w_\iota(\mu) \cdot b_\iota(\mu), \text{share}(\mu) \cdot b_1^*(\mu)\right) \cdot e_\mu\left(v \cdot \sum_{\iota=1}^{n(\mu)} w_\iota(\mu) \cdot b_\iota(\mu), \sum_{\iota=1}^{n(\mu)} \text{coef}(\mu) \cdot v_\iota(\mu) \cdot b_\iota^*(\mu)\right)\right\}^{const(\mu)} =$$

-continued $$\prod_{\mu \in SET \wedge LAB(\mu) = v(\mu)^{\rightarrow}} \left( g_T^{\tau \cdot \tau' \cdot v \cdot share(\mu)} \cdot \prod_{\iota=1}^{n(\mu)} g_T^{\tau \cdot \tau' \cdot v \cdot coef_\iota(\mu) \cdot w_\iota(\mu) \cdot v_\iota(\mu)} \right)^{const(\mu)} = \prod_{\mu \in SET \wedge LAB(\mu) = v(\mu)^{\rightarrow}} g_T^{\tau \cdot \tau' \cdot v \cdot const(\mu) \cdot share(\mu)}$$

Further, the following expression is satisfied on the basis of Expressions (6), (25), (42), (49), (54), and (56).

$$\prod_{\mu \in SET \wedge LAB(\mu) = \neg v(\mu)^{\rightarrow}} e_\mu(C(\mu), D^*(\mu))^{const(\mu)/(v(\mu)^{\rightarrow} \cdot w(\mu)^{\rightarrow})} = \prod_{\mu \in SET \wedge LAB(\mu) = \neg v(\mu)^{\rightarrow}} \quad (65)$$

$$e_\mu \left( v \cdot \sum_{\iota=1}^{n(\mu)} w_\iota(\mu) \cdot b_\iota(\mu) + \sum_{\iota=n(\mu)+1}^{n(\mu)+\zeta(\mu)} v_\iota(\mu) \cdot b_\iota(\mu), \text{share}(\mu) \cdot \sum_{\iota=1}^{n(\mu)} v_\iota(\mu) \cdot b_\iota^*(\mu) + \sum_{\iota=n(\mu)+1}^{n(\mu)+\zeta(\mu)} coef_\iota(\mu) \cdot b_\iota^*(\mu) \right)^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ \prod_{\iota=1}^{n(\mu)} e_\mu(b_\iota(\mu), b_\iota^*(\mu))^{v \cdot share(\mu) \cdot w_\iota(\mu) \cdot v_\iota(\mu)} \right\}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ \prod_{\iota=1}^{n(\mu)} g_T^{\tau \cdot \tau' \cdot v \cdot share(\mu) \cdot w_\iota(\mu) \cdot v_\iota(\mu)} \right\}^{const(\mu)/(v(\mu)^{\rightarrow} \cdot w(\mu)^{\rightarrow})} =$$

$$\prod_{\mu \in SET \wedge LAB(\mu) = \neg v(\mu)^{\rightarrow}} \left\{ g_T^{\tau \cdot \tau' \cdot v \cdot share(\mu) \cdot v(\mu)^{\rightarrow} \cdot w(\mu)^{\rightarrow}} \right\}^{const(\mu)/(v(\mu)^{\rightarrow} \cdot w(\mu)^{\rightarrow})} = \prod_{\mu \in SET \wedge LAB(\mu) = \neg v(\mu)^{\rightarrow}} g_T^{\tau \cdot \tau' \cdot v \cdot const(\mu) \cdot share(\mu)}$$

Accordingly, the following expression is satisfied on the basis of Expressions (45) and (63) to (65).

$$K = g_T^{\tau \cdot \tau' \cdot (-SE \cdot v + v')} \cdot \prod_{\mu \in SET \wedge LAB(\mu) = v(\mu)^{\rightarrow}} g_T^{\tau \cdot \tau' \cdot v \cdot const(\mu) \cdot share(\mu)} \cdot \quad (66)$$

$$\prod_{\mu \in SET \wedge LAB(\mu) = \neg v(\mu)^{\rightarrow}} g_T^{\tau \cdot \tau' \cdot v \cdot const(\mu) \cdot share(\mu)} =$$

$$g_T^{\tau \cdot \tau' \cdot (-SE \cdot v + v')} \cdot g_T^{\tau \cdot \tau' \cdot v \cdot SE} = g_T^{\tau \cdot \tau' \cdot v'}$$

For example, in the case where $\tau = \tau' = 1_F$, the following expression is satisfied.

$$K = g_T^{v'} \in G_T \quad (67)$$

(Dec-4) With the use of the common key K, the following plaintext is generated.

$$M' = Dec_K(C(\Psi+1)) = Dec_K(C(\Psi+1)) \quad (68)$$

For example, in the case of the common key cryptosystem shown in Expression (60), the plaintext M' is generated by the following expression.

$$M' = C(\Psi+1)/K \quad (69)$$

Note that $g_T^\tau$, $g_T^{\tau'}$, and $g_T^{\tau \cdot \tau'}$ may be treated as generating elements of $G_T$ instead of treating $g_T$ as a generating element of $G_T$. Further, a combination of $C(\lambda)$ and $D^*(\lambda)$ may be identified using a map that identifies a correspondence relationship between $\lambda$ of the key information SKS and $\lambda$ of the ciphertext, and the process of [Dec (PK, SKS, C): decryption] may be executed. Further, $1_F$ may be set to not only the first element $w_1(\lambda)$ of the second information VSET2={$\lambda$, w($\lambda$)$^{\rightarrow}$|$\lambda$=1, ..., $\Psi$} but also the n($\lambda$)-th element $v_{n(\lambda)}(\lambda)$ of the first information VSET1={$\lambda$, v($\lambda$)$^{\rightarrow}$|$\lambda$=1, ..., $\Psi$}. Further, in the case where the element $w_1(\lambda)$ is not $1_F$, $w(\lambda)^{\rightarrow}/w_1(\lambda)$ may be used instead of $w(\lambda)^{\rightarrow}$. In the case where the element $v_{n(\lambda)}(\lambda)$ is not $1_F$, $v(\lambda)^{\rightarrow}/v_{n(\lambda)}(\lambda)$ may be used instead of $v(\lambda)^{\rightarrow}$. Further, the second information VSET2={$\lambda$, w($\lambda$)$^{\rightarrow}$|$\lambda$=1, ..., $\Psi$} may be used instead of the first information VSET1={$\lambda$, v($\lambda$)$^{\rightarrow}$|$\lambda$=1, ..., $\Psi$}, and the first information VSET1={$\lambda$,v($\lambda$)$^{\rightarrow}$|$\lambda$=1, ..., $\Psi$} may be used instead of the second information VSET2={$\lambda$, w($\lambda$)$^{\rightarrow}$|$\lambda$=1, ..., $\Psi$}. In this case, $1_F$ is set to the first element $v_1(\lambda)$ of the first information VSET1={$\lambda$, v($\lambda$)$^{\rightarrow}$|$\lambda$=1, ..., $\Psi$}.

Next, predicate encryption using inner products will be described as an example of the predicate encryption that is one mode of the functional encryption. Expression numbers are newly assigned below. It should be noted that the same wording and symbols as those used in the above descriptions may have different meanings in the following description for the sake of explanation. The predicate encryption corresponds to functional encryption using a 1-out-of-1 sharing scheme.

[Definitions]

Matrix: A rectangular arrangement of elements of a set in which a calculation is defined. Not only elements of a ring but also elements of a group can form a matrix.

$(\cdot)^T$: Transposed matrix of $\cdot$ $(\cdot)^{-1}$: Inverse matrix of $\cdot$ $\wedge$ : Logical AND $\vee$ : Logical OR Z: Set of integers k: Security parameter (k∈Z, k>0)

{0, 1}*: Binary sequence having a desired bit length. An example is a sequence formed of integers 0 and 1. However, {0, 1}* is not limited to sequences formed of integers 0 and 1. {0, 1}* is a finite field of order 2 or its extended field.

{0, 1} C: Binary sequence having a bit length $\zeta$ ($\zeta \in Z$, $\zeta > 0$). An example is a sequence formed of integers 0 and 1. However, {0, 1}$^\zeta$ is not limited to sequences formed of integers 0 and 1. {0, 1}$^\zeta$ is a finite field of order 2 (when $\zeta = 1$) or its extended field (when $\zeta > 1$).

(+): Exclusive OR operator between binary sequences. For example, the following is satisfied: 10110011 (+) 11100001=01010010.

$F_q$: Finite field of order q, where q is an integer equal to or larger than 1. For example, the order q is a prime number of a power of a prime number. In other words, the finite field $F_q$ is a prime field or an extended field of the prime field, for example. When the finite field $F_q$ is a prime field, remainder calculations to modulus q can be easily performed, for example. When the finite field $F_q$ is an extended field, remainder calculations modulo an irreducible polynomial can be easily performed, for example. A specific method for configuring a finite field $F_q$ is disclosed, for example, in reference literature 1, "ISO/IEC 18033-2: Information technology—Security techniques—Encryption algorithms—Part 2: Asymmetric ciphers".

$0_F$: Additive unit element of the finite field $F_q$ $1_F$: Multiplicative unit element of the finite field $F_q$ $\delta(i, j)$: Kronecker's delta function. When i=j, $\delta(i, j)=1_F$. When i≠j, $\delta(i, j)=0_F$.

E: Elliptic curve defined on the finite field $F_q$. It is defined as a special point O called the point of infinity plus a set of points (x, y) satisfying x, y $\in F_q$ and the Weierstrass equation in an affine coordinate system $$y^2+a_1 xy+a_3 y=x^3+a_2 x^2+a_4 x+a_6 \quad (1)$$

where $a_1, a_2, a_3, a_4, a_6 \in F_q$. A binary operation + called an elliptic addition can be defined for any two points on the elliptic curve E, and a unary operation − called an elliptic inverse can be defined for any one point on the elliptic curve E. It is well known that a finite set of rational points on the elliptic curve E forms a group with respect to the elliptic addition. It is also well known that an operation called an elliptic scalar multiplication can be defined with the elliptic addition. A specific operation method of elliptic operations such as the elliptic addition on a computer is also well known. (For example, see reference literature 2, "RFC 5091: Identity-Based Cryptography Standard (IBCS) #1: Supersingular Curve Implementations of the BF and BB1 Cryptosystems", and reference literature 3, Ian F. Blake, Gadiel Seroussi, and Nigel P. Smart, "Elliptic Curves in Cryptography", Pearson Education, ISBN 4-89471-431-0.)

A finite set of rational points on the elliptic curve E has a subgroup of order p (p≥1). When the number of elements in a finite set of rational points on the elliptic curve E is #E and p is a large prime number that can divide #E without a remainder, for example, a finite set E[p] of p equally divided points on the elliptic curve E forms a subgroup of a finite set of rational points on the elliptic curve E. The p equally divided points on the elliptic curve E are points A on the elliptic curve E which satisfy the elliptic scalar multiplication pA=O.

$G_1, G_2, G_T$: Cyclic groups of order q. Examples of the cyclic groups $G_1$ and $G_2$ include the finite set E[p] of p equally divided points on the elliptic curve E and subgroups thereof. $G_1$ may equal $G_2$, or $G_1$ may not equal $G_2$. Examples of the cyclic group $G_T$ include a finite set constituting an extended field of the finite field $F_q$. A specific example thereof is a finite set of the p-th root of 1 in the algebraic closure of the finite field $F_q$.

Operations defined on the cyclic groups $G_1$ and $G_2$ are expressed as additions, and an operation defined on the cyclic group $G_T$ is expressed as a multiplication. More specifically, $\chi \cdot \Omega \in G_1$ for $\chi \in F_q$ and $\Omega \in G_1$ means that the operation defined in the cyclic group $G_1$ is applied to $\Omega \in G_1$ $\chi$ times, and $\Omega_1+\Omega_2 \in G_1$ for $\Omega_1, \Omega_2 \in G_1$ means that the operation defined in the cyclic group $G_1$ is applied to $\Omega_1 \in G_1$ and $\Omega_2 \in G_1$. In the same way, $\chi \cdot \Omega \in G_2$ for $\chi \in F_q$ and $\Omega \in G_2$ means that the operation defined in the cyclic group $G_2$ is applied to $\Omega \in G_2$ $\chi$ times, and $\Omega_1+\Omega_2 \in G_2$ for $\Omega_1, \Omega_2 \in G_2$ means that the operation defined in the cyclic group $G_2$ is applied to $\Omega_1 \in G_2$ and $\Omega_2 \in G_2$. In contrast, $\Omega^\chi \in G_T$ for $\chi \in F_q$ and $\Omega \in G_T$ means that the operation defined in the cyclic group $G_T$ is applied to $\Omega \in G_T$ $\chi$ times, and $\Omega_1 \cdot \Omega_2 \in G_T$ for $\Omega_1, \Omega_2 \in G_T$ means that the operation defined in the cyclic group $G_T$ is applied to $\Omega_1 \in G_T$ and $\Omega_2 \in G_T$.

$G_1^{n+1}$: Direct product of (n+1) cyclic groups $G_1$ (n≥1)

$G_2^{n+1}$: Direct product of (n+1) cyclic groups $G_2$ $g_1, g_2, g_T$: Generating elements of the cyclic groups $G_1, G_2, G_T$ V: (n+1)-dimensional vector space formed of the direct product of the (n+1) cyclic groups $G_1$ V*: (n+1)-dimensional vector space formed of the direct product of the (n+1) cyclic groups $G_2$ e: Function (bilinear function) for calculating a non-degenerate bilinear map that maps the direct product $G_1^{n+1} \times G_2^{n+1}$ of the direct product $G_1^{n+1}$ and the direct product $G_2^{n+1}$ to the cyclic group $G_T$. The bilinear function e receives (n+1) elements $\gamma_L$ (L=1, ..., n+1) (n≥1) of the cyclic group $G_1$ and (n+1) elements $\gamma_L^*$ (L=1, ..., n+1) of the cyclic group $G_2$ and outputs one element of the cyclic group $G_T$.

$$e: G_1^{n+1} \times G_2^{n+1} \rightarrow G_T \quad (2)$$

The bilinear function e satisfies the following characteristics:

Bilinearity: The following relationship is satisfied for all $\Gamma_1 \in G_1^{n+1}$, $\Gamma_2 \in G_2^{n+1}$, and $\nu, \kappa \in F_q$ $$e(\nu \cdot \Gamma_1, \kappa \cdot \Gamma_2)=e(\Gamma_1, \Gamma_2)^{\Gamma \cdot \kappa} \quad (3)$$

Non-degeneracy: This function does not map all $$\Gamma_1 \in G_1^{n+1}, \Gamma_2 \in G_2^{n+1} \quad (4)$$

onto the unit element of the cyclic group $G_T$.

Computability: There exists an algorithm for efficiently calculating $e(\Gamma_1, \Gamma_2)$ for all $\Gamma_1 \in G_1^{n+1}$, $\Gamma_2 \in G_2^{n+1}$.

The following function for calculating a non-degenerate bilinear map that maps the direct product $G_1 \times G_2$ of the cyclic group $G_1$ and the cyclic group $G_2$ to the cyclic group $G_T$ constitutes the bilinear function e.

$$\text{Pair}: G_1 \times G_2 \rightarrow G_T \quad (5)$$

The bilinear function e receives an (n+1)-dimensional vector $(\gamma_1, \ldots, \gamma_{n+1})$ formed of (n+1) elements $\gamma_L$ (L=1, ..., n+1) of the cyclic group $G_1$ and an (n+1)-dimensional vector $(\gamma_1^*, \ldots, \gamma_{n+1}^*)$ formed of (n+1) elements $\gamma_L^*$ (L=1, ..., n+1) of the cyclic group $G_2$ and outputs one element of the cyclic group $G_T$.

$$e=\Pi_{L=1}^{n+1} \text{Pair}(\gamma_L, \gamma_L^*) \quad (6)$$

The bilinear function Pair receives one element of the cyclic group $G_1$ and one element of the cyclic group $G_2$ and outputs one element of the cyclic group $G_T$, and satisfies the following characteristics:

Bilinearity: The following relationship is satisfied for all $\Omega_1 \in G_1$, $\Omega_2 \in G_2$, and $\nu, \kappa \in F_q$ $$\text{Pair}(\nu \cdot \Omega_1, \kappa \cdot \Omega_2)=\text{Pair}(\Omega_1, \Omega_2)^{\nu \cdot \kappa} \quad (7)$$

Non-degeneracy: This function does not map all $$\Omega_1 \in G_1, \Omega_2 \in G_2 \quad (8)$$

onto the unit element of the cyclic group $G_T$.

Computability: There exists an algorithm for efficiently calculating $\text{Pair}(\Omega_1, \Omega_2)$ for all $\Omega_1 \in G_1$, $\Omega_2 \in G_2$.

A specific example of the bilinear function Pair is a function for performing a pairing operation such as Weil pairing or Tate pairing. (See reference literature 4, Alfred. J. Menezes, "Elliptic Curve Public Key Cryptosystems", Kluwer Academic Publishers, ISBN 0-7923-9368-6, pp. 61-81, for example.) A modified pairing function $e(\Omega_1, phi(\Omega_2))$ $(\Omega_1 \in G_1, \Omega_2 \in G_2)$ obtained by combining a function for performing a pairing operation, such as Tate pairing, and a predetermined function phi according to the type of the elliptic curve E may be used as the bilinear function Pair (see reference literature 2, for example). As the algorithm for performing a pairing operation on a computer, the Miller algorithm (see reference literature 5, V. S. Miller, "Short Programs for Functions on Curves", 1986, http://crypto.stanford.edu/miller/miller.pdf) or some other known algorithm can be used. Methods for configuring a cyclic group and an elliptic curve used to efficiently perform a pairing operation have been known. (For example, see reference literature 2, described earlier, reference literature 6, A. Miyaji, M. Nakabayashi, and S. Takano, "New Explicit Conditions of Elliptic Curve Traces for FR Reduction", IEICE Trans. Fundamentals, Vol. E84-A, No. 5, pp. 1234-1243, May 2001, reference literature 7, P. S. L. M. Barreto, B. Lynn, M. Scott, "Constructing Elliptic Curves with Prescribed Embedding Degrees", Proc. SCN '2002, LNCS 2576, pp. 257-267, Springer-Verlag. 2003, and reference literature 8, R. Dupont, A. Enge, F. Morain, "Building Curves with Arbitrary Small MOV Degree over Finite Prime Fields", http://eprint.iacr.org/2002/094/).

$a_i$ (i=1, . . . , n+1): (n+1)-dimensional basis vector having (n+1) elements of the cyclic group $G_1$ as elements. An example of the basis vector $a_i$ is an (n+1)-dimensional basis vector having $\kappa_1 \cdot g_1 \in G_1$ as an i-dimensional element and the unit element (expressed as "0" in additive expression) of the cyclic group $G_1$ as the remaining n elements. In that case, each element of the (n+1)-dimensional basis vector $a_i$ (i=1, . . . , n+1) can be listed as follows:

$$a_1 = (\kappa_1 \cdot g_1, 0, 0, \ldots, 0) \quad (9)$$

$$a_2 = (0, \kappa_1 \cdot g_1, 0, \ldots, 0)$$

$$\ldots$$

$$a_{n+1} = (0, 0, 0, \ldots, \kappa_1 \cdot g_1)$$

Here, $\kappa_1$ is a constant formed of the elements of the finite field $F_q$ other than the additive unit element $0_F$. An example of $\kappa_1 \in F_q$ is $\kappa_1 = 1_F$. The basis vector $a_i$ is an orthogonal basis. Each (n+1)-dimensional vector having (n+1) elements of the cyclic group $G_1$ as elements is expressed by a linear sum of (n+1)-dimensional basis vectors $a_i$ (i=1, . . . , n+1). Therefore, the (n+1)-dimensional basis vectors $a_i$ span the vector space V, described earlier.

$a_i^*$ (i=1, . . . , n+1): (n+1)-dimensional basis vector having (n+1) elements of the cyclic group $G_2$ as elements. An example of the basis vector $a_i^*$ is an (n+1)-dimensional basis vector having $\kappa_2 \cdot g_2 \in G_2$ as an i-dimensional element and the unit element (expressed as "0" in additive expression) of the cyclic group $G_2$ as the remaining n elements. In that case, each element of the (n+1)-dimensional basis vector $a_i^*$ (i=1, . . . , n+1) can be listed as follows:

$$a_1^* = (\kappa_2 \cdot g_2, 0, 0, \ldots, 0) \quad (10)$$

$$a_2^* = (0, \kappa_2 \cdot g_2, 0, \ldots, 0)$$

$$\ldots$$

$$a_{n+1}^* = (0, 0, 0, \ldots, \kappa_2 \cdot g_2)$$

Here, $\kappa_2$ is a constant formed of the elements of the finite field $F_q$ other than the additive unit element $0_F$. An example of $\kappa_2 \in F_q$ is $\kappa_2 = 1_F$. The basis vector $a_i^*$ is an orthogonal basis. Each (n+1)-dimensional vector having (n+1) elements of the cyclic group $G_2$ as elements is expressed by a linear sum of (n+1)-dimensional basis vectors $a_i^*$ (i=1, . . . , n+1). Therefore, the (n+1)-dimensional basis vectors $a_i^*$ span the vector space V*, described earlier.

The basis vector $a_i$ and the basis vector $a_i^*$ satisfy the following expression for the elements $\tau = \kappa_1 \cdot \kappa_2$ of the finite field $F_q$ other than $0_F$:

$$e(a_i, a_j^*) = g_T^{\tau \cdot \delta(i,j)} \quad (11)$$

When i=j, the following expression is satisfied from Expressions (6) and (7).

$$\begin{aligned} e(a_i, a_i^*) &= \text{Pair}(\kappa_1 \cdot g_1, \kappa_2 \cdot g_2) \cdot \text{Pair}(0, 0) \cdot \ldots \cdot \text{Pair}(0, 0) \\ &= \text{Pair}(g_1, g_2)^{\kappa_1 \kappa_2} \cdot \text{Pair}(g_1, g_2)^{0 \cdot 0} \cdot \ldots \cdot \text{Pair}(g_1, g_2)^{0 \cdot 0} \\ &= \text{Pair}(g_1, g_2)^{\kappa_1 \kappa_2} \\ &= g_T^{\tau} \end{aligned}$$

When i≠j, $e(a_i, a_j^*)$ does not include $\text{Pair}(\kappa_1 \cdot g_1, \kappa_2 \cdot g_2)$ and is the product of $\text{Pair}(\kappa_1 \cdot g_1, 0)$, $\text{Pair}(0, \kappa_2 \cdot g_2)$, and $\text{Pair}(0, 0)$. In addition, the following expression is satisfied from Expression (7).

$$\text{Pair}(g_1, 0) = \text{Pair}(0, g_2) = \text{Pair}(g_1, g_2)^{0 \cdot 0}$$

Therefore, when i≠j, the following expression is satisfied.

$$e(a_i, a_j^*) = e(g_1, g_2)^0 = g_T^0$$

Especially when $\tau = \kappa_1 \cdot \kappa_2 = 1_F$ (for example, $\kappa_1 = \kappa_2 = 1_F$), the following expression is satisfied.

$$e(a_i, a_j^*) = g_T^{\delta(i,j)} \quad (12)$$

Here, $g_T^0 = 1$ is the unit element of the cyclic group $G_T$, and $g_T^1 = g_T$ is a generating element of the cyclic group $G_T$. In that case, the basis vector $a_i$ and the basis vector $a_i^*$ are a dual normal orthogonal basis, and the vector space V and the vector space V* are a dual vector space that constitute bilinear mapping (dual pairing vector space (DPVS)).

A: An (n+1) row by (n+1) column matrix having the basis vector $a_i$ (i=1, . . . , n+1) as elements. When the basis vector $a_i$ (i=1, . . . , n+1) is expressed by Expression (9), for example, the matrix A is as follows:

$$A = \begin{pmatrix} a_1 \\ a_2 \\ \vdots \\ a_{n+1} \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (13)$$

A*: A (n+1) row by (n+1) column matrix having the basis vector $a_i^*$ (i=1, . . . , n+1) as elements. When the basis vector $a_i^*$ (i=1, . . . , n+1) is expressed by Expression (10), for example, the matrix A* is as follows:

$$A^* = \begin{pmatrix} a_1^* \\ a_2^* \\ \vdots \\ a_{n+1}^* \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (14)$$

X: A (n+1) row by (n+1) column matrix having elements of the finite field $F_q$ as elements. The matrix X is used to apply coordinate conversion to the basis vector $a_i$. When the element located at the i-th row and the j-th column in the matrix X, $\chi_{i,j} \in Fq$, the matrix X is as follows:

$$X = \begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \quad (15)$$

Here, each element $\chi_{i,j}$ of the matrix X is called a conversion coefficient.

X*: Transposed matrix of the inverse matrix of the matrix X. $X^* = (X^{-1})^T$. The matrix X* is used to apply coordinate conversion to the basis vector $a_i^*$. When the element located at the i-th row and the j-th column in the matrix X*, $\chi_{i,j}^* \in Fq$, the matrix X* is as follows:

$$X^* = \begin{pmatrix} \chi_{1,1}^* & \chi_{1,2}^* & \cdots & \chi_{1,n+1}^* \\ \chi_{2,1}^* & \chi_{2,2}^* & & \vdots \\ \vdots & & \ddots & \vdots \\ \chi_{n+1,1}^* & \chi_{n+1,2}^* & \cdots & \chi_{n+1,n+1}^* \end{pmatrix} \quad (16)$$

Here, each element $\chi_{i,j}^*$ of the matrix X* is called a conversion coefficient.

In that case, when an (n+1) row by (n+1) column unit matrix is called I, $X \cdot (X^*)^T = I$. In other words, for the unit matrix shown below, $$I = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (17)$$

the following expression is satisfied.

$$\begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \cdot \begin{pmatrix} \chi_{1,1}^* & \chi_{2,1}^* & \cdots & \chi_{n+1,1}^* \\ \chi_{1,2}^* & \chi_{2,2}^* & & \vdots \\ \vdots & & \ddots & \vdots \\ \chi_{1,n+1}^* & \chi_{2,n+1}^* & \cdots & \chi_{n+1,n+1}^* \end{pmatrix} = \quad (18)$$

$$\begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

Here, (n+1)-dimensional vectors will be defined below.

$$\vec{\chi_i} = (\chi_{i,1}, \ldots, \chi_{i,n+1}) \quad (19)$$

$$\vec{\chi_j} = (\chi_{j,1}^*, \ldots, \chi_{j,n+1}^*) \quad (20)$$

The inner product of the (n+1)-dimensional vectors $\vec{\chi_i}$ and $\vec{\chi_j}^*$ satisfies the following expression from Expression (18).

$$\vec{\chi_i} \cdot \vec{\chi_j}^* = \delta(i,j) \quad (21)$$

$b_i$: (n+1)-dimensional basis vector having (n+1) elements of the cyclic group $G_1$ as elements. The basis vector $b_i$ is obtained by applying coordinate conversion to $a_i$ (i=1, ..., n+1) by using the matrix X. Specifically, the basis vector $b_i$ is obtained by the following calculation $$b_i = (\chi_{i,1} \cdot \kappa_1 \cdot g_1, \chi_{i,2} \cdot \kappa_1 \cdot g_1, \ldots, \chi_{i,n+1} \cdot \kappa_1 \cdot g_1) \quad (22)$$

When the basis vector $a_j$ (j=1, ..., n+1) is expressed by Expression (9), each element of the basis vector $b_i$ is shown below.

$$b_i = (\chi_{i,1} \cdot \kappa_1 \cdot g_1, \chi_{i,2} \cdot \kappa_1 \cdot g_1, \ldots \chi_{i,n+1} \cdot \kappa_1 \cdot g_1 \quad (23)$$

Each (n+1)-dimensional vector having (n+1) elements of the cyclic group $G_1$ as elements is expressed by a linear sum of (n+1)-dimensional basis vectors $b_i$ (i=1, ..., n+1). Therefore, the (n+1)-dimensional basis vectors $b_i$ span the vector space V, described earlier.

$b_i^*$: (n+1)-dimensional basis vector having (n+1) elements of the cyclic group $G_2$ as elements. The basis vector $b_i^*$ is obtained by applying coordinate conversion to $a_i^*$ (i=1, ..., n+1) by using the matrix X. Specifically, the basis vector $b_i^*$ is obtained by the following calculation $$b_i^* = \sum_{j=1}^{n+1} \chi_{i,j}^* \cdot a_j^* \quad (24)$$

When the basis vector $a_j$ (j=1, ..., n+1) is expressed by Expression (10), each element of the basis vector $b_i^*$ is shown below.

$$b_i^* = (\chi_{i,1}^* \cdot \kappa_2 \cdot g_2, \chi_{i,2}^* \cdot \eta_2 \cdot g_2, \ldots, \chi_{i,n+1}^* \cdot \kappa_2 \cdot g_2) \quad (25)$$

Each (n+1)-dimensional vector having (n+1) elements of the cyclic group $G_2$ as elements is expressed by a linear sum of (n+1)-dimensional basis vectors $b_i^*$ (i=1, ..., n+1). Therefore, the (n+1)-dimensional basis vectors $b_i^*$ span the vector space V*, described earlier.

The basis vector $b_i$ and the basis vector $b_i^*$ satisfy the following expression for the elements $\tau = \kappa_1 \cdot \kappa_2$ of the finite field $F_q$ other than $0_F$:

$$e(b_i, b_j^*) = g_T^{\tau \cdot \delta(i,j)} \quad (26)$$

The following expression is satisfied from Expressions (6), (21), (23), and (25).

$$e(b_i, b_j^*) = \prod_{L=1}^{n+1} \text{Pair}(\chi_{i,L} \cdot \kappa_1 \cdot g_1, \chi_{j,L}^* \cdot \kappa_2 \cdot g_2)$$

$$= \text{Pair}(\chi_{i,1} \cdot \kappa_1 \cdot g_1, \chi_{j,1}^* \cdot \kappa_2 \cdot g_2) \cdot \ldots \cdot (\chi_{i,n} \cdot \kappa_1 \cdot g_1, \chi_{j,n}^* \cdot \kappa_2 \cdot g_2) \times$$

$$\text{Pair}(\chi_{j,n+1} \cdot \kappa_1 \cdot g_1, \chi_{j,n+1}^* \cdot \kappa_2 \cdot g_2)$$

$$= \text{Pair}(g_1, g_2)^{\kappa_1 \cdot \kappa_2 \cdot \chi_{i,1} \cdot \chi_{j,1}^*} \cdot \ldots \cdot \text{Pair}(g_1, g_2)^{\kappa_1 \cdot \kappa_2 \cdot \chi_{i,2} \cdot \chi_{j,2}^*} \times$$

$$\text{Pair}(g_1, g_2)^{\kappa_1 \cdot \kappa_2 \cdot \chi_{i,n+1} \cdot \chi_{j,n+1}^*}$$

$$= \text{Pair}(g_1, g_2)^{\kappa_1 \cdot \kappa_2 (\chi_{i,1} \cdot \chi_{j,1}^* + \chi_{i,2} \cdot \chi_{j,2}^* + \cdots + \chi_{i,n+1} \cdot \chi_{j,n+1}^*)}$$

$$= \text{Pair}(g_1, g_2)^{\kappa_1 \cdot \kappa_2 \cdot \vec{\chi_i} \cdot \vec{\chi_j}^*}$$

$$= \text{Pair}(g_1, g_2)^{\tau \cdot \delta(i,j)}$$

$$= g_T^{\tau \cdot \delta(i,j)}$$

Especially when $\tau = \kappa_1 \cdot \kappa_2 = 1_F$ (for example, $\kappa_1 = \kappa_2 = 1_F$), the following expression is satisfied.

$$e(b_i, b_j^*) = g_T^{\delta(i,j)} \quad (27)$$

In that case, the basis vector $b_i$ and the basis vector $b_i^*$ are the dual normal orthogonal basis of a dual pairing vector space (the vector space V and the vector space V*).

As long as Expression (26) is satisfied, the basis vectors $a_i$ and $a_i^*$ other than those shown in Expressions (9) and (10) as examples, and the basis vectors $b_i$ and $b_i^*$ other than those shown in Expressions (22) and (24) as examples may be used.

B: An (n+1) row by (n+1) column matrix having the basis vector $b_i$ (i=1, ..., n+1) as elements. B=X·A is satisfied. When the basis vector $b_i$ is expressed by Expression (23), for example, the matrix B is as follows:

$$B = \begin{pmatrix} b_1 \\ b_2 \\ \vdots \\ b_{n+1} \end{pmatrix} = \begin{pmatrix} \chi_{1,1} \cdot \kappa_1 \cdot g_1 & \chi_{1,2} \cdot \kappa_1 \cdot g_1 & \cdots & \chi_{1,n+1} \cdot \kappa_1 \cdot g_1 \\ \chi_{2,1} \cdot \kappa_1 \cdot g_1 & \chi_{2,2} \cdot \kappa_1 \cdot g_1 & & \vdots \\ \vdots & & \ddots & \chi_{n,n+1} \cdot \kappa_1 \cdot g_1 \\ \chi_{n+1,1} \cdot \kappa_1 \cdot g_1 & \cdots & \chi_{n+1,n} \cdot \kappa_1 \cdot g_1 & \chi_{n+1,n+1} \cdot \kappa_1 \cdot g_1 \end{pmatrix} \quad (28)$$

B*: An (n+1) row by (n+1) column matrix having the basis vector $b_i^*$ (i=1, ..., n+1) as elements. B*=X*·A* is satisfied. When the basis vector $b_i^*$ (i=1, ..., n+1) is expressed by Expression (25), for example, the matrix B* is as follows:

$$B^* = \begin{pmatrix} b_1^* \\ b_2^* \\ \vdots \\ b_{n+1}^* \end{pmatrix} = \begin{pmatrix} \chi_{1,1}^* \cdot \kappa_2 \cdot g_2 & \chi_{1,2}^* \cdot \kappa_2 \cdot g_2 & \cdots & \chi_{1,n+1}^* \cdot \kappa_2 \cdot g_2 \\ \chi_{2,1}^* \cdot \kappa_2 \cdot g_2 & \chi_{2,2}^* \cdot \kappa_2 \cdot g_2 & & \vdots \\ \vdots & & \ddots & \chi_{n,n+1}^* \cdot \kappa_2 \cdot g_2 \\ \chi_{n+1,1}^* \cdot \kappa_2 \cdot g_2 & \cdots & \chi_{n+1,n}^* \cdot \kappa_2 \cdot g_2 & \chi_{n+1,n+1}^* \cdot \kappa_2 \cdot g_2 \end{pmatrix} \quad (29)$$

$\vec{w}$: An n-dimensional vector having elements of the finite field $F_q$ as elements.

$$\vec{w} = (w_1, \ldots, w_n) \in F_q^n \quad (30)$$

$w_\mu$: The μ-th (μ=1, ..., n) element of the n-dimensional vector.

$\vec{v}$: An n-dimensional vector having elements of the finite field $F_q$ as elements.

$$\vec{v} = (v_1, \ldots, v_n) \in F_q^n \quad (31)$$

$v_\mu$: The μ-th (μ=1, ..., n) element of the n-dimensional vector.

Collisionless function: A function h that satisfies the following condition with respect to a sufficiently larger security parameter k, or a function regarded as serving as such.

$$Pr[A(h)=(x,y)|h(x)=h(y) \wedge x \neq y] < \epsilon(k) \quad (32)$$

Here, Pr[·] is the probability of the event [·]; A(h) is a probability polynomial time algorithm for calculating x and y (x≠y) that satisfy h(x)=h(y) for a function h; and ε(k) is a polynomial for the security parameter k. An example collisionless function is a hash function such as the cryptographic hash function disclosed in reference literature 1.

Injective function: A function by which each element belonging to a value range is expressed as the image of only one element in the definition range, or a function regarded as such. An example injection function is a hash function such as the key derivation function (KDF) disclosed in reference literature 1.

Pseudo-random function: A function belonging to a subset $\phi_\zeta$ when a probability polynomial time algorithm cannot distinguish between the subset $\phi_\zeta$ and its whole set $\Phi_\Theta$, or a function regarded as such. The set $\Phi_\zeta$ is a set of all functions that map an element of a set $\{0, 1\}^\zeta$ to an element of the set $\{0, 1\}^\zeta$. An example pseudo-random function is a hash function such as that described above.

$H_1$: A collisionless function that receives two binary sequences $(\omega_1, \omega_2) \in \{0, 1\}^k \times \{0, 1\}^*$ and outputs two elements $(\psi_1, \psi_2) \in F_q \times F_q$ of the finite field $F_q$.

$$H_1: \{0,1\}^k \times \{0,1\}^* \to F_q \times F_q \quad (33)$$

An example of the function $H_1$ is a function that receives the connected bits $\omega_1 \| \omega_2$ of $\omega_1$ and $\omega_2$, performs calculations with a hash function such as the cryptographic hash function disclosed in reference literature 1, a binary-sequence-to-integer conversion function (octet string/integer conversion), and a binary-sequence-to-finite-field-element conversion function (octet string and integer/finite field conversion), and outputs two elements $(\psi_1, \psi_2) \in F_q \times F_q$ of the finite field $F_q$. It is preferred that the function $H_1$ be a pseudo-random function.

$H_2$: A collisionless function that receives an element of the cyclic group $G_T$ and a binary sequence $(\xi, \omega_2) \in G_T \times \{0, 1\}^*$ and outputs one element $\psi \in F_q$ of the finite field $F_q$.

$$H_2: G_T \times \{0,1\}^* \to F_q \quad (34)$$

An example of the function $H_2$ is a function that receives an element $\xi \in G_T$ of the cyclic group $G_T$ and a binary sequence $\omega_2 \in \{0, 1\}^*$, inputs the element $\xi \in G_T$ of the cyclic group $G_T$ to the finite-field-element-to-binary-sequence conversion function (octet string and integer/finite field conversion) disclosed in reference literature 1 to obtain a binary sequence, applies a hash function such the cryptographic hash function disclosed in reference literature 1 to the connected bits of the binary sequence and the binary sequence $\chi_2 \in \{0, 1\}^*$, performs a binary-sequence-to-finite-field-element conversion function (octet string and integer/finite field conversion), and outputs one element $\psi \in F_q$ of the finite field $F_q$. It is preferred from a security viewpoint that the function $H_2$ be a pseudo-random function.

R: An injective function that receives an element $\xi \in G_T$ of the cyclic group $G_T$ and outputs one binary sequence $\omega \in \{0, 1\}^k$.

$$R: G_T \to \{0,1\}^k \quad (35)$$

An example of the injective function R is a function that receives an element $\xi \in G_T$ of the cyclic group $G_T$, performs calculations with the finite-field-element-to-binary-sequence conversion function (octet string and integer/finite field conversion) and then with a hash function such as the KDF (key derivation function) disclosed in reference literature 1, and outputs one binary sequence $\omega \in \{0, 1\}^k$. From a security viewpoint, it is preferred that the function R be a collisionless function, and it is more preferred that the function R be a pseudo-random function.

Enc: A private key encryption function that indicates an encryption process of a private key cryptosystem. Example private key cryptosystems are Camellia(registered trademark) and AES.

$Enc_k(M)$: Ciphertext obtained by encrypting plaintext M by the private key encryption function Enc with the use of a common key K.

Dec: A private key decryption function that indicates a decryption process of the private key cryptosystem.

$Dec_k(C)$: A decryption result obtained by decrypting ciphertext C by the private key decryption function Dec with the use of the common key K.

[Inner Product Functional Encryption]

The basic configuration of inner product functional encryption will be described below.

<Functional Encryption>

Functional encryption (sometimes called functional encryption) means that ciphertext can be decrypted when a combination of attribute information and logic information makes a predetermined logical expression true. One of the attribute information and logic information is embedded in the ciphertext and the other is embedded in key information. The configuration of conventional functional encryption is, for example, disclosed in reference literature 9, Jonathan Katz, Amit Sahai and Brent Waters, "Function encryption supporting Disjunctions, Polynomial Equations, and Inner Products", one of four papers from Eurocrypt 2008 invited by the Journal of Cryptology.

<Inner Product Functional Encryption>

Inner product functional encryption means that ciphertext can be decrypted when the inner product of attribute information and logic information handled as vectors is zero. In inner product functional encryption, an inner product of zero is equivalent to a logical expression of true.

[Relationship Between Logical Expression and Polynomial]

In inner product functional encryption, a logical expression formed of a logical OR(s) and/or a logical AND(s) is expressed by a polynomial.

The logical OR $(x=\eta_1) \vee (x=\eta_2)$ of statement 1 indicating that x is $\eta_1$ and statement 2 indicating that x is $\eta_2$ is expressed by the following polynomial.

$$(x-\eta_1)\cdot(x-\eta_2) \quad (36)$$

Then, the relationships between true values and the function values of Expression (36) are shown in the following table.

TABLE 1

| Statement 1 ($x = \eta_1$) | Statement 2 ($x = \eta_2$) | Logical OR ($x = \eta_1$)∨($x = \eta_2$) | Function value ($x = \eta_1$)·($x = \eta_2$) |
|---|---|---|---|
| True | True | True | 0 |
| True | False | True | 0 |
| False | True | True | 0 |
| False | False | False | Other than 0 |

As understood from Table 1, when the logical OR $(x=\eta_1) \vee (x=\eta_2)$ is true, the function value of Expression (36) is zero; and when the logical OR $(x=\eta_1) \vee (x=\eta_2)$ is false, the function value of Expression (36) is a value other than zero. In other words, a logical OR $(x=\eta_1) \vee (x=\eta_2)$ of true is equivalent to a function value of zero in Expression (36). Therefore, the logical OR can be expressed by Expression (36).

The logical AND $(x=\eta_1) \wedge (x=\eta_2)$ of statement 1 indicating that x is $\eta_1$ and statement 2 indicating that x is $\eta_2$ is expressed by the following polynomial $$\iota_1\cdot(x-\eta_1)+\iota_2\cdot(x-\eta_2) \quad (37)$$

where $\iota_1$ and $\iota_2$ are random numbers. Then, the relationships between true values and the function values of Expression (37) are shown in the following table.

TABLE 2

| Statement 1 ($x = \eta_1$) | Statement 2 ($x = \eta_2$) | Logical AND ($x = \eta_1$)∧($x = \eta_2$) | Function value $\iota_1\cdot(x-\eta_1)+\iota_2\cdot(x-\eta_2)$ |
|---|---|---|---|
| True | True | True | 0 |
| True | False | False | Other than 0 |
| False | True | False | Other than 0 |
| False | False | False | Other than 0 |

As understood from Table 2, when the logical AND $(x=\eta_1) \wedge (x=\eta_2)$ is true, the function value of Expression (37) is zero; and when the logical AND $(x=\eta_1) \wedge (x=\eta_2)$ is false, the function value of Expression (37) is a value other than zero. In other words, a logical AND $(x=\eta_1) \wedge (x=\eta_2)$ of true is equivalent to a function value of zero in Expression (37). Therefore, the logical AND can be expressed by Expression (37).

As described above, by using Expressions (36) and (37), a logical expression formed of a logical OR(s) and/or a logical AND(s) can be expressed by the polynomial f(x). An example will be shown below.

Logical expression: $\{(x=\eta_1) \vee (x=\eta_2) \vee (x=\eta_3)\} \wedge (x=\eta_4) \wedge (x=\eta_5)$ Polynomial: $f(x)=\iota_1\cdot\{(x-\eta_1)\cdot(x-\eta_2)\cdot(x-\eta_3)\}+\iota_2\cdot(x-\eta_4)+\iota_3\cdot(x-\eta_5)$ (38)

In Expression (36), one indeterminate element x is used to express the logical OR. A plurality of indeterminate elements can also be used to express a logical OR. For example, two indeterminate elements $x_0$ and $x_1$ are used to express the logical OR $(x_0=\eta_0) \vee (x_1=\eta_1)$ of statement 1 indicating that $x_0$ is $\eta_0$ and statement 2 indicating that $x_1$ is $\eta_1$ by the following polynomial.

$$(x_0-\eta_0)\cdot(x_1-\eta_4)$$

Three or more indeterminate elements can also be used to express a logical OR by a polynomial.

In Expression (37), one indeterminate element x is used to express the logical AND. A plurality of indeterminate elements can also be used to express a logical AND. For example, the logical AND $(x_0=\eta_0) \wedge (x_1=\eta_1)$ of statement 1 indicating that $x_0$ is $\eta_0$ and statement 2 indicating that $x_1$ is $\eta_1$ can be expressed by the following polynomial.

$$\iota_0\cdot(x_0-\eta_0)+\iota_1\cdot(x_1-\eta_1)$$

Three or more indeterminate elements can also be used to express a logical AND by a polynomial.

A logical expression that includes a logical OR(s) and/or a logical AND(s) is expressed with H (H≥1) types of indeterminate elements $x_0, \ldots, x_{H-1}$ as the polynomial $f(x_0, \ldots, x_{H-1})$. It is assumed that a statement for each of the indeterminate elements $x_0, \ldots, x_{H-1}$ is "$x_h$ is $\eta_h$", where $\eta_h$ (h=0, ..., H-1) is a constant determined for each statement. Then, in the polynomial $f(x_0, \ldots, x_{H-1})$ indicating the logical expression, the statement indicating that an indeterminate element $x_h$ is a constant $\eta_h$ is expressed by the polynomial indicating the difference between the indeterminate element $x_h$ and the constant $\eta_h$; each logical OR of statements is expressed by the product of the polynomials indicating the statements; and the logical AND of statements or the logical ORs of statements is expressed by a linear OR of the polynomials indicating the statements or the logical ORs of statements. For example, five indeterminate elements $x_0, \ldots, x_4$ are used to express a logical expression $$\{(x_0=\eta_0) \vee (x_1=\eta_1) \vee (x_2=\eta_2)\} \wedge (x_3=\eta_3) \wedge (x_4=\eta_4)$$

by the following polynomial $$f(x_0, \ldots, x_4) = \iota_0 \cdot \{(x_0 - \eta_0) \cdot (x_1 - \eta_1) \cdot (x_2 - \eta_2)\} + \iota_1 \cdot (x_3 - \eta_3) + \iota_2 \cdot (x_4 - \eta_4)$$

[Relationship Between Polynomial and Inner Product]

The polynomial $f(x_0, \ldots, x_{H-1})$ indicating a logical expression can be expressed by the inner product of two n-dimensional vectors. More specifically, a vector having the indeterminate elements of the terms of the polynomial $f(x_0, \ldots, x_{H-1})$ as elements, $$\vec{v} = (v_1, \ldots, v_n)$$

and a vector having the coefficients of the terms of the polynomial $f(x_0, \ldots, x_{H-1})$ as elements, $$\vec{w} = (w_1, \ldots, w_n)$$

are used to generate the inner product thereof, $$f(x_0, \ldots, x_{H-1}) = \vec{w} \cdot \vec{v}$$

which is equal to the polynomial $f(x_0, \ldots, x_{H-1})$. In other words, whether the polynomial $f(x_0, \ldots, x_{H-1})$ indicating a logical expression is zero is equivalent to whether the inner product of the vector $\vec{v}$ having the indeterminate elements of the terms of the polynomial $f(x_0, \ldots, x_{H-1})$ as elements and the vector $\vec{w}$ having the coefficients of the terms of the polynomial $f(x_0, \ldots, x_{H-1})$ as elements is zero.

$$f(x_0, \ldots, x_{H-1}) = 0 \leftrightarrow \vec{w} \cdot \vec{v} = 0$$

For example, a polynomial $f(x) = \theta_0 \cdot x^0 \pm \theta_1 \cdot x + \ldots + \theta_{n-1} x^{n-1}$ can be expressed with two n-dimensional vectors $$\vec{w} = (w_1, \ldots, w_n) = (\theta_0, \ldots, \theta_{n-1}) \quad (39)$$

$$\vec{v} = (v_1, \ldots, v_n) = (x^0, \ldots, x^{n-1}) \quad (40)$$

by the inner product thereof.

$$f(x) = \vec{w} \cdot \vec{v} \quad (41)$$

In other words, whether the polynomial $f(x)$ indicating a logical expression is zero is equivalent to whether the inner product in Expression (41) is zero.

$$f(x) = 0 \leftrightarrow \vec{w} \cdot \vec{v} = 0 \quad (42)$$

When a vector having the indeterminate elements of the terms of the polynomial $f(x_0, \ldots, x_{H-1})$ as elements is expressed by $$\vec{w} = (w_1, \ldots, w_n)$$

and a vector having the coefficients of the terms of the polynomial $f(x_0, \ldots, x_{H-1})$ as elements is expressed by $$\vec{v} = (v_1, \ldots, v_n)$$

whether the polynomial $f(x_0, \ldots, x_{H-1})$ indicating a logical expression is zero is equivalent to whether the inner product of the vector $\vec{w}$ and the vector $\vec{v}$ is zero.

For example, when the following expressions are used instead of Expressions (39) and (40), $$\vec{w} = (w_1, \ldots, w_n) = (x_0, \ldots, x_{n-1}) \quad (43)$$

$$\vec{v} = (v_1, \ldots, v_n) = (\theta_0, \ldots, \theta_{n-1}) \quad (44)$$

whether the polynomial $f(x)$ indicating a logical expression is zero is equivalent to whether the inner product in Expression (41) is zero.

In inner product predicate encryption, one of the vectors $\vec{v} = (v_1, \ldots, v_n)$ and $\vec{w} = (w_1, \ldots, w_n)$ is used as attribute information and the other is used as predicate information. One of the attribute information and predicate information is embedded in ciphertext and the other is embedded in key information. For example, an n-dimensional vector $(\theta_0, \ldots, \theta_{n-1})$ is used as predicate information, another n-dimensional vector $(x^0, \ldots, x^{n-1})$ is used as attribute information, one of the attribute information and predicate information is embedded in ciphertext, and the other is embedded in key information. It is assumed in the following description that an n-dimensional vector embedded in key information is $\vec{w} = (w_1, \ldots, w_n)$ and another n-dimensional vector embedded in ciphertext is $\vec{v} = (v_1, \ldots, v_n)$. For example, Predicate information: $\vec{w} = (w_1, \ldots, w_n) = (\theta_n, \ldots, \theta_{n-1})$ Attribute information: $\vec{v} = (v_1, \ldots, v_n) = (x^0, \ldots, x^{n-1})$ Alternatively, Predicate information: $\vec{v} = (v_1, \ldots, v_n) = (\theta_0, \theta_{n-1})$ Attribute information: $\vec{w} = (w_1, \ldots, w_n) = (x^0, \ldots, x^{n-1})$

[Basic Configuration of Inner Product Predicate Encryption]

The basic configuration of a key encapsulation mechanism (KEM) using inner product predicate encryption will be described below. This configuration includes Setup($1^k$), GenKey(MSK, $\vec{w}$), Enc(PA, $\vec{v}$), and Dec(SKw, $C_2$).

<<Setting up Setup($1^k$)>>

Input: Security parameter k

Output: Master key information MSK, public parameter PK

In an example of Setup($1^k$), a security parameter k is used as n, an (n+1) row by (n+1) column matrix A having an (n+1)-dimensional basis vector $a_i$ (i=1, ..., n+1) as elements, an (n+1) row by (n+1) column matrix A* having a basis vector $a_i^*$ (i=1, ..., n+1) as elements, and (n+1) row by (n+1) column matrixes X and X* used for coordinate conversion are selected. Then, an (n+1)-dimensional basis vector $b_i$ (i=1, ..., n+1) is calculated through coordinate conversion by Expression (22), and an (n+1)-dimensional basis vector $b_i^*$ (i=1, ..., n+1) is calculated through coordinate conversion by Expression (24). An (n+1) row by (n+1) column matrix B* having the basis vector $b_i^*$ (i=1, ..., n+1) as elements is output as master key information MSK; and vector spaces V and V*, an (n+1) row by (n+1) column matrix B having the basis vector $b_i$ (i=1, ..., n+1) as elements, the security parameter k, the finite field $F_q$, the elliptic curve E, the cyclic groups $G_1$, $G_2$, and $G_T$, the generating elements $g_1$, $g_2$, and $g_T$, the bilinear function e, and others are output as a public parameter PK.

<<Key information generation GenKey(MSK, $\vec{w}$)>>

Input: Master key information MSK, vector $\vec{w}$

Output: Key information D* corresponding to vector $\vec{w}$

In an example of GenKey(MSK, $\vec{w}$), $\alpha \in F_q$ is selected from the finite field $F_q$. Then, the matrix B*, which is the master key information MSK, is used to generate and output key information D* corresponding to the vector $\vec{w}$ in the following way.

$$D^* = \alpha \cdot (\Sigma_{\mu=1}^n w_\mu \cdot b_\mu^*) + b_{n+1}^* \in G_2^{n+1} \quad (45)$$

If it is difficult to solve a discrete logarithmic problem on the cyclic group $G_2$, it is difficult to separate and extract the components of $w_\mu \cdot b_\mu^*$ and $b_{n+1}^*$.

<<Encryption Enc(PA, $\vec{v}$)>>

Input: Public parameter PK, vector $\vec{v}$

Output: Ciphertext $C_2$, common key K

In an example of Enc(PA, $\vec{v}$), a common key K and a random number $\upsilon_1$, which is an element of the finite field $F_q$, are generated. Then, the public parameter PK, such as the matrix B, an element $\upsilon_2$ corresponding to a value that includes the common key K, in the finite field $F_q$, the vector $\vec{v}$, and the random number $\upsilon_1$ are used to generate ciphertext $C_2$ in the following way.

$$C_2 = \upsilon_1 * (\Sigma_{\mu=1}^n v_\mu \cdot b_\mu) + \upsilon_2 \cdot b_{n+1} \in G_1^{n+1} \tag{46}$$

The ciphertext $C_2$ and the common key K are output. An example of the common key K is $g_T^{\tau \cdot \upsilon_2} \in G_T$, where $\upsilon_2$ means $\upsilon_2$. An example of $\tau$ is $1_F$, as described above. If it is difficult to solve a discrete logarithmic problem on the cyclic group $G_1$, it is difficult to separate and extract the components of $v_\mu \cdot b_\mu$ and $\upsilon_2 \cdot b_{n+1}$.

<<Decryption and Key Sharing Dec(SKw, $C_2$)>>

Input: Key information $D_1^*$ corresponding to vector $\vec{w}$, ciphertext $C_2$ Output: Common key K In an example of Dec(SKw, $C_2$), the ciphertext $C_2$ and the key information $D_1^*$ are input to the bilinear function e of Expression (2). Then, from the characteristics of Expressions (3) and (26), the following is satisfied.

$$\begin{aligned}
e(C_2, D^*) &= e\left(v_1 \cdot \left(\sum_{\mu=1}^n v_\mu \cdot b_\mu\right) + v_2 \cdot b_{n+1}, \alpha \cdot \left(\sum_{\mu=1}^n w_\mu \cdot b_\mu^*\right) + b_{n+1}^*\right) \\
&= e(v_1 \cdot v_1 \cdot b_1, \alpha \cdot w_1 \cdot b_1^*) \cdot \ldots \cdot e(v_1 \cdot v_n \cdot b_n, \alpha \cdot w_n \cdot b_n^*) \times \\
&\quad e(v_2 \cdot b_{n+1}, b_{n+1}^*) \\
&= e(b_1, b_1^*)^{\gamma_1 \cdot v_1 \cdot \alpha \cdot w_1} \cdot \ldots \cdot e(b_n, b_n^*)^{\gamma_1 \cdot v_n \cdot \alpha \cdot w_n} \cdot e(b_{n+1}, b_{n+1}^*)^{v_2} \\
&= g_T^{\tau \cdot \gamma_1 \cdot v_1 \cdot \alpha \cdot w_1} \cdot \ldots \cdot g_T^{\tau \cdot \gamma_1 \cdot v_n \cdot \alpha \cdot w_n} \cdot g_T^{\tau \cdot v_2} \\
&= g_T^{\tau \cdot \gamma_1 \cdot \alpha \cdot \vec{v} \cdot \vec{w}} \cdot g_T^{\tau \cdot v_2}
\end{aligned} \tag{47}$$

When the inner product $\vec{w} \cdot \vec{v}$ is zero, Expression (47) can be changed to the following.

$$\begin{aligned}
e(C_2, D^*) &= g_T^{\tau \cdot \gamma_1 \cdot \alpha \cdot 0} \cdot g_T^{\tau \cdot v_2} \\
&= g_T^{\tau \cdot v_2}
\end{aligned} \tag{48}$$

From this result, the common key K is generated and output. An example of the common key K is $e_T^{\tau \cdot \upsilon_2} \in G_T$.

The (n+1)-dimensional basis vectors are used to configure the algorithm. The dimension is not limited to (n+1). An (n+$\Xi$)-dimensional basis vector $bi^*$ (i=1, n+$\Xi$) may be used to configure the algorithm, where $\Xi$ is a predetermined integer equal to two or more. In that case, Expressions (49) can be used instead of Expression (45), and Expression (50) can be used instead of Expression (46), where $\upsilon_\iota$ is a constant or a variable (such as a random number).

$$D^* = \alpha \cdot (\Sigma_{\mu=1}^n w_\mu \cdot b_\mu^*) + \Sigma_{\nu=n+1}^{n+\Xi} \upsilon_\iota \cdot b_\iota^* \in G_2^{n+\Xi} \tag{49}$$

$$C_2 = \upsilon_1 \cdot (\Sigma_{\mu=1}^n v_\mu \cdot b_\mu) + \Sigma_{\iota=2}^{\Xi} {}^{+1}\upsilon_\iota \cdot b_{\iota+n+1} \in G_1^{n+\Xi} \tag{50}$$

The following expression may be used as Expression (45).

$$D^* = \alpha \cdot (\Sigma_{\mu=1}^n w_\mu \cdot b_\mu^*) + \upsilon_{n+1} \cdot b_{n+1}^* \in G_2^{n+1}$$

In addition, the input information may be switched. Specifically, w is replaced with v in Expression (45) and v is replaced with w in Expression (46).

Next, description will be given of embodiments according to a first aspect of the present invention which relate to a cryptographic communication technology that is based on functional encryption (predicate encryption is adopted as an example of the functional encryption) and that can operate flexibly. Note that expression numbers are newly assigned below.

(First Embodiment According to First Aspect)

A first embodiment according to the first aspect of the present invention will be described below with reference to FIG. 1 to FIG. 17.

As shown in FIG. 1, a cryptographic system 1 includes a plurality of client apparatuses 10 and 30, one or a plurality of key generation apparatuses 20, one or a plurality of user information management apparatuses 40 (hereafter each called a management apparatus), conversion rule information pair management apparatuses 50 (hereafter each called a registration apparatus), one or a plurality of maintenance apparatuses 80, and one or a plurality of authentication apparatuses 90. These apparatuses can communicate with each other through a communication network 5, such as the Internet.

The client apparatuses function as encryption apparatuses or decryption apparatuses based on their processing functions. In the light of their functions, the client apparatuses are called encryption apparatuses 10 or decryption apparatuses 30. The cryptographic system 1 may include client apparatuses that function only as encryption apparatuses and/or client apparatuses that function only as decryption apparatuses.

In the cryptographic system 1, encryption and decryption are performed using predicate encryption. In the first aspect of the present invention, the predicate encryption algorithm to be used is not limited, and the predicate encryption algorithm disclosed in Non-patent literature 2, for example, may be used. In the first embodiment of the first aspect, a predicate encryption algorithm of KEM (the key encapsulation mechanism) type will be used.

A cryptographic communication method used in the cryptographic system 1 will be described with reference to FIGS. 2, 3, 4, 6, 8, and 10. See FIGS. 5, 7, and 9 for the functional structure of each apparatus.

<<Preparation Process>>

A parameter generation unit (not shown) of the key generation apparatus 20 generates a private key and an entry used in the predicate encryption algorithm (step S1). The entry includes a public parameter (abbreviated as a public P in the figures) used in the predicate encryption algorithm, the address of the key generation apparatus 20, a list of policies that can be used by the key generation apparatus 20, and a list of schemas that can be used by the key generation apparatus 20.

The public parameter includes, for example, generating elements $g_1$, $g_2$, and $g_T$ of cyclic groups $G_1$, $G_2$, and $G_T$ having an order q, a non-degenerate bilinear mapping e: $G_1 \times G_2 \to G_T$ (where $e(g_1, g_2) = g_T$), the order q, and the orthogonal basis B of an (n+1) dimensional vector space V. The private key includes the orthogonal basis $B^*$ of a dual vector space V. When the algebraic structure is a finite field $F_q$, q is a prime number or a power of a prime number. The bilinear mapping e is, for example, Tate pairing or Weil pairing.

The orthogonal basis B and the orthogonal basis $B^*$ will be described next. It is assumed that an arbitrary element of the (n+1) dimensional vector space V is expressed as an element of an (n+1) dimensional direct product $G_1^{n+1}$ of the cyclic group $G_1$, as shown in Expression (1). An arbitrary element of the (n+1) dimensional vector space V can also be expressed by using the canonical basis A of the (n+1) dimensional vector space V, as shown in Expression (2), where $a_i$ is an element of the (n+1) dimensional direct product $G_1^{n+1}$, $z_i$ is an element of an (n+1) dimensional direct product $F_q^{n+1}$, and 1 indicates an additive identity.

$$V: (g_1^{z_1}, \ldots, g_1^{z_{n+1}}) \in G_1^{n+1} \quad (1)$$

$$V: z_1 a_1 + \ldots + z_{n+1} a_{n+1} \quad (2)$$

$$A = (a_1, \ldots, a_{n+1})$$

$$= \begin{pmatrix} g_1 & 1 & \ldots & 1 \\ 1 & g_1 & & \vdots \\ \vdots & & \ddots & 1 \\ 1 & \ldots & 1 & g_1 \end{pmatrix}, a_i \in G_1^{n+1}$$

$$z_i \in F_q^{n+1}$$

The orthogonal basis B is obtained by applying an (n+1) dimensional square matrix X to the canonical basis A, as shown in Expression (3), where symbol T indicates transposition. The matrix X is kept secret as the private key.

$$B = X \cdot A \quad (3)$$

$$B = {}^T(b_1, \ldots, b_{n+1})$$

$$X = {}^T(x_1, \ldots, x_{n+1})$$

$$= (\chi_{ij})_{(n+1) \times (n+1)}, \chi_{ij} \in F_q$$

$$x_i = (\chi_{i1}, \ldots, \chi_{i(n+1)})$$

$$b_i = \sum_{j=1}^{n+1} \chi_{ij} a_j$$

$$= (g_1^{\chi_{i1}}, \ldots, g_1^{\chi_{i(n+1)}})$$

It is also assumed that an arbitrary element of the dual vector space V* corresponding to the vector space V is expressed as an element of an (n+1) dimensional direct product $G_2^{n+1}$ of the cyclic group $G_2$, as shown in Expression (4). An arbitrary element of the dual vector space V* can also be expressed by using the canonical basis A* of the dual vector space V*, as shown in Expression (5), where $a_i^*$ is an element of the (n+1) dimensional direct product $G_2^{n+1}$, $y_i^*$ is an element of the (n+1) dimensional direct product $F_q^{n+1}$, and 1 indicates an additive identity.

$$V^*: (g_2^{y_1}, \ldots, g_2^{y_{n+1}}) \in G_2^{n+1} \quad (4)$$

$$V^*: y_1 a_1^* + \ldots + y_{n+1} a_{n+1}^* \quad (5)$$

$$A^* = (a_1^*, \ldots, a_{n+1}^*)$$

$$= \begin{pmatrix} g_2 & 1 & \ldots & 1 \\ 1 & g_2 & & \vdots \\ \vdots & & \ddots & 1 \\ 1 & \ldots & 1 & g_2 \end{pmatrix}, a_i^* \in G_2^{n+1}$$

$$y_i \in F_q^{n+1}$$

The orthogonal basis B* is obtained by applying an (n+1) dimensional square matrix $^T(X^{-1})$ to the canonical basis A*, as shown in Expression (6), where symbol E indicates a unit matrix.

$$B^* = {}^T(X^{-1}) \cdot A^* \quad (6)$$

$$B^* = {}^T(b_1^*, \ldots, b_{n+1}^*)$$

$$b_i^* = (g_2^{x_{i1}^*}, \ldots, g_2^{x_{i(n+1)}^*})$$

$$X \cdot {}^T(X^*) = E,$$

$$X^* = {}^T(X^{-1})$$

The schema list will be described next. A pair of conversion rule information items is called a schema pair (see FIGS. 11 to 13): one of the conversion rule information items is information (attribute conversion rule information, or attribute schema) that prescribes a conversion rule for converting information that designates an attribute (attribute designation information, that is, information that identifies an attribute such as a name or a date of birth specifically and uniquely, also called an attribute value) to attribute information used in the predicate encryption algorithm, and the other of the conversion rule information items is information (predicate (logical expression) conversion rule information, or predicate (logical expression) schema) that prescribes a conversion rule for converting information that designates a predicate (logical expression) (predicate (logical expression) designation information, that is, information that specifies a condition related to an attribute, such as an age or an authority specifically by a logical expression, also called a propositional function) to predicate information (logic information) used in the predicate encryption algorithm. A set (data list) of one or a plurality of schema pairs is called a schema list. Each key generation apparatus 20 can determine a schema list in a desired manner. Each data item included in each schema in the schema list is written, for example, in XML (the eXtensible Markup Language) or ASN.1 (the Abstract Notation Number One).

An example of the attribute schema shown in FIG. 12 will be described below. User attribute designation information (attribute value) is associated with an attribute name and a data type. In the example shown in FIG. 12, a data type 'character string' is specified for an attribute name 'email1', and the attribute name 'email1' and the data type 'character string' are associated with an attribute value 'XXX@XXX.ntt.co.jp', for example.

The attribute schema prescribes a conversion rule in which an element number is associated with an attribute name and a type conversion function. In the example shown in FIG. 12, an element number '1' is associated with an attribute name 'blood type' and a type conversion function, for example. The type conversion function corresponding to the element number '1' converts the attribute value to 0 when the attribute value of the blood type is 'O', to 1 when the attribute value of the blood type is 'A', to 2 when the attribute value of the blood type is 'B', and to 3 when the attribute value of the blood type is 'AB'. Element numbers '2' and '3' are associated with an attribute name "date of birth" and type conversion functions. The type conversion functions corresponding to the element numbers '2' and '3' convert the year of the attribute value of the date of birth to the value of a hash function having the year as the input for the element number '2' and the month and day of the attribute value of the date of birth to the value of the hash function having the month and day as the input for the element number '3'.

Figure 12:
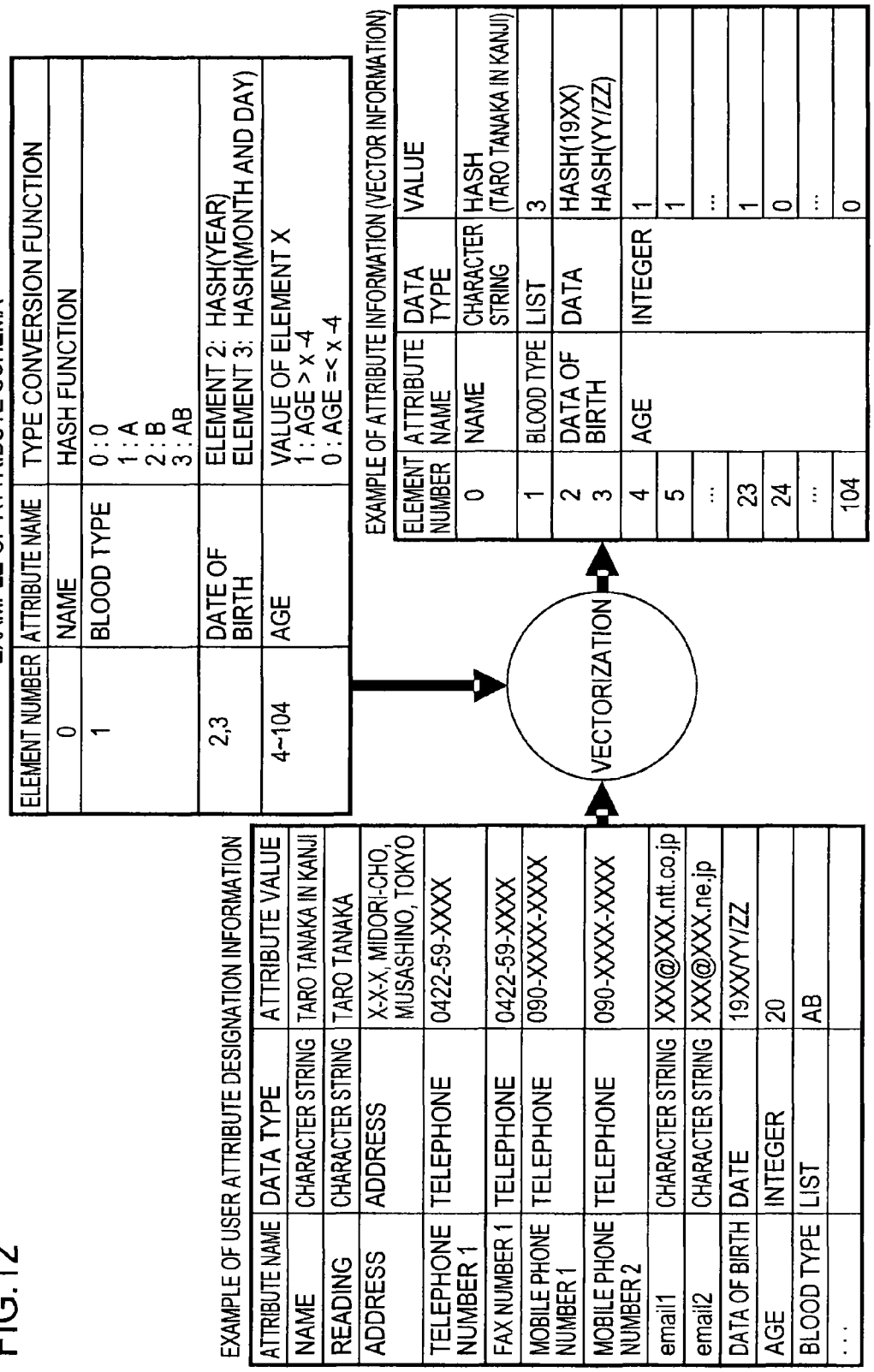
FIG. 12 is a view showing how to obtain attribute information from attribute designation information by using an attribute schema.
Figure 18:
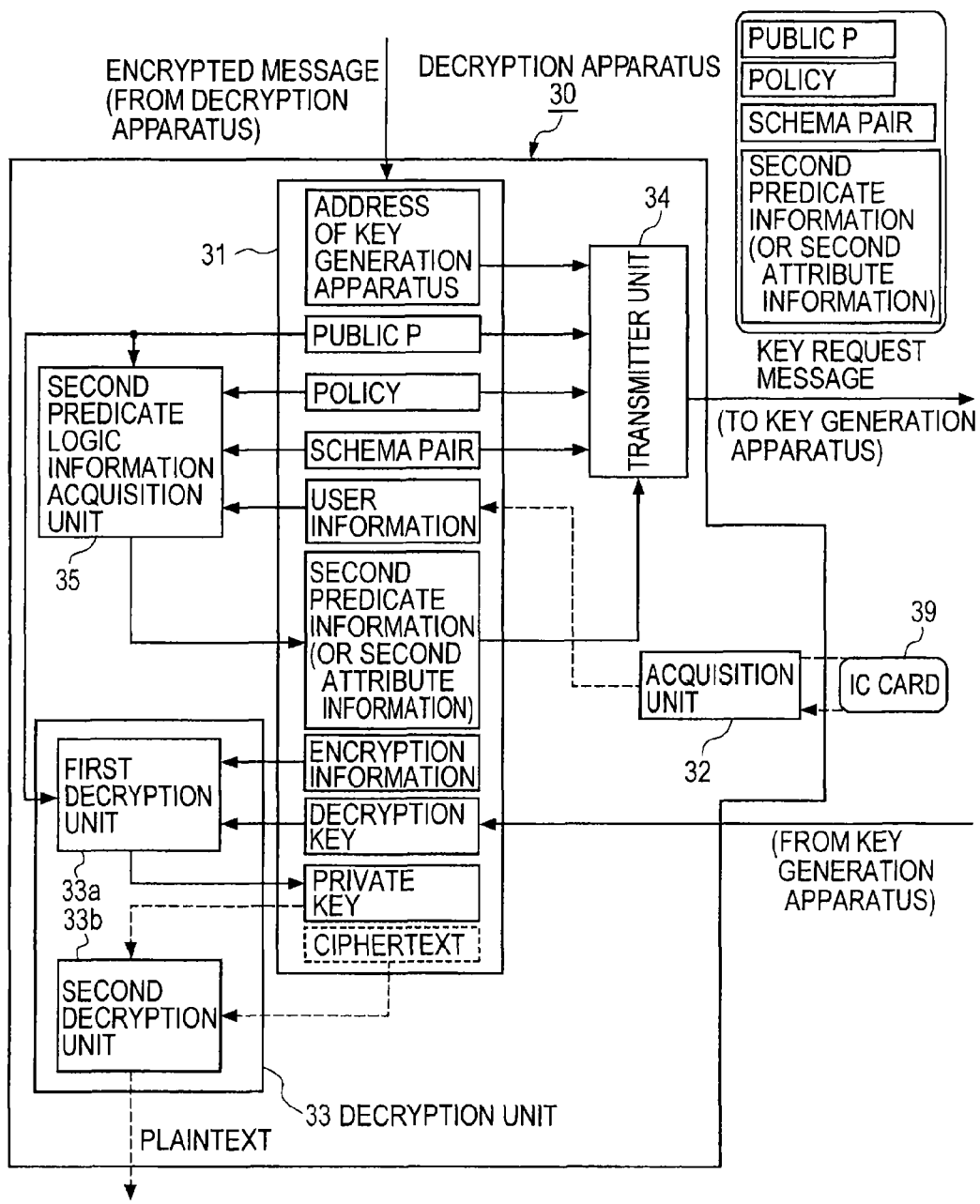
FIG. 18 is a functional block diagram of a decryption apparatus according to a second embodiment of the first aspect.
Figure 19:
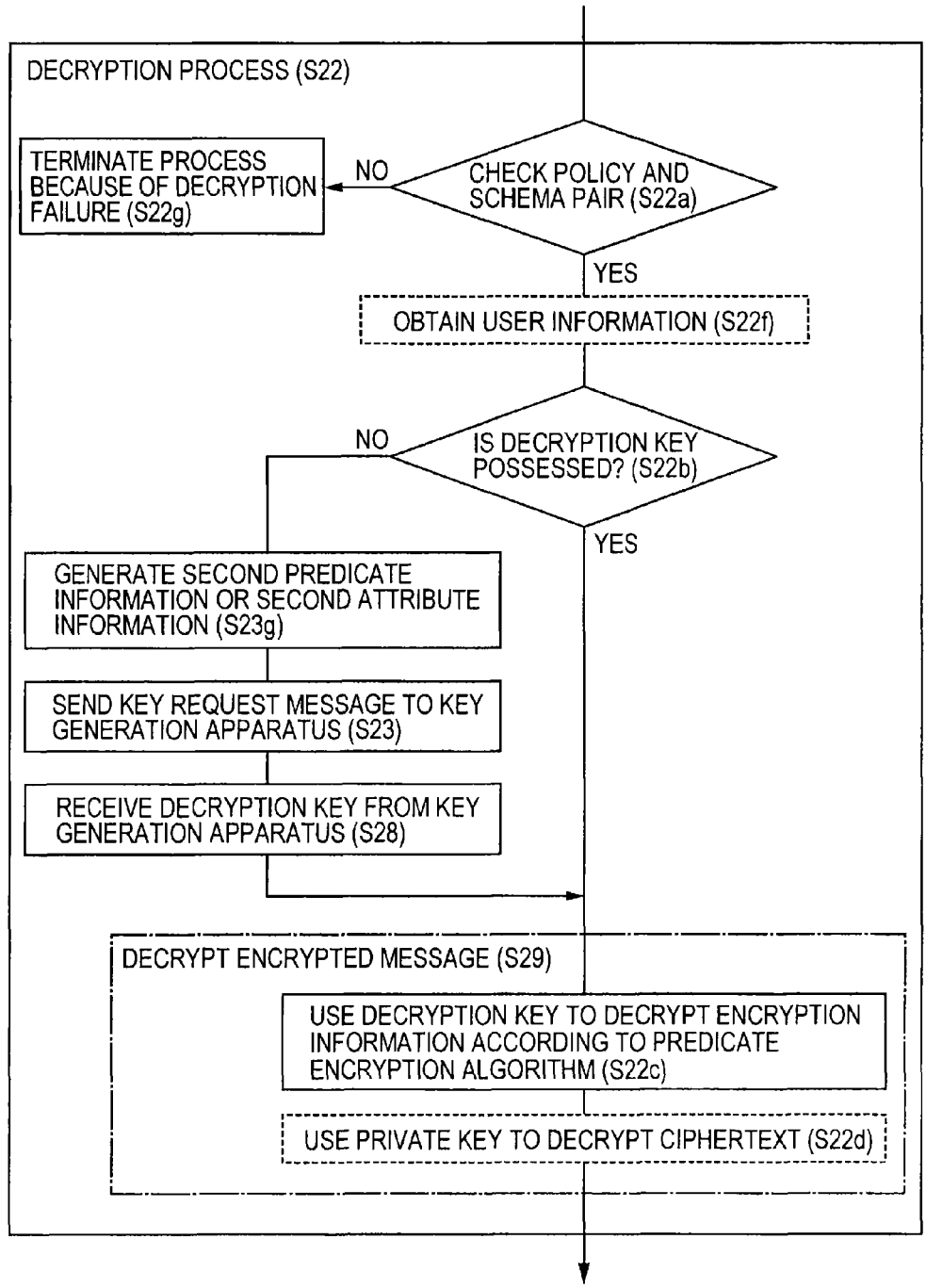
FIG. 19 is a view showing a detailed processing procedure of a decryption process according to the second embodiment of the first aspect.
Figure 20:
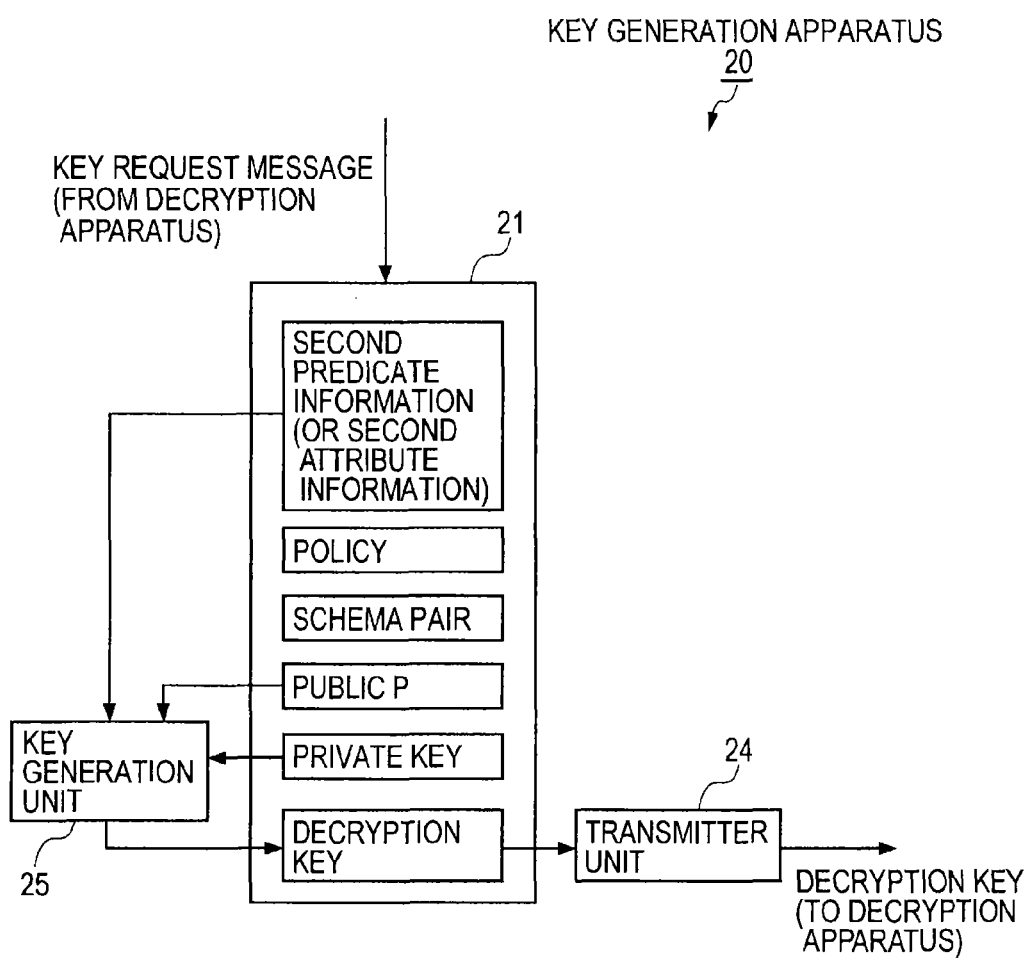
FIG. 20 is a functional block diagram of a key generation apparatus according to the second embodiment of the first aspect.
Figure 21:
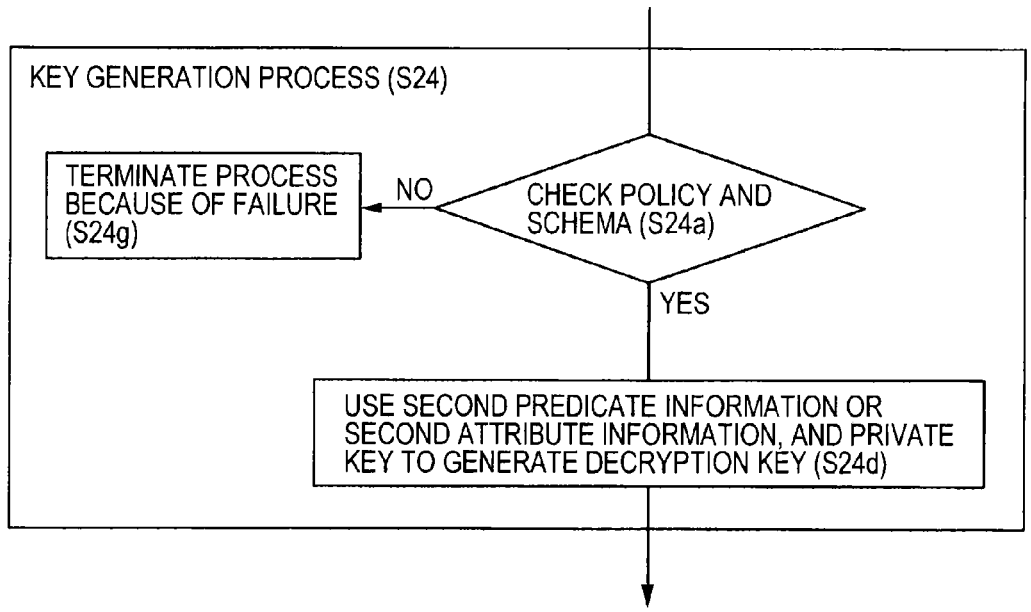
FIG. 21 is a view showing a detailed processing procedure of a key generation process according to the second embodiment of the first aspect.
Figure 22:
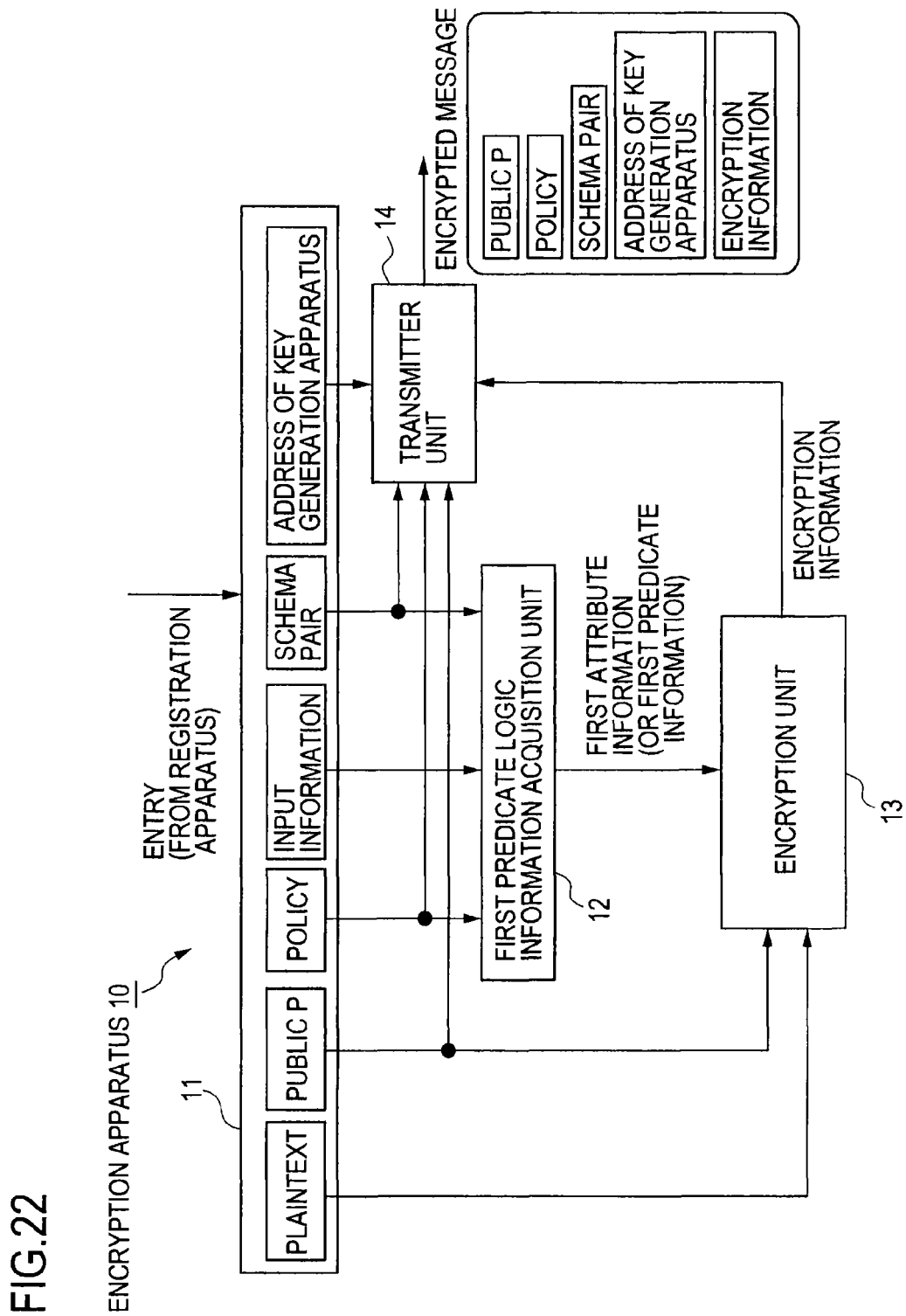
FIG. 22 is a functional block diagram of an encryption apparatus according to a third embodiment of the first aspect.
Figure 23:
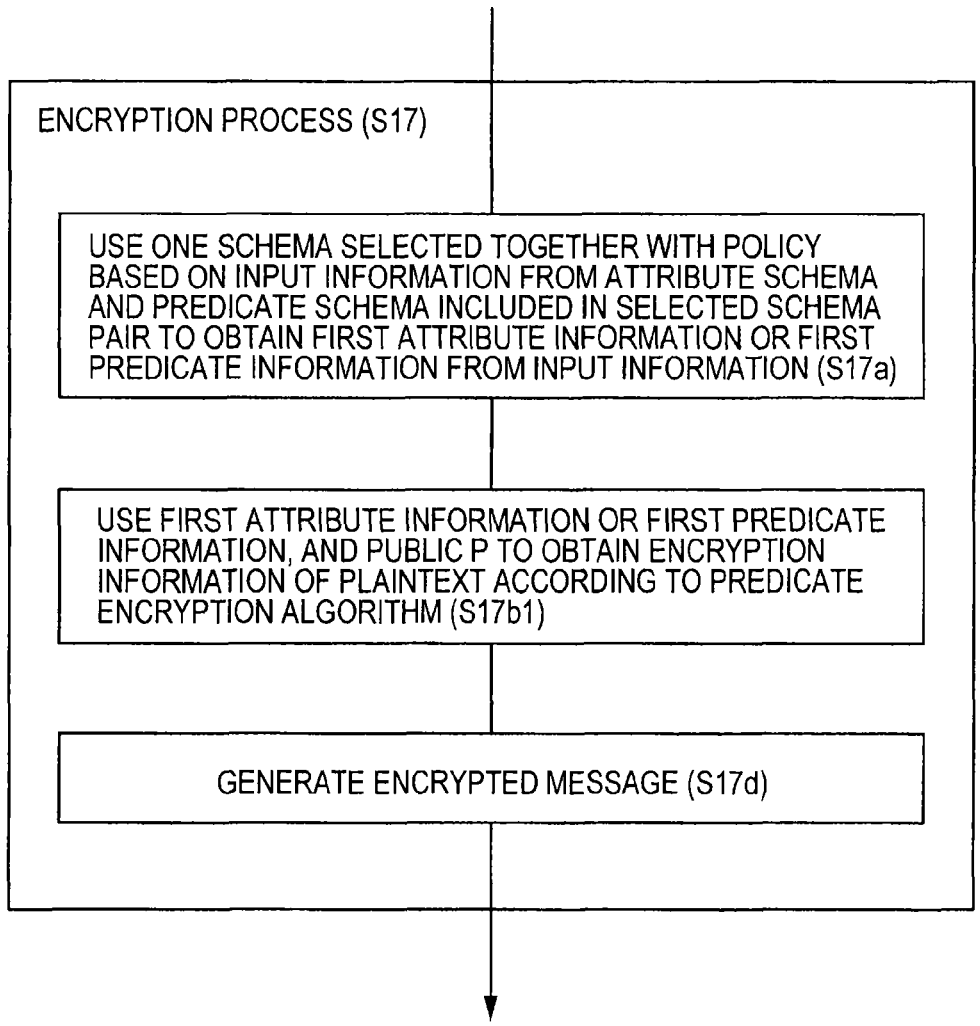
FIG. 23 is a view showing a detailed processing procedure of an encryption process according to the third embodiment of the first aspect.
Figure 24:
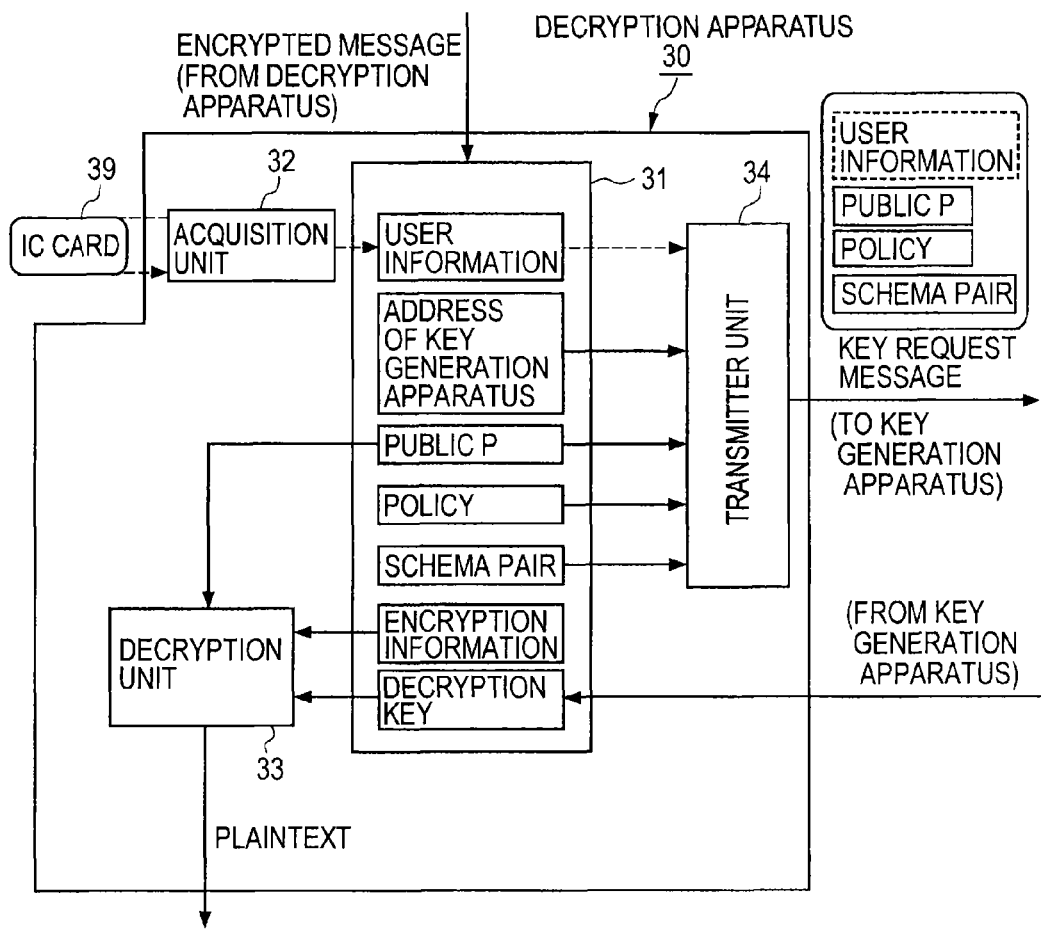
FIG. 24 is a functional block diagram of a decryption apparatus according to the third embodiment of the first aspect.
Figure 25:
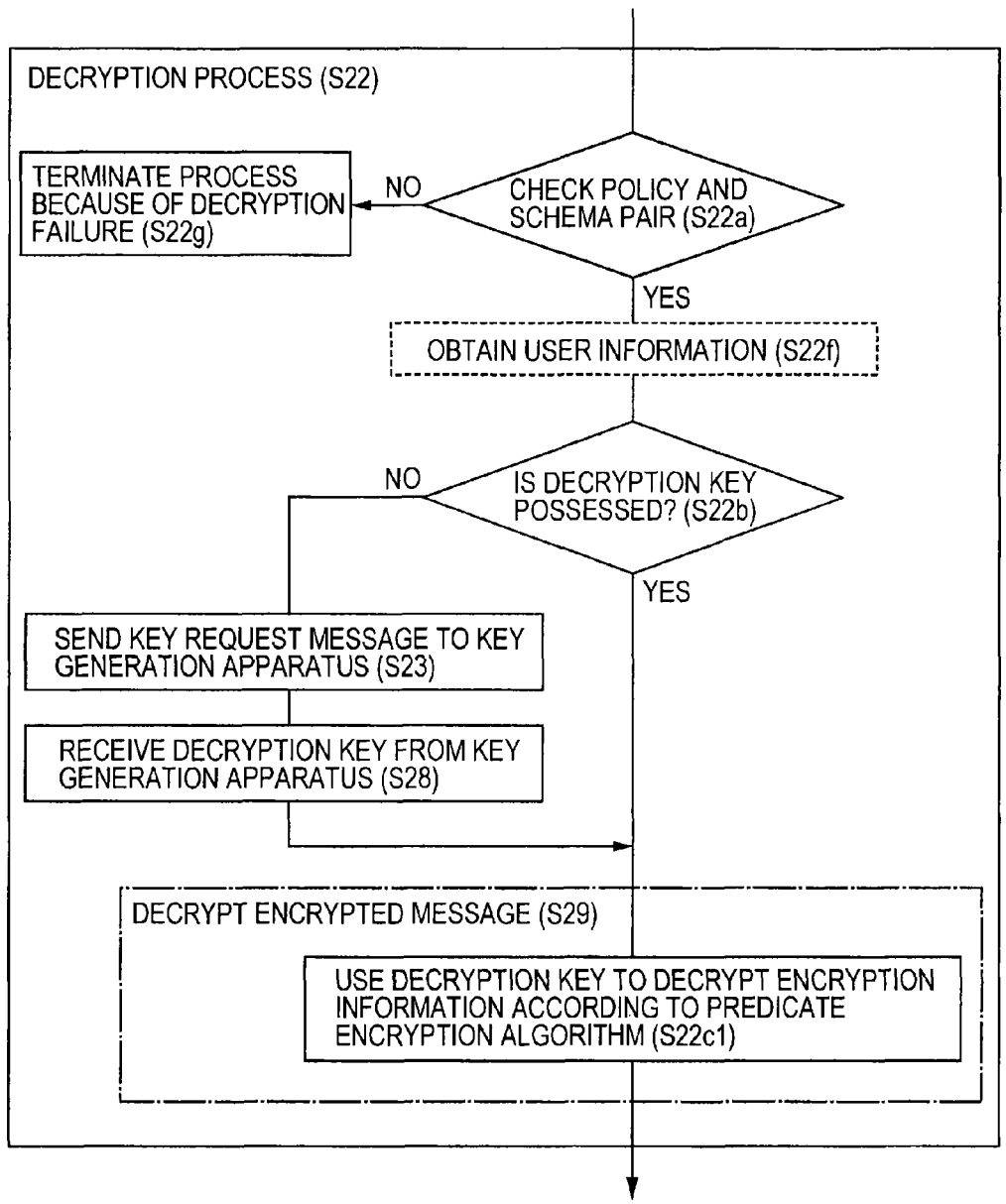
FIG. 25 is a view showing a detailed processing procedure of a decryption process according to the third embodiment of the first aspect.

When the example attribute schema shown in FIG. 12 is applied to the example attribute designation information (attribute value) of a user shown in FIG. 12, example attribute information (vector information) shown in FIG. 12 is obtained. This attribute information can be regarded as a vector by arranging the outputs of the type conversion functions by using the element numbers of the attribute schema as the element numbers of the vector.

In general, according to the functional encryption, a plurality of pieces of attribute information can be designated at the time of encryption. For example, an attribute schema is applied to a plurality of pieces of attribute designation information, whereby a plurality of pieces of attribute information can be obtained. Alternatively, a plurality of attribute schemas may be applied to one piece of attribute designation information, whereby a plurality of pieces of attribute information may be obtained.

In the above description, the outputs of the type conversion functions are integers and the output values of the hash function. In reality, the outputs of the type conversion functions depend on the predicate encryption algorithm and are, for example, elements of the finite field $F_q$.

An example of the predicate schema shown in FIG. 13 will be described below. As predicate designation information, logic expressions that specify conditions for attributes are given. In the example shown in FIG. 13, the predicate designation information of 'name=Taro Tanaka AND age=20 or more' which means the attribute value of an attribute name 'name' is 'Taro Tanaka' and the attribute value of an attribute name 'age' is '20 or more" is given.

The predicate schema prescribes a conversion rule in which an element number is associated with an attribute name and a type conversion function. In the example shown in FIG. 13, an element number '1' is associated with an attribute name 'blood type' and a type conversion function, for example. The type conversion function corresponding to the element number '1' converts the attribute value to 0 when the attribute value of the blood type is 'O', to 1 when the attribute value of the blood type is 'A', to 2 when the attribute value of the blood type is 'B', and to 3 when the attribute value of the blood type is 'AB'. Element numbers '2' and '3' are associated with an attribute name 'date of birth' and type conversion functions. The type conversion functions corresponding to the element numbers '2' and '3' convert the year of the attribute value of the date of birth to the value of a hash function having the year as the input for the element number '2' and the month and day of the attribute value of the date of birth to the value of the hash function having the month and day as the input for the element number '3'.

When the example predicate schema shown in FIG. 13 is applied to the example predicate designation information shown in FIG. 13, example predicate information (vector information) shown in FIG. 13 is obtained. Specifically, in this example, the predicate schema is applied to the predicate designation information to obtain a multivariate polynomial f having variables corresponding to the element numbers, and the multivariate polynomial f is converted to vector information to obtain predicate information (vector information). This process will be described below by using the example predicate designation information shown in FIG. 13. When the predicate schema is applied to the predicate designation information of 'name=Taro Tanaka AND age=20 or more', the output value 'Hash (Taro Tanaka)' of the type conversion function corresponding to an element number '0' and the output value '1' of the type conversion function corresponding to an element number '23' are obtained. A polynomial with a degree of one with respect to a variable $X_0$ corresponding to the element number '0', which has the output value 'Hash(Taro Tanaka)' of the type conversion function corresponding to the element number '0' as a zero, and a polynomial with a degree of one with respect to a variable $X_{23}$ corresponding to the element number '23', which has the output value '1' of the type conversion function corresponding to the element number '23' as a zero, are linearly combined to obtain a multivariate polynomial $f=r_1(X_0-H(\text{Taro Tanaka}))+r_2(X_{23}-1)$, where $r_1$ and $r_2$ are random numbers. Then, this multivariate polynomial f is expanded and the coefficients of the terms are arranged to convert the multivariate polynomial f to vector information. The example of the predicate information (vector information) shown in FIG. 13 is thus obtained.

In general, according to the functional encryption, a plurality of pieces of predicate information can be designated at the time of encryption. For example, a predicate schema is applied to a plurality of pieces of predicate designation information, whereby a plurality of pieces of predicate information can be obtained. Alternatively, a plurality of predicate schemas may be applied to one piece of predicate designation information, whereby a plurality of pieces of predicate information may be obtained.

In the above description, the outputs of the type conversion functions are integers or the output values of the hash function. In reality, the outputs of the type conversion functions depend on the predicate encryption algorithm and are, for example, elements of the finite field $F_q$.

Both schemas constituting a schema pair need to have the same combinations of attribute names and type conversion functions, the same data types of attribute values to be input, and the like.

The policy list will be described next with reference to FIG. 14. Information that identifies either the attribute schema or the predicate schema is called policy information (hereafter called just policy). A data list in which the policy is written is called a policy list. When the key generation apparatus 20 uses both the attribute schema and the predicate schema, two types of policies are prepared: Cipher_Text_Policy and Key_Policy. When the key generation apparatus 20 uses only the attribute schema, just one type of policy is prepared: Key_Policy. When the key generation apparatus 20 uses only the predicate schema, just one type of policy is prepared: Cipher_Text_Policy. The policy is written, for example, with XML (the eXtensible Markup Language) or ASN.1 (the Abstract Notation Number One). The key generation apparatus 20 can freely determine the policy target: only the attribute schema, only the predicate schema, or both the attribute schema and the predicate schema.

In general, according to the functional encryption, as described above, the plurality of different attribute schemas are applied to one piece of attribute designation information, whereby the plurality of pieces of attribute information can be obtained. In such a case, the plurality of attribute schemas are designated in advance as the policy. The plurality of different predicate schemas are applied to one piece of predicate designation information, whereby the plurality of pieces of predicate information can be obtained. In such a case, the plurality of predicate schemas are designated in advance as the policy.

After the process of step S1, a transmitter unit of the key generation apparatus 20 sends the entry to the authentication apparatus 90, and a receiver unit of the authentication apparatus 90 receives the entry (step S2). A signature assigning unit (not shown) of the authentication apparatus 90 assigns an electronic signature to the entry with, for example, a conventional method (step S3), a transmitter unit of the authentication apparatus 90 sends the entry with the signature to the key generation apparatus 20, and a receiver unit of the key generation apparatus 20 receives the entry with the signature (step S4). Then, the transmitter unit of the key generation apparatus 20 sends the entry with the signature to the maintenance apparatus 80, and a receiver unit of the maintenance apparatus 80 receives the entry with the signature (step S5).

A transmitter unit of the maintenance apparatus 80 sends a search query, which includes information (such as address) identifying the key generation apparatus 20, to the registration apparatus 50, and a receiver unit of the registration apparatus 50 receives the search query (step S6). A searching unit (not shown) of the registration apparatus 50 searches for the registered content (entry) concerning the key generation apparatus 20 (step S7), a transmitter unit of the registration apparatus 50 sends a search result, which includes whether registration has been made and the registered content, to the maintenance apparatus 80, and the receiver unit of the maintenance apparatus 80 receives the search result (step S8).

A checking unit (not shown) of the maintenance apparatus 80 compares the entry with the signature received in the process of step S5 with the search result received in the process of step S8 to check if the entry has already been registered (step S9). If it is determined that the entry has not yet been registered, the transmitter unit of the maintenance apparatus 80 sends the entry with the signature to the registration apparatus 50, and the receiver unit of the registration apparatus 50 receives the entry with the signature (step S10). A registration unit (not shown) of the registration apparatus 50 stores the entry with the signature in a storage unit of the registration apparatus 50 in association with the key generation apparatus 20 (step S11). The transmitter unit of the registration apparatus 50 sends the registration result to the maintenance apparatus 80, and the receiver unit of the maintenance apparatus 80 receives the registration result (step S12). The transmitter unit of the maintenance apparatus 80 sends the registration result to the key generation apparatus 20, and the key generation apparatus 20 receives the registration result (step S13).

When a plurality of key generation apparatuses 20 are provided, each of the plurality of key generation apparatuses 20 separately performs the processes of step S1 to step S13. For example, each key generation apparatus specifies a public parameter and a private key. However, this does not prevent each key generation apparatus from having a common public parameter and a common private key. The key generation apparatuses may register their entries in the same registration apparatus 50 or in different registration apparatuses 50.

When the private key and the entry are specified in advance and the entry is registered in the registration apparatus 50 in advance, the processes from step S1 to step S13 may be omitted.

The authentication apparatus 90 and the maintenance apparatus 80 may be the same hardware entity. The cryptographic system 1 may have a system structure having no maintenance apparatus 80, no authentication apparatus 90, or no maintenance apparatus 80 and no authentication apparatus 90 when authentication is not required for registering an entry or when it is guaranteed unity of the entry is registered in the registration apparatus 50.

The description of <<the preparation process>> ends here.

<<Encryption Process>>

Under the control of a controller unit, not shown, a transmitter unit 14 of the encryption apparatus 10 sends a search query to the registration apparatus 50, and the receiving unit of the registration apparatus 50 receives the search query (step S14). The searching unit of the registration apparatus 50 searches some or all of the entries registered in the storage unit of the registration apparatus 50 and chooses any one entry (step S15). The transmitter unit of the registration apparatus 50 sends the entry to the encryption apparatus 10, and a receiver unit of the encryption apparatus 10 receives the entry (step S16). This entry includes the address of the key generation apparatus, the public parameter of the key generation apparatus, the policy list that can be used by the key generation apparatus, and the schema list that can be used by the key generation apparatus. The received entry is stored in a memory 11 of the encryption apparatus 10.

When the encryption apparatus 10 has the public parameter, schema list, policy list, and address of each key generation apparatus 20 in advance, the processes of steps S14 to S16 are omitted. It should be noted that the cryptographic system 1 may have no registration apparatus 50.

A first predicate logic information acquisition unit 12 of the encryption apparatus 10 reads the input information, the policy, and the schemas from the memory 11 and obtains attribute information (hereafter called first attribute information) and predicate information (hereafter called first predicate information) (step S17a). Details of this process will be described below with reference to FIGS. 12 and 13.

When the schema list has a plurality of schema pairs, one schema pair is selected based on the usage or the like. The user of the encryption apparatus 10 may select a schema pair and input designation information thereof. Alternatively, the first predicate logic information acquisition unit 12 may select a schema pair according to a predetermined rule.

According to whether the input information is attribute designation information or predicate designation information, one of the schemas is selected together with the policy. The user of the encryption apparatus 10 may select the policy and one of the schemas and input designation information thereof. Alternatively, the first predicate logic information acquisition unit 12 may select the policy and one of the schemas according to a predetermined rule. When only one type of policy is prepared in the key generation apparatus 20, one schema of the schema pair is selected according to the policy. If the selected schema does not correspond to the type of the input information, a schema pair needs to be selected again from the schema list or an entry needs to be provided by the registration apparatus 50 again.

The input information may be information inputted by the user of the encryption apparatus 10 or information acquired by an acquisition unit (not shown) of the encryption apparatus 10 from a storage medium such as an IC card 39.

Then, the first predicate logic information acquisition unit 12 uses the schema selected from the schema pair according to the policy to obtain the first attribute information or the first predicate information from the input information. When the policy is Key_Policy and the selected schema is an attribute schema, the first attribute information is obtained. When the policy is Cipher_Text_Policy and the selected schema is a predicate schema, the first predicate information is obtained. The first attribute information and the first predicate information are one or a plurality of vector information having elements of the finite field $F_q$ as components in the first embodiment according to the first aspect (see FIGS. 11 to 13). The schema is used to extract or arrange necessary attribute values from the input information.

Next, an encryption unit 13 of the encryption apparatus 10 uses the first attribute information $v=(v_1, \ldots, v_n)$ or the first predicate information $w=(w_1, \ldots, w_n)$, an orthogonal basis B (substantial public key) included in the public parameter read from the memory 11, and plaintext M to obtain a common key K, encryption information $C_1$, and ciphertext $C_2$ (steps S17b and S17c). Details of these processes will be described below. When the first embodiment of the first aspect is dedicated to the delivery of the common key K, it is not necessary to generate the ciphertext $C_2$.

A first encryption unit 13a generates random numbers r and ρ which are elements of the finite field Fq according to the predicate encryption algorithm, specifies the common key K as shown by Expression (7), and obtains the encryption information $C_1$ according to Expression (8) (step S17b), where H indicates, for example, a hash function. In this example, the first attribute information v is used. To use the first predicate information, v needs to be replaced with w in Expression (8). In this example, the encryption information $C_1$ corresponds to ρ used to generate the common key K. The encryption information $C_1$ may correspond to the common key K.

$$K = H(g_T^\rho) \quad (7)$$

$$C_1 = r\sum_{i=1}^{n} v_i b_i + \rho b_{n+1} \quad (8)$$

Next, the second encryption unit 13b uses the common key K and the plaintext M to obtain the ciphertext $C_2$ according to Expression (9) (step S17c). An encryption method $Enc_k$ that uses the private key can be a known method. For example, it may be the method disclosed in Non-patent literature 1. As described earlier, when the first embodiment of the first aspect is dedicated to the delivery of the common key K, the process of step S17c is omitted. In other words, the encryption apparatus 10 has even the function of the second encryption unit 13b but does not perform the process of step S17c.

$$C_2 = Enc_K(M) \quad (9)$$

Next, under the control of the controller unit, the transmitter unit 14 of the encryption apparatus 10 generates an encrypted message that includes the encryption information $C_1$ and the ciphertext $C_2$ (if necessary), together with the schema pair, the policy, the public parameter, and the address of the key generation apparatus read from the memory 11 (step S17d). The transmitter unit 14 of the encryption apparatus 10 then sends the encrypted message to the decryption apparatus 30, and a receiver unit of the decryption apparatus 30 receives the encrypted message (step S18).

The description of <<the encryption process>> ends here.

<<Decryption Process>>

Under the control of a controller unit, not shown, a transmitter unit 34 of the decryption apparatus 30 sends a search query that includes the address of the key generation apparatus, the address being included in the encrypted message, to the registration apparatus 50, and the receiving unit of the registration apparatus 50 receives the search query (step S19). The searching unit of the registration apparatus 50 searches for the entry of the key generation apparatus specified by the address and selects it (step S20). The transmitter unit of the registration apparatus 50 sends the entry of the search result to the decryption apparatus 30, and the receiver unit of the decryption apparatus 30 receives the entry (step S21). This entry includes the address of the key generation apparatus, the public parameter of the key generation apparatus, the policy list that can be used by the key generation apparatus, and the schema list that can be used by the key generation apparatus. The received entry is stored in a memory 31 of the decryption apparatus 30.

When the decryption apparatus 30 has the public parameter, schema list, policy list, and address of each key generation apparatus 20 in advance, the processes of steps S19 to S21 are omitted. In that case, the decryption apparatus 30 searches the memory 31 for the entry of the key generation apparatus corresponding to the address included in the encrypted message and retrieves it.

Under the control of the controller unit, a verification unit (not shown) of the decryption apparatus 30 verifies that the schema pair and the policy included in the encrypted message are included in the schema list and the policy list included in the entry obtained from the registration apparatus 50 (step S22a). If this verification fails, the process ends with a decryption processing failure (step S22g).

When the verification succeeds, an acquisition unit 32 of the decryption apparatus 30 reads the attribute designation information or the predicate designation information corresponding to the user of the decryption apparatus 30 from a storage medium such as the IC card 39 (step S22f). Whether the attribute designation information or the predicate designation information is read depends on the policy included in the encrypted message. More specifically, the read designation information corresponds to the content of the policy identifying one schema paired with the other schema identified by the policy included in the encrypted message. When the policy is Cipher_Text_Policy, the acquisition unit 32 reads the attribute designation information from the storage medium. When the policy is Key_Policy, the acquisition unit 32 reads the predicate designation information from the storage medium. The read designation information is hereafter called user information. The acquisition unit 32 of the decryption apparatus 30 may read from the management apparatus 40 the attribute designation information or the predicate designation information corresponding to the user of the decryption apparatus 30, in the same way as in <<a user information acquisition process>> in the key generation apparatus 20, described later. In the first embodiment of the first aspect, the process of step S22f may be omitted. When the decryption apparatus 30 has the attribute designation information and the predicate designation information corresponding to the user in advance, either the attribute designation information or the predicate designation information serves as user information, according to the policy.

Next, the verification unit of the decryption apparatus 30 verifies that the decryption apparatus 30 has the decryption key to be used to decrypt the encryption information included in the encryption message (step S22b).

The decryption apparatus 30 stores a decryption key table in the memory 31. In the decryption key table, as shown in FIG. 15, for example, the identifier of each key generation apparatus is associated with the public parameter, the schema pair, the decryption key target, the predicate designation information, and the decryption key. The verification unit verifies that the decryption apparatus 30 has the decryption key corresponding to the identifier of the key generation apparatus determined from the address included in the encrypted message, to the public parameter, to the schema pair, and to the decryption key target (corresponding to the content of the policy identifying one schema paired with the other schema identified by the policy included in the encrypted message). When the decryption apparatus 30 has the decryption key, the process of step S29 will be performed. If the decryption apparatus 30 does not have the decryption key, the process of step S23 will be performed.

The description of <<the decryption process>> is temporarily halted here and <<a key generation process>> will be described below, If the decryption apparatus 30 does not have the decryption key, the transmitter unit 34 of the decryption apparatus 30 generates, under the control of the controller unit, a key request message that includes the public parameter, the policy, the schema pair, the user information (if any), and the authentication information, all of these items being read from the memory 31. The authentication information includes, for example, the ID of the user and a password. The transmitter unit 34 of the decryption apparatus 30 sends the key request message to the key generation apparatus having the address read from the memory 31, and the receiver unit of the key generation apparatus 20 receives the key request message (step S23). The received key request message is stored in a memory 21 of the key generation apparatus 20.

Under the control of a controller unit, a verification unit (not shown) of the key generation apparatus 20 verifies that the schema pair and the policy included in the key request message are included in the schema list and the policy list included in the entry owned by the key generation apparatus 20 (for example, the entry generated in step S1) and that the public parameter included in the key request message is identical to the public parameter of the key generation apparatus 20 (step S24*a*). If this verification fails, the process ends with a key generation process failure (step S24*g*). When the authentication information is included in the key request message, the authentication information is also verified in the process of step S24*a*. The key generation apparatus 20 stores an authentication table in the memory 21. In the authentication table, as shown in FIG. 16, for example, each user ID is associated with a password. The verification unit verifies that the user ID and the password included in the key request message are identical to the user ID and the password included in the authentication table. If the verification fails, the process of step S24*g* is performed.

When this verification succeeds, the verification unit of the key generation apparatus 20 verifies that the key request message includes the user information (step S24*b*). When the key request message includes the user information, the process of step S24*c* will be performed. If the key request message does not include the user information, the process of step S25 will be performed. When a method is employed in which a key request message always includes user information, the process of step S24*b* and <<a user information acquisition process>>, described later, are unnecessary.

The description of <<the key generation process>> is temporarily halted here and <<the user information acquisition process>> will be described below.

The transmitter unit 24 of the key generation apparatus 20 sends a request that includes the policy and the authentication information (if any) included in the key request message to the management apparatus 40, and the management apparatus 40 receives the request (step S25). The received request is stored in a memory of the management apparatus 40.

The management apparatus 40 stores an authentication table in the memory. In the same way as in the authentication table described above, the user ID is associated with the password in this authentication table (see FIG. 16). A verification unit (not shown) of the management apparatus 40 verifies that the user ID and the password included in the request are identical to the user ID and the password included in the authentication table.

When this verification succeeds, a searching unit (not shown) of the management apparatus 40 searches a user information table stored in the memory for the attribute designation information or the predicate designation information according to the policy included in the request (step S26). The user information table includes, for example, a first table formed of each user ID, and an attribute name and attribute designation information associated with the user ID, and a second table formed of the user ID and predicate designation information associated with the user ID (see FIG. 17). Whether the attribute designation information or the predicate designation information is read is determined by the policy included in the request. More specifically, the read information corresponds to the content of one policy identifying the schema paired with the other schema identified by the policy included in the request. When the policy is Cipher_Text_Policy, the searching unit reads the attribute designation information corresponding to the user ID included in the request from the first table. When the policy is Key_Policy, the searching unit reads the predicate designation information corresponding to the user ID included in the request from the second table. The read designation information is hereafter called user information.

Under the control of a controller unit, a transmitter unit of the management apparatus 40 sends the user information to the key generation apparatus 20, and the receiver unit of the key generation apparatus 20 receives the user information (step S27). The received user information is stored in the memory 21 of the key generation apparatus 20.

The description of <<the user information acquisition process>> ends here, and the description of <<the key generation process>> will be resumed.

When the key generation apparatus 20 already has the user information or receives the user information through the user information acquisition process (step S27), a second predicate logic information acquisition unit 23 of the key generation apparatus 20 reads the policy, the schema pair, the public parameter, and the user information from the memory 21, and obtains attribute information (hereafter called second attribute information) or predicate information (second predicate information) from the user information (step S24*c*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17*a* is used in this process. In the first embodiment of the first aspect, the second attribute information and the second predicate information are one or a plurality of vector information having elements of the finite field $F_q$ as components (see FIGS. 11 to 13).

The schema is used to extract and arrange necessary attribute values from the input information.

Next, a key generation unit 25 of the key generation apparatus 20 generates a random number α that is an element of the finite field $F_q$, based on the public parameter q according to the predicate encryption algorithm, and uses the random number α, the second attribute information $v_{(p)}=(V_{(p)1}, \ldots, V_{(p)n})$ or the second predicate information $w_{(p)}=(w_{(p)1}, \ldots, w_{(p)n})$ read from the memory 21, and a private key B* of the key generation apparatus to obtain a decryption key R according to Expression (10) (step S24*d*). The second predicate information $w_{(p)}$ is used in this example because the input information used in the encryption process is the attribute designation information. When the input information is the predicate designation information, the second attribute information $v_{(p)}$ is used. Therefore, $w_{(p)}$ needs to be replaced with $v_{(p)}$ in Expression (10).

$$R = \alpha \sum_{i=1}^{n} w_{(p)i} b_i^* + b_{n+1}^* \qquad (10)$$

Next, under the control of the controller unit, the transmitter unit 24 of the key generation apparatus 20 sends the decryption key R to the decryption apparatus 30, and the receiver unit of the decryption apparatus 30 receives the decryption key R (step S28). The received decryption key R is stored in the memory 31 of the decryption apparatus 30.

The description of <<the key generation process>> ends here, and the description of <<the decryption process>> will be resumed.

When the decryption apparatus 30 already has the decryption key or receives the decryption key through the key generation process (step S28), a decryption unit 33 of the decryption apparatus 30 reads the public parameter, the decryption key R, the encryption information $C_1$, and the ciphertext $C_2$ (if necessary) from the memory 31, and obtains the common key K and the plaintext M (if necessary) (step S29).

Details of the process in step S29 will be described below. A first decryption unit 33*a* reads the public parameter, the decryption key R, and the encryption information $C_1$ from the memory 31, and obtains $e(C_1, R)$ according to the predicate encryption algorithm. As shown in Expression (11), the calculation result depends on the result of the canonical inner product of the first attribute information v and the second predicate information $w_{(p)}$ taken out from the encryption information $C_1$ and the decryption key R according to bilinearity when the input information is the attribute designation information. When the input information is the predicate designation information, v needs to be replaced with $v_{(p)}$ and $w_{(p)}$ needs to be replaced with w in Expression (11). The calculation result depends on the result of the canonical inner product of the first predicate information w and the second attribute information $v_{(p)}$ taken out from the encryption information $C_1$ and the decryption key R according to bilinearity. In Expression (11), $e(b_i, b_i^*)$ is defined as shown in Expression (12), where $\delta_{ij}$ is the Kronecker's delta symbol.

$$e(C_1, R) = e\left(r \sum_{i=1}^{n} v_i b_i, R\right) \cdot e(\rho b_{n+1}, R) \qquad (11)$$
$$= \prod_{i=1}^{n} e(b_i, b_i^*)^{r \alpha v_i w_{(p)i}} \cdot e(b_{n+1}, b_{n+1}^*)^{\rho}$$
$$= g_T^{r\alpha \sum_{i=1}^{n} v_i w_{(p)i}} \cdot g_T^{\rho}$$
$$= g_T^{r\alpha v \cdot w_{(p)}} \cdot g_T^{\rho}$$

$$e(b_i, b_j^*) = \prod_{j=1}^{n+1} e\left(g_1^{\chi_{ij}}, g_2^{\chi_{ij}^*}\right) \qquad (12)$$
$$= g_T^{\sum_{j=1}^{n+1} \chi_{ij} \chi_{ij}^*}$$
$$= g_T^{x_i \cdot T_{x_j}^*}$$
$$= g_T^{\delta_{ij}}$$

Therefore, when the canonical inner product of the first attribute information v and the second predicate information $w_{(p)}$ is zero (or when the canonical inner product of the first predicate information w and the second attribute information $v_{(p)}$ is zero), the result of calculation in Expression (11), $g_T^{\rho}$, is obtained. When the result of calculation, $g_T^{\rho}$, is obtained, the first decryption unit 33*a* of the decryption apparatus 30 obtains the common key K, which is correct, according to Expression (7) (step S22*c*). When the canonical inner product of the first attribute information v and the second predicate information $w_{(p)}$ is not zero (or when the canonical inner product of the first predicate information w and the second attribute information $v_{(p)}$ is not zero), the first decryption unit 33*a* obtains an incorrect value according to Expression (7). In this example, it is assumed that the hash function H is common to the system or is included in the public parameter. The encryption information $C_1$ corresponds to the information ρ used to generate the common key K in this example. When encryption information $C_1$ corresponds to the common key K, the result of calculation in Expression (11) is the common key K (or incorrect value). In other words, an authorized user of the decryption apparatus 30 has predicate designation information that gives the second predicate information $w_{(p)}$ which makes the canonical inner product with the first attribute information v zero, or attribute designation information that gives the second attribute information $v_{(p)}$ which makes the canonical inner product with the first predicate information w zero.

Then, a second decryption unit 33*b* uses the common key K and the ciphertext $C_2$ to calculate plaintext M according to Expression (13) (step S22*d*). A decryption method $Dec_K$ that uses the private key corresponds to the encryption method $Enc_K$. As described earlier, when the first embodiment of the first aspect is dedicated to the delivery of the common key K, the process of step S22*d* is omitted. More specifically, even if the decryption apparatus 30 has the function of the second decryption unit 33*b*, it does not perform the process of step S22*d*.

$$M = Dec_K(C_2) \qquad (13)$$

If the result of calculation in Expression (11) is an incorrect value, the correct plaintext M cannot be obtained by Expression (13).

The decryption apparatus 30 may store the decryption key R in the decryption key table. In addition, the decryption apparatus 30 may store the common key K in the decryption key table.

The description of <<the decryption process>> ends here.

(Second Embodiment According to First Aspect)

A second embodiment of the first aspect differs from the first embodiment of the first aspect in that the decryption apparatus 30 generates the second attribute information or the second predicate information. Because of this difference, the second embodiment of the first aspect differs in several points from the first embodiment of the first aspect. A description of commonalities between the first and second embodiments of the first aspect is omitted (the same reference numerals are assigned to the same components), and a description of the differences from the first embodiment of the first aspect will be made with reference to FIGS. 18 to 21.

The processes of steps S1 to S22*b* are the same as those in the first embodiment of the first aspect.

When the decryption key is not possessed in the process of step S22*b*, a second predicate logic information acquisition unit 35 of the decryption apparatus 30 reads the policy, the schema pair, the public parameter, and the user information from the memory 31 and obtains attribute information (called second attribute information) or predicate information (called second predicate information) from the user information (step S23*g*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the second embodiment of the first aspect, the second attribute information and the second predicate information are one or a plurality of vector information having elements of the finite field $F_q$ as components (see FIGS. 11 to 13).

After the process of step S23g, the process of step 23 is performed. In this process, the transmitter unit 34 of the decryption apparatus 30 generates a key request message that includes the public parameter, the policy, the schema pair, and the authentication information read from the memory 31, and the second attribute information or the second predicate information, under the control of the controller unit. The transmitter unit 34 of the decryption apparatus 30 sends the key request message to the key generation apparatus having the address read from the memory 31, and the receiver unit of the key generation apparatus 20 receives the key request message.

When the verification succeeds in the process of step S24a, the process of step S24d is performed. Since the key generation apparatus 20 has received the second attribute information or the second predicate information from the decryption apparatus 30, the function and the process for generating the information are unnecessary, unlike in the first embodiment of the first aspect.

The processes of steps S28 and S29, to be performed after the process of step S24d, are the same as those in the first embodiment of the first aspect.

(Third Embodiment According to First Aspect)

A third embodiment of the first aspect differs from the first embodiment of the first aspect in that the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$. In other words, the predicate encryption algorithm disclosed in Non-patent literature 2, for example, is used in the third embodiment of the first aspect. Because of this difference, the third embodiment of the first aspect differs in several points from the first embodiment of the first aspect. A description of commonalities between the first and third embodiments of the first aspect is omitted (the same reference numerals are assigned to the same components), and a description of the differences from the first embodiment of the first aspect will be made with reference to FIGS. 22 to 25.

The processes of steps S1 to S17a are the same as those in the first embodiment of the first aspect. The public parameter and some other information are required by the predicate encryption algorithm of the third embodiment of the first aspect. For specific information required, see Non-patent literature 2, described above, for example.

In the process of step S17b1, following the process of step S17a, the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$ according to the predicate encryption algorithm (step S17b1).

After the process of step S17b1, the process of step 17d is performed. In this process, the transmitter unit 14 of the encryption apparatus 10 generates an encrypted message that includes the encryption information $C_1$, and the schema pair, the policy, the public parameter, and the address of the key generation apparatus read from the memory 31, under the control of the controller unit (step S17d).

The processes of steps S18 to S28, following the process of step S17d, are the same as those in the first embodiment of the first aspect.

In the process of step S22c1, following the process of step S28, the decryption unit 33 of the decryption apparatus 30 reads the public parameter, the decryption key R, and the encryption information $C_1$ from the memory 31 to calculate plaintext M according to the predicate encryption algorithm (step S22c1).

(Fourth Embodiment According to First Aspect)

Figure 26:
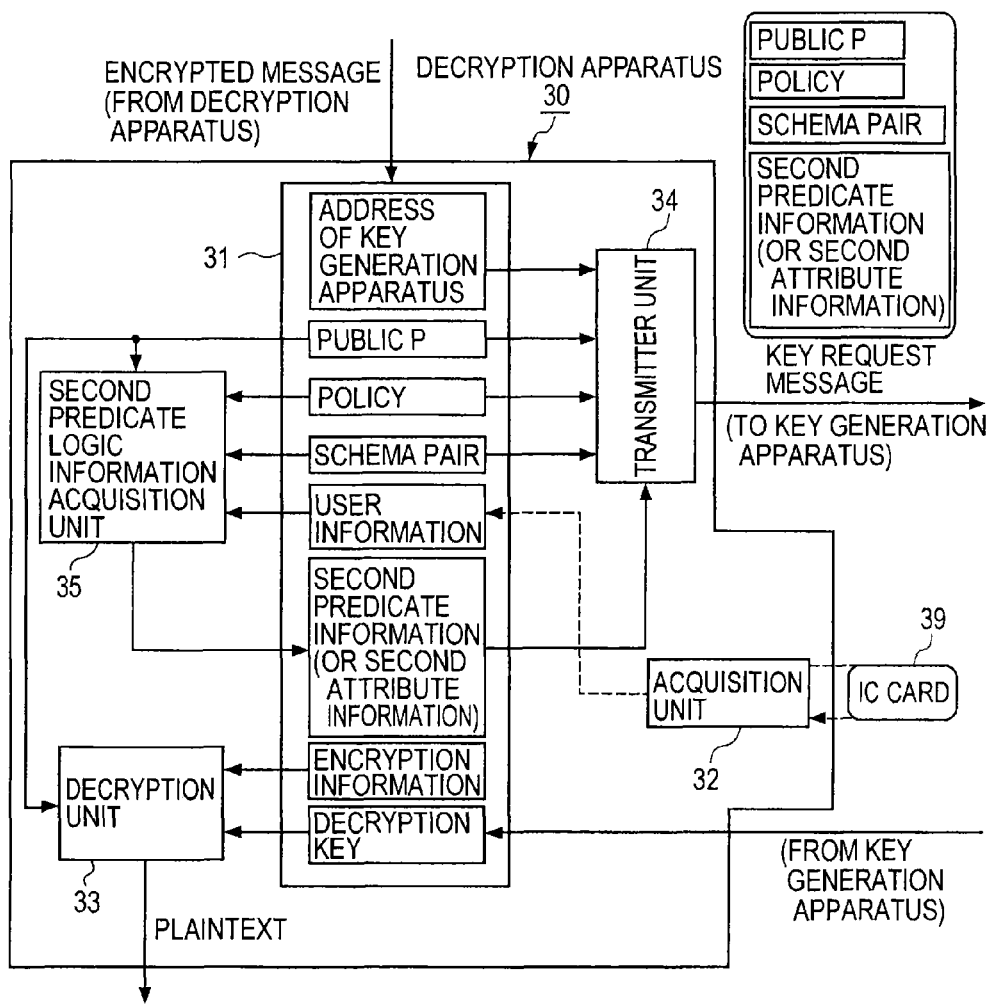
FIG. 26 is a functional block diagram of a decryption apparatus according to a fourth embodiment of the first aspect.
Figure 27:
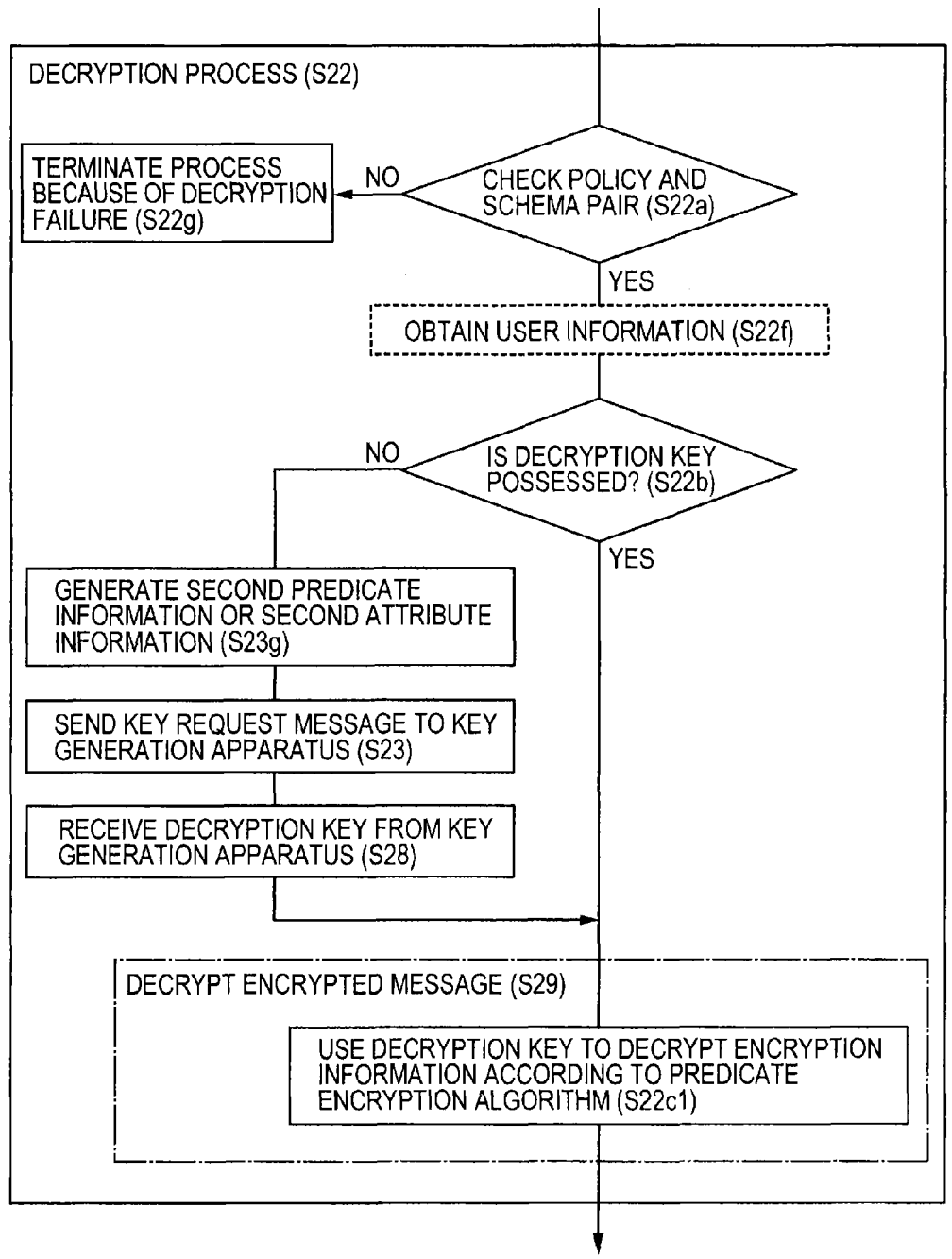
FIG. 27 is a view showing a detailed processing procedure of a decryption process according to the fourth embodiment of the first aspect.

A fourth embodiment of the first aspect corresponds to a combination of the second embodiment of the first aspect and the third embodiment of the first aspect. The fourth embodiment of the first aspect differs from the first embodiment of the first aspect in that (1) the decryption apparatus 30 generates the second attribute information or the second predicate information, and (2) the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$. Because of these differences, the fourth embodiment of the first aspect differs in several points from the first embodiment of the first aspect. A description of commonalities between the first and fourth embodiments of the first aspect is omitted (the same reference numerals are assigned to the same components), and a description of the differences from the first embodiment of the first aspect will be made with reference to FIGS. 26 and 27.

The processes of steps S1 to S17a are the same as those in the first embodiment of the first aspect. The public parameter and some other information are required by the predicate encryption algorithm of the fourth embodiment of the first aspect. For specific information required, see Non-patent literature 2, described above, for example.

In the process of step S17b1, following the process of step S17a, the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$ according to the predicate encryption algorithm (step S17b1).

After the process of step S17b1, the process of step 17d is performed. In this process, the transmitter unit 14 of the encryption apparatus 10 generates an encrypted message that includes the encryption information $C_1$, and the schema pair, the policy, the public parameter, and the address of the key generation apparatus read from the memory 31, under the control of the controller unit (step S17d).

The processes of steps S18 to S22b, following the process of step S17d, are the same as those in the first embodiment of the first aspect.

When the decryption key is not possessed in the process of step S22b, the second predicate logic information acquisition unit 35 of the decryption apparatus 30 reads the policy, the schema pair, the public parameter, and the user information from the memory 31 and obtains attribute information (called second attribute information) or predicate information (called second predicate information) from the user information (step S23g). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the fourth embodiment of the first aspect, the second attribute information and the second predicate information are one or a plurality of vector information having elements of the finite field $F_q$ as components (see FIGS. 11 to 13).

After the process of step S23g, the process of step 23 is performed. In this process, the transmitter unit 34 of the decryption apparatus 30 generates a key request message that includes the public parameter, the policy, the schema pair, and the authentication information read from the memory 31, and the second attribute information or the second predicate information, under the control of the controller unit. The transmitter unit 34 of the decryption apparatus 30 sends the key request message to the key generation apparatus having the address read from the memory 31, and the receiver unit of the key generation apparatus 20 receives the key request message.

When the verification succeeds in the process of step S24a, the process of step S24d is performed. Since the key generation apparatus 20 has received the second attribute information or the second predicate information from the decryption apparatus 30, the function and the process for generating the information are unnecessary.

The process of step S28, following the process of step S24d, is the same as that in the first embodiment of the first aspect.

In the process of step S22c1, following the process of step S28, the decryption unit 33 of the decryption apparatus 30 reads the public parameter, the decryption key R, and the encryption information $C_1$ from the memory 31 to calculate plaintext M according to the predicate encryption algorithm (step S22c1).

Embodiments according to a second aspect of the present invention, which relate to a cryptographic communication technology that can operate flexibly, that is based on predicate encryption, and that allows encryption information encrypted with the predicate encryption to be distributed will be described next while attention is being paid to the cryptographic communication technology of the first aspect, described above. Since a decryption apparatus has a transfer function in the cryptographic communication technology of the second aspect, encryption information encrypted with the predicate encryption can be distributed.

The description of the cryptographic communication technology of the second aspect and the description of the cryptographic communication technology of the first aspect have many substantial commonalities, but, to avoid referring to the description of the cryptographic communication technology of the first aspect, the cryptographic communication technology of the second aspect will be described below with overlapping explanations and figures being included as much as possible. Therefore, in both descriptions, identical expression numbers, identical reference numerals assigned to function blocks, and identical reference numerals assigned to steps are used. Because the contexts are different, there should be no risk of confusion.

(First Embodiment According to Second Aspect)

A first embodiment according to the second aspect of the present invention will be described below with reference to FIG. 28 to FIG. 41.

Figure 28:
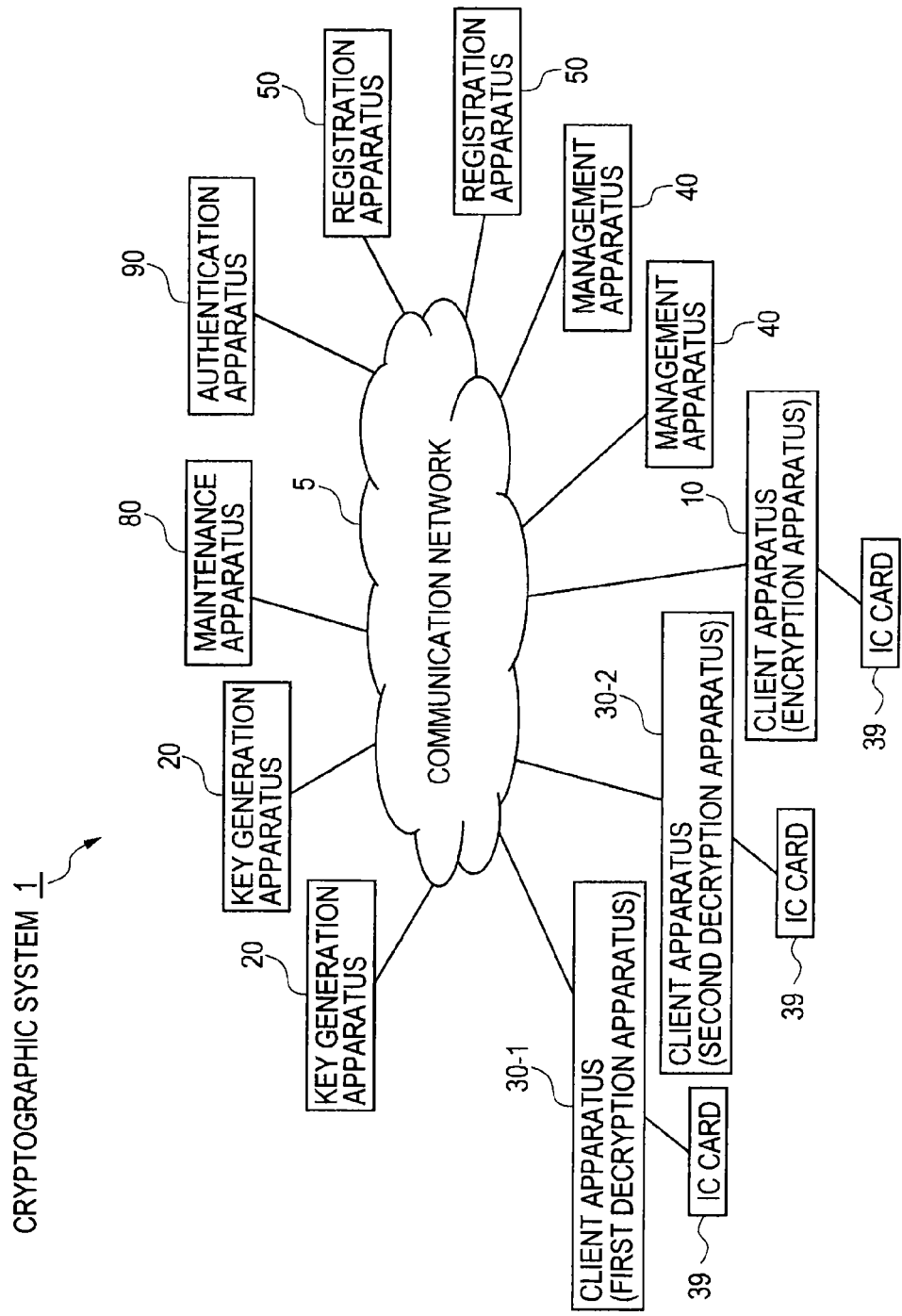
FIG. 28 is a structural view of a cryptographic system according to each embodiment in a second aspect of the present invention.
Figure 29:
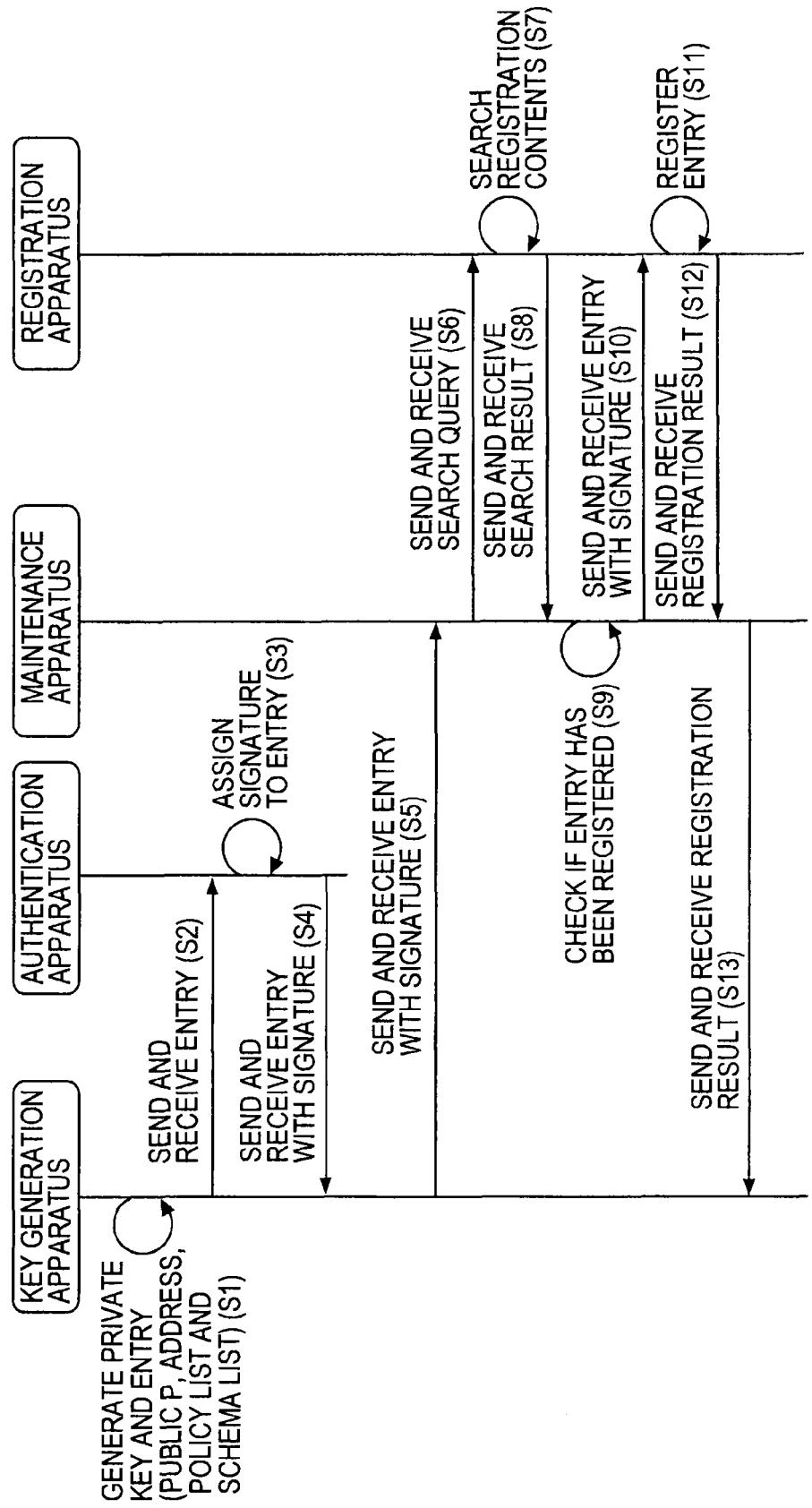
FIG. 29 is a view (No. 1) showing a processing procedure of a cryptographic communication method according to each embodiment in the second aspect.
Figure 30:
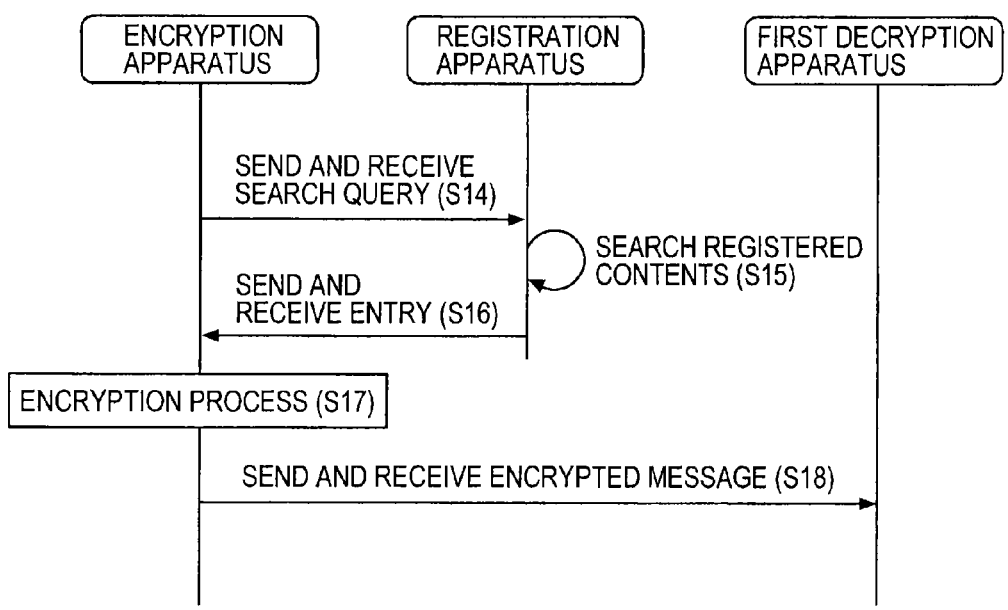
FIG. 30 is a view (No. 2) showing the processing procedure of the cryptographic communication method according to each embodiment in the second aspect.
Figure 31:
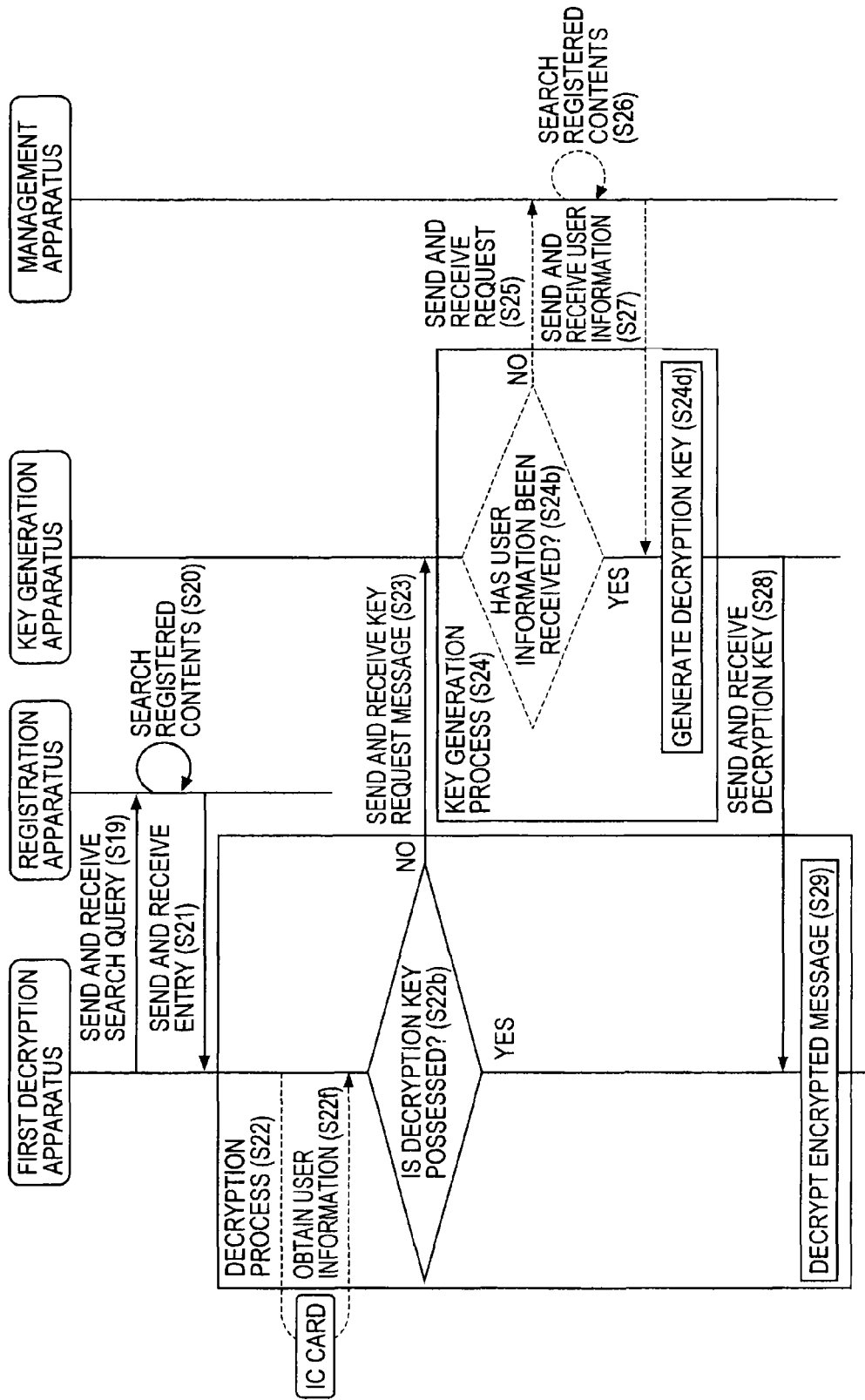
FIG. 31 is a view (No. 3) showing the processing procedure of the cryptographic communication method according to each embodiment in the second aspect.
Figure 32:
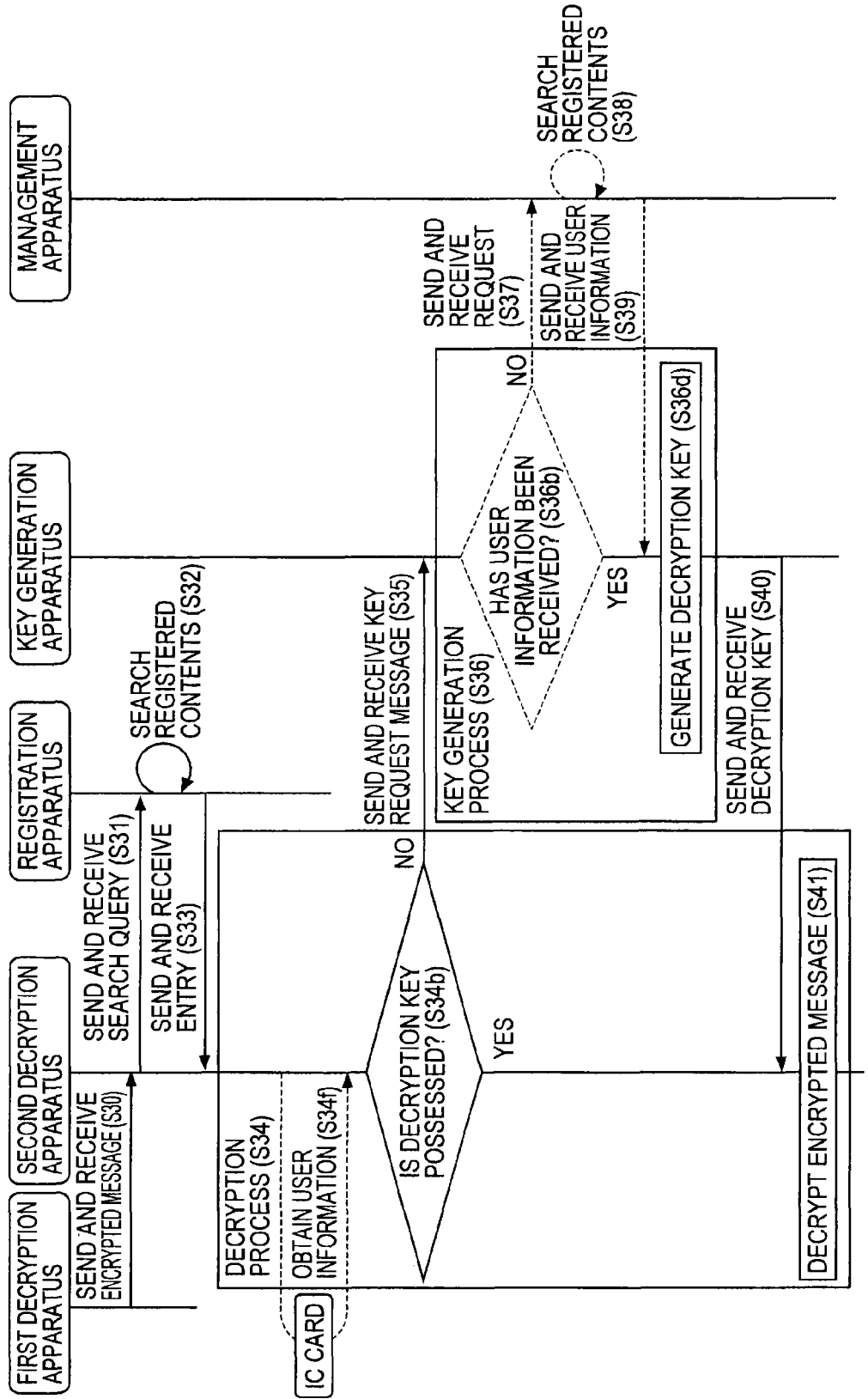
FIG. 32 is a view (No. 4) showing the processing procedure of the cryptographic communication method according to each embodiment in the second aspect.
Figure 33:
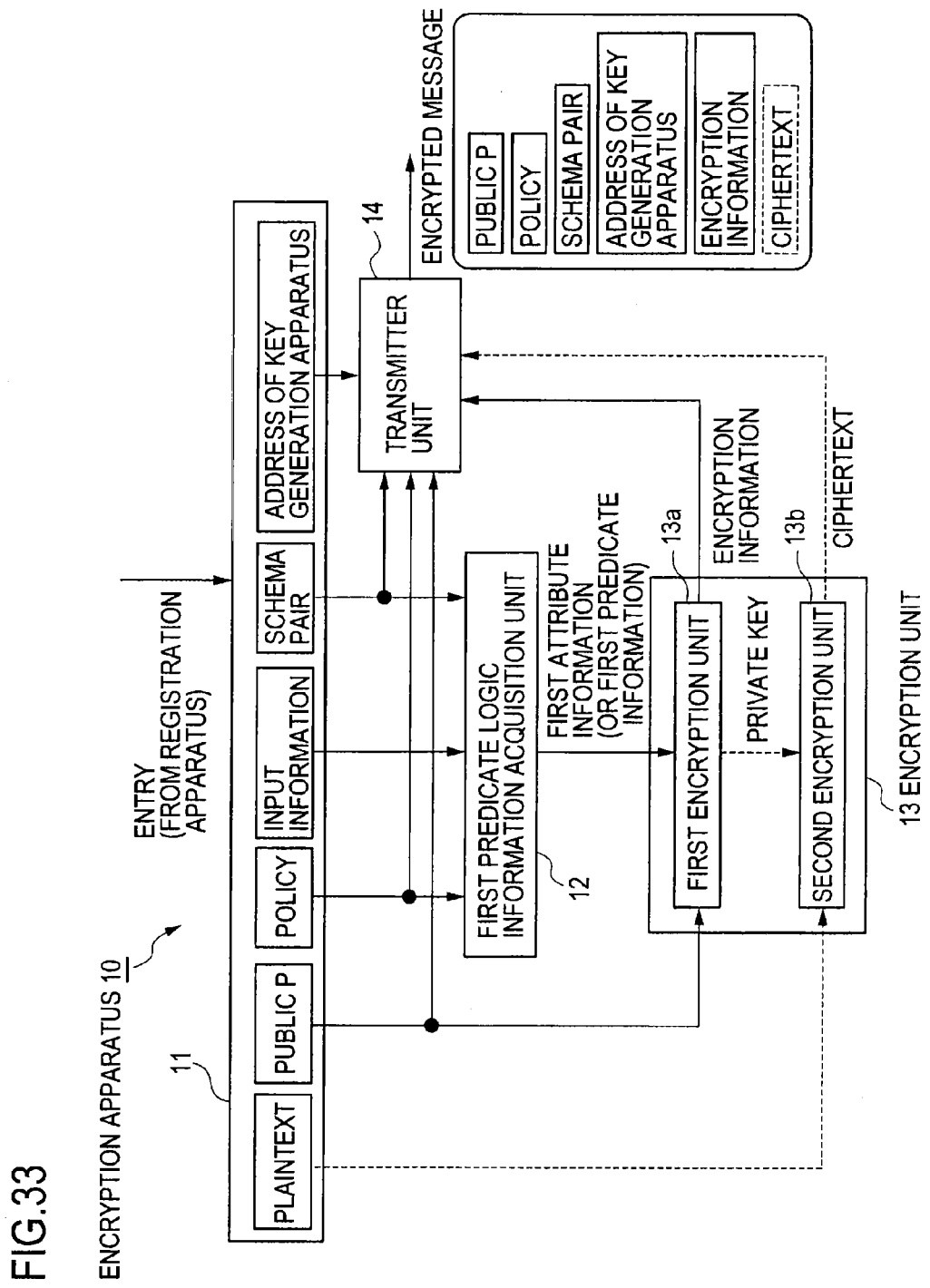
FIG. 33 is a functional block diagram of an encryption apparatus according to a first embodiment of the second aspect.
Figure 34:
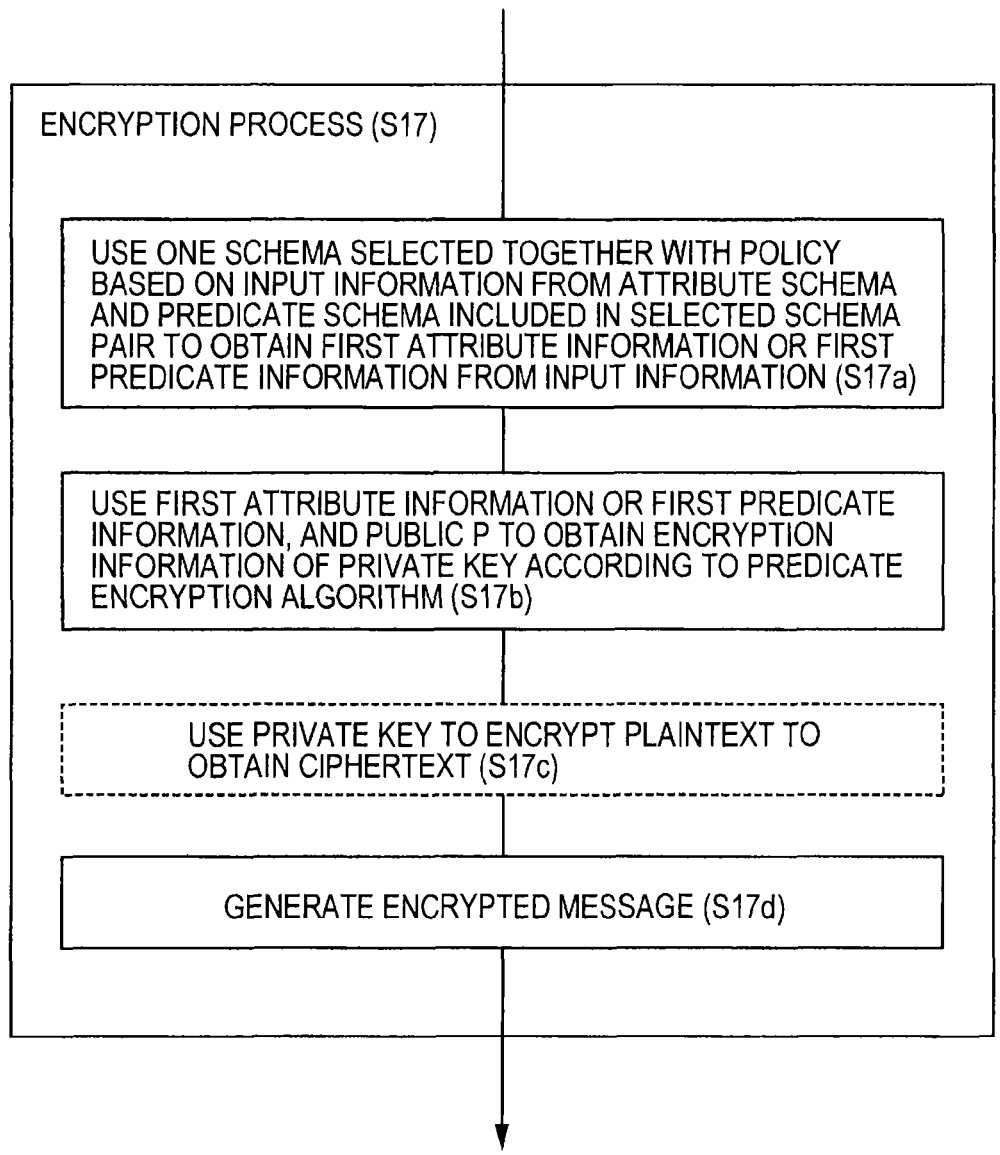
FIG. 34 is a view showing a detailed processing procedure of an encryption process according to the first embodiment of the second aspect.
Figure 35:
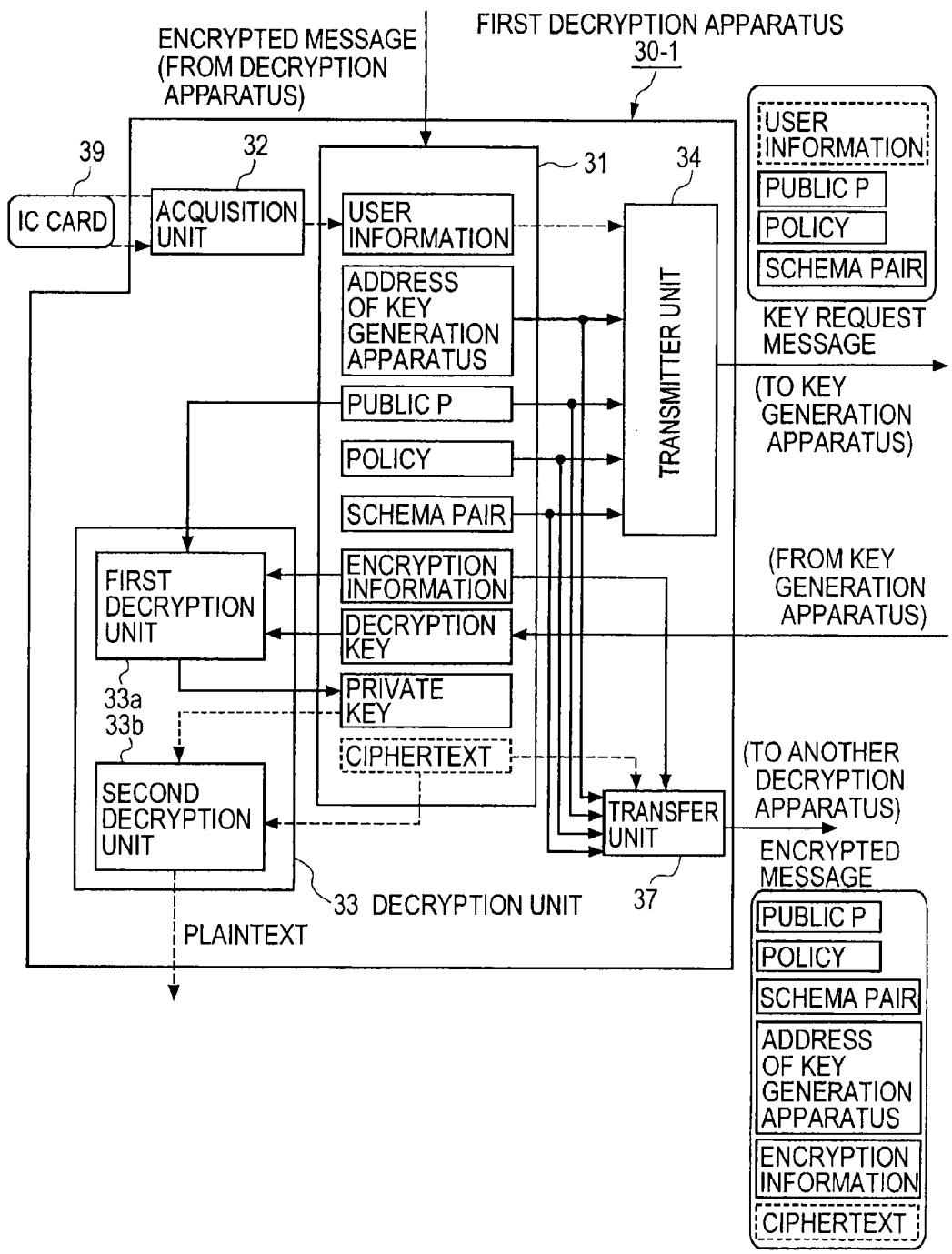
FIG. 35 is a functional block diagram of a first decryption apparatus according to the first embodiment of the second aspect.
Figure 36:
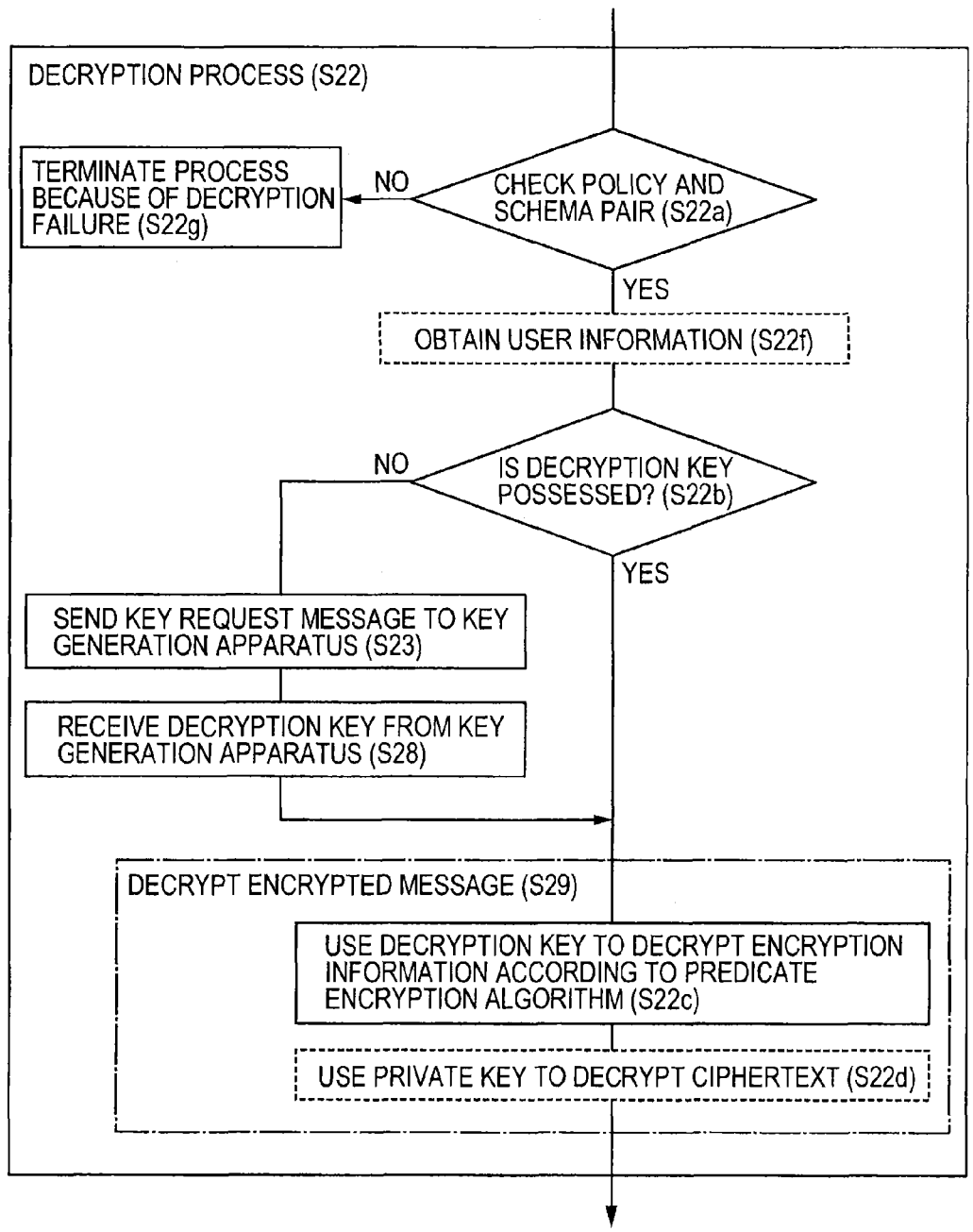
FIG. 36 is a view showing a detailed processing procedure of a first decryption process according to the first embodiment of the second aspect.
Figure 37:
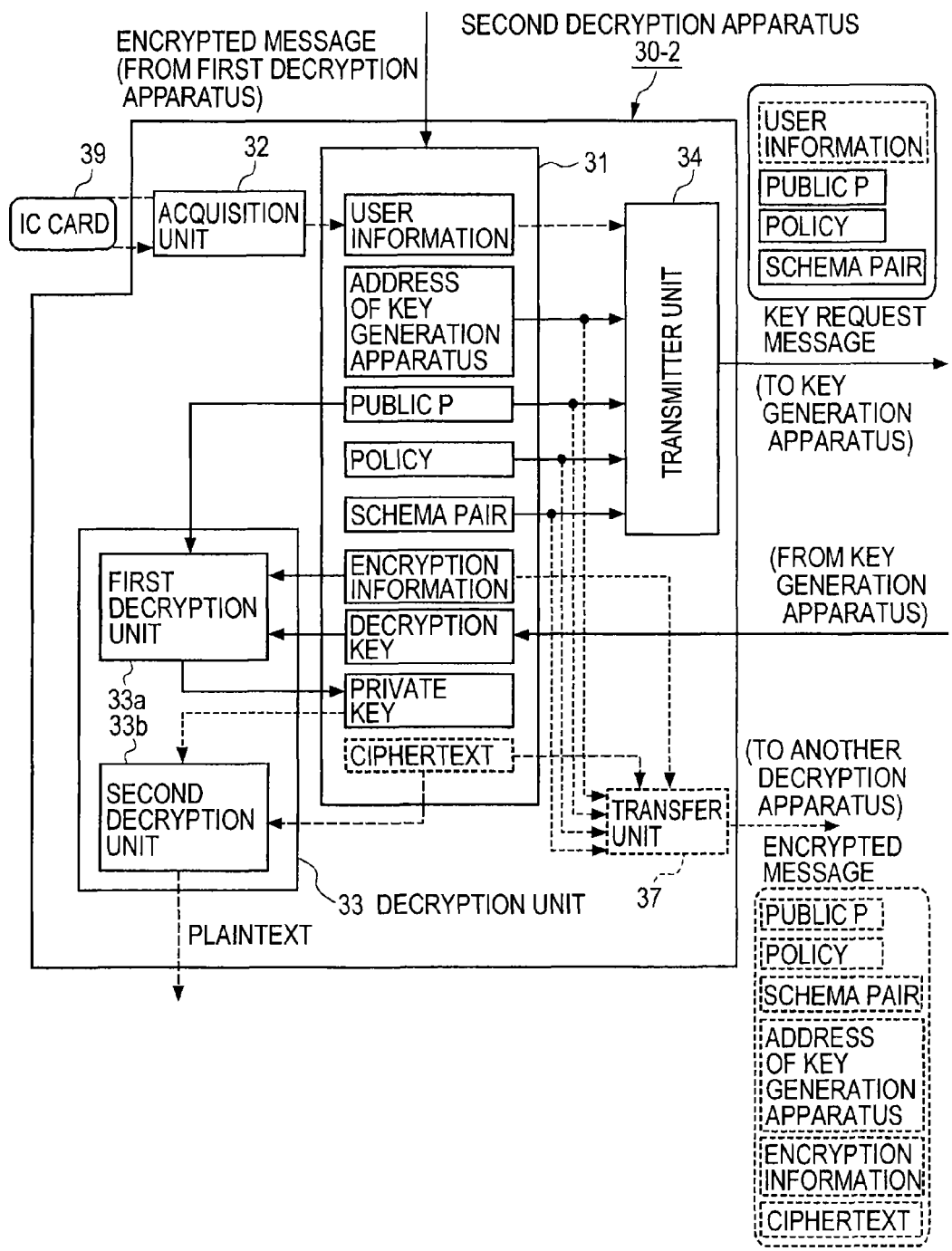
FIG. 37 is a functional block diagram of a second decryption apparatus according to the first embodiment of the second aspect.
Figure 38:
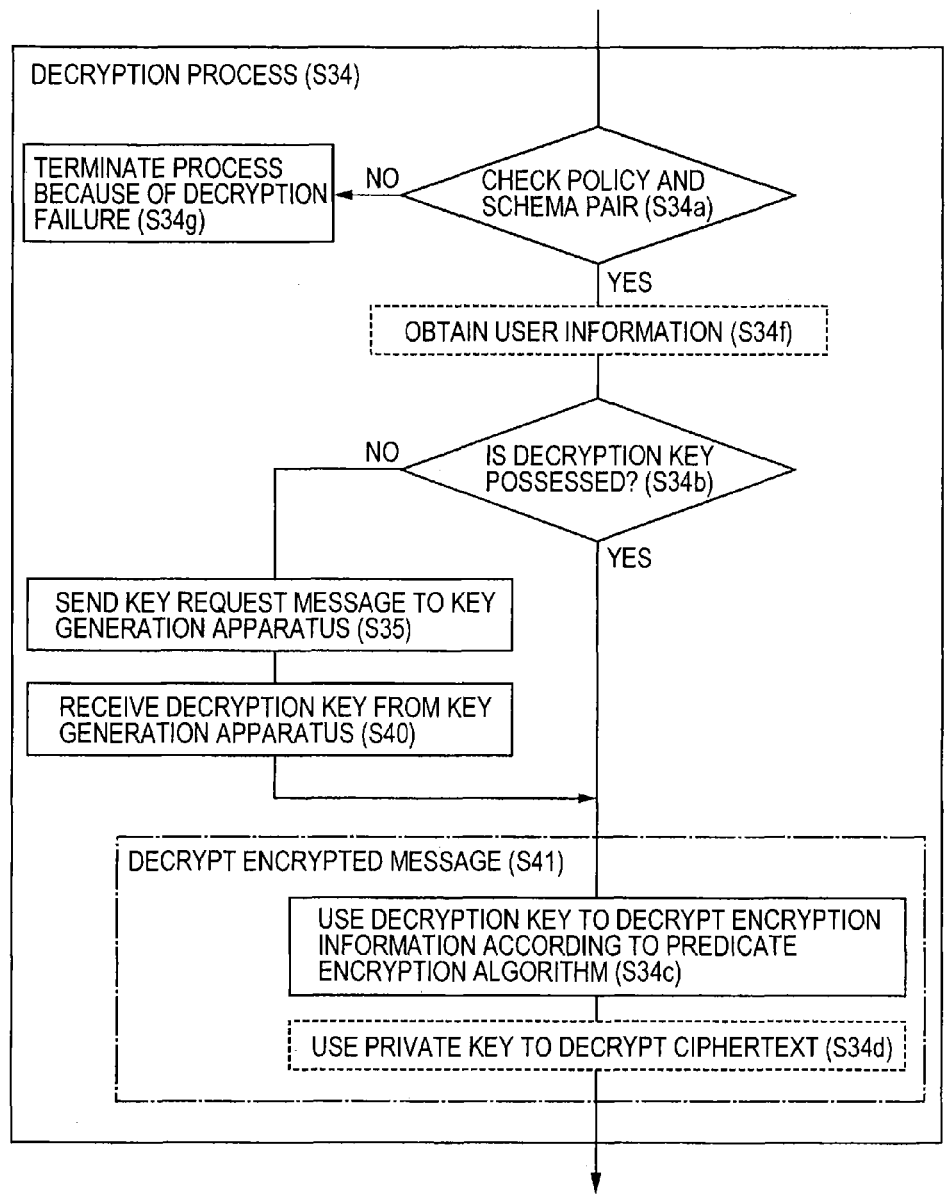
FIG. 38 is a view showing a detailed processing procedure of a second decryption process according to the first embodiment of the second aspect.
Figure 39:
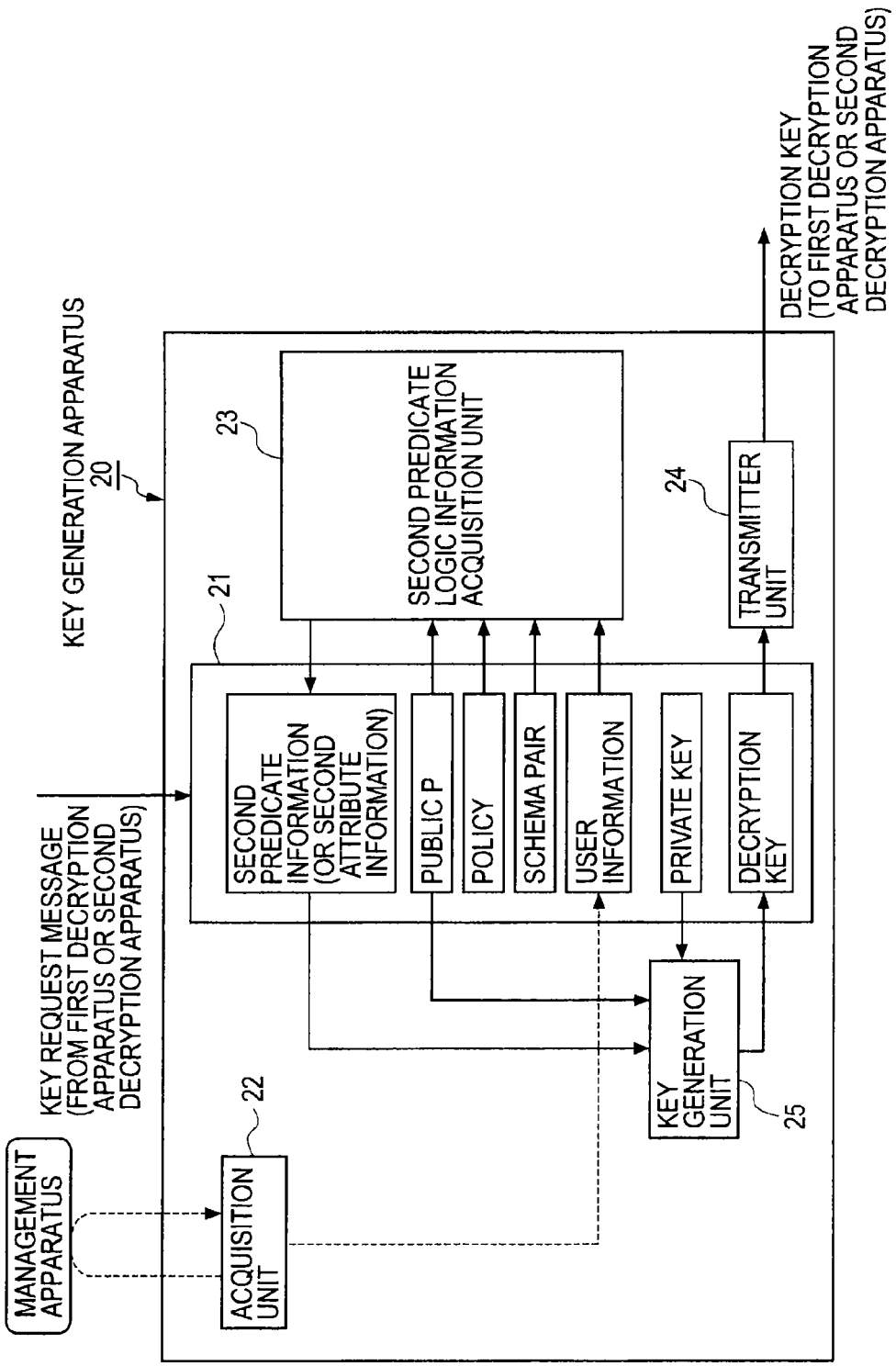
FIG. 39 is a functional block diagram of a key generation apparatus according to the first embodiment of the second aspect.
Figure 40:
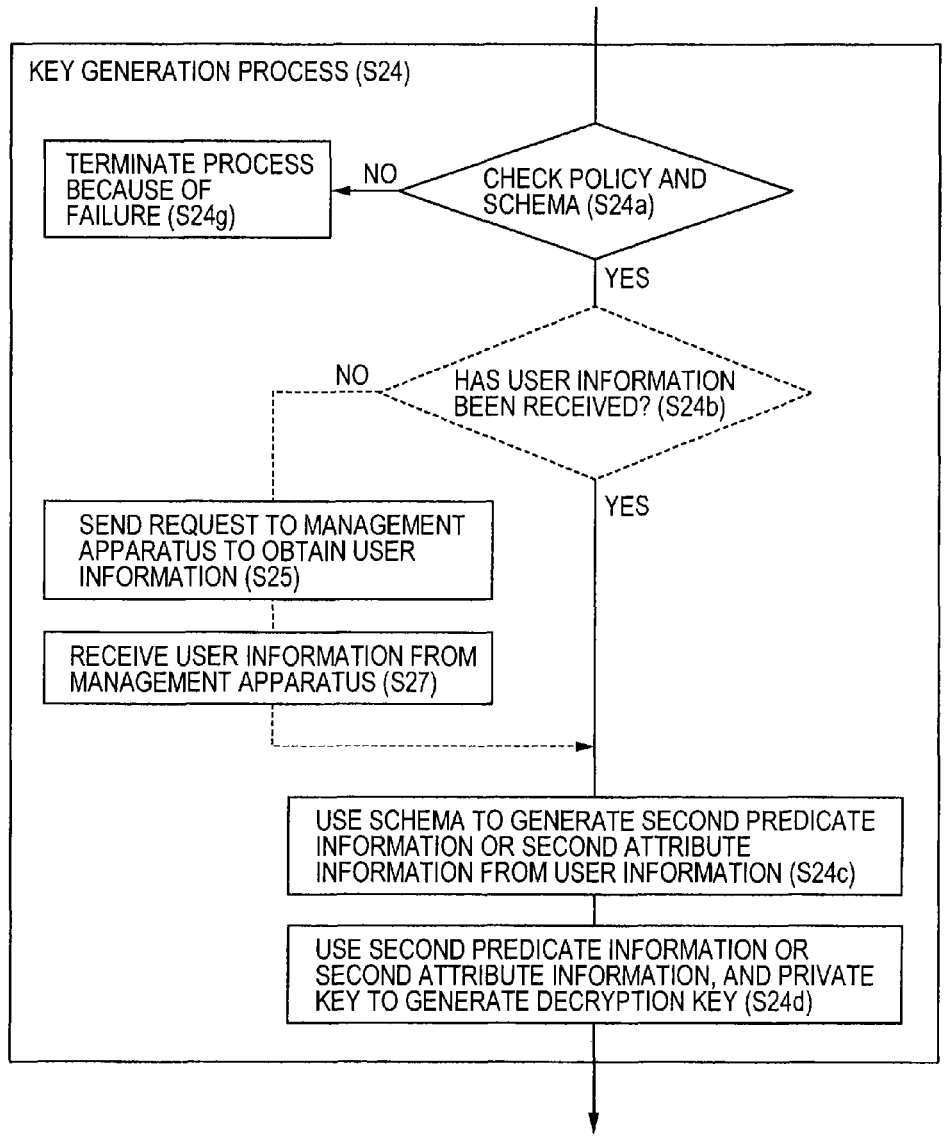
FIG. 40 is a view showing a detailed processing procedure (corresponding to the first decryption apparatus) of a key generation process according to the first embodiment of the second aspect.
Figure 41:
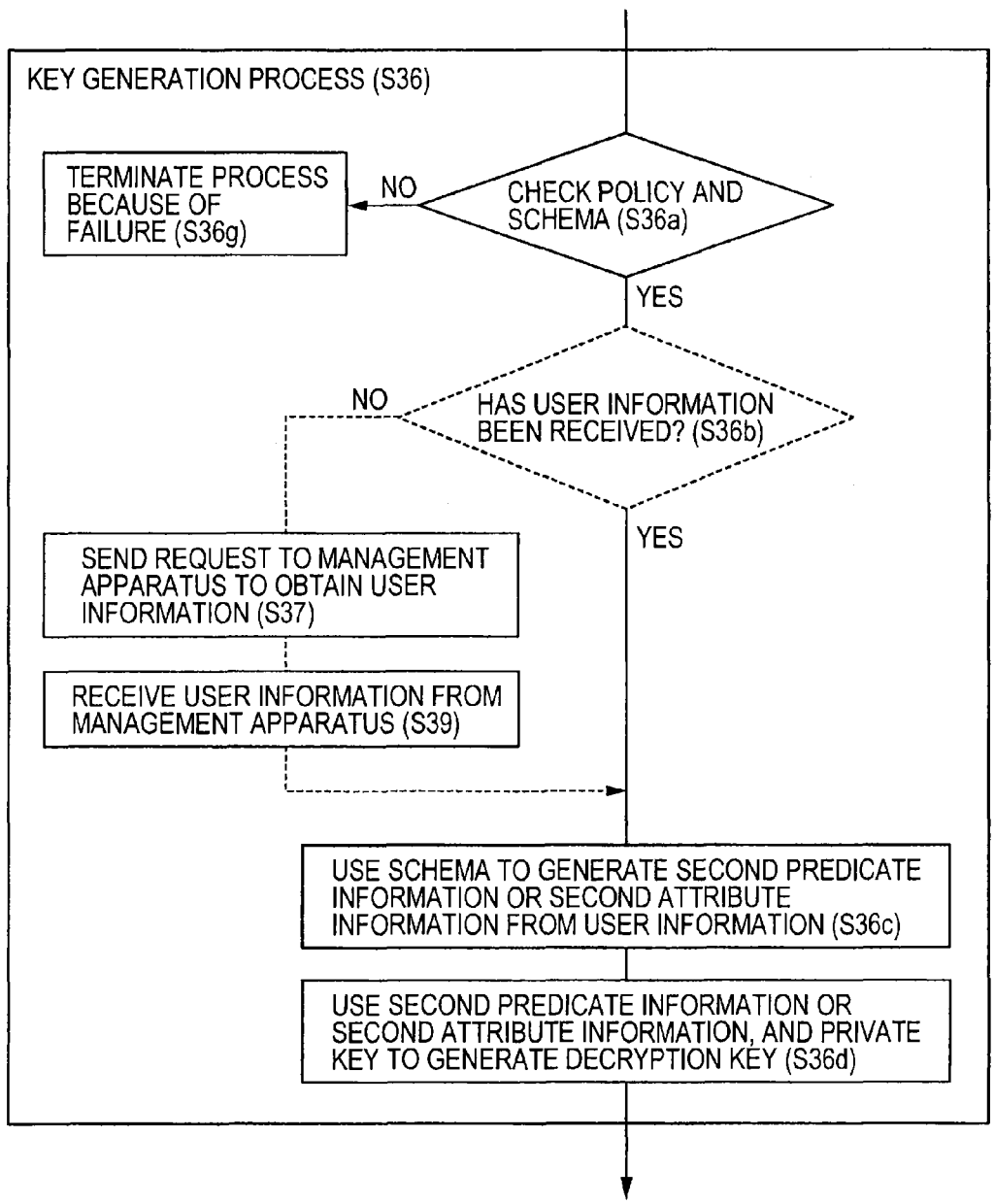
FIG. 41 is a view showing a detailed processing procedure (corresponding to the second decryption apparatus) of a key generation process according to the first embodiment of the second aspect.
Figure 42:
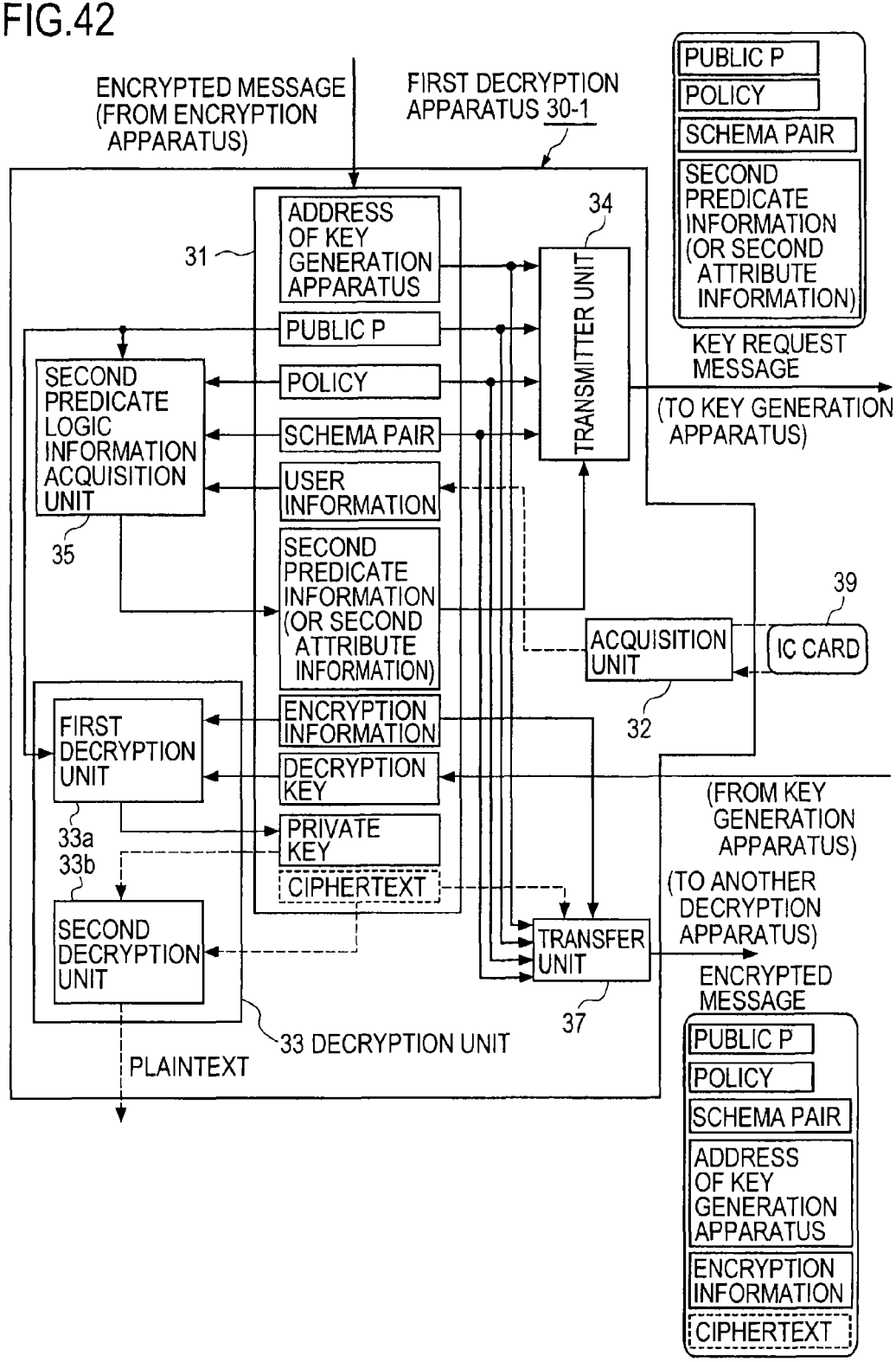
FIG. 42 is a functional block diagram of a first decryption apparatus according to a second embodiment of the second aspect.
Figure 43:
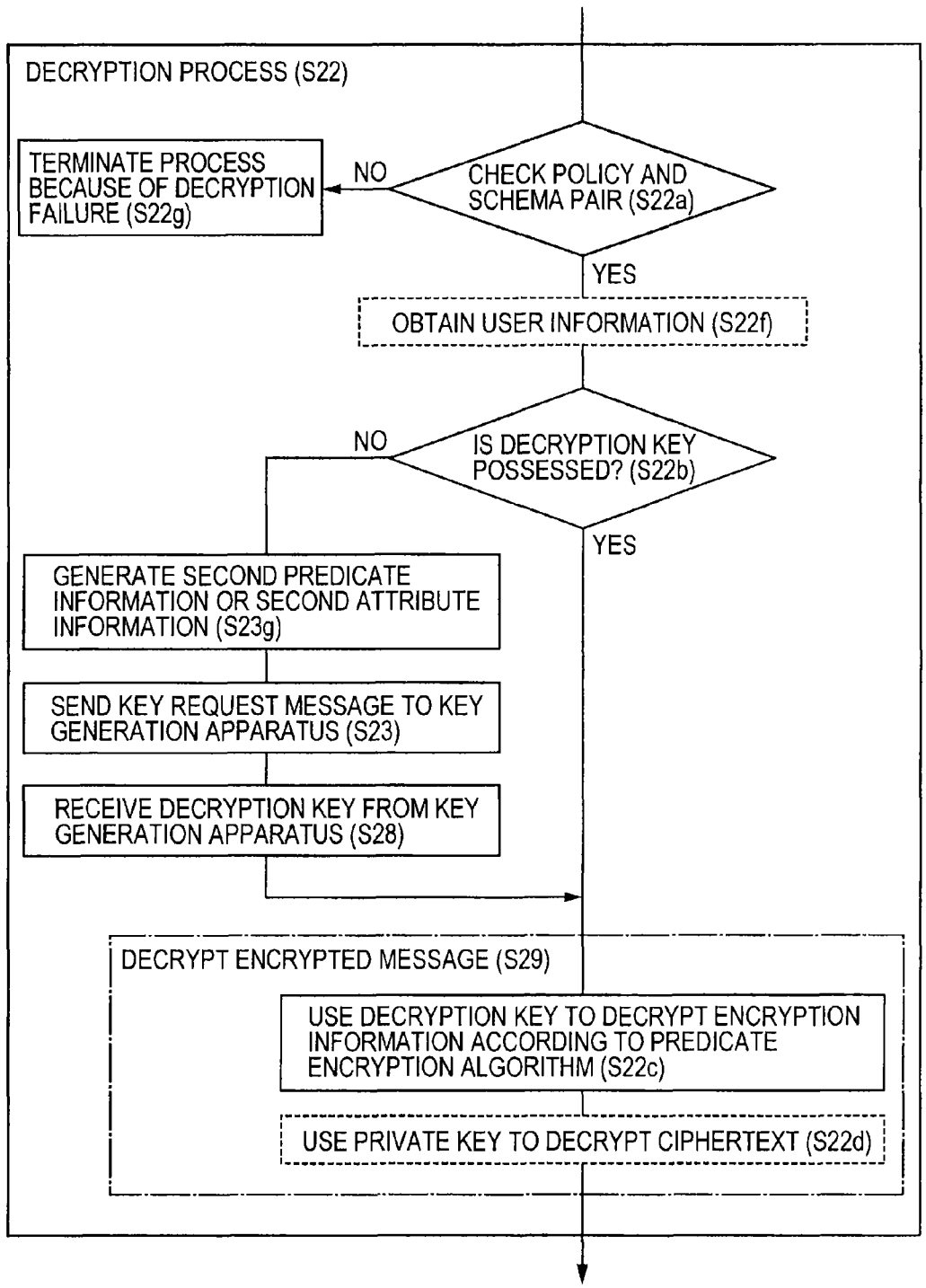
FIG. 43 is a view showing a detailed processing procedure of a first decryption process according to the second embodiment of the second aspect.
Figure 44:
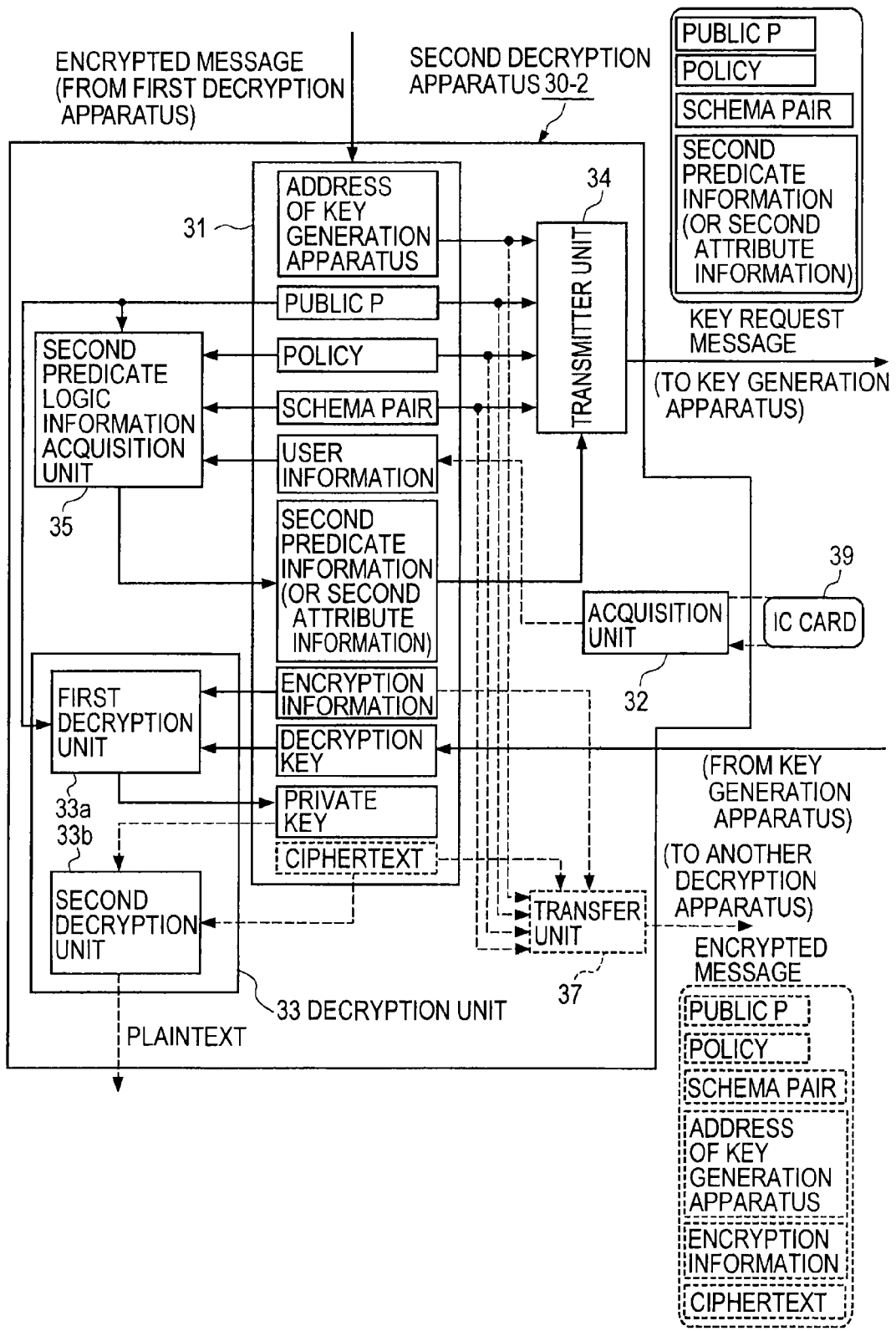
FIG. 44 is a functional block diagram of a second decryption apparatus according to the second embodiment of the second aspect.
Figure 45:
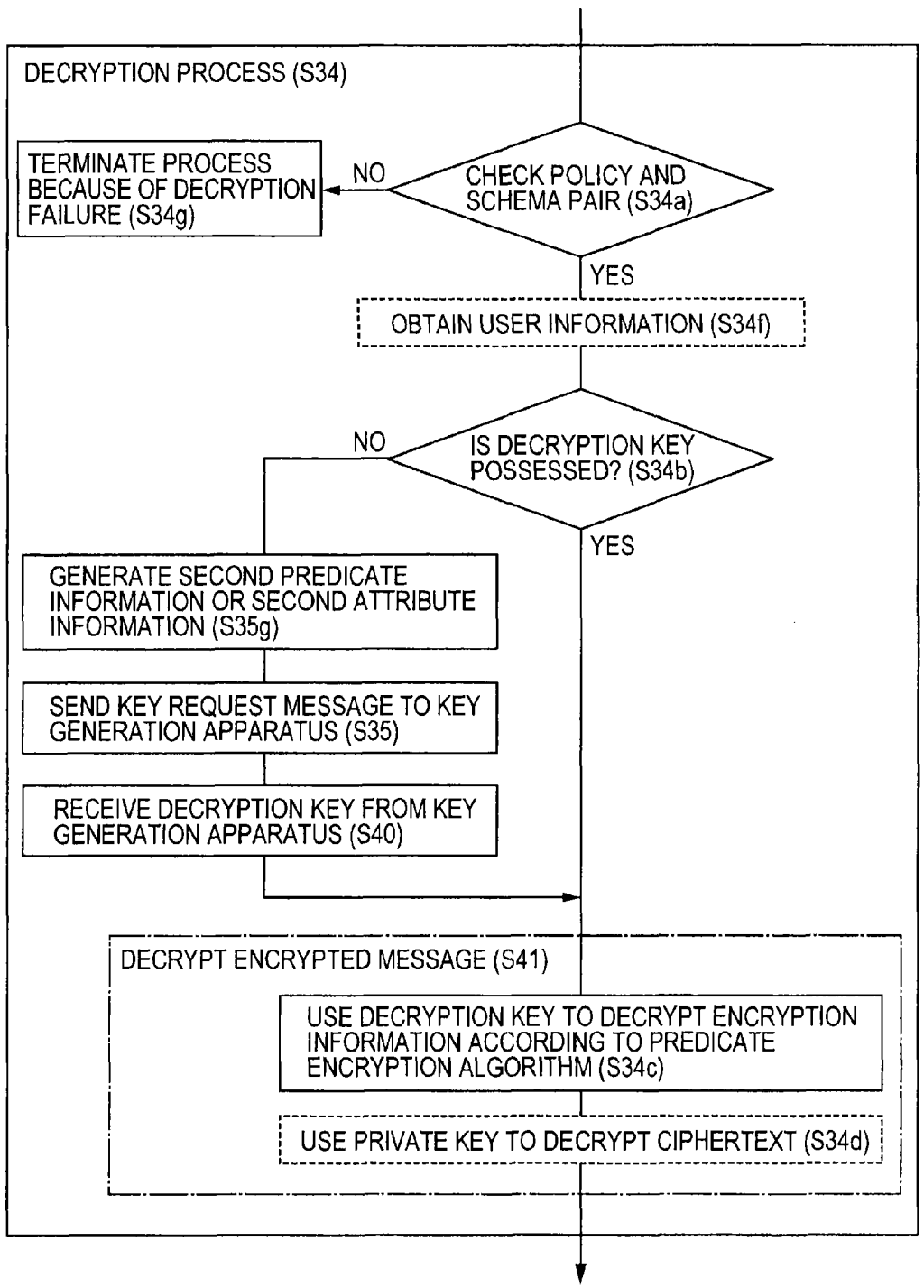
FIG. 45 is a view showing a detailed processing procedure of a second decryption process according to the second embodiment of the second aspect.
Figure 46:
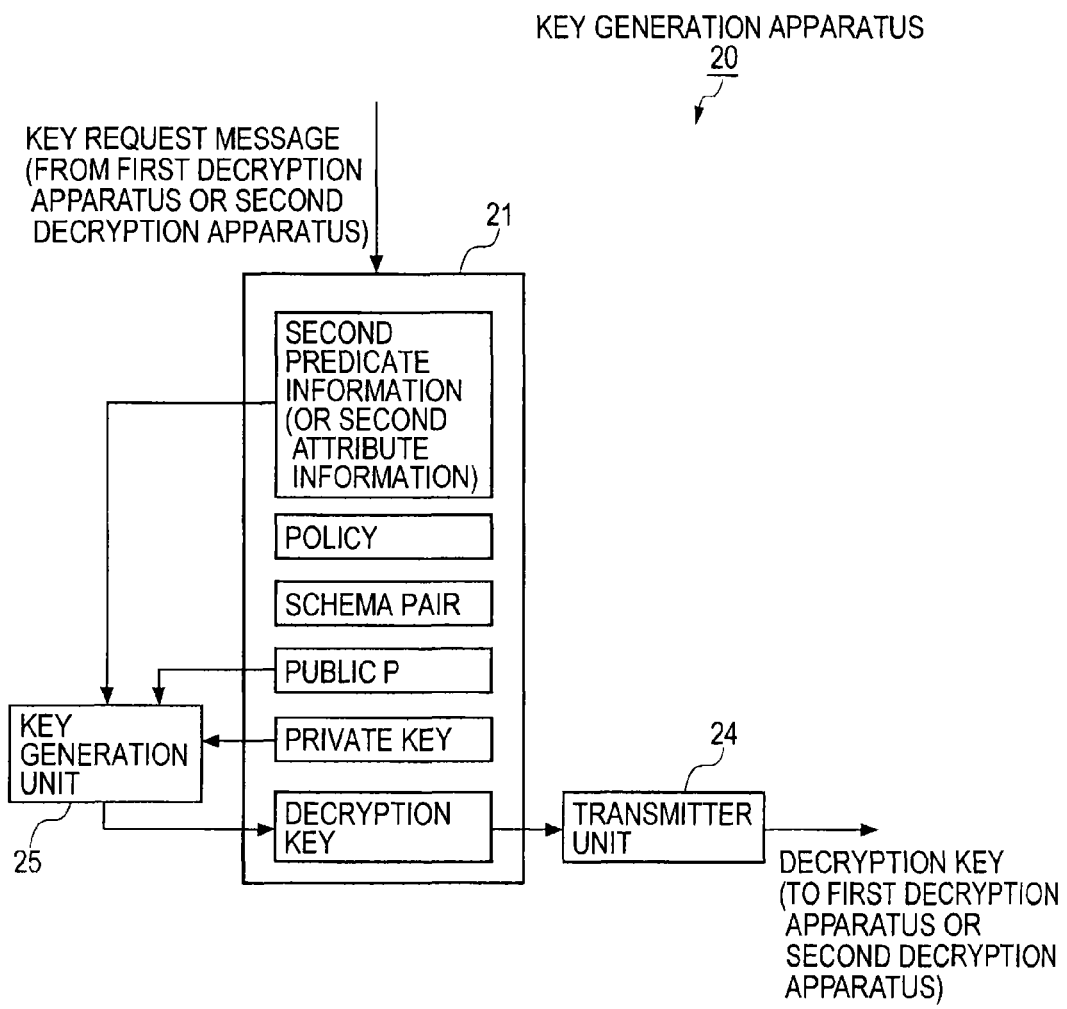
FIG. 46 is a functional block diagram of a key generation apparatus according to the second embodiment of the second aspect.
Figure 47:
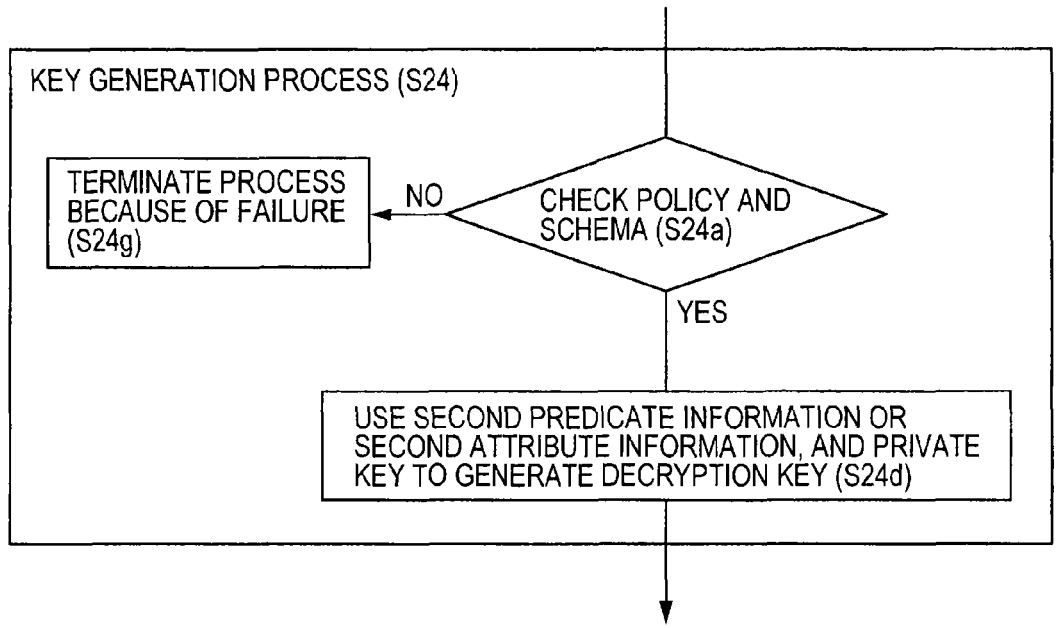
FIG. 47 is a view showing a detailed processing procedure (corresponding to the first decryption apparatus) of a key generation process according to the second embodiment of the second aspect.
Figure 48:
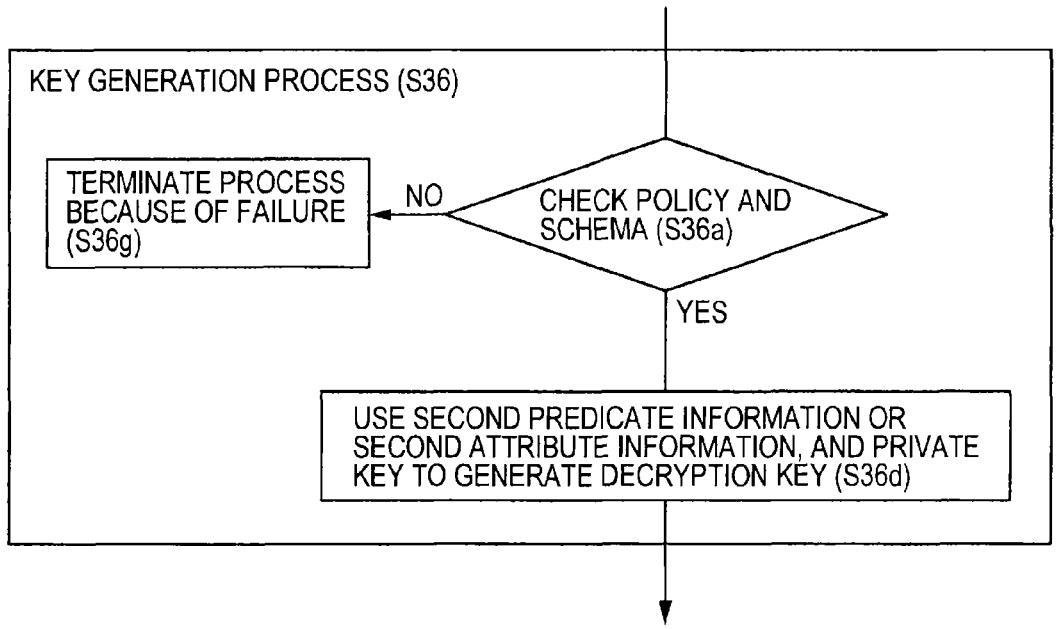
FIG. 48 is a view showing a detailed processing procedure (corresponding to the second decryption apparatus) of a key generation process according to the second embodiment of the second aspect.
Figure 49:
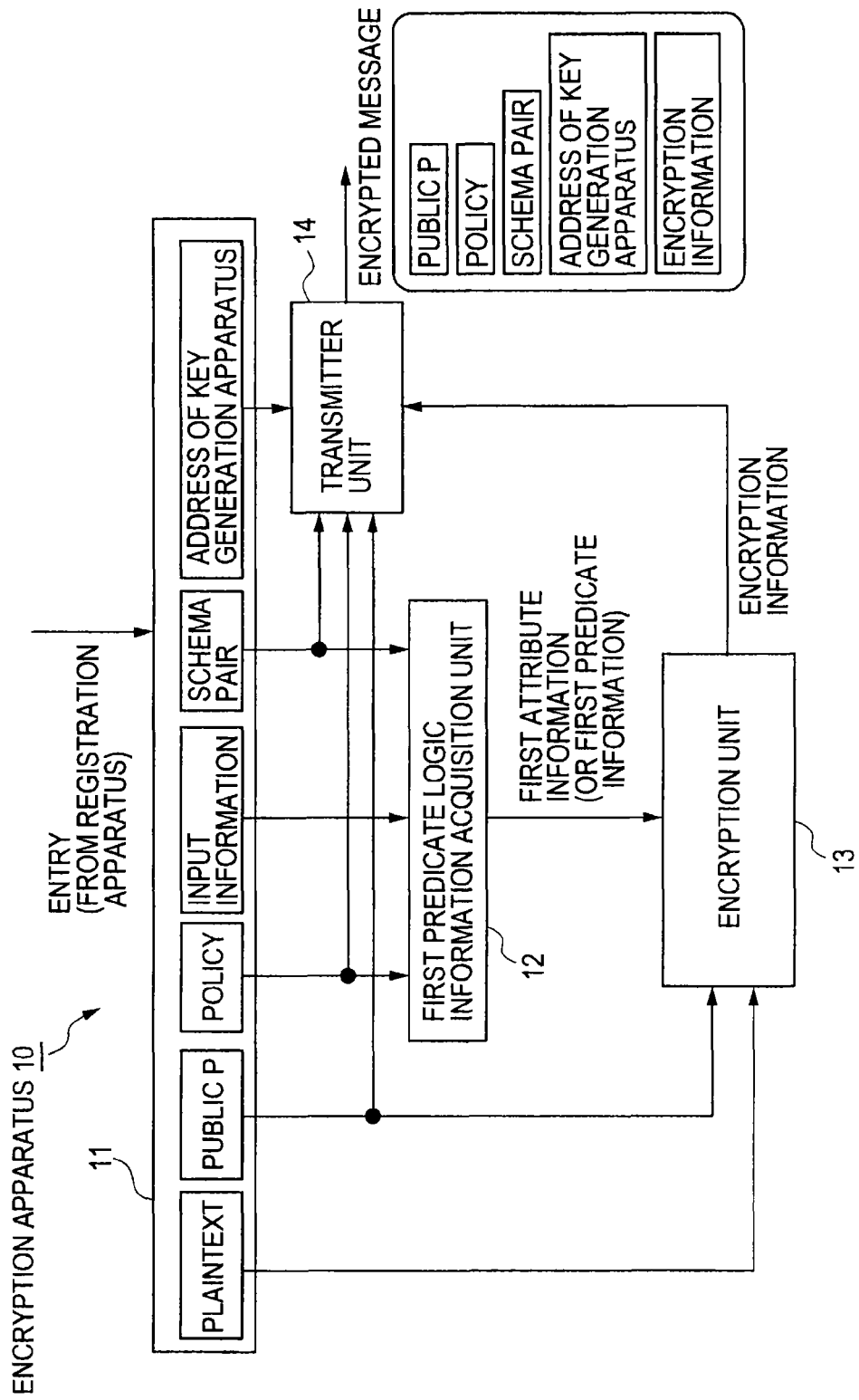
FIG. 49 is a functional block diagram of an encryption apparatus according to a third embodiment of the second aspect.
Figure 50:
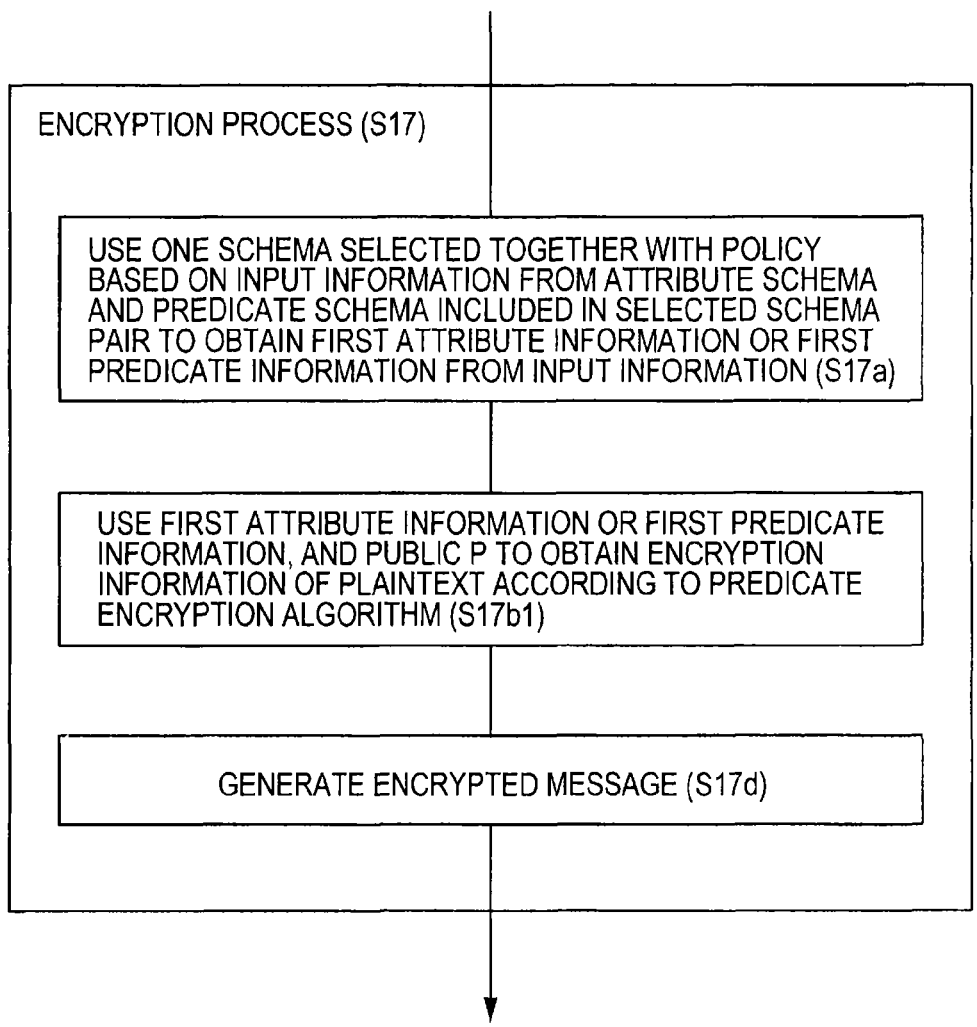
FIG. 50 is a view showing a detailed processing procedure of an encryption process according to the third embodiment of the second aspect.
Figure 51:
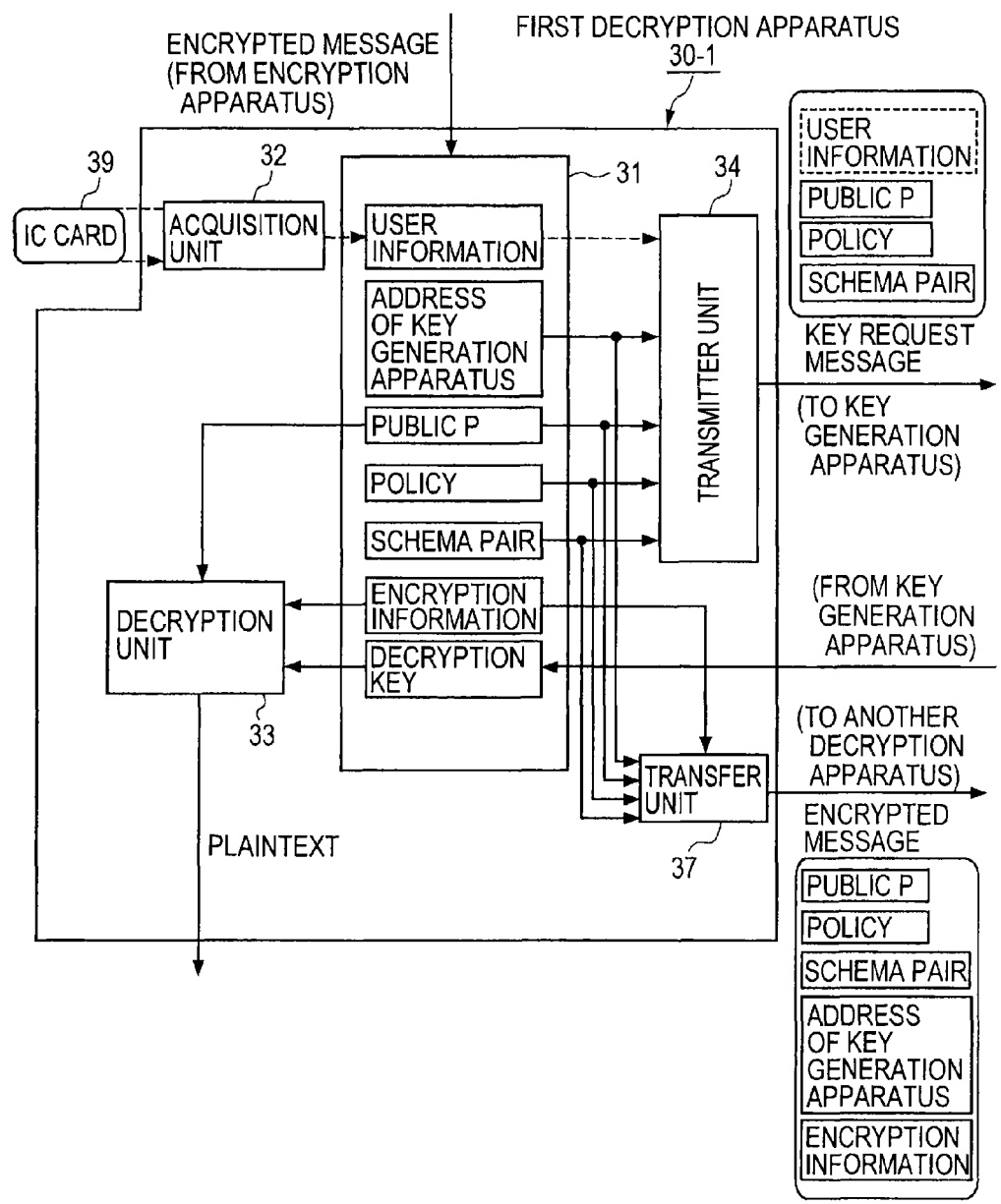
FIG. 51 is a functional block diagram of a first decryption apparatus according to the third embodiment of the second aspect.
Figure 52:
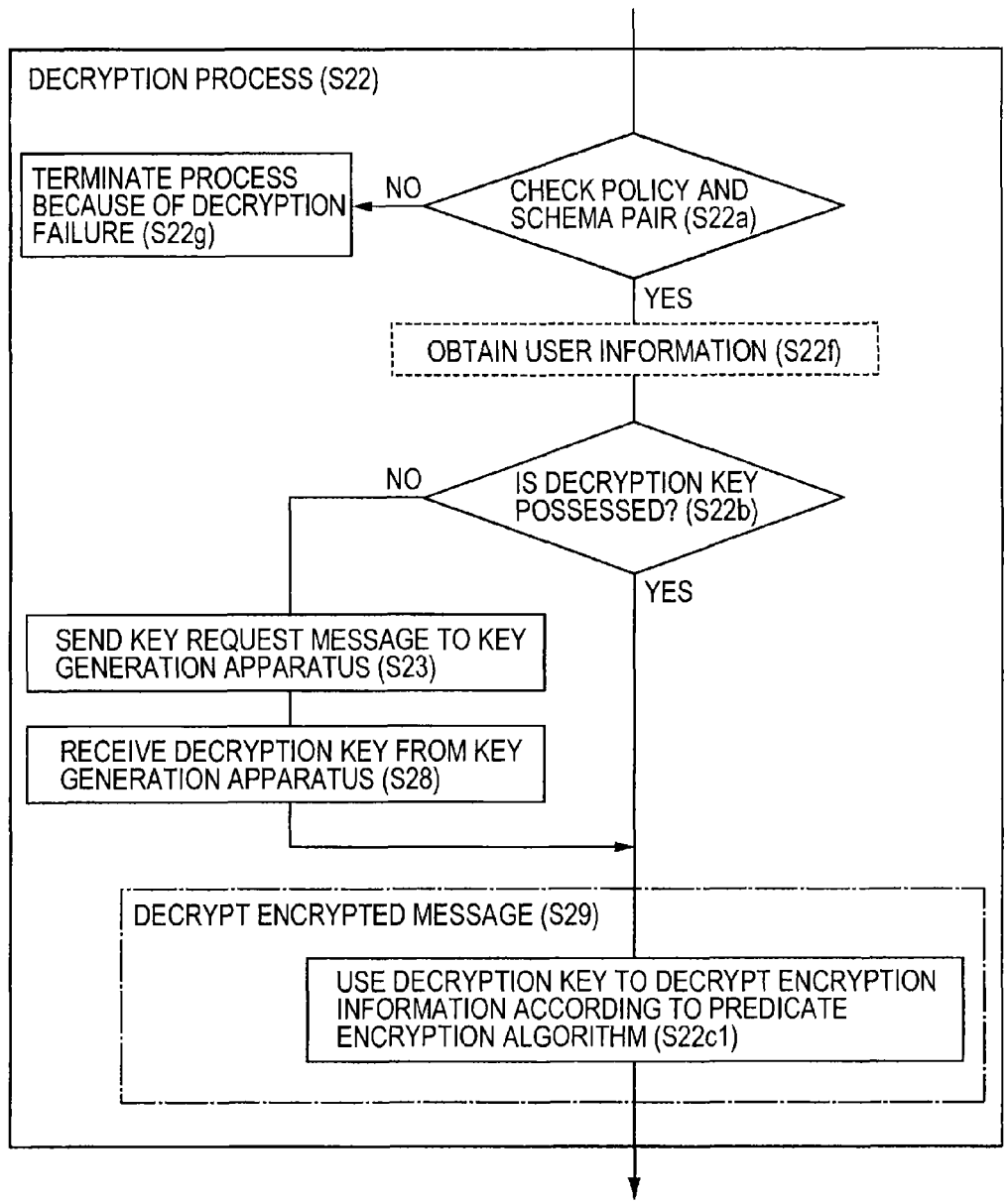
FIG. 52 is a view showing a detailed processing procedure of a first decryption process according to the third embodiment of the second aspect.
Figure 53:
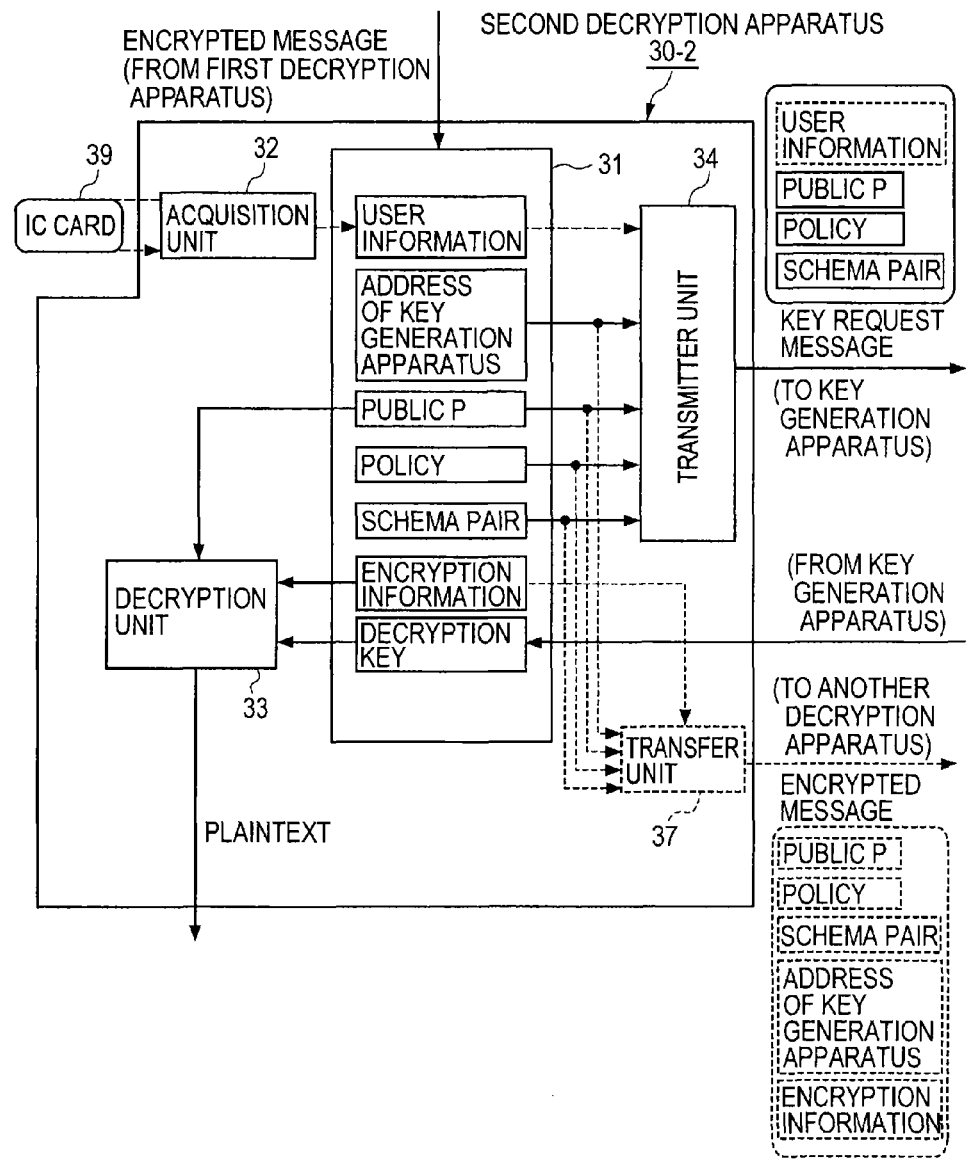
FIG. 53 is a functional block diagram of a second decryption apparatus according to the third embodiment of the second aspect.
Figure 54:
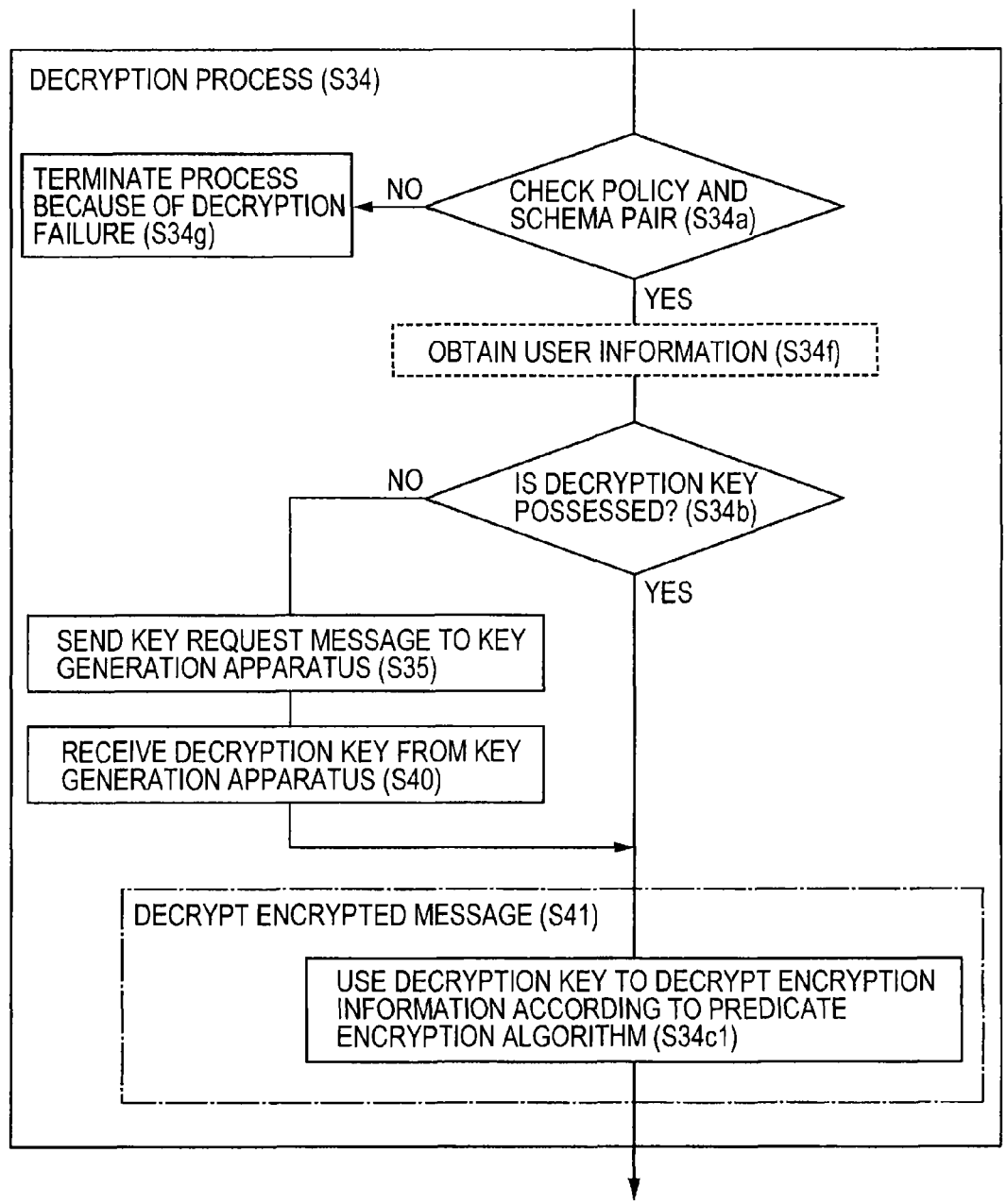
FIG. 54 is a view showing a detailed processing procedure of a second decryption process according to the third embodiment of the second aspect.
Figure 55:
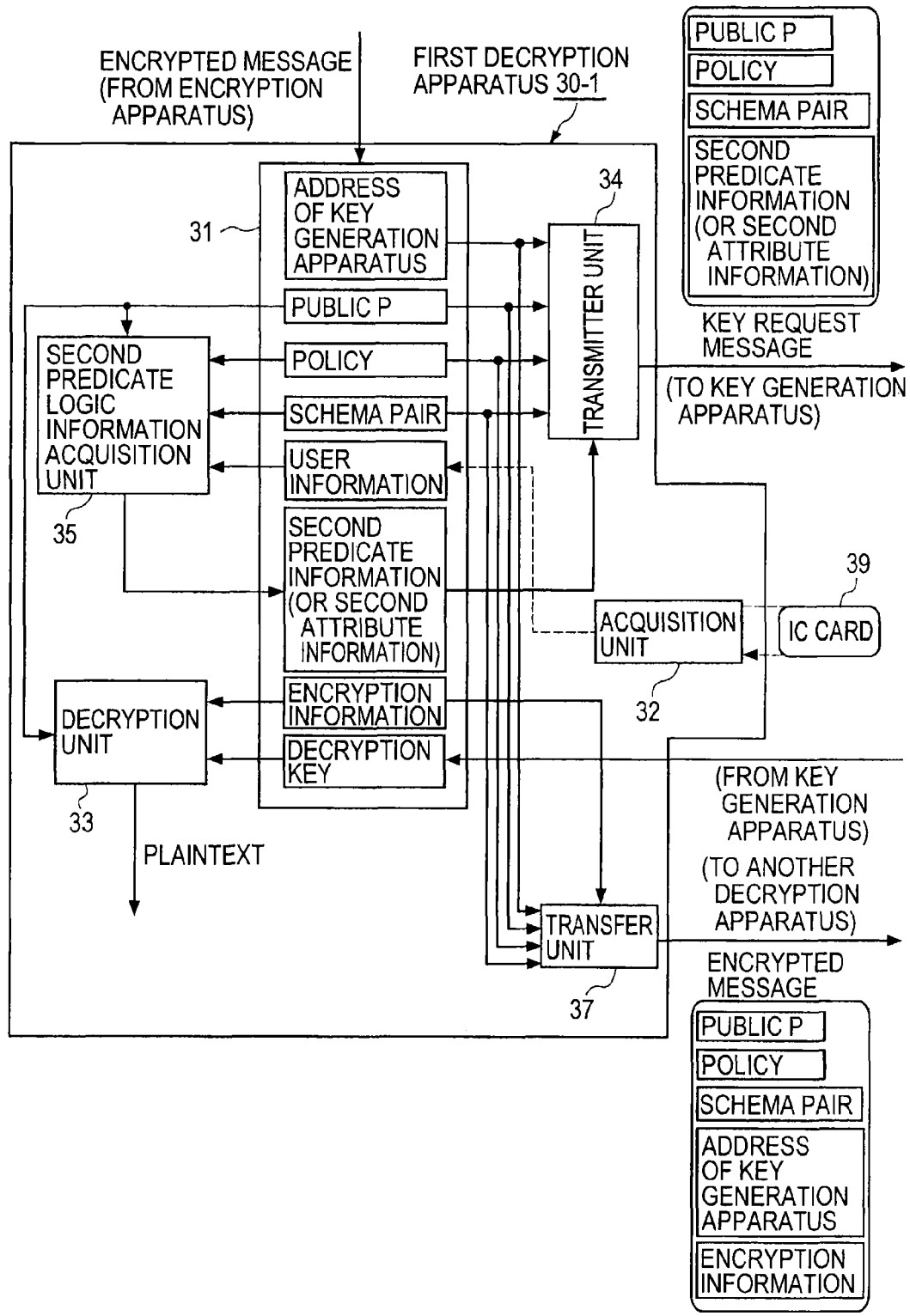
FIG. 55 is a functional block diagram of a first decryption apparatus according to a fourth embodiment of the second aspect.
Figure 56:
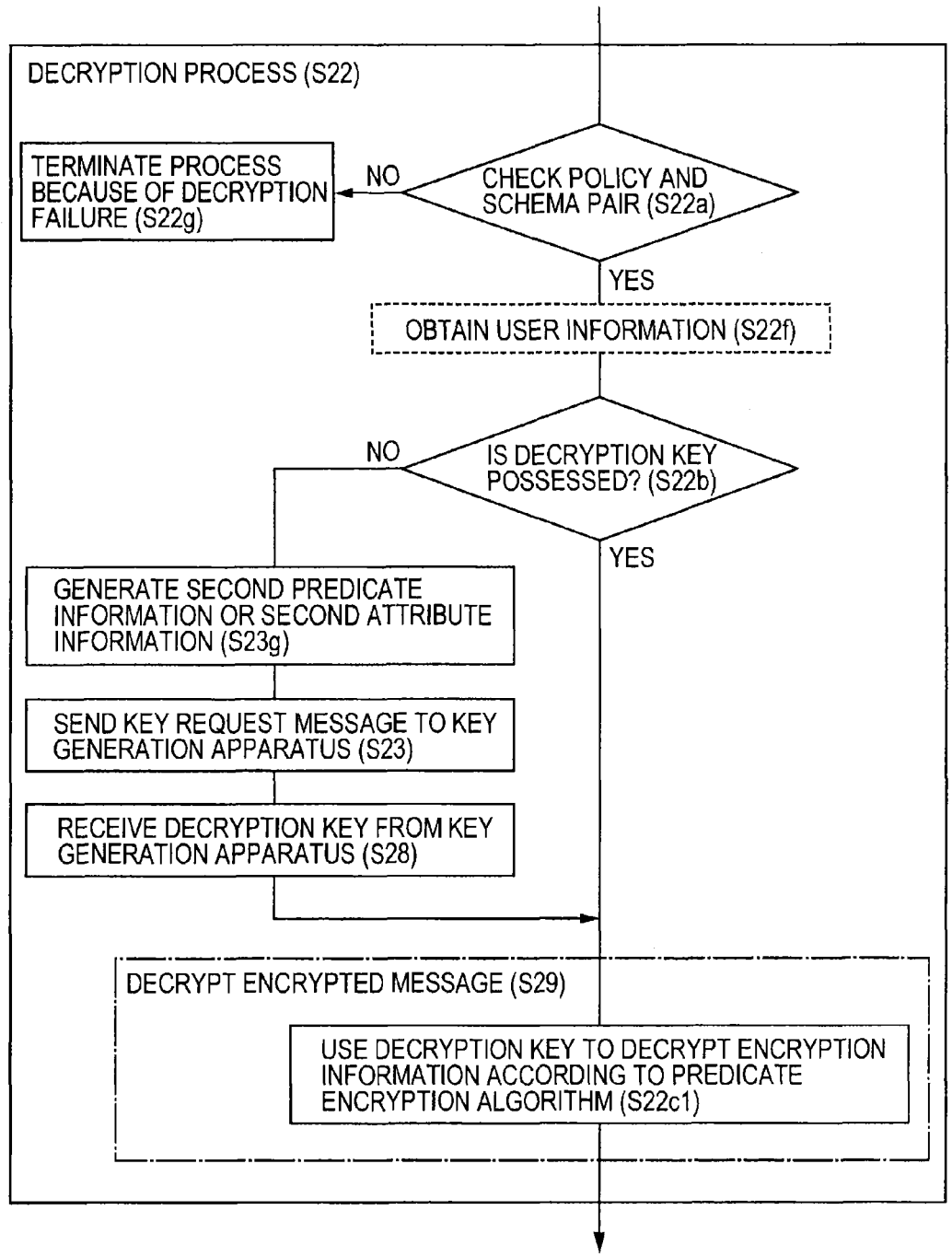
FIG. 56 is a view showing a detailed processing procedure of a first decryption process according to the fourth embodiment of the second aspect.
Figure 57:
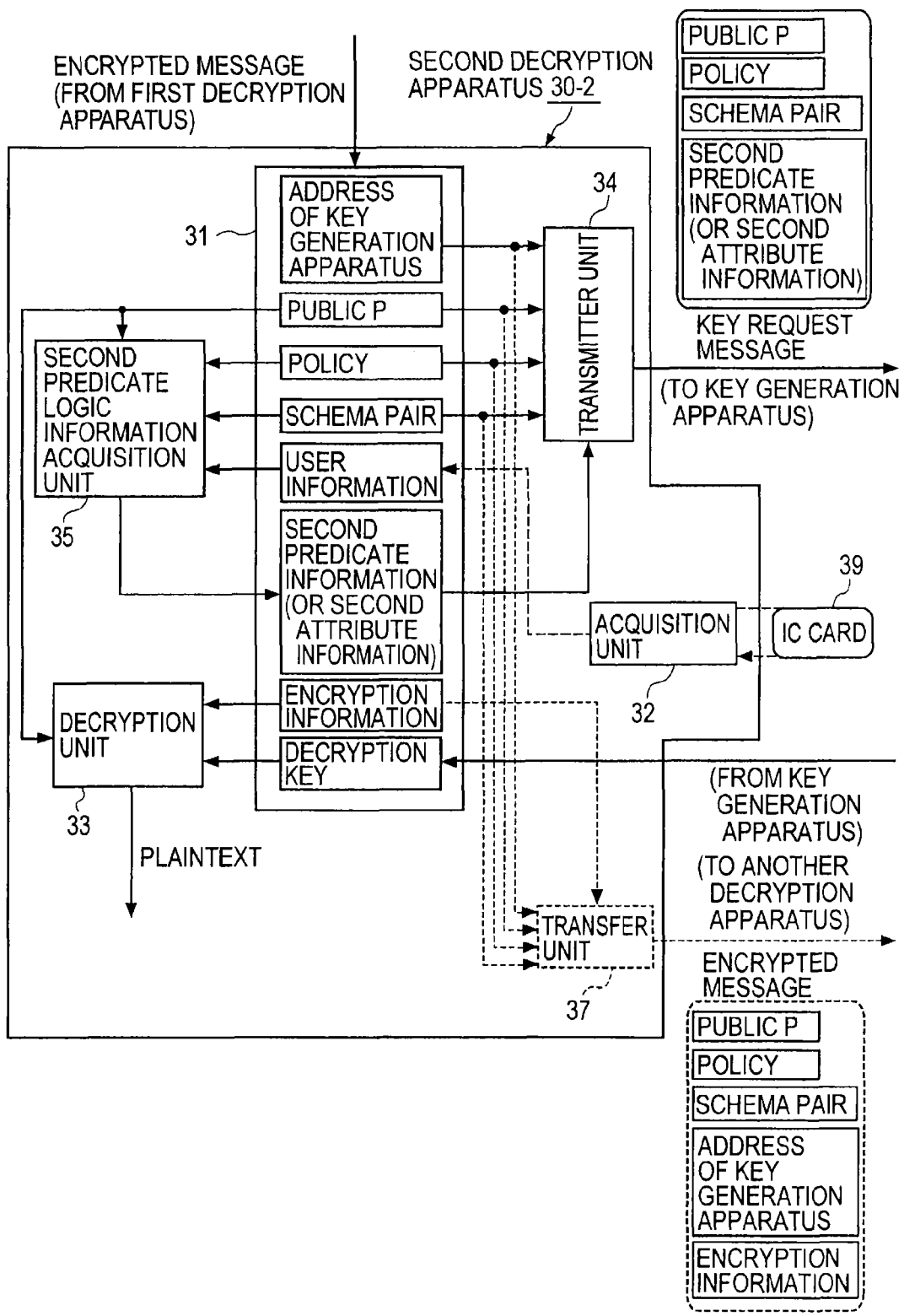
FIG. 57 is a functional block diagram of a second decryption apparatus according to the fourth embodiment of the second aspect.
Figure 58:
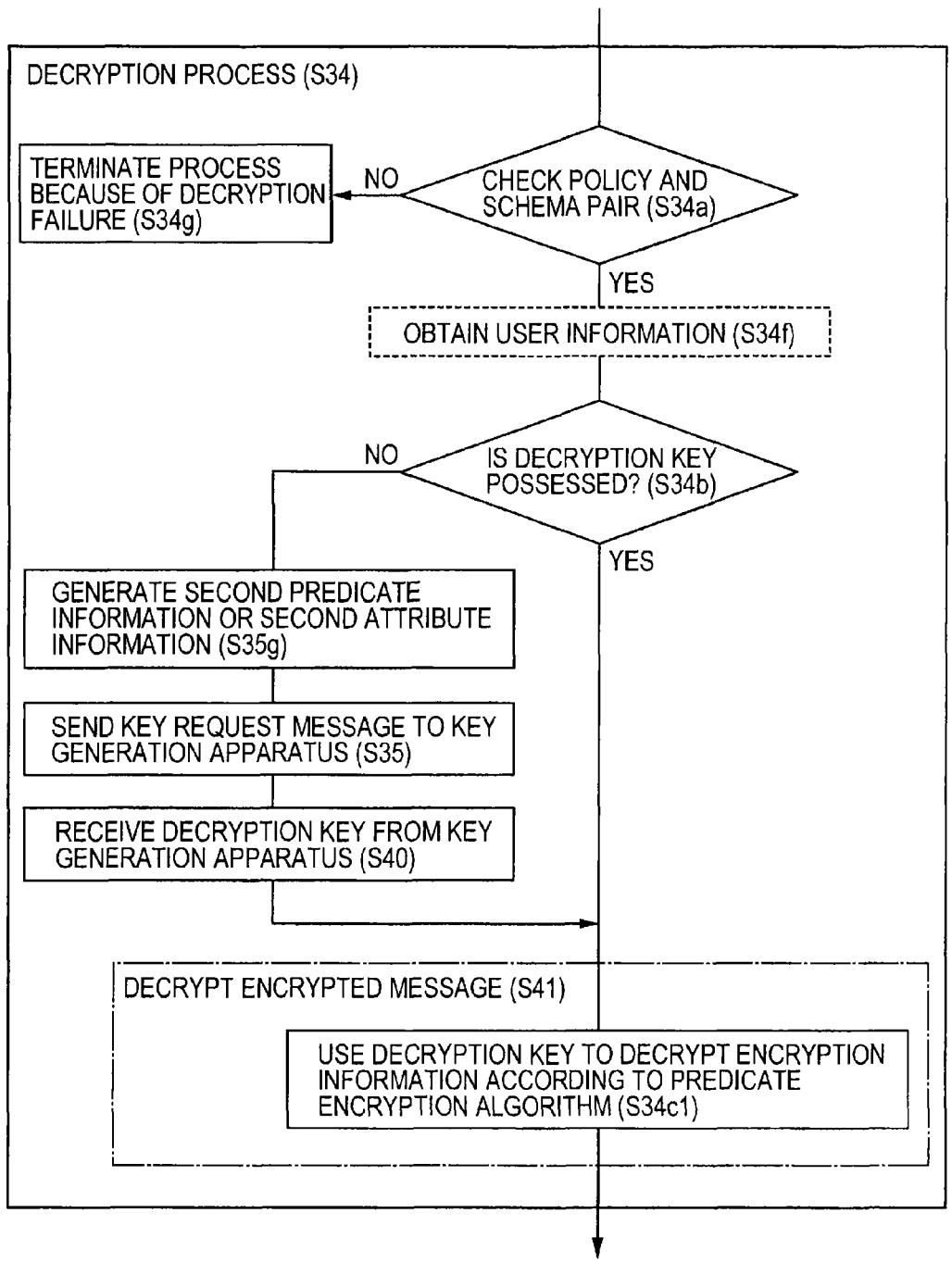
FIG. 58 is a view showing a detailed processing procedure of a second decryption process according to the fourth embodiment of the second aspect.
Figure 61:
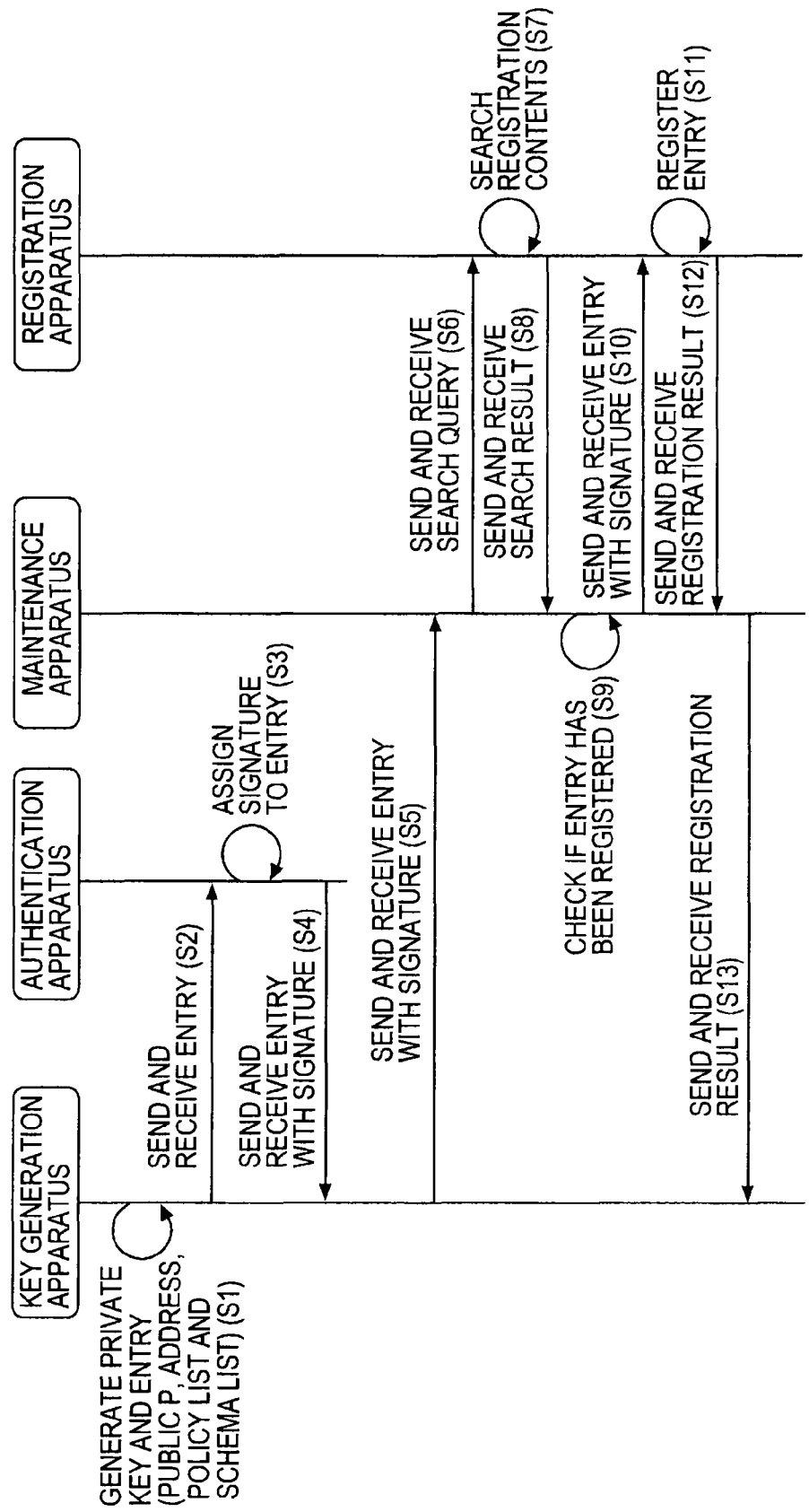
FIG. 61 is a view (No. 1) showing a processing procedure of a cryptographic communication method according to each embodiment in the third aspect.
Figure 62:
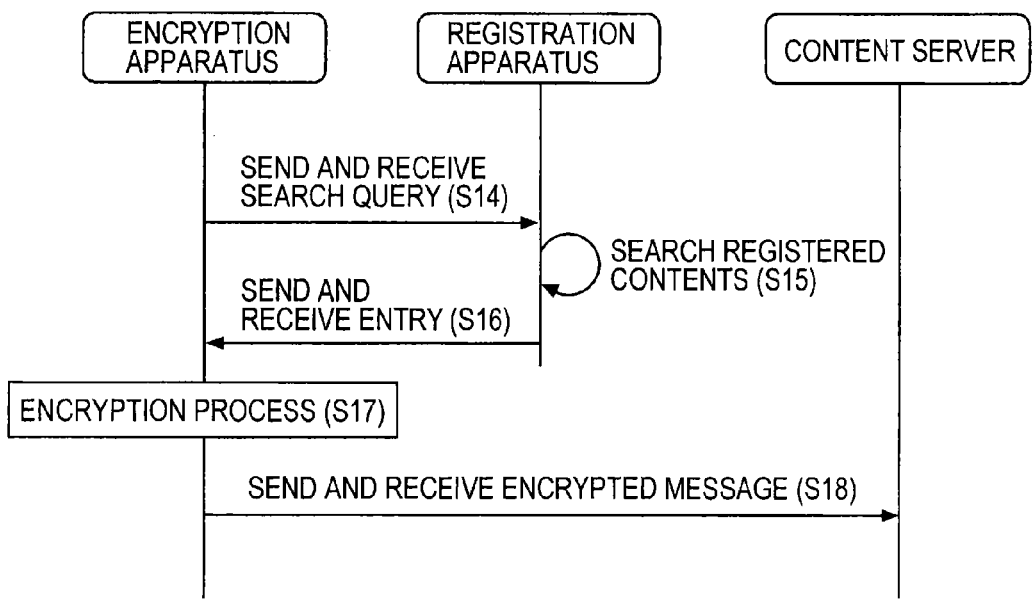
FIG. 62 is a view (No. 2) showing the processing procedure of the cryptographic communication method according to each embodiment in the third aspect.
Figure 63:
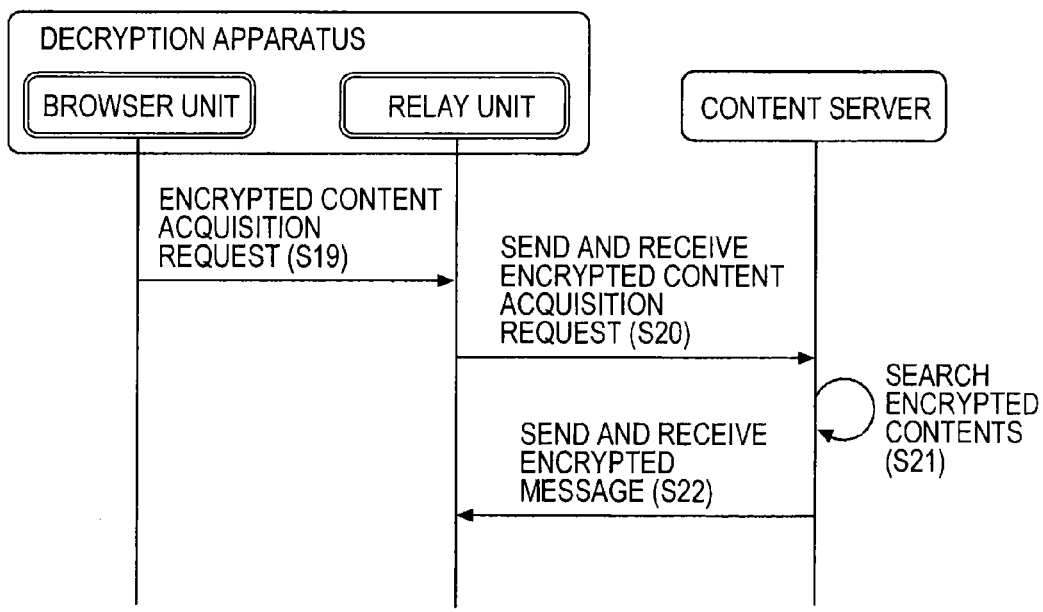
FIG. 63 is a view (No. 3) showing the processing procedure of the cryptographic communication method according to each embodiment in the third aspect.
Figure 64:
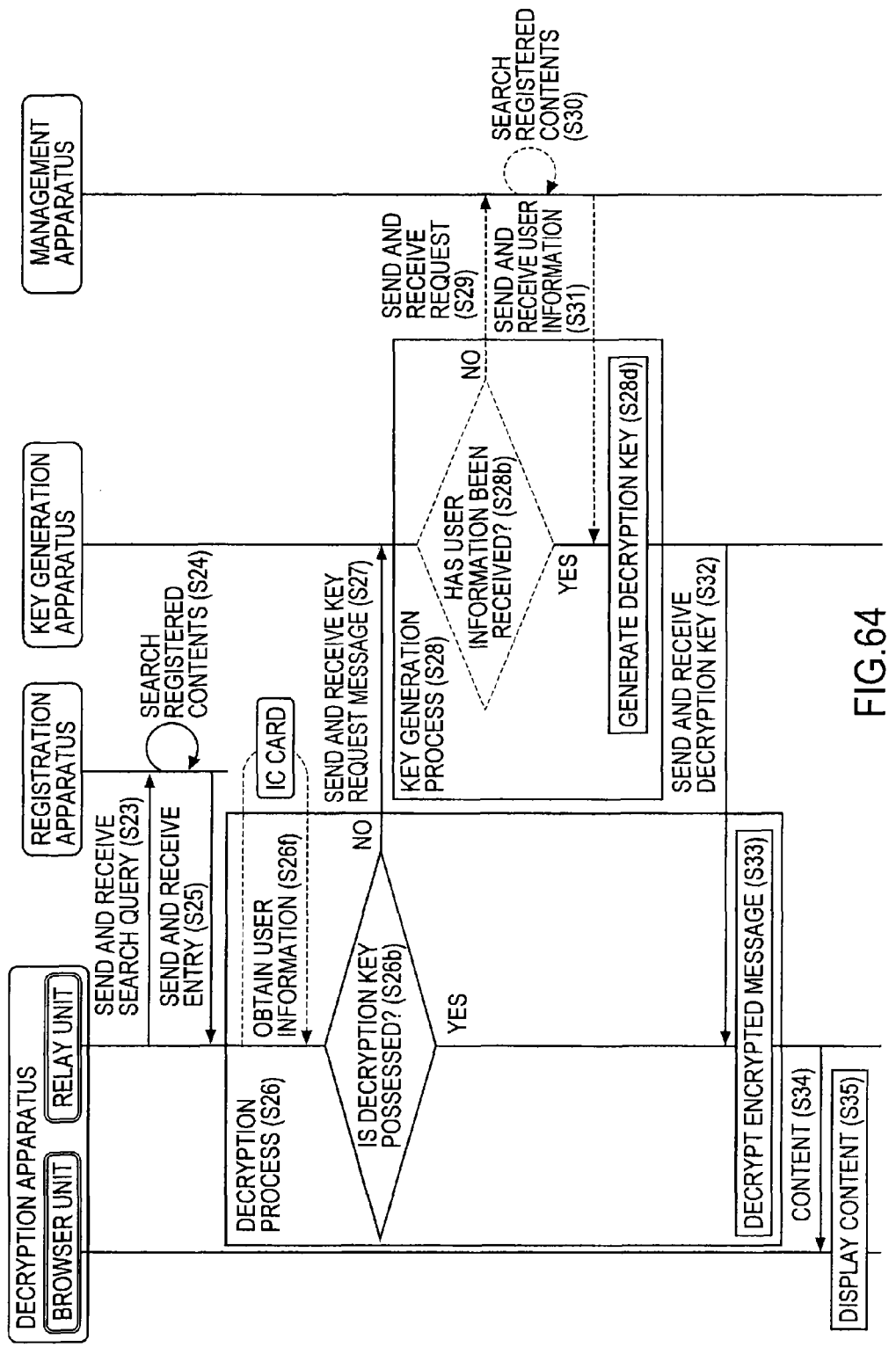
FIG. 64 is a view (No. 4) showing the processing procedure of the cryptographic communication method according to each embodiment in the third aspect.
Figure 65:
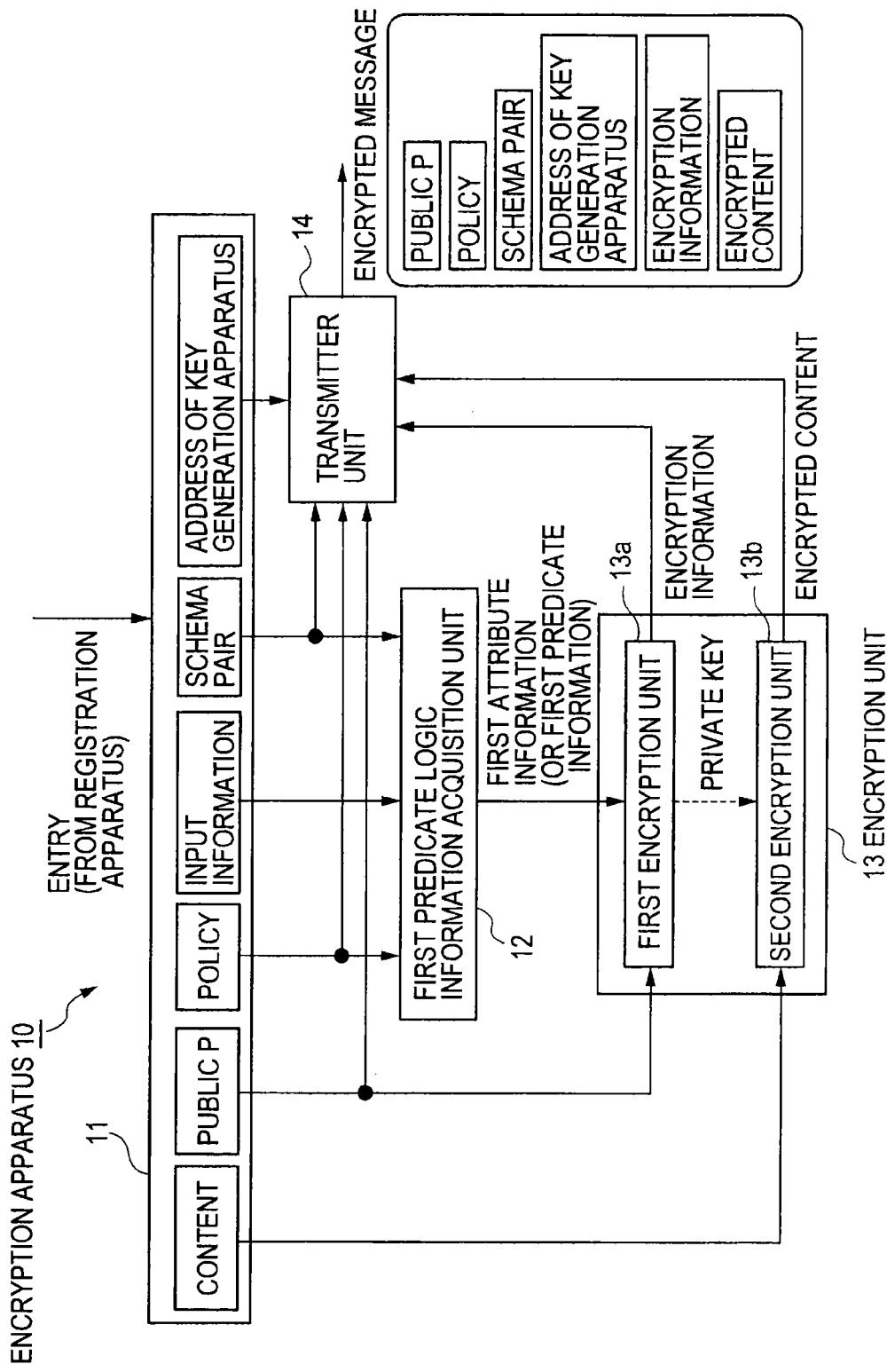
FIG. 65 is a functional block diagram of an encryption apparatus according to a first embodiment of the third aspect.
Figure 66:
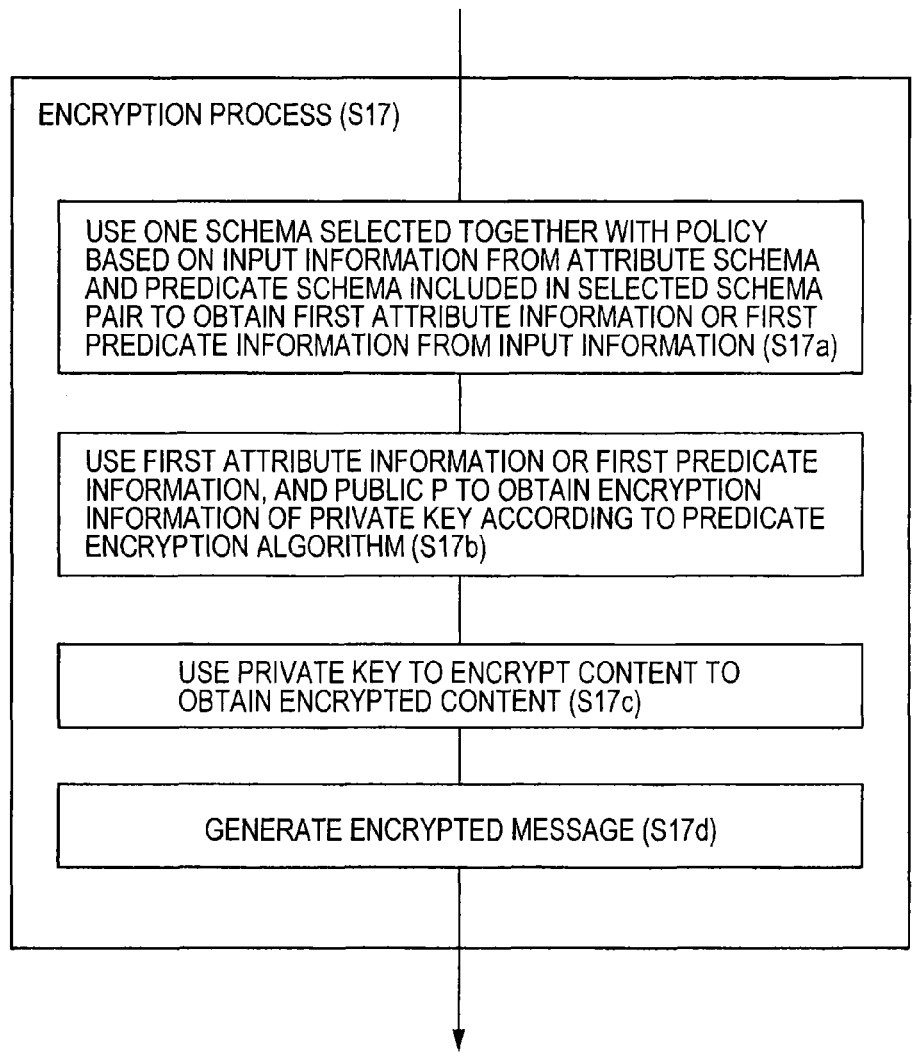
FIG. 66 is a view showing a detailed processing procedure of an encryption process according to the first embodiment of the third aspect.
Figure 67:
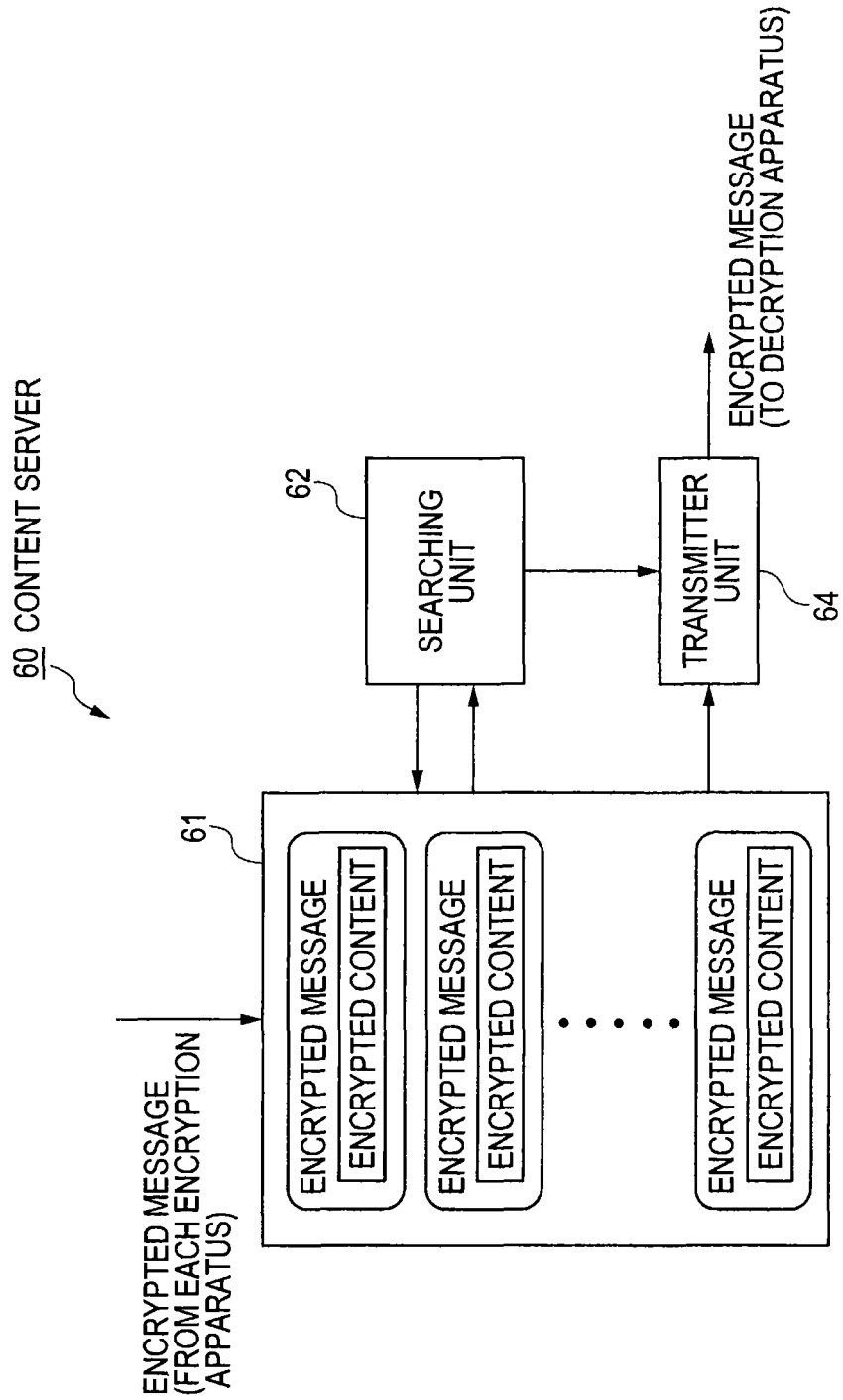
FIG. 67 is a functional block diagram of a content server according to the first embodiment of the third aspect.
Figure 68:
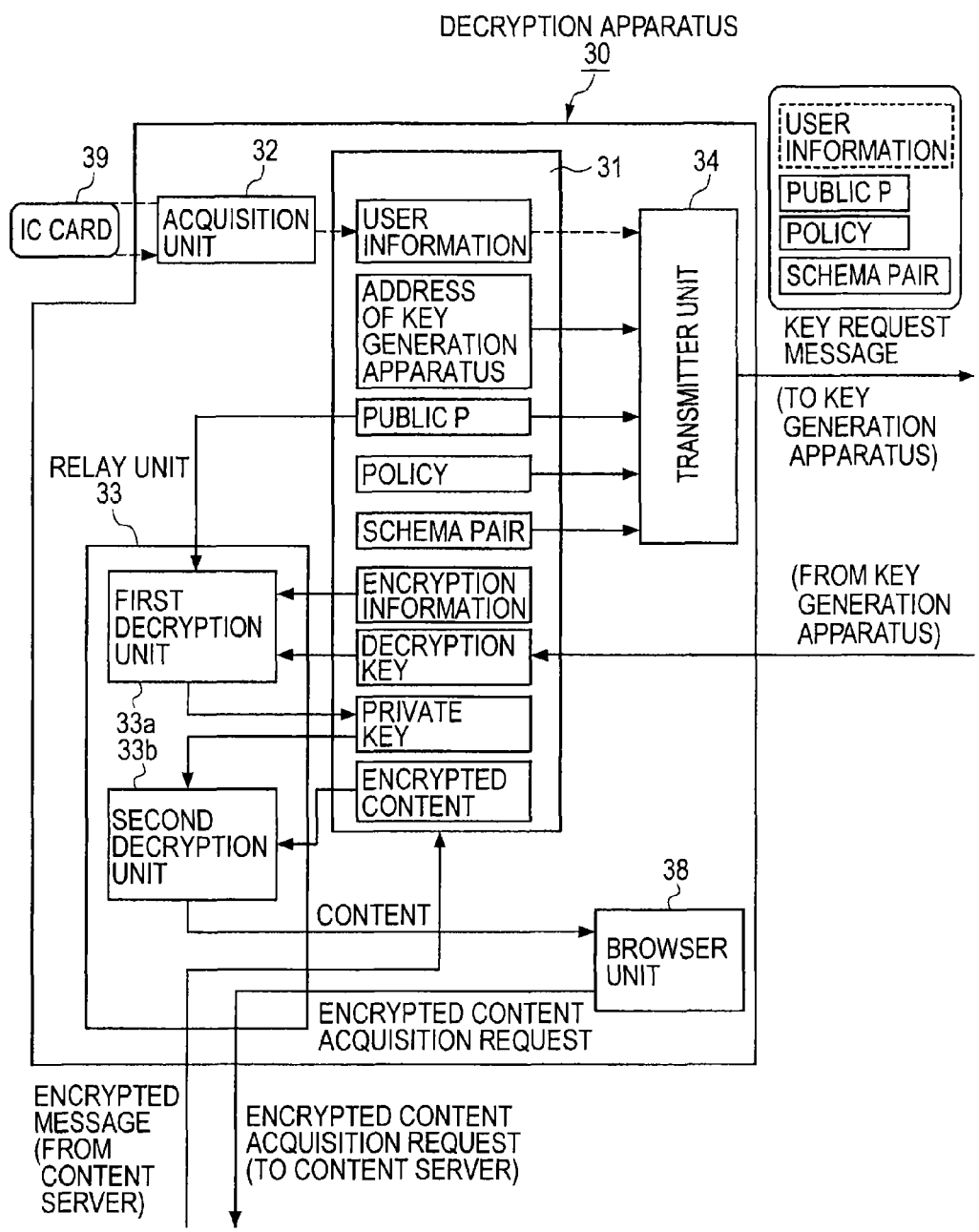
FIG. 68 is a functional block diagram of a decryption apparatus according to the first embodiment of the third aspect.
Figure 69:
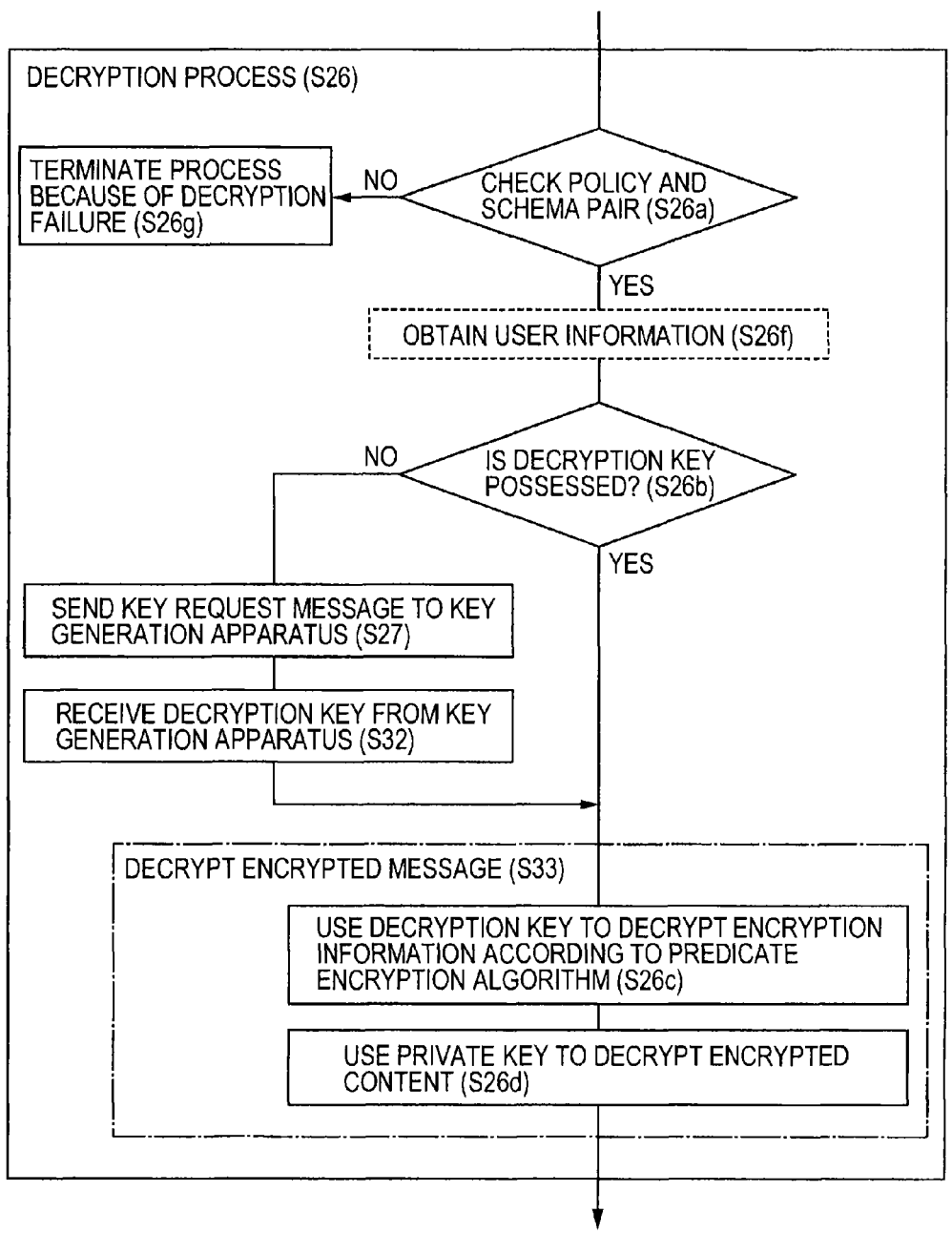
FIG. 69 is a view showing a detailed processing procedure of a second decryption process according to the first embodiment of the third aspect.
Figure 70:
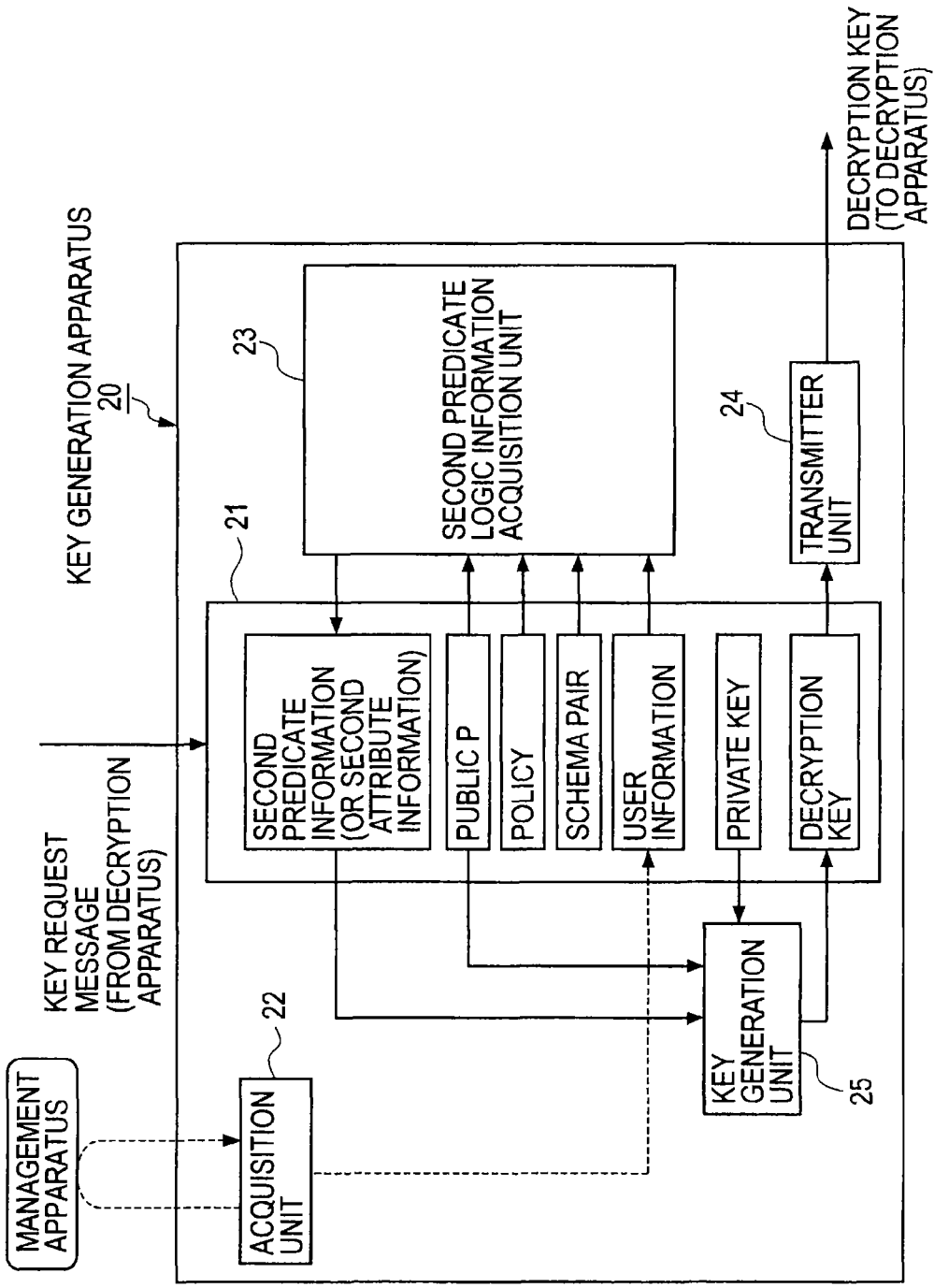
FIG. 70 is a functional block diagram of a key generation apparatus according to the first embodiment of the third aspect.
Figure 71:
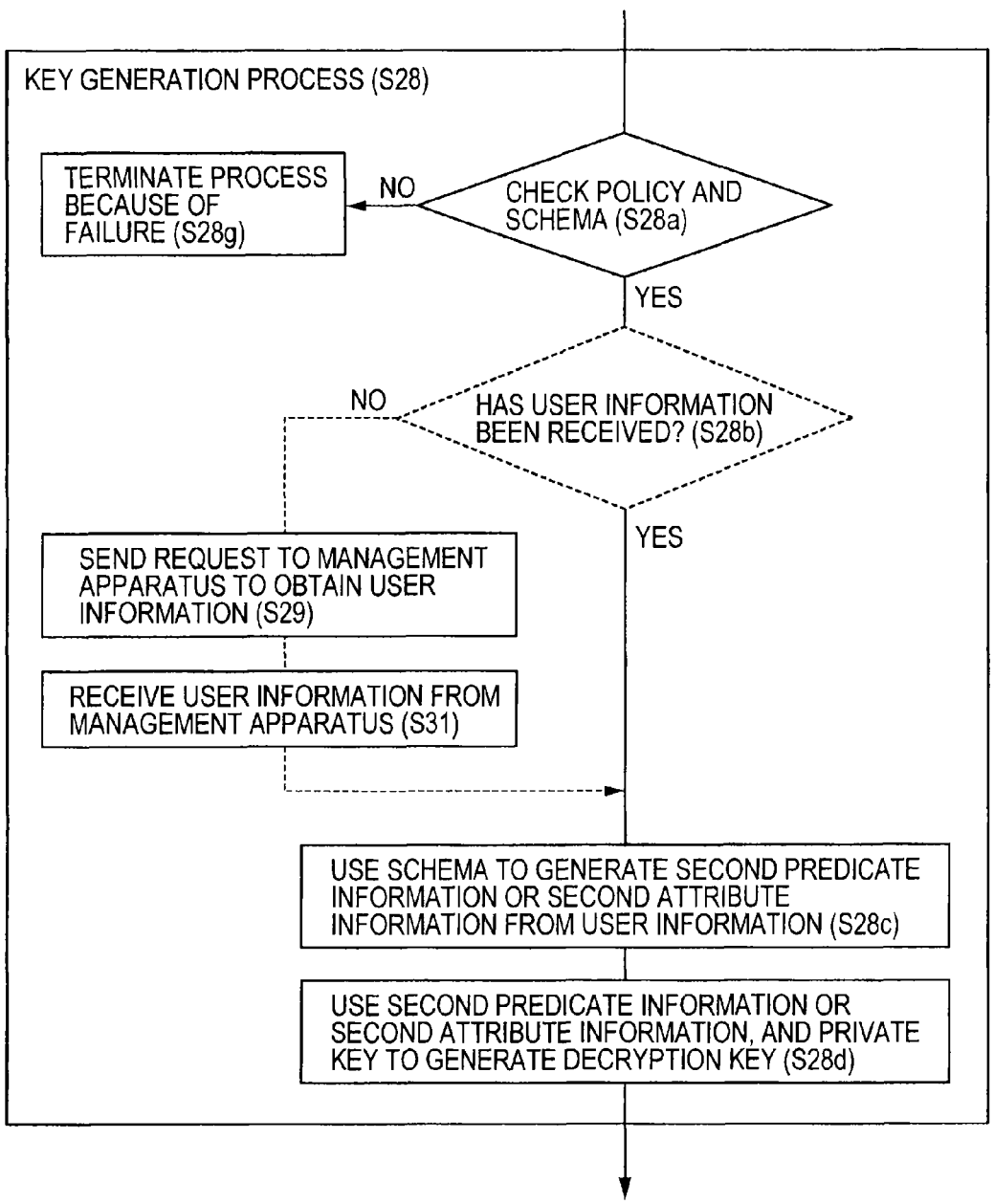
FIG. 71 is a view showing a detailed processing procedure of a key generation process according to the first embodiment of the third aspect.
Figure 72:
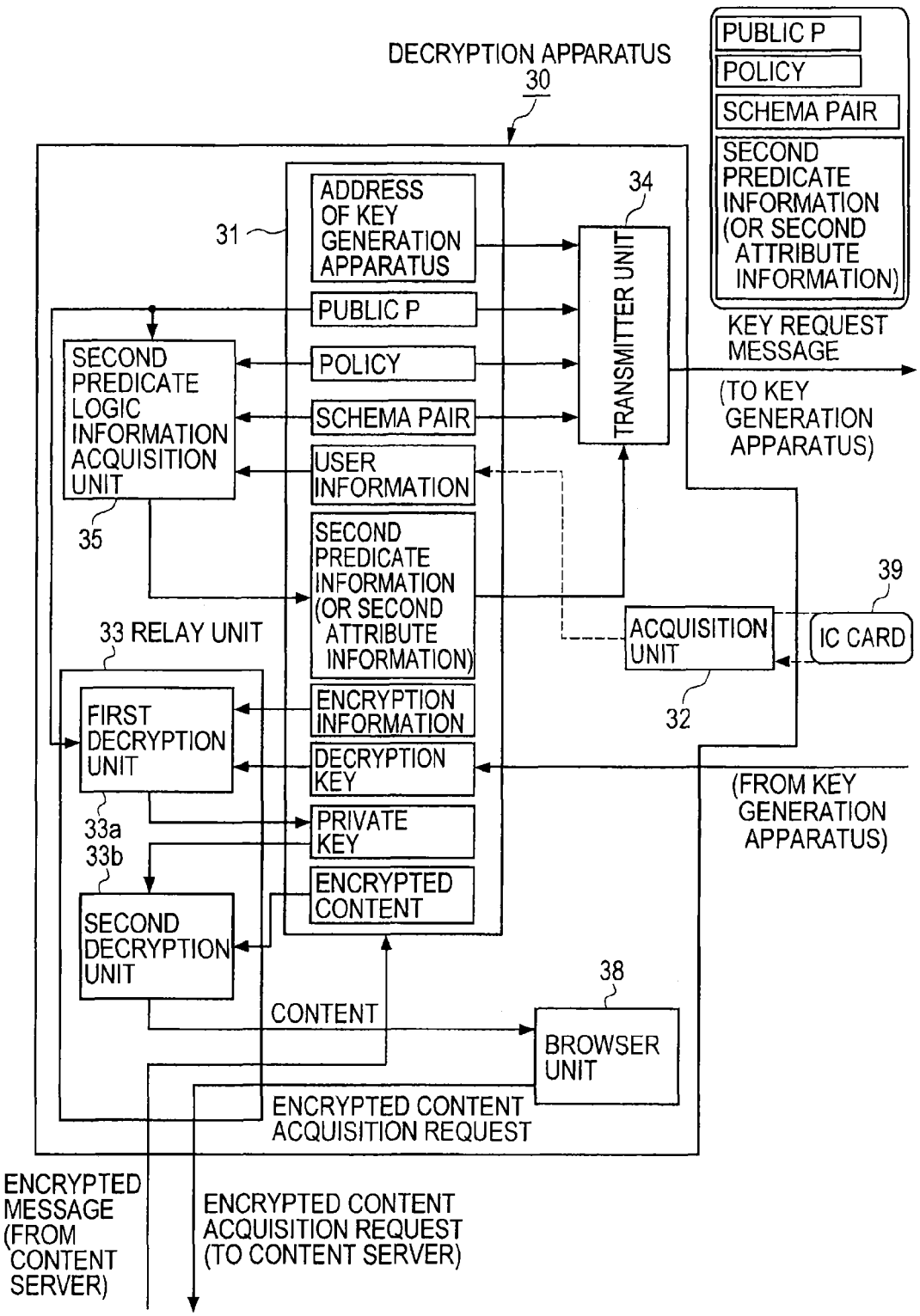
FIG. 72 is a functional block diagram of a decryption apparatus according to a second embodiment of the third aspect.
Figure 73:
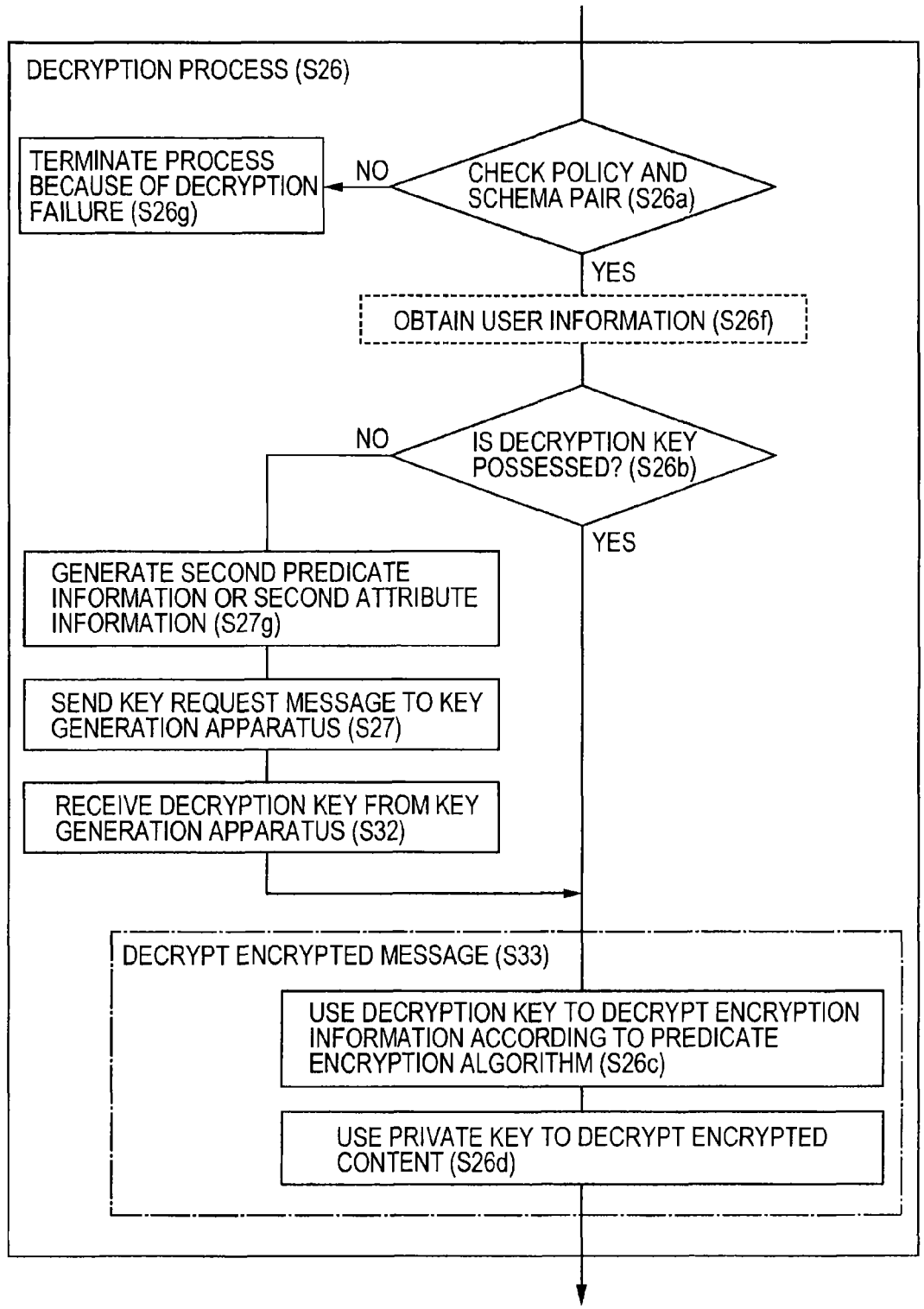
FIG. 73 is a view showing a detailed processing procedure of a decryption process according to the second embodiment of the third aspect.
Figure 74:
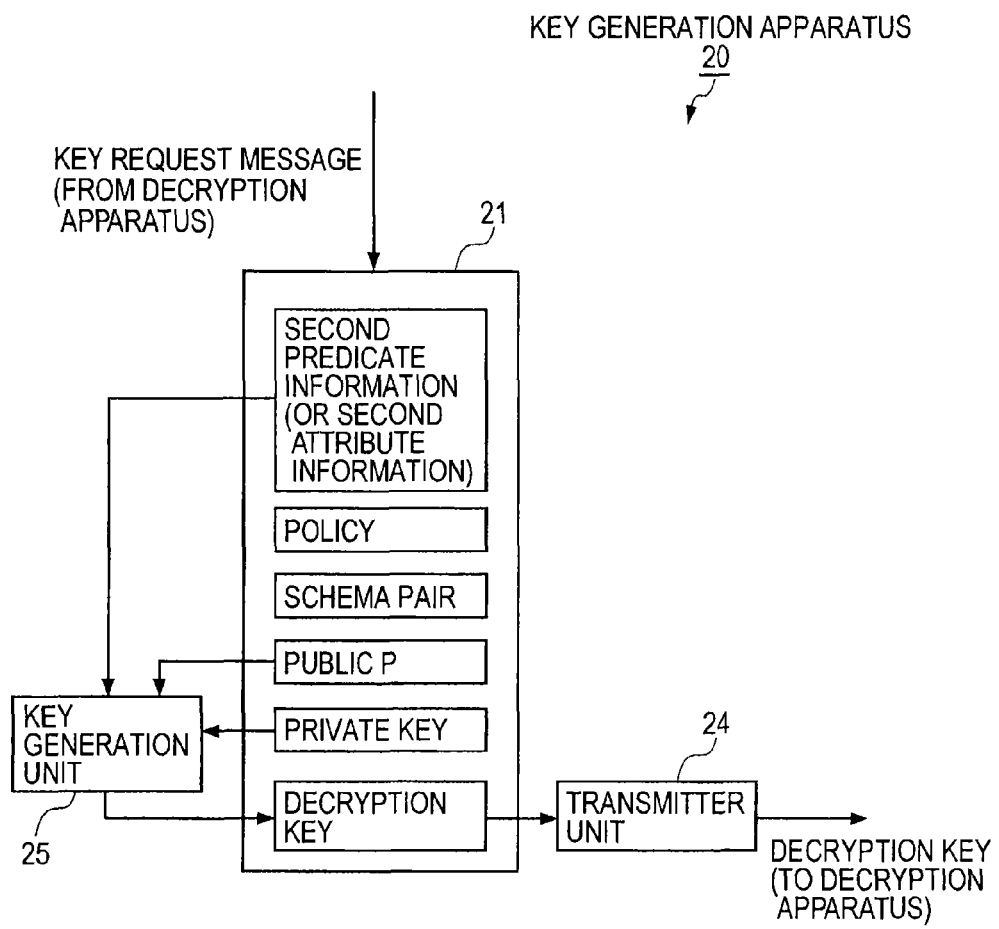
FIG. 74 is a functional block diagram of a key generation apparatus according to the second embodiment of the third aspect.
Figure 75:
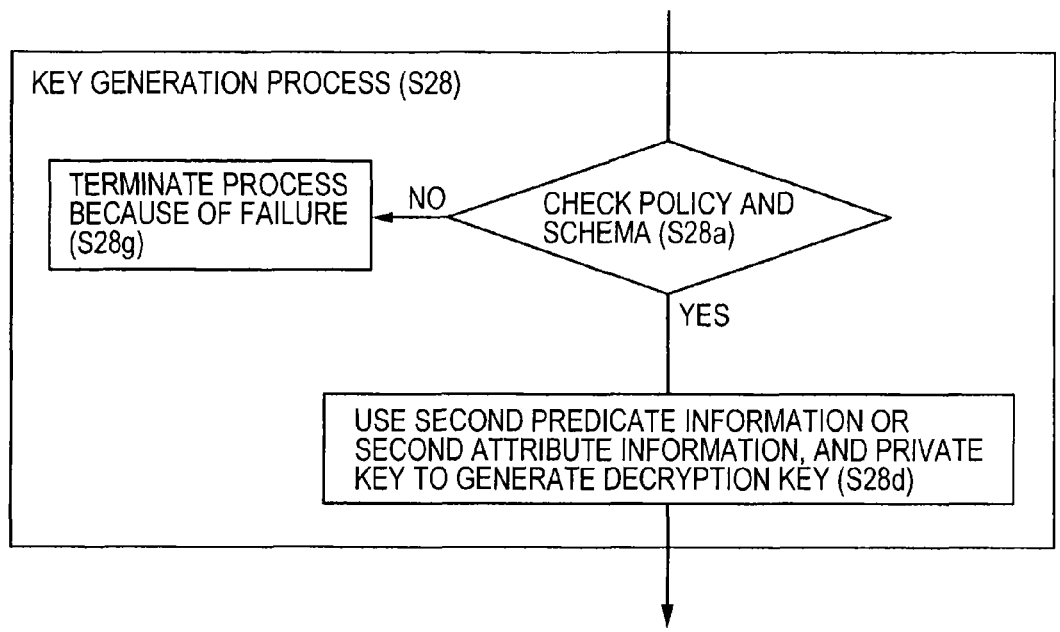
FIG. 75 is a view showing a detailed processing procedure of a key generation process according to the second embodiment of the third aspect.
Figure 76:
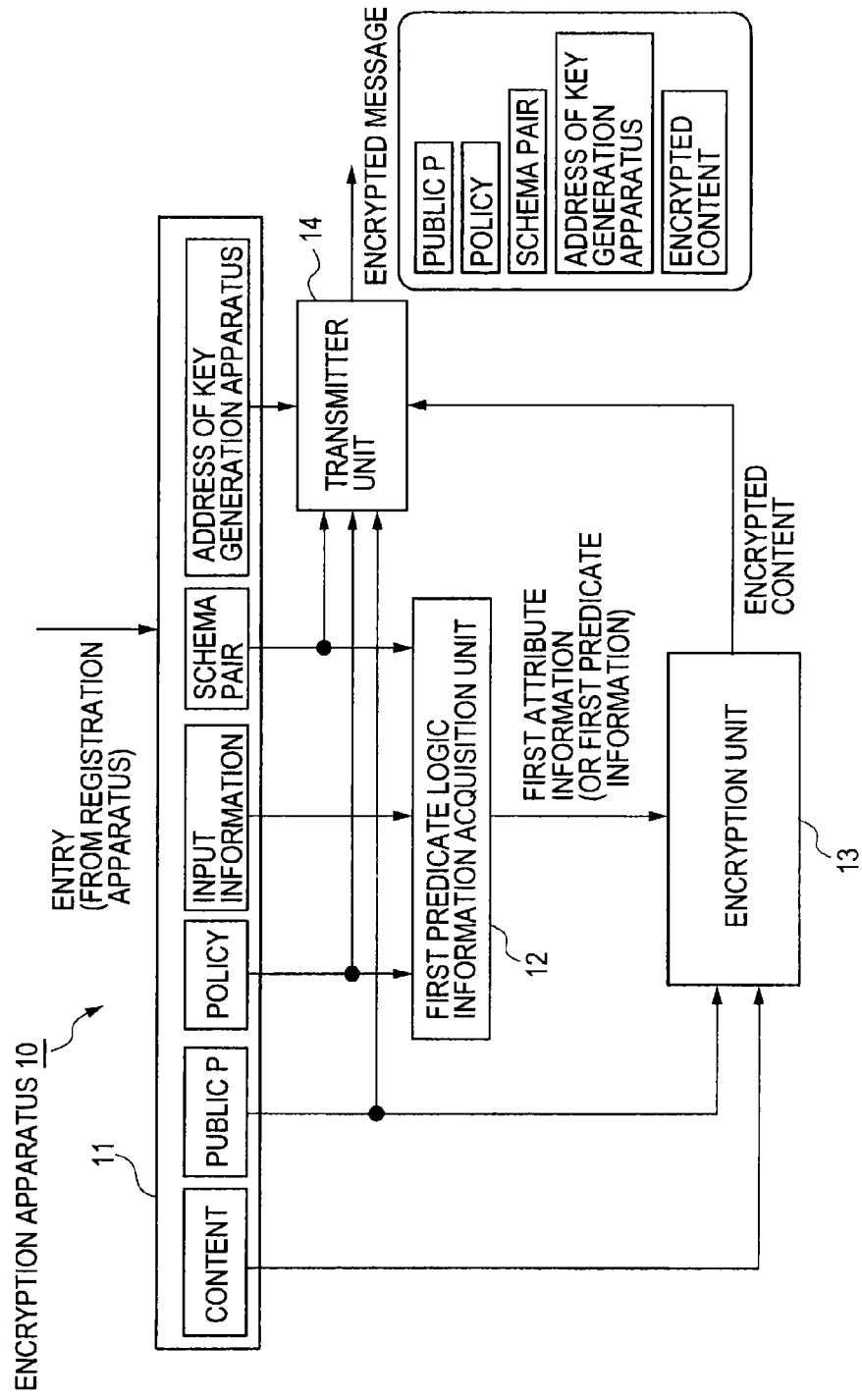
FIG. 76 is a functional block diagram of an encryption apparatus according to a third embodiment of the third aspect.
Figure 77:
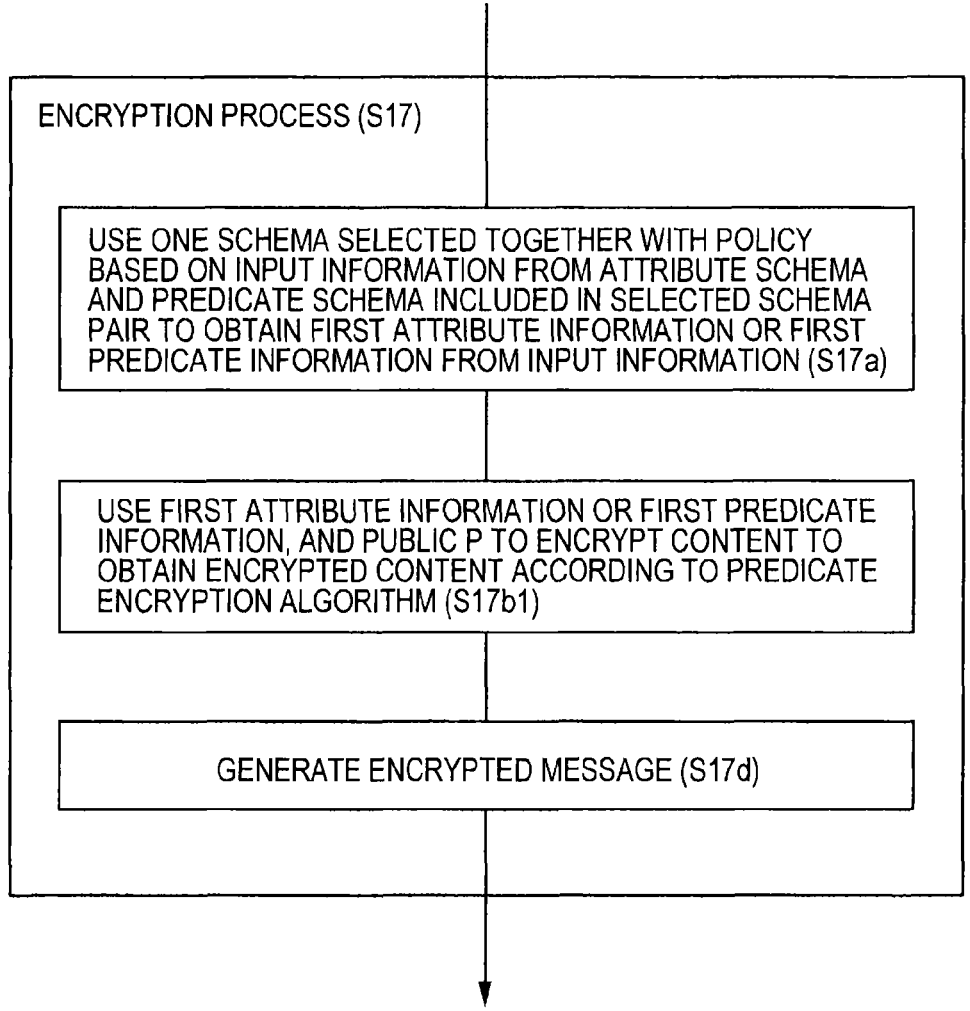
FIG. 77 is a view showing a detailed processing procedure of an encryption process according to the third embodiment of the third aspect.
Figure 78:
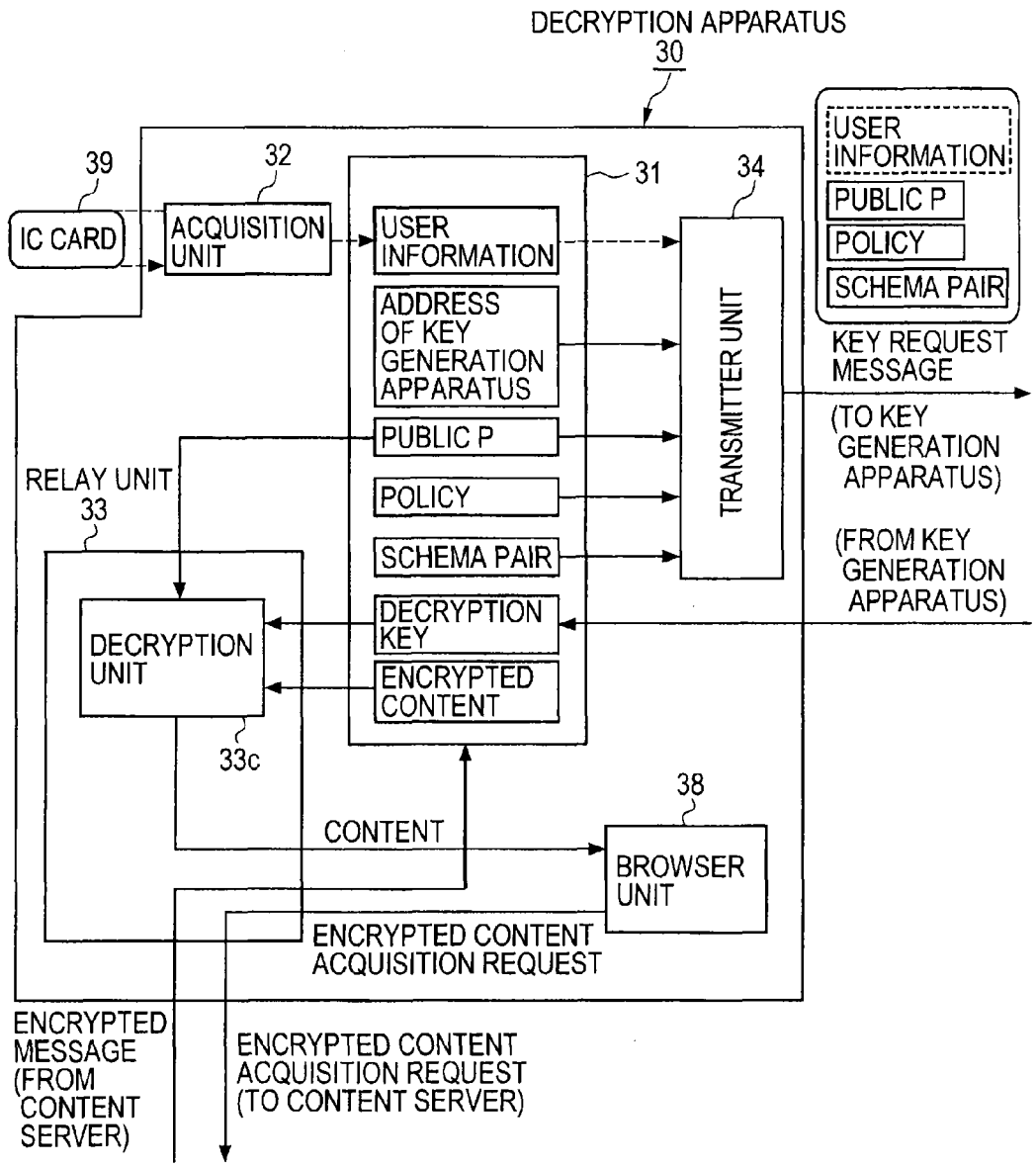
FIG. 78 is a functional block diagram of a decryption apparatus according to the third embodiment of the third aspect.
Figure 79:
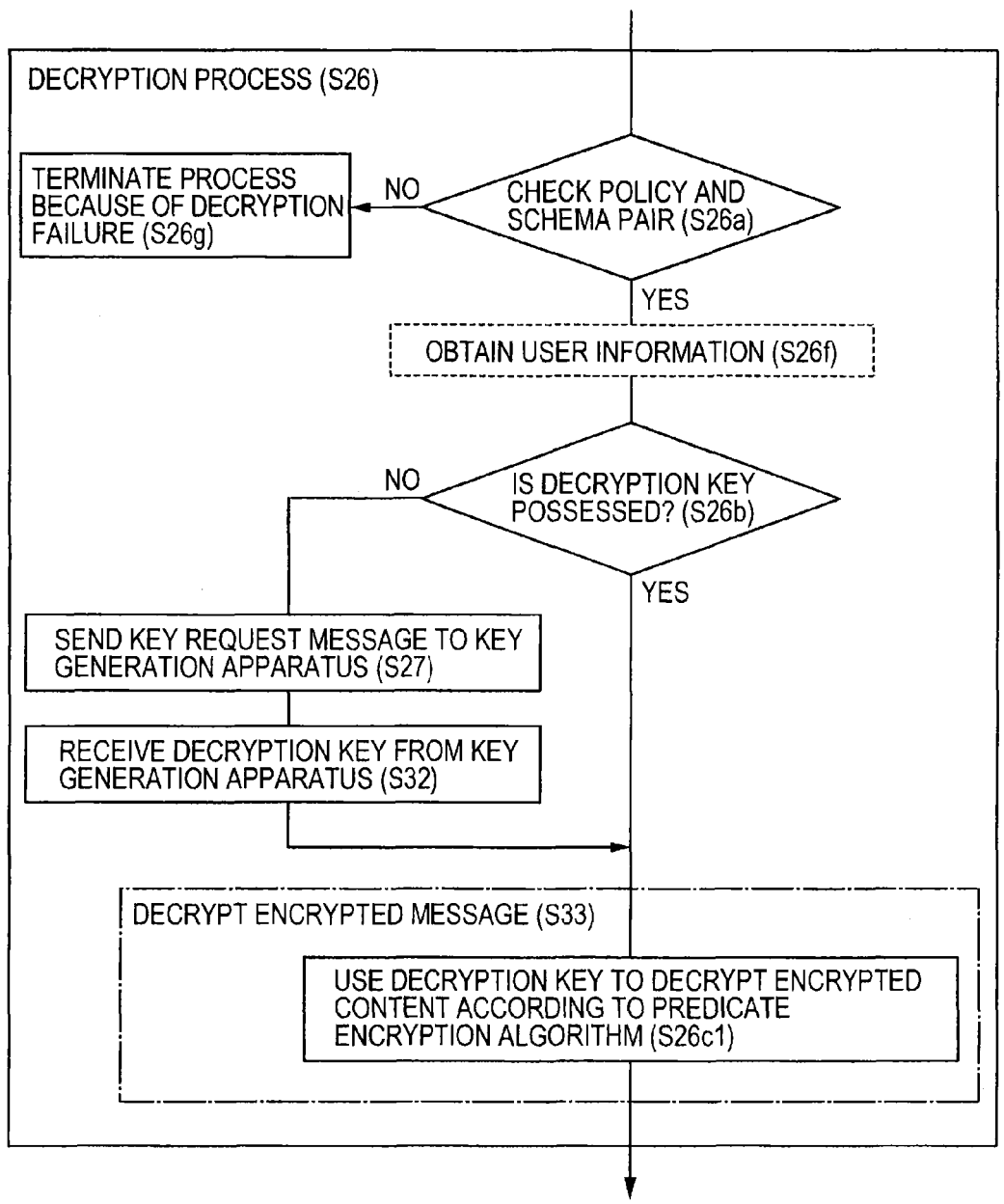
FIG. 79 is a view showing a detailed processing procedure of a decryption process according to the third embodiment of the third aspect.

As shown in FIG. 28, a cryptographic system 1 according to the second aspect includes a plurality of client apparatuses 10, 30-1, and 30-2, one or a plurality of key generation apparatuses 20, one or a plurality of user information management apparatuses 40 (hereafter each called a management apparatus), conversion rule information pair management apparatuses 50 (hereafter each called a registration apparatus), one or a plurality of maintenance apparatuses 80, and one or a plurality of authentication apparatuses 90. These apparatuses can communicate with each other through a communication network 5, such as the Internet.

The client apparatuses function as encryption apparatuses or decryption apparatuses based on their processing functions. In the light of their functions, the client apparatuses are called encryption apparatuses 10 or decryption apparatuses. The decryption apparatuses include a first decryption apparatus 30-1 serving as an apparatus for exchanging an encrypted message, described later, with the encryption apparatus 10 and a second decryption apparatus 30-2 that does not perform such an exchange. The cryptographic system 1 according to the second aspect may include client apparatuses that function only as encryption apparatuses and/or client apparatuses that function only as decryption apparatuses.

In the cryptographic system 1 according to the second aspect, encryption and decryption are performed using predicate encryption. In the second aspect of the present invention, the predicate encryption algorithm to be used is not limited, and the predicate encryption algorithm disclosed in Non-patent literature 2, for example, may be used. In the first embodiment of the second aspect, a predicate encryption algorithm of KEM (the key encapsulation mechanism) type will be used.

A cryptographic communication method used in the cryptographic system 1 according to the second aspect will be described with reference to FIGS. 29, 30, 31, 32, 34, 36, 38, 40, and 41. See FIGS. 33, 35, 37, and 39 for the functional structure of each apparatus.

<<Preparation Process>>

The entire description of <<the preparation process>> in the first embodiment of the first aspect according to the present invention is incorporated here and a description of <<the preparation process>> is omitted. See FIG. 29 for the preparation process, FIGS. 11 to 13 for schema pairs, and FIG. 14 for policy lists. The description of the preparation process ends here.

<<Encryption Process>>

Under the control of a controller unit, not shown, a transmitter unit 14 of the encryption apparatus 10 sends a search query to the registration apparatus 50, and the receiving unit of the registration apparatus 50 receives the search query (step S14). The searching unit of the registration apparatus 50 searches some or all of the entries registered in the storage unit of the registration apparatus 50 and chooses one entry (step S15). The transmitter unit of the registration apparatus 50 sends the entry to the encryption apparatus 10, and a receiver unit of the encryption apparatus 10 receives the entry (step S16). This entry includes the address of the key generation apparatus, the public parameter of the key generation apparatus, the policy list that can be used by the key generation apparatus, and the schema list that can be used by the key generation apparatus. The received entry is stored in a memory 11 of the encryption apparatus 10.

When the encryption apparatus 10 has the public parameter, schema list, policy list, and address of each key generation apparatus 20 in advance, the processes of steps S14 to S16 are omitted. It should be noted that the cryptographic system 1 may have no registration apparatus 50.

A first predicate logic information acquisition unit 12 of the encryption apparatus 10 reads the input information, the policy, and the schemas from the memory 11 and obtains attribute information (hereafter called first attribute information) and predicate information (hereafter called first predicate information) (step S17a). Details of this process will be described below with reference to FIGS. 12 and 13.

When the schema list has a plurality of schema pairs, one schema pair is selected based on the usage or the like. The user of the encryption apparatus 10 may select a schema pair and input designation information thereof. Alternatively, the first predicate logic information acquisition unit 12 may select a schema pair according to a predetermined rule.

According to whether the input information is attribute designation information or predicate designation information, one of the schemas is selected together with the policy. The user of the encryption apparatus 10 may select the policy and one of the schemas and input designation information thereof. Alternatively, the first predicate logic information acquisition unit 12 may select the policy and one of the schemas according to a predetermined rule. When only one type of policy is prepared in the key generation apparatus 20, one schema of the schema pair is selected according to the policy. If the selected schema does not correspond to the type of the input information, a schema pair needs to be selected again from the schema list or an entry needs to be provided by the registration apparatus 50 again.

The input information may be information inputted by the user of the encryption apparatus 10 or information acquired by an acquisition unit (not shown) of the encryption apparatus 10 from a storage medium such as an IC card 39.

Then, the first predicate logic information acquisition unit 12 uses the schema selected from the schema pair according to the policy to obtain the first attribute information or the first predicate information from the input information. When the policy is Key_Policy and the selected schema is an attribute schema, the first attribute information is obtained. When the policy is Cipher_Text_Policy and the selected schema is a predicate schema, the first predicate information is obtained. The first attribute information and the first predicate information are one or a plurality of vector information having elements of the finite field $F_q$ as components in the first embodiment according to the second aspect (see FIGS. 11 to 13). The schema is used to extract or arrange necessary attribute values from the input information.

Next, an encryption unit 13 of the encryption apparatus 10 uses the first attribute information $v=(v_1, \ldots, v_n)$ or the first predicate information $w=(w_1, \ldots, w_n)$, an orthogonal basis B (substantial public key) included in the public parameter read from the memory 11, and plaintext M to obtain a common key K, encryption information $C_1$, and ciphertext $C_2$ (steps S17b and S17c). Details of these processes will be described below. When the first embodiment of the second aspect is dedicated to the delivery of the common key K, it is not necessary to generate the ciphertext $C_2$.

A first encryption unit 13a generates random numbers r and ρ which are elements of the finite field Fq according to the predicate encryption algorithm, specifies the common key K as shown by Expression (7), and obtains the encryption information $C_1$ according to Expression (8) (step S17b), where H indicates, for example, a hash function. In this example, the first attribute information v is used. To use the first predicate information, v needs to be replaced with w in Expression (8). In this example, the encryption information $C_1$ corresponds to ρ used to generate the common key K. The encryption information $C_1$ may correspond to the common key K.

Next, the second encryption unit 13b uses the common key K and the plaintext M to obtain the ciphertext $C_2$ according to Expression (9) (step S17c). An encryption method $Enc_k$ that uses the private key can be a known method. For example, it may be the method disclosed in Non-patent literature 1. As described earlier, when the first embodiment of the second aspect is dedicated to the delivery of the common key K, the process of step S17c is omitted. In other words, the encryption apparatus 10 has even the function of the second encryption unit 13b but does not perform the process of step S17c.

Next, under the control of the controller unit, the transmitter unit 14 of the encryption apparatus 10 generates an encrypted message that includes the encryption information $C_1$ and the ciphertext $C_2$ (if necessary), together with the schema pair, the policy, the public parameter, and the address of the key generation apparatus read from the memory 11 (step S17d). The transmitter unit 14 of the encryption apparatus 10 then sends the encrypted message to the first decryption apparatus 30-1, and a receiver unit of the first decryption apparatus 30-1 receives the encrypted message (step S18). The encryption apparatus 10 is allowed to send an encrypted message to a plurality of first decryption apparatuses 30-1.

The description of <<the encryption process>> ends here.

<<First Decryption Process>>

Under the control of a controller unit, not shown, a transmitter unit 34 of the first decryption apparatus 30-1 sends a search query that includes the address of the key generation apparatus, the address being included in the encrypted message, to the registration apparatus 50, and the receiving unit of the registration apparatus 50 receives the search query (step S19). The searching unit of the registration apparatus 50 searches for the entry of the key generation apparatus specified by the address and selects it (step S20). The transmitter unit of the registration apparatus 50 sends the entry of the search result to the first decryption apparatus 30-1, and the receiver unit of the first decryption apparatus 30-1 receives the entry (step S21). This entry includes the address of the key generation apparatus, the public parameter of the key generation apparatus, the policy list that can be used by the key generation apparatus, and the schema list that can be used by the key generation apparatus. The received entry is stored in a memory 31 of the first decryption apparatus 30-1.

When the first decryption apparatus 30-1 has the public parameter, schema list, policy list, and address of each key generation apparatus 20 in advance, the processes of steps S19 to S21 are omitted. In that case, the first decryption apparatus 30-1 searches the memory 31 for the entry of the key generation apparatus corresponding to the address included in the encrypted message and retrieves it.

Under the control of the controller unit, a verification unit (not shown) of the first decryption apparatus 30-1 verifies that the schema pair and the policy included in the encrypted message are included in the schema list and the policy list included in the entry obtained from the registration apparatus 50 (step S22a). If this verification fails, the process ends with a decryption processing failure (step S22g).

When the verification succeeds, an acquisition unit 32 of the first decryption apparatus 30-1 reads the attribute designation information or the predicate designation information corresponding to the user of the first decryption apparatus 30-1 from a storage medium such as the IC card 39 (step S22f). Whether the attribute designation information or the predicate designation information is read depends on the policy included in the encrypted message. More specifically, the read designation information corresponds to the content of the policy identifying one schema paired with the other schema identified by the policy included in the encrypted message. When the policy is Cipher_Text_Policy, the acquisition unit 32 reads the attribute designation information from the storage medium. When the policy is Key_Policy, the acquisition unit 32 reads the predicate designation information from the storage medium. The read designation information is hereafter called user information. The acquisition unit 32 of the first decryption apparatus 30-1 may read from the management apparatus 40 the attribute designation information or the predicate designation information corresponding to the user of the first decryption apparatus 30-1, in the same way as in <<a user information acquisition process>> in the key generation apparatus 20, described later. In the first embodiment of the second aspect, the process of step S22f may be omitted. When the first decryption apparatus 30-1 has the attribute designation information and the predicate designation information corresponding to the user in advance, either the attribute designation information or the predicate designation information serves as user information, according to the policy.

Next, the verification unit of the first decryption apparatus 30-1 verifies that the decryption apparatus 30 has the decryption key to be used to decrypt the encryption information included in the encryption message (step S22b).

The first decryption apparatus 30-1 stores a decryption key table in the memory 31. In the decryption key table, as shown in FIG. 15, for example, the identifier of each key generation apparatus is associated with the public parameter, the schema pair, the decryption key target, the predicate designation information, and the decryption key. The verification unit verifies that the decryption apparatus 30 has the decryption key corresponding to the identifier of the key generation apparatus determined from the address included in the encrypted message, to the public parameter, to the schema pair, and to the decryption key target (corresponding to the content of the policy identifying one schema paired with the other schema identified by the policy included in the encrypted message). When the decryption apparatus 30 has the decryption key, the process of step S29 is performed. If the decryption apparatus 30 does not have the decryption key, the process of step S23 is performed.

The description of <<the decryption process>> is temporarily halted here and <<a key generation process>> will be described below.

If the first decryption apparatus 30-1 does not have the decryption key, the transmitter unit 34 of the first decryption apparatus 30-1 generates, under the control of the controller unit, a key request message that includes the public parameter, the policy, the schema pair, the user information (if any), and the authentication information, all of these items being read from the memory 31. The authentication information includes, for example, the ID of the user and a password. The transmitter unit 34 of the first decryption apparatus 30-1 sends the key request message to the key generation apparatus having the address read from the memory 31, and the receiver unit of the key generation apparatus 20 receives the key request message (step S23). The received key request message is stored in a memory 21 of the key generation apparatus 20.

Under the control of a controller unit, a verification unit (not shown) of the key generation apparatus 20 verifies that the schema pair and the policy included in the key request message are included in the schema list and the policy list included in the entry owned by the key generation apparatus 20 (for example, the entry generated in step S1) and that the public parameter included in the key request message is identical to the public parameter of the key generation apparatus 20 (step S24a). If this verification fails, the process ends with a key generation process failure (step S24g). When the authentication information is included in the key request message, the authentication information is also verified in the process of step S24a. The key generation apparatus 20 stores an authentication table in the memory 21. In the authentication table, as shown in FIG. 16, for example, each user ID is associated with a password. The verification unit verifies that the user ID and the password included in the key request message are identical to the user ID and the password included in the authentication table. If the verification fails, the process of step S24g is performed.

When this verification succeeds, the verification unit of the key generation apparatus 20 verifies that the key request message includes the user information (step S24b). When the key request message includes the user information, the process of step S24c is performed. If the key request message does not include the user information, the process of step S25 is performed. When a method is employed in which a key request message always includes user information, the process of step S24b and <<a user information acquisition process>>, described later, are unnecessary.

The description of <<the key generation process>> is temporarily halted here and <<the user information acquisition process>> will be described below.

The transmitter unit 24 of the key generation apparatus 20 sends a request that includes the policy and the authentication information (if any) included in the key request message to the management apparatus 40, and the management apparatus 40 receives the request (step S25). The received request is stored in a memory of the management apparatus 40.

The management apparatus 40 stores an authentication table in the memory. In the same way as in the authentication table described above, the user ID is associated with the password in this authentication table (see FIG. 16). A verification unit (not shown) of the management apparatus 40 verifies that the user ID and the password included in the request are identical to the user ID and the password included in the authentication table.

When this verification succeeds, a searching unit (not shown) of the management apparatus 40 searches a user information table stored in the memory for the attribute designation information or the predicate designation information according to the policy included in the request (step S26). The user information table includes, for example, a first table formed of each user ID, and an attribute name and attribute designation information associated with the user ID, and a second table formed of the user ID and predicate designation information associated with the user ID (see FIG. 17). Whether the attribute designation information or the predicate designation information is read is determined by the policy included in the request. More specifically, the read information corresponds to the content of the policy identifying one schema paired with the other schema identified by the policy included in the request. When the policy is Cipher_Text_Policy, the searching unit reads the attribute designation information corresponding to the user ID included in the request from the first table. When the policy is Key_Policy, the searching unit reads the predicate designation information corresponding to the user ID included in the request from the second table. The read designation information is hereafter called user information.

Under the control of a controller unit, a transmitter unit of the management apparatus 40 sends the user information to the key generation apparatus 20, and the receiver unit of the key generation apparatus 20 receives the user information (step S27). The received user information is stored in the memory 21 of the key generation apparatus 20.

The description of <<the user information acquisition process>> ends here, and the description of <<the key generation process>> will be resumed.

When the key generation apparatus 20 already has the user information or receives the user information through the user information acquisition process (step S27), a second predicate logic information acquisition unit 23 of the key generation apparatus 20 reads the policy, the schema pair, the public parameter, and the user information from the memory 21, and obtains attribute information (hereafter called second attribute information) or predicate information (second predicate information) from the user information (step S24c). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the first embodiment of the second aspect, the second attribute information and the second predicate information are one or a plurality of vector information having elements of the finite field $F_q$ as components (see FIGS. 11 to 13). The schema is used to extract and arrange necessary attribute values from the input information.

Next, a key generation unit 25 of the key generation apparatus 20 generates a random number α that is an element of the finite field $F_q$, based on the public parameter q according to the predicate encryption algorithm, and uses the random number α, the second attribute information $v_{(p)}=(v_{(p)1}, \ldots, v_{(p)n})$ or the second predicate information $w_{(p)}=(w_{(p)1}, w_{(p)n})$ read from the memory 21, and a private key B* of the key generation apparatus to obtain a decryption key R according to Expression (10) (step S24d). The second predicate information $w_{(p)}$ is used in this example because the input information used in the encryption process is the attribute designation information. When the input information is the predicate designation information, the second attribute information $v_{(p)}$ is used. Therefore, $w_{(p)}$ needs to be replaced with $v_{(p)}$ in Expression (10), described earlier.

Next, under the control of the controller unit, the transmitter unit 24 of the key generation apparatus 20 sends the decryption key R to the first decryption apparatus 30-1, and the receiver unit of the first decryption apparatus 30-1 receives the decryption key R (step S28). The received decryption key R is stored in the memory 31 of the first decryption apparatus 30-1.

The description of <<the key generation process>> ends here, and the description of <<the decryption process>> will be resumed.

When the first decryption apparatus 30-1 already has the decryption key or receives the decryption key through the key generation process (step S28), a decryption unit 33 of the first decryption apparatus 30-1 reads the public parameter, the decryption key R, the encryption information $C_1$, and the ciphertext $C_2$ (if necessary) from the memory 31, and obtains the common key K and the plaintext M (if necessary) (step S29).

Details of the process in step S29 will be described below. A first decryption unit 33a reads the public parameter, the decryption key R, and the encryption information $C_1$ from the memory 31, and obtains $e(C_1, R)$ according to the predicate encryption algorithm. As shown in Expression (11), described earlier, the calculation result depends on the result of the canonical inner product of the first attribute information v and the second predicate information $w_{(p)}$ taken out from the encryption information $C_1$ and the decryption key R according to bilinearity when the input information is the attribute designation information. When the input information is the predicate designation information, v needs to be replaced with $v_{(p)}$ and $w_{(p)}$ needs to be replaced with w in Expression (11), described earlier. The calculation result depends on the result of the canonical inner product of the first predicate information w and the second attribute information $v_{(p)}$ taken out from the encryption information $C_1$ and the decryption key R according to bilinearity. In Expression (11), $e(b_i, b_i^*)$ is defined as shown in Expression (12), described earlier, where $\delta_{ij}$ is the Kronecker's delta symbol.

Therefore, when the canonical inner product of the first attribute information v and the second predicate information $w_{(p)}$ is zero (or when the canonical inner product of the first predicate information w and the second attribute information $v_{(p)}$ is zero), the result of calculation in Expression (11), $g_T^\rho$, is obtained. When the result of calculation, $g_T^\rho$, is obtained, the first decryption unit 33a of the first decryption apparatus 30-1 obtains the common key K, which is correct, according to Expression (7), described earlier (step S22c). When the canonical inner product of the first attribute information v and the second predicate information $w_{(p)}$ is not zero (or when the canonical inner product of the first predicate information w and the second attribute information $v_{(p)}$ is not zero), the first decryption unit 33a obtains an incorrect value according to Expression (7), described earlier. In this example, it is assumed that the hash function H is common to the system or is included in the public parameter. The encryption information $C_1$ corresponds to the information ρ used to generate the common key K in this example. When encryption information $C_1$ corresponds to the common key K, the result of calculation in Expression (11), described earlier, is the common key K (or incorrect value). In other words, an authorized user of the first decryption apparatus 30-1 has predicate designation information that gives the second predicate information $w_{(p)}$ which makes the canonical inner product with the first attribute information v zero, or attribute designation information that gives the second attribute information $v_{(p)}$ which makes the canonical inner product with the first predicate information w zero.

Then, a second decryption unit 33b uses the common key K and the ciphertext $C_2$ to calculate plaintext M according to Expression (13), described earlier (step S22d). A decryption method $Dec_K$ that uses the private key corresponds to the encryption method $Enc_K$. As described earlier, when the first embodiment of the second aspect is dedicated to the delivery of the common key K, the process of step S22d is omitted. More specifically, even if the first decryption apparatus 30-1 has the function of the second decryption unit 33b, it does not perform the process of step S22d.

If the result of calculation in Expression (11), described earlier, is an incorrect value, the correct plaintext M cannot be obtained by Expression (13), described earlier.

The first decryption apparatus 30-1 may store the decryption key R in the decryption key table. In addition, the first decryption apparatus 30-1 may store the common key K in the decryption key table.

The description of <<the first decryption process>> ends here.

<<Transfer Process>>

A transfer unit 37 of the first decryption apparatus 30-1 transfers the encrypted message received from the encryption apparatus 10, to the second decryption apparatus 30-2, and a receiver unit of the second decryption apparatus 30-2 receives the encrypted message (step S30). The decryption apparatus to which the encrypted message is transferred is not limited to the second decryption apparatus (decryption apparatus that does not exchange an encrypted message with the encryption apparatus) and may be another first decryption apparatus (decryption apparatus that exchanges an encrypted message with the encryption apparatus). For the convenience of description, the process of step S30 follows the process of step S29. The process of step S30, however, may be performed anytime after the first decryption apparatus 30-1 receives the encrypted message from the encryption apparatus 10.

The description of <<the transfer process>> ends here.

A second decryption process (that includes a key generation process and, if necessary, a user information acquisition process) performed by the second decryption apparatus 30-2 will be described below. This series of processing is substantially the same as the first decryption process. The second decryption apparatus 30-2 has the same functional structure as the first decryption apparatus 30-1 except that the transfer unit 37 is not necessarily required. Therefore, the same reference numerals are assigned to the same functional components.

<<Second Decryption Process>>

Under the control of a controller unit, not shown, a transmitter unit 34 of the second decryption apparatus 30-2 sends a search query that includes the address of the key generation apparatus, the address being included in the encrypted message, to the registration apparatus 50, and the receiving unit of the registration apparatus 50 receives the search query (step S31). The searching unit of the registration apparatus 50 searches for the entry of the key generation apparatus specified by the address and selects it (step S32). The transmitter unit of the registration apparatus 50 sends the entry of the search result to the second decryption apparatus 30-2, and the receiver unit of the second decryption apparatus 30-2 receives the entry (step S33). This entry includes the address of the key generation apparatus, the public parameter of the key generation apparatus, the policy list that can be used by the key generation apparatus, and the schema list that can be used by the key generation apparatus. The received entry is stored in a memory 31 of the second decryption apparatus 30-2.

When the second decryption apparatus 30-2 has the public parameter, schema list, policy list, and address of each key generation apparatus 20 in advance, the processes of steps S31 to S33 are omitted. In that case, the second decryption apparatus 30-2 searches the memory 31 for the entry of the key generation apparatus corresponding to the address included in the encrypted message and retrieves it.

Under the control of the controller unit, a verification unit (not shown) of the second decryption apparatus 30-2 verifies that the schema pair and the policy included in the encrypted message are included in the schema list and the policy list included in the entry obtained from the registration apparatus 50 (step S34a). If this verification fails, the process ends with a decryption processing failure (step S34g).

When the verification succeeds, an acquisition unit 32 of the second decryption apparatus 30-2 reads the attribute designation information or the predicate designation information corresponding to the user of the second decryption apparatus 30-2 from a storage medium such as the IC card 39 (step S34f). Whether the attribute designation information or the predicate designation information is read depends on the policy included in the encrypted message. More specifically, the read designation information corresponds to the content of the policy identifying one schema paired with the other schema identified by the policy included in the encrypted message. When the policy is Cipher_Text_Policy, the acquisition unit 32 reads the attribute designation information from the storage medium. When the policy is Key_Policy, the acquisition unit 32 reads the predicate designation information from the storage medium. The read designation information is hereafter called user information. The acquisition unit 32 of the second decryption apparatus 30-2 may read from the management apparatus 40 the attribute designation information or the predicate designation information corresponding to the user of the second decryption apparatus 30-2, in the same way as in <<a user information acquisition process>> in the key generation apparatus 20, described later. In the first embodiment of the second aspect, the process of step S34f may be omitted. When the second decryption apparatus 30-2 has the attribute designation information and the predicate designation information corresponding to the user in advance, either the attribute designation information or the predicate designation information serves as user information, according to the policy.

Next, the verification unit of the second decryption apparatus 30-2 verifies that the decryption apparatus 30 has the decryption key to be used to decrypt the encryption information included in the encryption message (step S34b).

The second decryption apparatus 30-2 stores a decryption key table in the memory 31. In the decryption key table, as shown in FIG. 15, for example, the identifier of each key generation apparatus is associated with the public parameter, the schema pair, the decryption key target, the predicate designation information, and the decryption key. The verification unit verifies that the decryption apparatus 30 has the decryption key corresponding to the identifier of the key generation apparatus determined from the address included in the encrypted message, to the public parameter, to the schema pair, and to the decryption key target (corresponding to the content of the policy identifying one schema paired with other the schema identified by the policy included in the encrypted message). When the decryption apparatus 30 has the decryption key, the process of step S41 is performed. If the decryption apparatus 30 does not have the decryption key, the process of step S35 is performed.

The description of <<the decryption process>> is temporarily halted here and <<a key generation process>> will be described below.

If the second decryption apparatus 30-2 does not have the decryption key, the transmitter unit 34 of the second decryption apparatus 30-2 generates, under the control of the controller unit, a key request message that includes the public parameter, the policy, the schema pair, the user information (if any), and the authentication information, all of these items being read from the memory 31. The authentication information includes, for example, the ID of the user and a password. The transmitter unit 34 of the second decryption apparatus 30-2 sends the key request message to the key generation apparatus having the address read from the memory 31, and the receiver unit of the key generation apparatus 20 receives the key request message (step S35). The received key request message is stored in a memory 21 of the key generation apparatus 20. This key generation apparatus 20 does not necessarily need to be the key generation apparatus 20 paired with the first decryption apparatus 30-1.

Under the control of a controller unit, a verification unit (not shown) of the key generation apparatus 20 verifies that the schema pair and the policy included in the key request message are included in the schema list and the policy list included in the entry owned by the key generation apparatus 20 (for example, the entry generated in step S1) and that the public parameter included in the key request message is identical to the public parameter of the key generation apparatus 20 (step S36a). If this verification fails, the process ends with a key generation process failure (step S36g).

When the authentication information is included in the key request message, the authentication information is also verified in the process of step S36a. The key generation apparatus 20 stores an authentication table in the memory 21. In the authentication table, as shown in FIG. 16, for example, each user ID is associated with a password. The verification unit verifies that the user ID and the password included in the key request message are identical to the user ID and the password included in the authentication table. If the verification fails, the process of step S36g is performed.

When this verification succeeds, the verification unit of the key generation apparatus 20 verifies that the key request message includes the user information (step S36b). When the key request message includes the user information, the process of step S36c is performed. If the key request message does not include the user information, the process of step S37 is performed. When a method is employed in which a key request message always includes user information, the process of step S36b and <<a user information acquisition process>>, described later, are unnecessary.

The description of <<the key generation process>> is temporarily halted here and <<the user information acquisition process>> will be described below.

The transmitter unit 24 of the key generation apparatus 20 sends a request that includes the policy and the authentication information (if any) included in the key request message to the management apparatus 40, and the management apparatus 40 receives the request (step S37). The received request is stored in a memory of the management apparatus 40.

The management apparatus 40 stores an authentication table in the memory. In the same way as in the authentication table described above, the user ID is associated with the password in this authentication table (see FIG. 16). A verification unit (not shown) of the management apparatus 40 verifies that the user ID and the password included in the request are identical to the user ID and the password included in the authentication table.

When this verification succeeds, a searching unit (not shown) of the management apparatus 40 searches a user information table stored in the memory for the attribute designation information or the predicate designation information according to the policy included in the request (step S38). The user information table includes, for example, a first table formed of each user ID, and an attribute name and attribute designation information associated with the user ID, and a second table formed of the user ID and predicate designation information associated with the user ID (see FIG. 17). Whether the attribute designation information or the predicate designation information is read is determined by the policy included in the request. More specifically, the read information corresponds to the content of the policy identifying one schema paired with the other schema identified by the policy included in the request. When the policy is Cipher_Text_Policy, the searching unit reads the attribute designation information corresponding to the user ID included in the request from the first table. When the policy is Key_Policy, the searching unit reads the predicate designation information corresponding to the user ID included in the request from the second table. The read designation information is hereafter called user information.

Under the control of a controller unit, a transmitter unit of the management apparatus 40 sends the user information to the key generation apparatus 20, and the receiver unit of the key generation apparatus 20 receives the user information (step S27). The received user information is stored in the memory 21 of the key generation apparatus 20.

The description of <<the user information acquisition process>> ends here, and the description of <<the key generation process>> will be resumed.

When the key generation apparatus 20 already has the user information or receives the user information through the user information acquisition process (step S39), a second predicate logic information acquisition unit 23 of the key generation apparatus 20 reads the policy, the schema pair, the public parameter, and the user information from the memory 21, and obtains attribute information (hereafter called second attribute information) or predicate information (second predicate information) from the user information (step S36c). In general, the user of the first decryption apparatus 30-1 and the user of the second decryption apparatus 30-2 are different. Therefore, the second attribute information or second predicate information obtained in this process is not necessarily the same as the second attribute information or the second predicate information obtained in the process of step S24c. In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the first embodiment of the second aspect, the second attribute information and the second predicate information are one or a plurality of vector information having elements of the finite field $F_q$ as components (see FIGS. 11 to 13). The schema is used to extract and arrange necessary attribute values from the input information.

Next, a key generation unit 25 of the key generation apparatus 20 generates a random number $\alpha$ that is an element of the finite field $F_q$, based on the public parameter q according to the predicate encryption algorithm, and uses the random number $\alpha$, the second attribute information $v'_{(p)}=(v'_{(p)1}, \ldots, v'_{(p)n})$ or the second predicate information $w'_{(p)}=(w'_{(p)1}, \ldots, w'_{(p)n})$ read from the memory 21, and a private key $B^*$ of the key generation apparatus to obtain a decryption key $R'$ according to Expression (14) (step S36d). The second predicate information $w'_{(p)}$ is used in this example because the input information used in the encryption process is the attribute designation information. When the input information is the predicate designation information, the second attribute information $v'_{(p)}$ is used. Therefore, $w'_{(p)}$ needs to be replaced with $v'_{(p)}$ in Expression (14).

$$R' = \varepsilon \sum_{i=1}^{n} w'_{(p)i} b_i^* + b_{n+1}^* \quad (14)$$

Next, under the control of the controller unit, the transmitter unit 24 of the key generation apparatus 20 sends the decryption key R' to the second decryption apparatus 30-2, and the receiver unit of the second decryption apparatus 30-2 receives the decryption key R' (step S28). The received decryption key R is stored in the memory 31 of the second decryption apparatus 30-2.

The description of <<the key generation process>> ends here, and the description of <<the decryption process>> will be resumed.

When the second decryption apparatus 30-2 already has the decryption key or receives the decryption key through the key generation process (step S40), a decryption unit 33 of the second decryption apparatus 30-2 reads the public parameter, the decryption key R', the encryption information $C_1$, and the ciphertext $C_2$ (if necessary) from the memory 31, and obtains the common key K and the plaintext M (if necessary) (step S41).

Details of the process in step S41 will be described below. The first decryption unit 33a reads the public parameter, the decryption key R', and the encryption information $C_1$ from the memory 31, and obtains $e(C_1, R)$ according to the predicate encryption algorithm. As shown in Expression (15), the calculation result depends on the result of the canonical inner product of the first attribute information v and the second predicate information $w'_{(p)}$ taken out from the encryption information $C_1$ and the decryption key R' according to bilinearity when the input information is the attribute designation information. When the input information is the predicate designation information, v needs to be replaced with $v'_{(p)}$ and $w'_{(p)}$ needs to be replaced with w in Expression (15). The calculation result depends on the result of the canonical inner product of the first predicate information w and the second attribute information $v'_{(p)}$ taken out from the encryption information $C_1$ and the decryption key R' according to bilinearity. In Expression (15), $e(b_i, b_i^*)$ is defined as shown in Expression (12), described earlier.

$$e(C_1, R') = e\left(r \sum_{i=1}^{n} v_i b_i, R'\right) \cdot e(\rho b_{n+1}, R') \quad (15)$$

$$= \prod_{i=1}^{n} e(b_i, b_i^*)^{r a v_i w'_{(p)i}} \cdot e(b_{n+1}, b_{n+1}^*)^{\rho}$$

$$= g_T^{r a \sum_{i=1}^{n} v_i w'_{(p)i}} \cdot g_T^{\rho}$$

$$= g_T^{r a v \cdot w'_{(p)}} \cdot g_T^{\rho}$$

Therefore, when the canonical inner product of the first attribute information v and the second predicate information $w'_{(p)}$ is zero (or when the canonical inner product of the first predicate information w and the second attribute information $v'_{(p)}$ is zero), the result of calculation in Expression (15), $g_T^{\rho}$, is obtained. When the result of calculation, $g_T^{\rho}$, is obtained, the first decryption unit 33a of the second decryption apparatus 30-2 obtains the common key K, which is correct, according to Expression (7), described earlier (step S34c). When the canonical inner product of the first attribute information v and the second predicate information $w'_{(p)}$ is not zero (or when the canonical inner product of the first predicate information w and the second attribute information $v'_{(p)}$ is not zero), the first decryption unit 33a obtains an incorrect value according to Expression (7), described earlier. In this example, it is assumed that the hash function H is common to the system or is included in the public parameter. The encryption information $C_1$ corresponds to the information ρ used to generate the common key K in this example. When encryption information $C_1$ corresponds to the common key K, the result of calculation in Expression (15) is the common key K (or incorrect value). In other words, an authorized user of the second decryption apparatus 30-2 has predicate designation information that gives the second predicate information $w'_{(p)}$ which makes the canonical inner product with the first attribute information v zero, or attribute designation information that gives the second attribute information $v'_{(p)}$ which makes the canonical inner product with the first predicate information w zero.

Then, the second decryption unit 33b uses the common key K and the ciphertext $C_2$ to calculate plaintext M according to Expression (13), described earlier (step S34d). A decryption method $Dec_K$ that uses the private key corresponds to the encryption method $Enc_K$. As described earlier, when the first embodiment of the second aspect is dedicated to the delivery of the common key K, the process of step S34d is omitted. More specifically, even if the second decryption apparatus 30-2 has the function of the second decryption unit 33b, it does not perform the process of step S34d.

If the result of calculation in Expression (15) is an incorrect value, the correct plaintext M cannot be obtained by Expression (13), described earlier.

The second decryption apparatus 30-2 may store the decryption key R' in the decryption key table. In addition, the second decryption apparatus 30-2 may store the common key K in the decryption key table.

The description of <<the second decryption process>> ends here.

When the second decryption apparatus 30-2 has a transfer unit 37, the second decryption apparatus 30-2 may transfer the encrypted message received from the first decryption apparatus 30-1, to another second decryption apparatus (decryption apparatus that does not exchange an encrypted message with the encryption apparatus) or to the first decryption apparatus (decryption apparatus that exchanges an encrypted message with the encryption apparatus). This transfer process may be performed anytime after the second decryption apparatus 30-2 receives the encrypted message from the first decryption apparatus 30-1.

(Second Embodiment According to Second Aspect)

A second embodiment of the second aspect differs from the first embodiment of the second aspect in that the first decryption apparatus 30-1 and the second decryption apparatus 30-2 generate the second attribute information or the second predicate information. Because of this difference, the second embodiment of the second aspect differs in several points from the first embodiment of the second aspect. A description of commonalities between the first and second embodiments of the second aspect is omitted (the same reference numerals are assigned to the same components), and a description of the differences from the first embodiment of the second aspect will be made with reference to FIGS. 42 to 48.

The processes of steps S1 to S22 are the same as those in the first embodiment of the second aspect.

When the decryption key is not possessed in the process of step S22b, a second predicate logic information acquisition unit 35 of the first decryption apparatus 30-1 reads the policy, the schema pair, the public parameter, and the user information from the memory 31 and obtains attribute information (called second attribute information) or predicate information (called second predicate information) from the user information (step S23g). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the second embodiment of the second aspect, the second attribute information and the second predicate information are one or a plurality of vector information having elements of the finite field $F_q$ as components (see FIGS. 11 to 13).

After the process of step S23g, the process of step 23 is performed. In this process, the transmitter unit 34 of the first decryption apparatus 30-1 generates a key request message that includes the public parameter, the policy, the schema pair, and the authentication information read from the memory 31, and the second attribute information or the second predicate information, under the control of the controller unit. The transmitter unit 34 of the first decryption apparatus 30-1 sends the key request message to the key generation apparatus having the address read from the memory 31, and the receiver unit of the key generation apparatus 20 receives the key request message.

When the verification succeeds in the process of step S24a, the process of step S24d is performed. Since the key generation apparatus 20 has received the second attribute information or the second predicate information from the first decryption apparatus 30-1, the function and the process for generating the information are unnecessary, unlike in the first embodiment of the second aspect.

The processes of steps S28 to S34a, to be performed after the process of step S24d, are the same as those in the first embodiment of the second aspect.

When the decryption key is not possessed in the process of step S34b, a second predicate logic information acquisition unit 35 of the second decryption apparatus 30-2 reads the policy, the schema pair, the public parameter, and the user information from the memory 31 and obtains attribute information (called second attribute information) or predicate information (called second predicate information) from the user information (step S35g). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the second embodiment of the second aspect, the second attribute information and the second predicate information are one or a plurality of vector information having elements of the finite field $F_q$ as components (see FIGS. 11 to 13).

After the process of step S35g, the process of step 35 is performed. In this process, the transmitter unit 34 of the second decryption apparatus 30-2 generates a key request message that includes the public parameter, the policy, the schema pair, and the authentication information read from the memory 31, and the second attribute information or the second predicate information, under the control of the controller unit. The transmitter unit 34 of the second decryption apparatus 30-2 sends the key request message to the key generation apparatus having the address read from the memory 31, and the receiver unit of the key generation apparatus 20 receives the key request message.

When the verification succeeds in the process of step S36a, the process of step S36d is performed. Since the key generation apparatus 20 has received the second attribute information or the second predicate information from the second decryption apparatus 30-2, the function and the process for generating the information are unnecessary, unlike in the first embodiment of the second aspect.

The processes of steps S40 and S41, following the process of step S36d, are the same as those in the first embodiment of the second aspect.

(Third Embodiment According to Second Aspect)

A third embodiment of the second aspect differs from the first embodiment of the second aspect in that the encryption unit 13 of the encryption apparatus 10 uses the first attribute information $v=(v_1, \ldots, v_n)$ or the first predicate information $w=(w_1, \ldots, w_n)$, together with the public key and included in the public parameter the plaintext M read from the memory 11 to obtain encryption information $C_1$. In other words, the predicate encryption algorithm disclosed in Non-patent literature 2, for example, is used in the third embodiment of the second aspect. Because of this difference, the third embodiment of the second aspect differs in several points from the first embodiment of the second aspect. A description of commonalities between the first and third embodiments of the second aspect is omitted (the same reference numerals are assigned to the same components), and a description of the differences from the first embodiment of the second aspect will be made with reference to FIGS. 49 to 54.

The processes of steps S1 to S17a are the same as those in the first embodiment of the second aspect. The public parameter and some other information are required by the predicate encryption algorithm of the third embodiment of the second aspect. For specific information required, see Non-patent literature 2, described above, for example.

In the process of step S17b1, following the process of step S17a, the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$ according to the predicate encryption algorithm (step S17b1).

After the process of step S17b1, the process of step 17d is performed. In this process, the transmitter unit 14 of the encryption apparatus 10 generates an encrypted message that includes the encryption information $C_1$, and the schema pair, the policy, the public parameter, and the address of the key generation apparatus read from the memory 31, under the control of the controller unit (step S17d).

The processes of steps S18 to S28, following the process of step S17d, are the same as those in the first embodiment of the second aspect.

In the process of step S22c1, following the process of step S28, the decryption unit 33 of the first decryption apparatus 30-1 reads the public parameter, the decryption key R, and the encryption information $C_1$ from the memory 31 to calculate plaintext M according to the predicate encryption algorithm (step S22*c*1).

The processes of steps S30 to S40, following the process of step S22*c*1, are the same as those in the first embodiment of the second aspect.

In the process of step S34*c*1, following the process of step S40, the decryption unit 33 of the second decryption apparatus 30-2 reads the public parameter, the decryption key R, and the encryption information $C_1$ from the memory 31 to calculate plaintext M according to the predicate encryption algorithm (step S34*c*1).

(Fourth Embodiment According to Second Aspect)

A fourth embodiment of the second aspect corresponds to a combination of the second embodiment of the second aspect and the third embodiment of the second aspect. The fourth embodiment of the second aspect differs from the first embodiment of the second aspect in that (1) the first decryption apparatus 30-1 and the second decryption apparatus 30-2 generate the second attribute information or the second predicate information, and (2) the encryption unit 13 of the encryption apparatus 10 uses the first attribute information $v=(v_1, \ldots, v_n)$ or the first predicate information $w=(w_1, \ldots, w_n)$, together with the public key included in the public parameter and the plaintext M read from the memory 11, to obtain encryption information $C_1$. Because of these differences, the fourth embodiment of the second aspect differs in several points from the first embodiment of the second aspect. A description of commonalities between the first and fourth embodiments of the second aspect is omitted (the same reference numerals are assigned to the same components), and a description of the differences from the first embodiment of the second aspect will be made with reference to FIGS. 55 to 58.

The processes of steps S1 to S17*a* are the same as those in the first embodiment of the second aspect. The public parameter and some other information are required by the predicate encryption algorithm of the fourth embodiment of the second aspect. For specific information required, see Non-patent literature 2, described above, for example.

In the process of step S17*b*1, following the process of step S17*a*, the encryption unit 13 of the encryption apparatus 10 uses the first attribute information $v=(v_1, \ldots, v_n)$ or the first predicate information $w=(w_i, \ldots, w_n)$, together with the public key included in the public parameter and the plaintext M read from the memory 11, to obtain encryption information $C_1$ according to the predicate encryption algorithm (step S17*b*1).

After the process of step S17*b*1, the process of step 17*d* is performed. In this process, the transmitter unit 14 of the encryption apparatus 10 generates an encrypted message that includes the encryption information $C_1$, and the schema pair, the policy, the public parameter, and the address of the key generation apparatus read from the memory 31, under the control of the controller unit (step S17*d*).

The processes of steps S18 to S22*b*, following the process of step S17*d*, are the same as those in the first embodiment of the second aspect.

When the decryption key is not possessed in the process of step S22*b*, the second predicate logic information acquisition unit 35 of the first decryption apparatus 30-1 reads the policy, the schema pair, the public parameter, and the user information from the memory 31 and obtains attribute information (called second attribute information) or predicate information (called second predicate information) from the user information (step S23*g*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17*a* is used in this process. In the fourth embodiment of the second aspect, the second attribute information and the second predicate information are one or a plurality of vector information having elements of the finite field $F_q$ as components (see FIGS. 11 to 13).

After the process of step S23*g*, the process of step 23 is performed. In this process, the transmitter unit 34 of the first decryption apparatus 30-1 generates a key request message that includes the public parameter, the policy, the schema pair, and the authentication information read from the memory 31, and the second attribute information or the second predicate information, under the control of the controller unit. The transmitter unit 34 of the first decryption apparatus 30-1 sends the key request message to the key generation apparatus having the address read from the memory 31, and the receiver unit of the key generation apparatus 20 receives the key request message.

When the verification succeeds in the process of step S24*a*, the process of step S24*d* is performed. Since the key generation apparatus 20 has received the second attribute information or the second predicate information from the first decryption apparatus 30-1, the function and the process for generating the information are unnecessary.

The process of step S28, following the process of step S24*d*, is the same as that in the first embodiment of the second aspect.

In the process of step S22*c*1, following the process of step S28, the decryption unit 33 of the first decryption apparatus 30-1 reads the public parameter, the decryption key R, and the encryption information $C_1$ from the memory 31 to calculate plaintext M according to the predicate encryption algorithm (step S22*c*1).

The processes of steps S30 to S34, following the process of step S22*c*1, are the same as those in the first embodiment of the second aspect.

When the decryption key is not possessed in the process of step S34*b*, the second predicate logic information acquisition unit 35 of the second decryption apparatus 30-2 reads the policy, the schema pair, the public parameter, and the user information from the memory 31 and obtains attribute information (called second attribute information) or predicate information (called second predicate information) from the user information (step S35*g*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17*a* is used in this process. In the fourth embodiment of the second aspect, the second attribute information and the second predicate information are one or a plurality of vector information having elements of the finite field $F_q$ as components (see FIGS. 11 to 13).

After the process of step S35g, the process of step 35 is performed. In this process, the transmitter unit 34 of the second decryption apparatus 30-2 generates a key request message that includes the public parameter, the policy, the schema pair, and the authentication information read from the memory 31, and the second attribute information or the second predicate information, under the control of the controller unit. The transmitter unit 34 of the second decryption apparatus 30-2 sends the key request message to the key generation apparatus having the address read from the memory 31, and the receiver unit of the key generation apparatus 20 receives the key request message.

When verification succeeds in the process of step S36a, the process of step S36d is performed. Since the key generation apparatus 20 has received the second attribute information or the second predicate information from the second decryption apparatus 30-2, the function and the process for generating the information are unnecessary, unlike in the first embodiment of the second aspect.

The process of step S40, following the process of step S36d, is the same as that in the first embodiment of the second aspect.

In the process of step S34c1, following the process of step S40, the decryption unit 33 of the second decryption apparatus 30-2 reads the public parameter, the decryption key R, and the encryption information $C_1$ from the memory 31 to calculate plaintext M according to the predicate encryption algorithm (step S34c1).

The above described embodiments of the second aspect are implemented, for example, as email systems or instant message systems. FIG. 59 shows the structure of data exchanged. The basic format of the entire message conforms, for example, to S/MIME (Secure Multipurpose Internet Mail Extensions). An appropriate data structure is given to data from the start position marker of an encrypted message to the end position marker of the encrypted message in XML (the eXtensible Markup Language) or other some language.

A series of data concerning the predicate encryption is disposed from the start position marker of an encrypted message to the end position marker of the encrypted message.

An algorithm identifier block specifies information that identifies the predicate encryption algorithm used to encrypt the private key and the private key encryption algorithm used to encrypt the message payload. An identifier indicating the algorithm or the version of an algorithm (for example, PE/Version X+Camellia (Camellia is a registered trademark)) can be specified.

A digital signature block specifies the digital signature. A known signature algorithm can be used. This item can be omitted depending on the application.

A public parameter information block specifies information that identifies the public parameter used. An identifier that identifies the public parameter or the data of the public parameter can be specified.

A policy field specifies an identifier that identifies the policy used.

A schema field specifies an identifier that identifies the schema used or the data of the schema.

An encryption information field specifies the data (encryption information) obtained by encrypting, with the predicate encryption, the private key used to encrypt the message payload (plaintext).

An ciphertext field specifies the data (ciphertext) obtained by encrypting the message payload (plaintext).

An attribute field and a predicate field specify letter string representations that indicate the attribute and the predicate used for encryption, corresponding to the policy field, respectively. These items can be omitted according to the application.

An attachment field can include an attachment file encrypted with RSA, for example. This item can be omitted according to the application.

In secure communication for instant messaging, for example, it is not necessary to resend the encryption information obtained by encrypting the private key. In usual instant messaging, when an appropriate private key is obtained in the first instant message, the receiver may store the private key to decrypt subsequent instant messages. In that case, the sender just sends ciphertext to the receiver but may not send the public parameter, the policy, the schema, or the encryption information in the subsequent instant messages. In the same way, when the encryption algorithm used is not changed, the encryption algorithm identifier may be omitted in the subsequent instant messages.

Predicate encryption does not depend on information based on the receiver, in encryption. Therefore, the sender (sending apparatus) can send an encrypted message to an unknown receiver (receiving apparatus). In other words, the sender performs encryption just once even if there are a plurality of receivers (receiving apparatuses) (in the public key cryptosystem, encryption needs to be performed N times). Therefore, the sender (sending apparatus) can send an encrypted message to a plurality of receivers at a low cost.

The receiver (receiving apparatus) can transfer the encrypted message received from the encryption apparatus to a third party (apparatus). In the public key cryptosystem, the receiver (receiving apparatus) needs to decrypt the encrypted message, encrypt the original message with the public key of the third party (apparatus), and send the encrypted message, causing a high processing cost. In the above-described embodiments, since the encrypted message received from the encryption apparatus can be transferred to the third party (apparatus) without any processing, the encrypted message is transferred at a low processing cost.

Embodiments according to a third aspect of the present invention, which relate to a cryptographic communication technology that can operate flexibly, that is based on predicate encryption, and that allows content (encrypted content) encrypted with the predicate encryption to be distributed will be described next while attention is being paid to the cryptographic communication technology of the first aspect, described above. In the cryptographic communication technology of the third aspect, content (encrypted content) encrypted with predicate encryption is stored in a content server, and the encrypted content is distributed to a decryption apparatus upon request.

The description of the cryptographic communication technology of the third aspect and the description of the cryptographic communication technology of the first aspect have many substantial commonalities, but, to avoid referring to the description of the cryptographic communication technology of the first aspect, the cryptographic communication technology of the third aspect will be described below with overlapping explanations and figures being included as much as possible. Therefore, in both descriptions, identical expression numbers, identical reference numerals assigned to function blocks, and identical reference numerals assigned to steps are used. Because the contexts are different, there should be no risk of confusion.

(First Embodiment According to Third Aspect)

A first embodiment according to the third aspect of the present invention will be described below with reference to FIG. 60 to FIG. 71.

As shown in FIG. 60, a cryptographic system 1 according to the third aspect includes a plurality of client apparatuses 10 and 30, one or a plurality of key generation apparatuses 20, one or a plurality of content servers 60, one or a plurality of user information management apparatuses 40 (hereafter each called a management apparatus), conversion rule information pair management apparatuses 50 (hereafter each called a registration apparatus), one or a plurality of maintenance apparatuses 80, and one or a plurality of authentication apparatuses 90. These apparatuses can communicate with each other through a communication network 5, such as the Internet.

The client apparatuses function as encryption apparatuses for encrypting content to generate encrypted content or decryption apparatuses for decrypting the encrypted content, based on their processing functions. Depending on their functions, the client apparatuses are called encryption apparatuses 10 or decryption apparatuses 30. The cryptographic system 1 of the third aspect may include client apparatuses that function only as encryption apparatuses and/or client apparatuses that function only as decryption apparatuses.

In the cryptographic system 1 of the third aspect, encryption and decryption are performed using predicate encryption. In the third aspect of the present invention, the predicate encryption algorithm to be used is not limited, and the predicate encryption algorithm disclosed in Non-patent literature 2, for example, may be used. In the first embodiment of the third aspect, a predicate encryption algorithm of KEM (the key encapsulation mechanism) type will be used.

A cryptographic communication method used in the cryptographic system 1 will be described with reference to FIGS. 61, 62, 63, 64, 66, 69, and 71. See FIGS. 65, 67, 68, and 70 for the functional structure of each apparatus.

<<Preparation Process>>

The entire description of <<the preparation process>> in the first embodiment of the first aspect according to the present invention is incorporated here and a description of <<the preparation process>> is omitted. See FIG. 61 for the preparation process, FIGS. 11 to 13 for schema pairs, and FIG. 14 for policy lists. The description of the preparation process ends here.

<<Encryption Process>>

Under the control of a controller unit, not shown, a transmitter unit 14 of the encryption apparatus 10 sends a search query to the registration apparatus 50, and the receiving unit of the registration apparatus 50 receives the search query (step S14). The searching unit of the registration apparatus 50 searches some or all of the entries registered in the storage unit of the registration apparatus 50 and chooses one entry (step S15). The transmitter unit of the registration apparatus 50 sends the entry to the encryption apparatus 10, and a receiver unit of the encryption apparatus 10 receives the entry (step S16). This entry includes the address of the key generation apparatus, the public parameter of the key generation apparatus, the policy list that can be used by the key generation apparatus, and the schema list that can be used by the key generation apparatus. The received entry is stored in a memory 11 of the encryption apparatus 10.

When the encryption apparatus 10 has the public parameter, schema list, policy list, and address of each key generation apparatus 20 in advance, the processes of steps S14 to S16 are omitted. It should be noted that the cryptographic system 1 may have no registration apparatus 50.

A first predicate logic information acquisition unit 12 of the encryption apparatus 10 reads the input information, the policy, and the schemas from the memory 11 and obtains attribute information (hereafter called first attribute information) and predicate information (hereafter called first predicate information) (step S17a). Details of this process will be described below with reference to FIGS. 12 and 13.

When the schema list has a plurality of schema pairs, one schema pair is selected based on the usage or the like. The user of the encryption apparatus 10 may select a schema pair and input designation information thereof. Alternatively, the first predicate logic information acquisition unit 12 may select a schema pair according to a predetermined rule.

According to whether the input information is attribute designation information or predicate designation information, one of the schemas is selected together with the policy. The user of the encryption apparatus 10 may select the policy and one of the schemas and input designation information thereof. Alternatively, the first predicate logic information acquisition unit 12 may select the policy and one of the schemas according to a predetermined rule. When only one type of policy is prepared in the key generation apparatus 20, one schema of the schema pair is selected according to the policy. If the selected schema does not correspond to the type of the input information, a schema pair needs to be selected again from the schema list or an entry needs to be provided by the registration apparatus 50 again.

The input information may be information inputted by the user of the encryption apparatus 10 or information acquired by an acquisition unit (not shown) of the encryption apparatus 10 from a storage medium such as an IC card 39.

Then, the first predicate logic information acquisition unit 12 uses the schema selected from the schema pair according to the policy to obtain the first attribute information or the first predicate information from the input information. When the policy is Key_Policy and the selected schema is an attribute schema, the first attribute information is obtained. When the policy is Cipher_Text_Policy and the selected schema is a predicate schema, the first predicate information is obtained. The first attribute information and the first predicate information are vector information having elements of the finite field $F_q$ as components in the first embodiment according to the third aspect (see FIGS. 11 to 13). The schema is used to extract or arrange necessary attribute values from the input information.

Next, an encryption unit 13 of the encryption apparatus 10 uses the first attribute information $v=(v_1, \ldots, v_n)$ or the first predicate information $w=(w_1, \ldots, w_n)$, an orthogonal basis B (substantial public key) included in the public parameter read from the memory 11, and content M to obtain a common key K, encryption information $C_1$, and ciphertext $C_2$ (steps S17b and S17c). Details of these processes will be described below.

A first encryption unit 13a generates random numbers r and p which are elements of the finite field Fq according to the predicate encryption algorithm, specifies the common key K as shown by Expression (7), described earlier, and obtains the encryption information $C_1$ according to Expression (8) (step S17b), where H indicates, for example, a hash function. In this example, the first attribute information v is used. To use the first predicate information, v needs to be replaced with w in Expression (8), described earlier. In this example, the encryption information $C_1$ corresponds to ρ used to generate the common key K. The encryption information $C_1$ may correspond to the common key K.

Next, the second encryption unit 13b uses the common key K and the content M to obtain the ciphertext $C_2$ according to Expression (9), described earlier (step S17c). An encryption method $Enc_k$ that uses the private key can be a known method. For example, it may be the method disclosed in Non-patent literature 1.

Next, under the control of the controller unit, the transmitter unit 14 of the encryption apparatus 10 generates an encrypted message that includes the encryption information $C_1$ and the encrypted content $C_2$, together with the schema pair, the policy, the public parameter, and the address of the key generation apparatus read from the memory 11 (step S17d). The transmitter unit 14 of the encryption apparatus 10 then sends the encrypted message to the content server 60, and a receiver unit of the content server 60 receives the encrypted message (step S18). The encrypted content is uploaded by a known method such as FTP (file transfer protocol) or WebDAV (distributed authoring and versioning protocol for the WWW).

The description of <<the encryption process>> ends here.

<<Content Delivery Process>>

Under the control of a controller unit, the content server 60 stores, in a memory 61 thereof, the encrypted message sent from each encryption apparatus 10. With this, the encryption information and the encrypted content included in the encrypted message are registered in the content server 60. The encrypted content registered in the content server 60 is made public, for example, on a web page.

The web page is displayed on a display unit, now shown, of the decryption apparatus 30 by a browser unit 38 of the decryption apparatus 30 according to the Internet protocol. The user of the decryption apparatus 30 performs an input operation to select a desired encrypted content. Based on the user input information, the browser unit 38 of the decryption apparatus 30 sends an acquisition request for acquiring the selected encrypted content from the content server 60, to a decryption unit 33 (hereafter called a relay unit) of the decryption apparatus 30 (step S19). Then, the relay unit 33 of the decryption apparatus 30 sends this acquisition request to the content server 60, and a receiver unit of the content server 60 receives the acquisition request (step S20). In this way, the browser unit 38 and the content server 60 performs exchanges through the relay unit 33 according to, for example, HTTP (hyper text transfer protocol) (the proxy setting of a WWW browser may be used). A searching unit 62 of the content server 60 searches for the encrypted message that includes the encrypted content specified in the acquisition request and selects it (step S21). A transmitter unit 64 of the content server 60 sends the encrypted message to the decryption apparatus 30 under the control of the searching unit 62, and a receiver unit of the decryption apparatus receives the encrypted message (step S22).

The description of <<the content delivery process>> ends here.

<<Decryption Process>>

Under the control of a controller unit, not shown, a transmitter unit 34 of the decryption apparatus 30 sends a search query that includes the address of the key generation apparatus, the address being included in the encrypted message, to the registration apparatus 50, and the receiving unit of the registration apparatus 50 receives the search query (step S23). The searching unit of the registration apparatus 50 searches for the entry of the key generation apparatus specified by the address and selects it (step S24). The transmitter unit of the registration apparatus 50 sends the entry of the search result to the decryption apparatus 30, and the receiver unit of the decryption apparatus 30 receives the entry (step S25). This entry includes the address of the key generation apparatus, the public parameter of the key generation apparatus, the policy list that can be used by the key generation apparatus, and the schema list that can be used by the key generation apparatus. The received entry is stored in a memory 31 of the decryption apparatus 30.

When the decryption apparatus 30 has the public parameter, schema list, policy list, and address of each key generation apparatus 20 in advance, the processes of steps S19 to S21 are omitted. In that case, the decryption apparatus 30 searches the memory 31 for the entry of the key generation apparatus corresponding to the address included in the encrypted message and retrieves it.

Under the control of the controller unit, a verification unit (not shown) of the decryption apparatus 30 verifies that the schema pair and the policy included in the encrypted message are included in the schema list and the policy list included in the entry obtained from the registration apparatus 50 (step S26a). If this verification fails, the process ends with a decryption processing failure (step S26g).

When the verification succeeds, an acquisition unit 32 of the decryption apparatus 30 reads the attribute designation information or the predicate designation information corresponding to the user of the decryption apparatus 30 from a storage medium such as the IC card 39 (step S26f). Whether the attribute designation information or the predicate designation information is read depends on the policy included in the encrypted message. More specifically, the read designation information corresponds to the content of the policy identifying one schema paired with the other schema identified by the policy included in the encrypted message. When the policy is Cipher_Text_Policy, the acquisition unit 32 reads the attribute designation information from the storage medium. When the policy is Key_Policy, the acquisition unit 32 reads the predicate designation information from the storage medium. The read designation information is hereafter called user information. The acquisition unit 32 of the decryption apparatus 30 may read from the management apparatus 40 the attribute designation information or the predicate designation information corresponding to the user of the decryption apparatus 30, in the same way as in <<a user information acquisition process>> in the key generation apparatus 20, described later. In the first embodiment of the third aspect, the process of step S26f may be omitted. When the decryption apparatus 30 has the attribute designation information and the predicate designation information corresponding to the user in advance, either the attribute designation information or the predicate designation information serves as user information, according to the policy.

Next, the verification unit of the decryption apparatus 30 verifies that the decryption apparatus 30 has the decryption key to be used to decrypt the encryption information included in the encryption message (step S26b).

The decryption apparatus 30 stores a decryption key table in the memory 31. In the decryption key table, as shown in FIG. 15, for example, the identifier of each key generation apparatus is associated with the public parameter, the schema pair, the decryption key target, the predicate designation information, and the decryption key. The verification unit verifies that the decryption apparatus 30 has the decryption key corresponding to the identifier of the key generation apparatus determined from the address included in the encrypted message, to the public parameter, to the schema pair, and to the decryption key target (corresponding to the content of the policy identifying one schema paired with other the schema identified by the policy included in the encrypted message). When the decryption apparatus 30 has the decryption key, the process of step S33 is performed. If the decryption apparatus 30 does not have the decryption key, the process of step S27 is performed.

The description of <<the decryption process>> is temporarily halted here and <<a key generation process>> will be described below.

If the decryption apparatus 30 does not have the decryption key, the transmitter unit 34 of the decryption apparatus 30 generates, under the control of the controller unit, a key request message that includes the public parameter, the policy, the schema pair, the user information (if any), and the authentication information, all of these items being read from the memory 31. The authentication information includes, for example, the ID of the user and a password. The transmitter unit 34 of the decryption apparatus 30 sends the key request message to the key generation apparatus having the address read from the memory 31, and the receiver unit of the key generation apparatus 20 receives the key request message (step S27). The received key request message is stored in a memory 21 of the key generation apparatus 20.

Under the control of a controller unit, a verification unit (not shown) of the key generation apparatus 20 verifies that the schema pair and the policy included in the key request message are included in the schema list and the policy list included in the entry owned by the key generation apparatus 20 (for example, the entry generated in step S1) and that the public parameter included in the key request message is identical to the public parameter of the key generation apparatus 20 (step S28a). If this verification fails, the process ends with a key generation process failure (step S28g). When the authentication information is included in the key request message, the authentication information is also verified in the process of step S28a. The key generation apparatus 20 stores an authentication table in the memory 21. In the authentication table, as shown in FIG. 16, for example, each user ID is associated with a password. The verification unit verifies that the user ID and the password included in the key request message are identical to the user ID and the password included in the authentication table. If the verification fails, the process of step S28g is performed.

When this verification succeeds, the verification unit of the key generation apparatus 20 verifies that the key request message includes the user information (step S28b). When the key request message includes the user information, the process of step S28c is performed. If the key request message does not include the user information, the process of step S29 is performed. When a method is employed in which a key request message always includes user information, the process of step S28b and <<a user information acquisition process>>, described later, are unnecessary.

The description of <<the key generation process>> is temporarily halted here and <<the user information acquisition process>> will be described below.

The transmitter unit 24 of the key generation apparatus 20 sends a request that includes the policy and the authentication information (if any) included in the key request message to the management apparatus 40, and the management apparatus 40 receives the request (step S29). The received request is stored in a memory of the management apparatus 40.

The management apparatus 40 stores an authentication table in the memory. In the same way as in the authentication table described above, the user ID is associated with the password in this authentication table (see FIG. 16). A verification unit (not shown) of the management apparatus 40 verifies that the user ID and the password included in the request are identical to the user ID and the password included in the authentication table.

When this verification succeeds, a searching unit (not shown) of the management apparatus 40 searches a user information table stored in the memory for the attribute designation information or the predicate designation information according to the policy included in the request (step S30). The user information table includes, for example, a first table formed of each user ID, and an attribute name and attribute designation information associated with the user ID, and a second table formed of the user ID and predicate designation information associated with the user ID (see FIG. 17). Whether the attribute designation information or the predicate designation information is read is determined by the policy included in the request. More specifically, the read information corresponds to the content of the policy identifying one schema paired with the other schema identified by the policy included in the request. When the policy is Cipher_Text_Policy, the searching unit reads the attribute designation information corresponding to the user ID included in the request from the first table. When the policy is Key_Policy, the searching unit reads the predicate designation information corresponding to the user ID included in the request from the second table. The read designation information is hereafter called user information.

Under the control of a controller unit, a transmitter unit of the management apparatus 40 sends the user information to the key generation apparatus 20, and the receiver unit of the key generation apparatus 20 receives the user information (step S31). The received user information is stored in the memory 21 of the key generation apparatus 20.

The description of <<the user information acquisition process>> ends here, and the description of <<the key generation process>> will be resumed.

When the key generation apparatus 20 already has the user information or receives the user information through the user information acquisition process (step S31), a second predicate logic information acquisition unit 23 of the key generation apparatus 20 reads the policy, the schema pair, the public parameter, and the user information from the memory 21, and obtains attribute information (hereafter called second attribute information) or predicate information (second predicate information) from the user information (step S28c). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17a is used in this process. In the first embodiment of the third aspect, the second attribute information and the second predicate information are one or a plurality of vector information having elements of the finite field $F_q$ as components (see FIGS. 11 to 13).

The schema is used to extract and arrange necessary attribute values from the input information.

Next, a key generation unit 25 of the key generation apparatus 20 generates a random number α that is an element of the finite field $F_q$, based on the public parameter q according to the predicate encryption algorithm, and uses the random number α, the second attribute information $v_{(p)}=(V_{(p)1}, \ldots, V_{(p)n})$ or the second predicate information $w_{(p)}=(w_{(p)1}, \ldots, w_{(p)n})$ read from the memory 21, and a private key $B^*$ of the key generation apparatus to obtain a decryption key R according to Expression (10), described earlier (step S28d). The second predicate information $w_{(p)}$ is used in this example because the input information used in the encryption process is the attribute designation information. When the input information is the predicate designation information, the second attribute information $v_{(p)}$ is used. Therefore, $w_{(p)}$ needs to be replaced with $v_{(p)}$ in Expression (10), described earlier.

Next, under the control of the controller unit, the transmitter unit 24 of the key generation apparatus 20 sends the decryption key R to the decryption apparatus 30, and the receiver unit of the decryption apparatus 30 receives the decryption key R (step S32). The received decryption key R is stored in the memory 31 of the decryption apparatus 30.

The description of <<the key generation process<< ends here, and the description of <<the decryption process>> will be resumed.

When the decryption apparatus 30 already has the decryption key or receives the decryption key through the key generation process (step S32), the relay unit 33 of the decryption apparatus 30 reads the public parameter, the decryption key R, the encryption information $C_1$, and the encrypted content $C_2$ (if necessary) from the memory 31, and obtains the common key K and the content M (if necessary) (step S33).

Details of the process in step S33 will be described below. The relay unit 33 includes a first decryption unit 33*a* and a second decryption unit 33*b* for decryption.

The first decryption unit 33*a* reads the public parameter, the decryption key R, and the encryption information $C_1$ from the memory 31, and obtains $e(C_1, R)$ according to the predicate encryption algorithm. As shown in Expression (11), described earlier, the calculation result depends on the result of the canonical inner product of the first attribute information v and the second predicate information $w_{(p)}$ taken out from the encryption information $C_1$ and the decryption key R according to bilinearity when the input information is the attribute designation information. When the input information is the predicate designation information, v needs to be replaced with $v_{(p)}$ and $w_{(p)}$ needs to be replaced with w in Expression (11), described earlier. The calculation result depends on the result of the canonical inner product of the first predicate information w and the second attribute information $v_{(p)}$ taken out from the encryption information $C_1$ and the decryption key R according to bilinearity. In Expression (11), $e(b_i, b_i^*)$ is defined as shown in Expression (12), described earlier, where $\delta_{ij}$ is the Kronecker's delta symbol.

Therefore, when the canonical inner product of the first attribute information v and the second predicate information $w_{(p)}$ is zero (or when the canonical inner product of the first predicate information w and the second attribute information $v_{(p)}$ is zero), the result of calculation in Expression (11), $g_T^\rho$, is obtained. When the result of calculation, $g_T^\rho$, is obtained, the first decryption unit 33*a* of the decryption apparatus 30 obtains the common key K, which is correct, according to Expression (7), described earlier (step S26*c*). When the canonical inner product of the first attribute information v and the second predicate information $w_{(p)}$ is not zero (or when the canonical inner product of the first predicate information w and the second attribute information $v_{(p)}$ is not zero), the first decryption unit 33*a* obtains an incorrect value according to Expression (7), described earlier. In this example, it is assumed that the hash function H is common to the system or is included in the public parameter. The encryption information $C_1$ corresponds to the information ρ used to generate the common key K in this example. When encryption information $C_1$ corresponds to the common key K, the result of calculation in Expression (11), described earlier, is the common key K (or incorrect value). In other words, an authorized user of the decryption apparatus 30 has predicate designation information that gives the second predicate information $w_{(p)}$ which makes the canonical inner product with the first attribute information v zero, or attribute designation information that gives the second attribute information $v_{(p)}$ which makes the canonical inner product with the first predicate information w zero.

Then, a second decryption unit 33*b* uses the common key K and the encrypted content $C_2$ to calculate content M according to Expression (13), described earlier (step S26*d*). A decryption method $Dec_K$ that uses the private key corresponds to the encryption method $Enc_K$.

If the result of calculation in Expression (11), described earlier, is an incorrect value, the correct plaintext M cannot be obtained by Expression (13), described earlier.

The decryption apparatus 30 may store the decryption key R in the decryption key table. In addition, the decryption apparatus 30 may store the common key K in the decryption key table.

The content M, obtained by decrypting the encrypted content, is sent from the relay unit 33 to the browser unit 38 (step S34), and the browser unit 38 displays the content M on a display unit of the decryption apparatus 30 (step S35).

The description of <<the decryption process>> ends here.

(Second Embodiment According to Third Aspect)

A second embodiment of the third aspect differs from the first embodiment of the third aspect in that the decryption apparatus 30 generates the second attribute information or the second predicate information. Because of this difference, the second embodiment of the third aspect differs in several points from the first embodiment of the third aspect. A description of commonalities between the first and second embodiments of the third aspect is omitted (the same reference numerals are assigned to the same components), and a description of the differences from the first embodiment of the third aspect will be made with reference to FIGS. 72 to 75.

The processes of steps S1 to S26*b* are the same as those in the first embodiment of the third aspect.

When the decryption key is not possessed in the process of step S26*b*, a second predicate logic information acquisition unit 35 of the decryption apparatus 30 reads the policy, the schema pair, the public parameter, and the user information from the memory 31 and obtains attribute information (called second attribute information) or predicate information (called second predicate information) from the user information (step S27*g*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17*a* is used in this process. In the second embodiment of the third aspect, the second attribute information and the second predicate information are one or a plurality of vector information having elements of the finite field $F_q$ as components (see FIGS. 11 to 13).

After the process of step S27*g*, the process of step 27 is performed. In this process, the transmitter unit 34 of the decryption apparatus 30 generates a key request message that includes the public parameter, the policy, the schema pair, and the authentication information read from the memory 31, and the second attribute information or the second predicate information, under the control of the controller unit. The transmitter unit 34 of the decryption apparatus 30 sends the key request message to the key generation apparatus having the address read from the memory 31, and the receiver unit of the key generation apparatus 20 receives the key request message.

When the verification succeeds in the process of step S28*a*, the process of step S28*d* is performed. Since the key generation apparatus 20 has received the second attribute information or the second predicate information from the decryption apparatus 30, the function and the process for generating the information are unnecessary, unlike in the first embodiment of the third aspect.

The processes of steps S32 to S35, to be performed after the process of step S28*d*, are the same as those in the first embodiment of the third aspect.

(Third Embodiment According to Third Aspect)

A third embodiment of the third aspect differs from the first embodiment of the third aspect in that the encryption unit 13 of the encryption apparatus 10 uses the first attribute information $v=(v_1, \ldots, v_n)$ or the first predicate information $w=(w_1, \ldots, w_n)$, together with the public key included in the public parameter and the content M read from the memory 11, to obtain encrypted content $C_1$. In other words, the predicate encryption algorithm disclosed in Non-patent literature 2, for example, is used in the third embodiment of the third aspect. Because of this difference, the third embodiment of the third aspect differs in several points from the first embodiment of the third aspect. A description of commonalities between the first and third embodiments of the third aspect is omitted (the same reference numerals are assigned to the same components), and a description of the differences from the first embodiment of the third aspect will be made with reference to FIGS. 76 to 79.

The processes of steps S1 to S17*a* are the same as those in the first embodiment of the third aspect. The public parameter and some other information are required by the predicate encryption algorithm of the third embodiment of the third aspect. For specific information required, see Non-patent literature 2, described above, for example.

In the process of step S17*b*1, following the process of step S17*a*, the encryption unit 13 of the encryption apparatus 10 uses the first attribute information $v=(v_1, \ldots, v_n)$ or the first predicate information $w=(w_1, \ldots, w_n)$, together with the public key included in the public parameter and the content M read from the memory 11, to obtain encrypted content $C_1$ according to the predicate encryption algorithm (step S17*b*1).

After the process of step S17*b*1, the process of step 17*d* is performed. In this process, the transmitter unit 14 of the encryption apparatus 10 generates an encrypted message that includes the encrypted content $C_1$, and the schema pair, the policy, the public parameter, and the address of the key generation apparatus read from the memory 31, under the control of the controller unit (step S17*d*).

The processes of steps S18 to S32, following the process of step S17*d*, are the same as those in the first embodiment of the third aspect.

In the process of step S26*c*1, following the process of step S32, a decryption unit 33*c* included in the relay unit 33 of the decryption apparatus 30 reads the public parameter, the decryption key R, and the encrypted content $C_1$ from the memory 31 to calculate content M according to the predicate encryption algorithm (step S26*c*1).

The processes of steps S34 and S35, following the process of step S26*c*1, are the same as those in the first embodiment of the third aspect.

(Fourth Embodiment According to Third Aspect)

Figure 80:
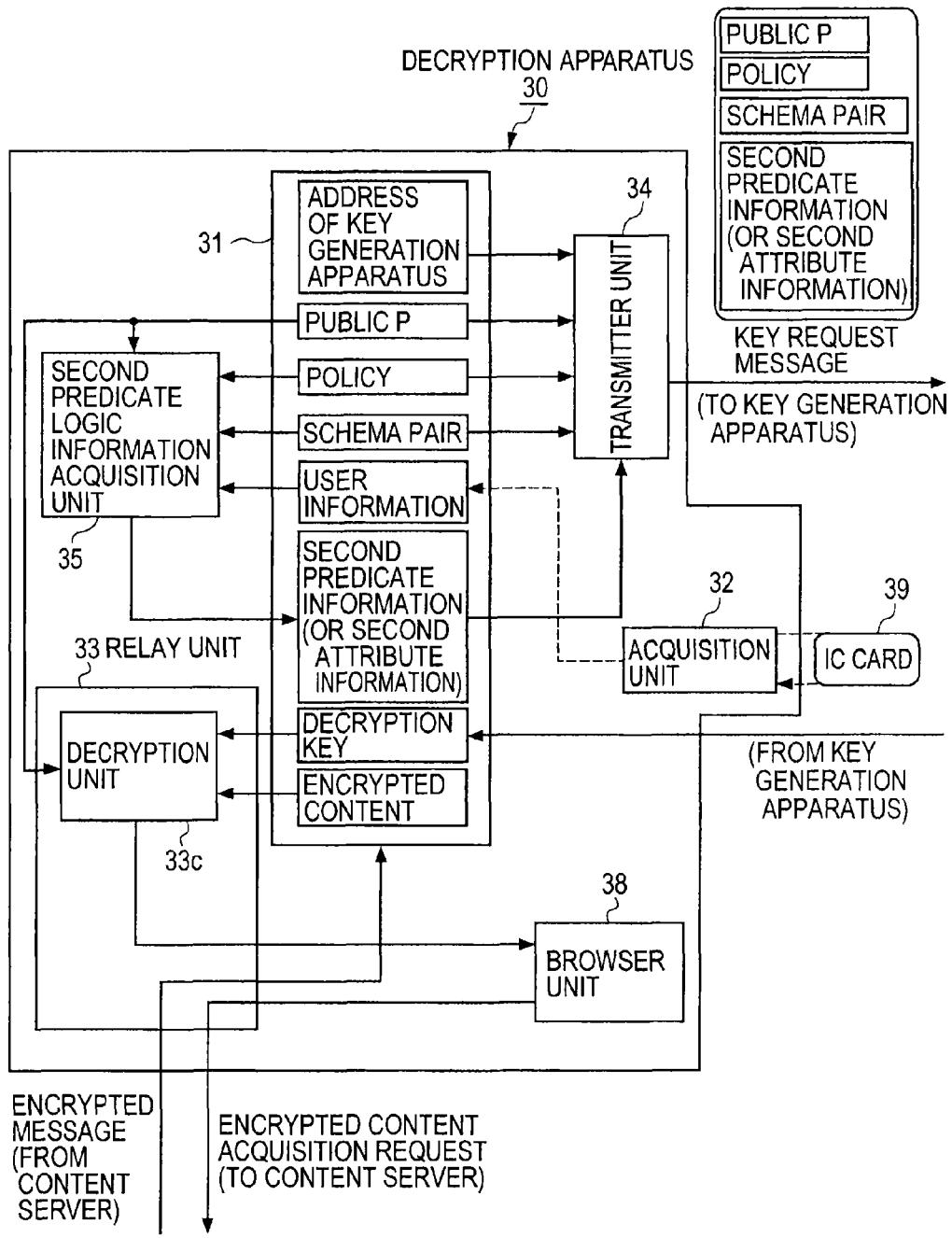
FIG. 80 is a functional block diagram of a decryption apparatus according to a fourth embodiment of the third aspect.
Figure 81:
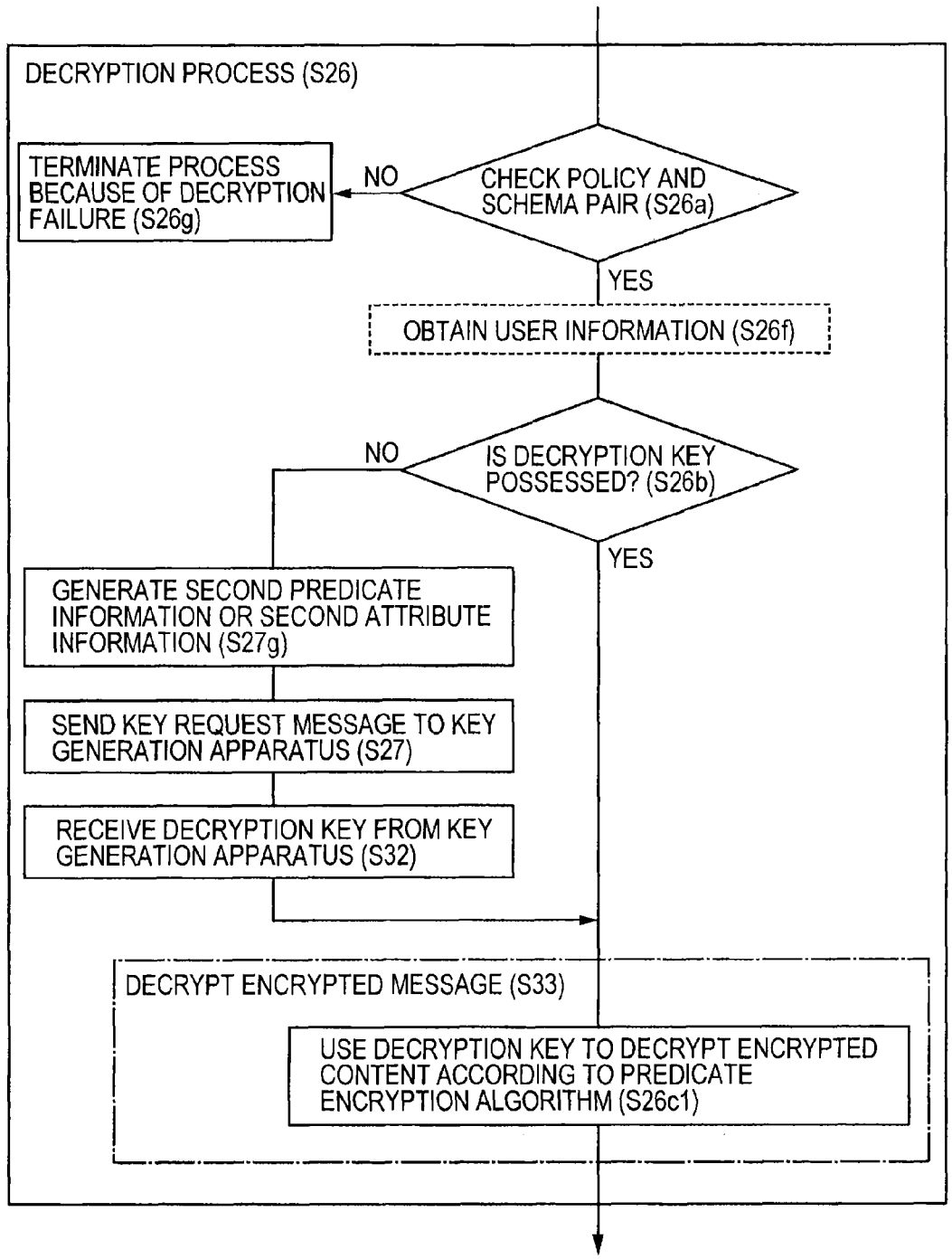
FIG. 81 is a view showing a detailed processing procedure of a decryption process according to the fourth embodiment of the third aspect.

A fourth embodiment of the third aspect corresponds to a combination of the second embodiment of the third aspect and the third embodiment of the third aspect. The fourth embodiment of the third aspect differs from the first embodiment of the third aspect in that (1) the decryption apparatus 30 generates the second attribute information or the second predicate information, and (2) the encryption unit 13 of the encryption apparatus 10 uses the first attribute information $v=(v_1, \ldots, v_n)$ or the first predicate information $w=(w_1, \ldots, w_n)$, together with the public key included in the public parameter and the content M read from the memory 11, to obtain encrypted content $C_1$. Because of these differences, the fourth embodiment of the third aspect differs in several points from the first embodiment of the third aspect. A description of commonalities between the first and fourth embodiments of the third aspect is omitted (the same reference numerals are assigned to the same components), and a description of the differences from the first embodiment of the third aspect will be made with reference to FIGS. 80 and 81.

The processes of steps S1 to S17*a* are the same as those in the first embodiment of the third aspect. The public parameter and some other information are required by the predicate encryption algorithm of the fourth embodiment of the third aspect. For specific information required, see Non-patent literature 2, described above, for example.

In the process of step S17*b*1, following the process of step S17*a*, the encryption unit 13 of the encryption apparatus 10 uses the first attribute information $v=(v_1, \ldots, v_n)$ or the first predicate information $w=(w_1, \ldots, w_n)$, together with the public key included in the public parameter and the content M read from the memory 11, to obtain encrypted content $C_1$ according to the predicate encryption algorithm (step S17*b*1).

After the process of step S17*b*1, the process of step 17*d* is performed. In this process, the transmitter unit 14 of the encryption apparatus 10 generates an encrypted message that includes the encrypted content $C_1$, and the schema pair, the policy, the public parameter, and the address of the key generation apparatus read from the memory 31, under the control of the controller unit (step S17*d*).

The processes of steps S18 to S26*b*, following the process of step S17*d*, are the same as those in the first embodiment of the third aspect.

When the decryption key is not possessed in the process of step S26*b*, the second predicate logic information acquisition unit 35 of the decryption apparatus 30 reads the policy, the schema pair, the public parameter, and the user information from the memory 31 and obtains attribute information (called second attribute information) or predicate information (called second predicate information) from the user information (step S27*g*). In this process, the schema paired with the schema identified by the policy is applied to the user information. When the policy is Cipher_Text_Policy, the schema (attribute schema) paired with the schema (predicate schema) identified by Cipher_Text_Policy is used to obtain the second attribute information from the user information (attribute designation information). When the policy is Key_Policy, the schema (predicate schema) paired with the schema (attribute schema) identified by Key_Policy is used to obtain the second predicate information from the user information (predicate designation information). It should be noted that the schema paired with the schema used in step S17*a* is used in this process. In the fourth embodiment of the third aspect, the second attribute information and the second predicate information are one or a plurality of vector information having elements of the finite field $F_q$ as components (see FIGS. 11 to 13).

After the process of step S27*g*, the process of step 27 is performed. In this process, the transmitter unit 34 of the decryption apparatus 30 generates a key request message that includes the public parameter, the policy, the schema pair, and the authentication information read from the memory 31, and the second attribute information or the second predicate information, under the control of the controller unit. The transmitter unit 34 of the decryption apparatus 30 sends the key request message to the key generation apparatus having the address read from the memory 31, and the receiver unit of the key generation apparatus 20 receives the key request message.

When the verification succeeds in the process of step S28a, the process of step S28d is performed. Since the key generation apparatus 20 has received the second attribute information or the second predicate information from the decryption apparatus 30, the function and the process for generating the information are unnecessary.

The process of step S32, following the process of step S28d, is the same as that in the first embodiment of the third aspect.

In the process of step S26c1, following the process of step S32, the decryption unit 33 of the decryption apparatus 30 reads the public parameter, the decryption key R, and the encrypted content $C_1$ from the memory 31 to calculate content M according to the predicate encryption algorithm (step S26c1).

The processes of steps S34 and S35, to be performed after the process of step S26c1, are the same as those in the first embodiment of the third aspect.

The relay unit decrypts the encrypted content as clearly understood from the above described embodiments of the third aspect. Therefore, decryption can be performed separately from the usual protocol of, for example, a WWW server or a WWW browser, and a known WWW system can be used easily. Since the relay unit performs decryption even when the user does not perform any operation to decrypt the encrypted content, the user is provided with great convenience.

In the above described embodiments of the third aspect, a cache server may be provided at the communication path between the content server 60 and the decryption apparatus 30 (in that case, the encrypted content is cached).

The relay unit may cache the encrypted content before it is decrypted, in order to provide convenience when a client terminal is not always connected to the communication network 5.

To avoid the caching operation of a WWW browser for the decrypted content, an HTTP cache control header that disables caching may be added to a response to the WWW browser.

When a plurality of users use the same client terminal, the relay unit may have an authentication function. In that case, basic authentication and digest authentication in HTTP may be used for a WWW browser, and an authentication information (user IDs and passwords) table and a management function for adding, changing, and deleting authentication information may be added to the relay unit.

It is preferred that the above described embodiments of the third aspect be applied to content delivery systems. Since predicate encryption is not based on information depending on the receiver, it is preferred that the predicate encryption be applied to access control of content that may be browsed by unspecified persons.

FIG. 82 shows the structure of data exchanged. The basic format of the entire message conforms, for example, to S/MIME (Secure Multipurpose Internet Mail Extensions). An appropriate data structure is given to data from the start position marker of an encrypted message to the end position marker of the encrypted message in XML (the eXtensible Markup Language) or other some language.

Data related to the encrypted content is called an encryption block. The components of the encryption block will be described below.

An algorithm identifier block specifies information that identifies the predicate encryption algorithm used to encrypt the private key and the private key encryption algorithm used to encrypt the content. An identifier indicating the algorithm or the version of an algorithm (for example, PE/Version X+Camellia (Camellia is a registered trademark)) can be specified.

A digital signature block specifies the digital signature. A known signature algorithm can be used. This item can be omitted depending on the application.

A public parameter information block specifies information that identifies the public parameter used. An identifier that identifies the public parameter or the data of the public parameter can be specified.

A policy field specifies an identifier that identifies the policy used.

A schema field specifies an identifier that identifies the schema used or the data of the schema.

An encryption information field specifies the data (encryption information) obtained by encrypting, with the predicate encryption, the private key used to encrypt the content.

A content file name, a content type, and a content file size specify the file name of the content, the data type (such as text or html) of the content, and the file size of the content, respectively.

An attribute field and a predicate field specify letter string representations that indicate the attribute and the predicate used for encryption, corresponding to the policy field, respectively. These items can be omitted according to the application.

The encrypted content generated by encrypting the content is described in encryption data.

The basic data structure of the content is described with HTML (Hyper Text Markup Language), and the encryption block is specified by a comment statement in HTML.

The encryption block is given an appropriate data structure with XML (the eXtensible Markup Language) or other languages.

When the encrypted content is directly browsed with a browser, comment statements are not displayed, and the other HTML statements are displayed. Therefore, a message indicating that the data includes encrypted content or an error message for a decryption failure may be described in the other HTML statements.

In the above description, the algebraic structure S is a finite field. The algebraic structure may be a finite ring (integer residue ring). When a predicate encryption algorithm uses an inner product, for example, the first and second attribute information and the first and second predicate information are vectors having elements of S as components.

According to the scheme of the algebraic structure S, the public key B is a set of elements of a module V on S, the private key B* is a set of elements of a module V* dual of the module V, and the decryption key R is an element of the dual module V*. When the algebraic structure S is a finite field, the module V on the finite field is a so-called vector space on the finite field. In that case, the encryption unit performs calculations that include a scalar multiplication in which the elements of the public key B are multiplied by the components, used as coefficients, of the first attribute information or a scalar multiplication in which the elements of the public key B are multiplied by the components, used as coefficients, of the first predicate information, to obtain encryption information. The key generation unit performs calculations that include a scalar multiplication in which the elements of the private key B* are multiplied by the components, used as coefficients, of the second predicate information or a scalar multiplication in which the elements of the private key B* are multiplied by the components, used as coefficients, of the second attribute information, to obtain the decryption key R.

The hardware entities (the client apparatus, the key generation apparatus, the registration apparatus, the management apparatus, the maintenance apparatus, the authentication apparatus, and the content server) included in the cryptographic system include an input unit connectable to a keyboard or the like, an output unit connectable to a liquid crystal display unit and or like, a communication unit connectable to a communication apparatus (such as a communication cable) with which communications are allowed outside the entities, a CPU (central processing unit) (which may be provided with a cache memory and a register), memories such as a RAM and a ROM, an external storage device (hard disk), and a bus that is connected such that data can be exchanged among the input unit, the output unit, the communication unit, the CPU, the RAM, the ROM, and the external storage unit. If necessary, the hardware entities may be provided with an apparatus (drive) that can read and write data to and from a storage medium such as a CD-ROM. Physical entities provided with such hardware resources include a general purpose computer.

The external storage device of each hardware entity stores a program required to implement the foregoing functions and data required in the processing of the program (instead of the external storage device, a read only storage device, that is, a ROM, may store the program, for example). Data obtained by the processing of the program and the like are stored in a RAM or the external storage device, if necessary. In the above descriptions, storage devices, such as RAMs and registers, that store calculation results and the addresses of the storage areas of the results are called just memories.

In each hardware entity, the program stored in the external storage device (or the ROM) and the data required for the processing of the program are read into a memory, when needed, and are interpreted, executed, or processed by the CPU, as required. As a result, the CPU implements the predetermined functions (such as those of the encryption unit, the decryption unit, the key generation unit, the first predicate logic information acquisition unit, the second predicate logic information acquisition unit, and the control unit).

Numerical calculations in number theory are required in some cases in detailed operations of the hardware entities described in each embodiment. Since the numerical calculations in number theory are performed in the same way as with a known technology, a detailed description thereof, including a calculation method thereof, is omitted. (Software that is capable of the numerical calculations in number theory and indicates the current technical level thereof includes PARI/GP and KANT/KASH. For PARI/GP, see http://pari.math.u-bordeaux.fr/, retrieved on Apr. 14, 2009. For KANT/KASH, see http://www.math.tu-berlin.de/algebra/, retrieved on Apr. 14, 2009.) The following reference A describes the numerical calculations in number theory.

Reference A: H. Cohen, "A Course in Computational Algebraic Number Theory", GTM 138, Springer-Verlag, 1993.

The present invention is not limited to the embodiments described above, and appropriate modifications can be made without departing from the scope of the present invention. The processes described in the above embodiments may be executed not only time sequentially according to the order of description but also in parallel or individually when necessary or according to the processing capabilities of the apparatuses that execute the processes.

When the processing functions of the hardware entities described in the above embodiments are implemented by a computer, the processing details of the functions that should be provided by hardware entities are described in a program. When the program is executed by a computer, the processing functions of the hardware entities are implemented on the computer.

The program containing the processing details can be recorded in a computer-readable storage medium. The computer-readable storage medium can be any type of medium, such as a magnetic storage device, an optical disc, a magneto-optical storage medium, and a semiconductor memory. For example, a hard disk device, a flexible disk, a magnetic tape, or the like can be used as a magnetic recording device; a digital versatile disc (DVD), a DVD random access memory (DVD-RAM), a compact disc read only memory (CD-ROM), a CD recordable or rewritable (CD-R/RW), or the like can be used as an optical disc; a magneto-optical disc or the like can be used as a magneto-optical storage medium; and an electronically erasable and programmable read only memory (EEPROM) or the like can be used as a semiconductor memory.

The program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

A computer that executes this type of program first stores the program recorded on the portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the processing may be executed by a so-called application service provider (ASP) service, in which the processing function is implemented just by giving a program execution instruction and obtaining the results without transferring the program from the server computer to the computer. The program of this form includes information that is provided for use in processing by a computer and is treated correspondingly as a program (something that is not a direct instruction to the computer but is data or the like that has characteristics that determine the processing executed by the computer).

In the description given above, the hardware entities are implemented by executing the predetermined program on the computer, but at least a part of the processing may be implemented by hardware.

Information described in figures, such as names, are imaginary and has no relationship with actual persons.

<Summing Up>

The present invention can be summed up from the first aspect in the following way.

Item 1

A cryptographic system that uses predicate encryption, comprising at least:
one or a plurality of encryption apparatuses;
one or a plurality of key generation apparatuses; and
one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus, to obtain a common key, and encryption information corresponding to the common key or corresponding to information used to generate the common key, according to the functional encryption algorithm;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information; and each of the one or the plurality of decryption apparatuses comprises a decryption unit adapted to use the decryption key to apply a decryption process to the encryption information according to the functional encryption algorithm.

Item 2

A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus, to obtain a common key, and encryption information corresponding to the common key or corresponding to information used to generate the common key, according to the functional encryption algorithm;

each of the one or the plurality of decryption apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a decryption unit adapted to use a decryption key sent from the key generation apparatus to apply a decryption process to the encryption information according to the functional encryption algorithm; and each of the one or the plurality of key generation apparatuses comprises a key generation unit adapted to use the second attribute information or the second logic information, together with the private key of the key generation apparatus, to generate the decryption key used to decrypt the encryption information.

Item 3

A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and plaintext, to obtain encryption information corresponding to the plaintext according to the functional encryption algorithm;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information; and each of the one or the plurality of decryption apparatuses comprises a decryption unit adapted to use the decryption key to apply a decryption process to the encryption information according to the functional encryption algorithm.

Item 4

A cryptographic system that uses functional encryption, comprising at least:

one or a plurality of encryption apparatuses;
one or a plurality of key generation apparatuses; and
one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and plaintext, to obtain encryption information corresponding to the plaintext according to the functional encryption algorithm;

each of the one or the plurality of decryption apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a decryption unit adapted to use a decryption key sent from the key generation apparatus to apply a decryption process to the encryption information according to the functional encryption algorithm; and each of the one or the plurality of key generation apparatuses comprises a key generation unit adapted to use the second attribute information or the second logic information, together with the private key of the key generation apparatus, to generate the decryption key used to decrypt the encryption information.

Item 5

A cryptographic system according to one of Items 1 and 2, wherein the encryption unit of the encryption apparatus encrypts plaintext with the common key to obtain ciphertext; and the decryption unit of the decryption apparatus uses the common key obtained in the decryption process to apply a second decryption process to the ciphertext or uses a common key generated from the information that is obtained in the decryption process and that is used to generate the common key to apply a second decryption process to the ciphertext.

Item 6

A cryptographic system according to one of Items 1 to 5, wherein the attribute designation information and/or the logical expression designation information corresponding to the user is stored in a storage medium; and the decryption apparatus comprises a user information acquisition unit adapted to acquire the attribute designation information or the logical expression designation information corresponding to the user of the decryption apparatus from the storage medium.

Item 7

A cryptographic system according to one of Items 1 and 3, wherein the attribute designation information or the logical expression designation information corresponding to the user of the decryption apparatus, the information being used by the key generation apparatus, is obtained from the decryption apparatus.

Item 8

A cryptographic system according to one of Items 1 to 6, wherein the cryptographic system further comprises one or a plurality of user information management apparatuses;

each of the one or the plurality of user information management apparatuses comprises a storage unit adapted to store the attribute designation information and/or the logical expression designation information corresponding to the user; and the key generation apparatus obtains the attribute designation information or the logical expression designation information corresponding to the user of the decryption apparatus from the user information management apparatus.

Item 9

A cryptographic system according to one of Items 1 to 8, wherein the one or the plurality of conversion rule information pairs are determined in advance for each of the one or the plurality of key generation apparatuses;

the cryptographic system further comprises one or a plurality of conversion rule information pair management apparatuses;

each of the one or the plurality of conversion rule information pair management apparatuses comprises a storage unit adapted to store the conversion rule information pair corresponding to each of the one or the plurality of key generation apparatuses;

the encryption apparatus comprises a conversion rule information pair acquisition unit adapted to acquire the conversion rule information pair from the conversion rule information pair management apparatus; and the decryption apparatus comprises a conversion rule information pair acquisition unit adapted to acquire the conversion rule information pair from the conversion rule information pair management apparatus Item 10

A cryptographic system according to one of Items 1 to 8, wherein the one or the plurality of conversion rule information pairs are determined in advance for each of the one or the plurality of key generation apparatuses;

each of the one or the plurality of key generation apparatuses further comprises a storage unit adapted to store the conversion rule information pair corresponding to the key generation apparatus;

each of the one or the plurality of encryption apparatuses further comprises a storage unit adapted to store the conversion rule information pair corresponding to at least one of the one or the plurality of the key generation apparatuses; and each of the one or the plurality of decryption apparatuses further comprises a storage unit adapted to store the conversion rule information pair corresponding to at least one of the one or the plurality of the key generation apparatuses.

Item 11

A cryptographic system according to one of Items 1 to 10, wherein whether the policy information identifies only the attribute conversion rule information, only the logical expression conversion rule information, or the attribute conversion rule information and the logical expression conversion rule information is determined in advance for each of the one or the plurality of key generation apparatuses.

Item 12

A cryptographic system according to one of Items 1 to 11, wherein an algebraic structure K is a finite ring or a finite field;

the first and second attribute information and the first and second logic information are vectors having elements of K as components; and the decryption process of the decryption unit receives the encryption information and the decryption key as inputs and performs a calculation depending on the result of the canonical inner product of the first logic information and the second attribute information, or of the canonical inner product of the first attribute information and the second logic information.

Item 13

A cryptographic system according to Item 12, wherein the public key is a set of elements of a module V on K;

the private key is a set of elements of a module V* dual of the module V;

the decryption key is an element of the dual module V*; the encryption unit performs calculations that include a scalar multiplication in which the elements of the public key are multiplied by the components, used as coefficients, of the first attribute information or a scalar multiplication in which the elements of the public key are multiplied by the components, used as coefficients, of the first logic information, to obtain the encryption information;

the key generation unit performs calculations that include a scalar multiplication in which the elements of the private key are multiplied by the components, used as coefficients, of the second logic information or a scalar multiplication in which the elements of the private key are multiplied by the components, used as coefficients, of the second attribute information, to obtain the decryption key; and the calculation used in the decryption process of the decryption unit has bilinearity and the result of the calculation depends on the result of the canonical inner product of the first logic information and the second attribute information, or of the first attribute information and the second logic information, all the pieces of information being taken out from the encryption information and the decryption key according to bilinearity.

Item 14

A cryptographic communication method for a cryptographic system that uses functional encryption and includes at least one or a plurality of encryption apparatuses;

one or a plurality of key generation apparatuses; and one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus, to obtain a common key and encryption information corresponding to the common key or corresponding to information used to generate the common key, according to the functional encryption algorithm, in an encryption unit of the encryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of each of the one or the plurality of key generation apparatuses;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of each of the one or the plurality of decryption apparatuses.

Item 15

A cryptographic communication method for a cryptographic system that uses functional encryption and includes at least one or a plurality of encryption apparatuses;
one or a plurality of key generation apparatuses; and
one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus, to obtain a common key and encryption information corresponding to the common key or corresponding to information used to generate the common key, according to the functional encryption algorithm, in an encryption unit of the encryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of the decryption apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

Item 16

A cryptographic communication method for a cryptographic system that uses functional encryption and includes at least one or a plurality of encryption apparatuses;
one or a plurality of key generation apparatuses; and
one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information in a first propositional logic information acquisition unit of each of the one or the plurality of encryption apparatuses;

an encryption step of using the first attribute information or the first logic information, together with the public key of the key generation apparatus and plaintext, to obtain encryption information corresponding to the plaintext, according to the functional encryption algorithm, in an encryption unit of the encryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of each of the one or the plurality of key generation apparatuses;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of each of the one or the plurality of decryption apparatuses.

Item 17

A cryptographic communication method for a cryptographic system that uses functional encryption and includes at least one or a plurality of encryption apparatuses;

one or a plurality of key generation apparatuses; and one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and plaintext, to obtain encryption information corresponding to the plaintext, according to the functional encryption algorithm, in an encryption unit of the encryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of the decryption apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

Item 18

A cryptographic communication method according to one of Items 14 and 15, wherein the encryption step comprises a ciphertext generation step of also encrypting plaintext with the common key to obtain ciphertext, in the encryption unit; and the decryption step comprises a second decryption step of performing a second decryption process of the ciphertext with the common key obtained in the decryption process or a second decryption process of the ciphertext with a common key generated from the information used to generate the common key and obtained in the decryption process, in the decryption unit.

Item 19

A cryptographic communication method according to one of Items 14 to 18, comprising an acquisition step of acquiring the attribute designation information or the logical expression designation information corresponding to the user of the decryption apparatus from a storage medium that stores the attribute designation information and/or the logical expression designation information corresponding to the user, in an acquisition unit of the decryption apparatus.

Item 20

A cryptographic communication method according to one of Items 14 and 16, comprising a user information transmission step of transmitting the attribute designation information or the logical expression designation information corresponding to the user of the decryption apparatus, to the key generation apparatus, in a transmitter unit of the decryption apparatus; and a user information receiving step of receiving the attribute designation information or the logical expression designation information corresponding to the user from the decryption apparatus, in a receiver unit of the key generation apparatus.

Item 21

A cryptographic communication method according to one of Items 14 to 18, wherein the cryptographic system comprises one or a plurality of user information management apparatuses provided with a storage unit adapted to store the attribute designation information and/or the logical expression designation information corresponding to the user; and the cryptographic communication method comprises a user information acquisition step of acquiring the attribute designation information or the logical expression designation information corresponding to the user of the decryption apparatus from the user information management apparatus, in a user information acquisition unit of the key generation apparatus.

Item 22

A cryptographic communication method according to one of Items 14 to 21, wherein the one or the plurality of conversion rule information pairs are determined in advance for each of the one or the plurality of key generation apparatuses;

the cryptographic system comprises one or a plurality of conversion rule information pair management apparatuses provided with a storage unit adapted to store the conversion rule information pair corresponding to each of the one or the plurality of key generation apparatuses; and the cryptographic communication method comprises:

a conversion rule information pair acquisition step of acquiring the conversion rule information pair from the conversion rule information pair management apparatus, in a conversion rule information pair acquisition unit of the encryption apparatus; and a conversion rule information pair acquisition step of acquiring the conversion rule information pair from the conversion rule information pair management apparatus, in a conversion rule information pair acquisition unit of the decryption apparatus.

Item 23

A cryptographic communication method according to one of Items 14 to 22, wherein whether the policy information identifies only the attribute conversion rule information, only the logical expression conversion rule information, or the attribute conversion rule information and the logical expression conversion rule information is determined in advance for each of the one or the plurality of key generation apparatuses.

Item 24

A cryptographic communication method according to one of Items 14 to 23, wherein an algebraic structure K is a finite ring or a finite field;

the first and second attribute information and the first and second logic information are vectors having elements of K as components; and in the decryption step, the encryption information and the decryption key serve as inputs and a calculation is performed depending on the result of the canonical inner product of the first logic information and the second attribute information, or of the canonical inner product of the first attribute information and the second logic information, in the decryption unit.

Item 25

A cryptographic communication method according to Item 24, wherein the public key is a set of elements of a module V on K;

the private key is a set of elements of a module V* dual of the module V;

the decryption key is an element of the dual module V*;

in the encryption step, calculations that include a scalar multiplication in which the elements of the public key are multiplied by the components, used as coefficients, of the first attribute information or a scalar multiplication in which the elements of the public key are multiplied by the components, used as coefficients, of the first logic information, are performed to obtain the encryption information, in the encryption unit;

in the key generation step, calculations that include a scalar multiplication in which the elements of the private key are multiplied by the components, used as coefficients, of the second logic information or a scalar multiplication in which the elements of the private key are multiplied by the components, used as coefficients, of the second attribute information, are performed to obtain the decryption key, in the key generation unit; and the calculation used in the decryption process of the decryption unit has bilinearity and the result of the calculation depends on the result of the canonical inner product of the first logic information and the second attribute information, or of the first attribute information and the second logic information, all the pieces of information being taken out from the encryption information and the decryption key according to bilinearity.

Item 26

An encryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the encryption apparatus comprising:

a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus, to obtain a common key, and encryption information corresponding to the common key or corresponding to information used to generate the common key, according to the functional encryption algorithm.

Item 27

An encryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the encryption apparatus comprising:

a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and plaintext, to obtain encryption information corresponding to the plaintext, according to the functional encryption algorithm.

Item 28

A key generation apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the key generation apparatus comprising:

a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information.

Item 29

A key generation apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the key generation apparatus comprising a key generation unit adapted to use the private key of the key generation apparatus, together with attribute information (hereafter called second attribute information) or logic information (hereafter called second logic information) generated from attribute designation information or logical expression designation information corresponding to a user of the decryption apparatus by using the conversion rule information paired with the conversion rule information identified by the policy information, to generate a decryption key used to decrypt the encryption information.

Item 30

A decryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising a decryption unit adapted to use a decryption key generated by the key generation apparatus to apply a decryption process to encryption information generated by the encryption apparatus, according to the functional encryption algorithm.

Item 31

A decryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising:

a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a decryption unit adapted to use a decryption key generated by the key generation apparatus to apply a decryption process to encryption information generated by the encryption apparatus, according to the functional encryption algorithm.

Item 32

A program for making a computer function as an encryption apparatus according to one of Items 26 and 27.

Item 33

A program for making a computer function as a key generation apparatus according to one of Items 28 and 29.

Item 34

A program for making a computer function as a decryption apparatus according to one of Items 30 and 31.

Item 35

A computer readable storage medium having stored thereon at least one of a program according to Item 32, a program according to Item 33, and a program according to Item 34.

The present invention can be summed up from the second aspect in the following way. In the following description, item numbers will start again at one.

Item 1

A cryptographic communication method for a cryptographic system that uses functional encryption and includes at least one or a plurality of encryption apparatuses;

one or a plurality of key generation apparatuses; and a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus, to obtain a common key and encryption information corresponding to the common key or corresponding to information used to generate the common key, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the first decryption apparatus, in a second propositional logic information acquisition unit of each of the one or the plurality of key generation apparatuses;

a key generation step of using the second attribute information or the second logic information, together with the private key of the key generation apparatus, to generate a first decryption key used to decrypt the encryption information, in a key generation unit of the key generation apparatus; and a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain attribute information (hereafter called third attribute information) or logic information (hereafter called third logic information) from attribute designation information or logical expression designation information corresponding to a user of the second decryption apparatus, in the second propositional logic information acquisition unit of the key generation apparatus;

a key generation step of using the third attribute information or the third logic information, together with the private key of the key generation apparatus, to generate a second decryption key used to decrypt the encryption information, in the key generation unit of the key generation apparatus; and a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

Item 2

A cryptographic communication method for a cryptographic system that uses functional encryption and includes at least one or a plurality of encryption apparatuses;

one or a plurality of key generation apparatuses; and a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus, to obtain a common key and encryption information corresponding to the common key or corresponding to information used to generate the common key, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the first decryption apparatus, in a second propositional logic information acquisition unit of the first decryption apparatus;

a logic information transmission step of transmitting the second attribute information or the second logic information to the key generation apparatus, in a transmitter unit of the first decryption apparatus;

a logic information receiving step of receiving the second attribute information or the second logic information from the first decryption apparatus, in a receiver unit of the key generation apparatus;

a key generation step of using the second attribute information or the second logic information, together with the private key of the key generation apparatus, to generate a first decryption key used to decrypt the encryption information, in a key generation unit of the key generation apparatus; and a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain attribute information (hereafter called third attribute information) or logic information (hereafter called third logic information) from attribute designation information or logical expression designation information corresponding to a user of the second decryption apparatus, in the second propositional logic information acquisition unit of the second decryption apparatus;

a logic information transmission step of transmitting the third attribute information or the third logic information to the key generation apparatus, in a transmitter unit of the second decryption apparatus;

a logic information receiving step of receiving the third attribute information or the third logic information from the second decryption apparatus, in the receiver unit of the key generation apparatus;

a key generation step of using the third attribute information or the third logic information, together with the private key of the key generation apparatus, to generate a second decryption key used to decrypt the encryption information, in the key generation unit of the key generation apparatus; and a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

Item 3

A cryptographic communication method for a cryptographic system that uses functional encryption and includes at least one or a plurality of encryption apparatuses;
one or a plurality of key generation apparatuses; and
a plurality of decryption apparatuses;
wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:
a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and plaintext, to obtain encryption information corresponding to the plaintext, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the first decryption apparatus, in a second propositional logic information acquisition unit of each of the one or the plurality of key generation apparatuses;

a key generation step of using the second attribute information or the second logic information, together with the private key of the key generation apparatus, to generate a first decryption key used to decrypt the encryption information, in a key generation unit of the key generation apparatus; and a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain attribute information (hereafter called third attribute information) or logic information (hereafter called third logic information) from attribute designation information or logical expression designation information corresponding to a user of the second decryption apparatus, in the second propositional logic information acquisition unit of the key generation apparatus;

a key generation step of using the third attribute information or the third logic information, together with the private key of the key generation apparatus, to generate a second decryption key used to decrypt the encryption information, in the key generation unit of the key generation apparatus; and a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

Item 4

A cryptographic communication method for a cryptographic system that uses functional encryption and includes at least one or a plurality of encryption apparatuses;
one or a plurality of key generation apparatuses; and
a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and plaintext, to obtain encryption information corresponding to the plaintext, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the first decryption apparatus, in a second propositional logic information acquisition unit of the first decryption apparatus;

a logic information transmission step of transmitting the second attribute information or the second logic information to the key generation apparatus, in a transmitter unit of the first decryption apparatus;

a logic information receiving step of receiving the second attribute information or the second logic information from the first decryption apparatus, in a receiver unit of the key generation apparatus;

a key generation step of using the second attribute information or the second logic information, together with the private key of the key generation apparatus, to generate a first decryption key used to decrypt the encryption information, in a key generation unit of the key generation apparatus; and a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain attribute information (hereafter called third attribute information) or logic information (hereafter called third logic information) from attribute designation information or logical expression designation information corresponding to a user of the second decryption apparatus, in the second propositional logic information acquisition unit of the second decryption apparatus;

a logic information transmission step of transmitting the third attribute information or the third logic information to the key generation apparatus, in a transmitter unit of the second decryption apparatus;

a logic information receiving step of receiving the third attribute information or the third logic information from the second decryption apparatus, in the receiver unit of the key generation apparatus;

a key generation step of using the third attribute information or the third logic information, together with the private key of the key generation apparatus, to generate a second decryption key used to decrypt the encryption information, in the key generation unit of the key generation apparatus; and a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

Item 5

A cryptographic communication method according to one of Items 1 and 2, wherein the encryption step comprises a ciphertext generation step of also encrypting plaintext with the common key to obtain ciphertext, in the encryption unit; and the decryption step comprises a second decryption step of performing a second decryption process of the ciphertext with the common key obtained in the decryption process or a second decryption process of the ciphertext with a common key generated from the information used to generate the common key and obtained in the decryption process, in the decryption unit.

Item 6

A cryptographic communication method according to one of Items 1 to 5, comprising an acquisition step of acquiring the attribute designation information or the logical expression designation information corresponding to the user of the decryption apparatus from a storage medium that stores the attribute designation information and/or the logical expression designation information corresponding to the user, in an acquisition unit of the decryption apparatus.

Item 7

A cryptographic communication method according to one of Items 1 and 3, comprising a user information transmission step of transmitting the attribute designation information or the logical expression designation information corresponding to the user of the decryption apparatus, to the key generation apparatus, in a transmitter unit of the decryption apparatus; and a user information receiving step of receiving the attribute designation information or the logical expression designation information corresponding to the user from the decryption apparatus, in a receiver unit of the key generation apparatus.

Item 8

A cryptographic communication method according to one of Items 1 to 6, wherein the cryptographic system comprises one or a plurality of user information management apparatuses provided with a storage unit adapted to store the attribute designation information and/or the logical expression designation information corresponding to the user; and the cryptographic communication method comprises a user information acquisition step of acquiring the attribute designation information or the logical expression designation information corresponding to the user of the decryption apparatus from the user information management apparatus, in a user information acquisition unit of the key generation apparatus.

Item 9

A cryptographic communication method according to one of Items 1 to 8, wherein the one or the plurality of conversion rule information pairs are determined in advance for each of the one or the plurality of key generation apparatuses;

the cryptographic system comprises one or a plurality of conversion rule information pair management apparatuses provided with a storage unit adapted to store the conversion rule information pair corresponding to each of the one or the plurality of key generation apparatuses; and the cryptographic communication method comprises:

a conversion rule information pair acquisition step of acquiring the conversion rule information pair from the conversion rule information pair management apparatus, in a conversion rule information pair acquisition unit of the encryption apparatus; and a conversion rule information pair acquisition step of acquiring the conversion rule information pair from the conversion rule information pair management apparatus, in a conversion rule information pair acquisition unit of the decryption apparatus.

Item 10

A cryptographic communication method according to one of Items 1 to 9, wherein whether the policy information identifies only the attribute conversion rule information, only the logical expression conversion rule information, or the attribute conversion rule information and the logical expression conversion rule information is determined in advance for each of the one or the plurality of key generation apparatuses.

Item 11

A cryptographic communication method according to one of Items 1 to 10, wherein an algebraic structure K is a finite ring or a finite field;

the first and second attribute information and the first and second logic information are vectors having elements of K as components; and in the decryption step, the encryption information and the decryption key serve as inputs and a calculation is performed depending on the result of the canonical inner product of the first logic information and the second attribute information, or of the canonical inner product of the first attribute information and the second logic information, in the decryption unit.

Item 12

A cryptographic communication method according to Item 11, wherein the public key is a set of elements of a module V on K;

the private key is a set of elements of a module V* dual of the module V;

the decryption key is an element of the dual module V*;

in the encryption step, calculations that include a scalar multiplication in which the elements of the public key are multiplied by the components, used as coefficients, of the first attribute information or a scalar multiplication in which the elements of the public key are multiplied by the components, used as coefficients, of the first logic information, are performed to obtain the encryption information, in the encryption unit;

in the key generation step, calculations that include a scalar multiplication in which the elements of the private key are multiplied by the components, used as coefficients, of the second logic information or a scalar multiplication in which the elements of the private key are multiplied by the components, used as coefficients, of the second attribute information, are performed to obtain the decryption key, in the key generation unit; and the calculation used in the decryption process of the decryption unit has bilinearity and the result of the calculation depends on the result of the canonical inner product of the first logic information and the second attribute information, or of the first attribute information and the second logic information, all the pieces of information being taken out from the encryption information and the decryption key according to bilinearity.

Item 13

A cryptographic system that uses functional encryption, comprising at least:

one or a plurality of encryption apparatuses;
one or a plurality of key generation apparatuses; and
a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus, to obtain a common key, and encryption information corresponding to the common key or corresponding to information used to generate the common key, according to the functional encryption algorithm;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information; and the decryption apparatus comprises a decryption unit adapted to use the decryption key to apply a decryption process to the encryption information according to the functional encryption algorithm; and a transfer unit adapted to transfer the encryption information to at least one decryption apparatus other than the decryption apparatus.

Item 14

A cryptographic system that uses functional encryption, comprising at least:

one or a plurality of encryption apparatuses;
one or a plurality of key generation apparatuses; and
a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus, to obtain a common key, and encryption information corresponding to the common key or corresponding to information used to generate the common key, according to the functional encryption algorithm;

the decryption apparatus comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus;

a decryption unit adapted to use a decryption key sent from the key generation apparatus to apply a decryption process to the encryption information according to the functional encryption algorithm; and a transfer unit adapted to transfer the encryption information to at least one decryption apparatus other than the decryption apparatus; and each of the one or the plurality of key generation apparatuses comprises a key generation unit adapted to use the second attribute information or the second logic information, together with the private key of the key generation apparatus, to generate the decryption key used to decrypt the encryption information.

Item 15

A cryptographic system that uses functional encryption, comprising at least:

one or a plurality of encryption apparatuses;

one or a plurality of key generation apparatuses; and a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and plaintext, to obtain encryption information corresponding to the plaintext according to the functional encryption algorithm;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information; and the decryption apparatus comprises a decryption unit adapted to use the decryption key to apply a decryption process to the encryption information according to the functional encryption algorithm; and a transfer unit adapted to transfer the encryption information to at least one decryption apparatus other than the decryption apparatus.

Item 16

A cryptographic system that uses functional encryption, comprising at least:

one or a plurality of encryption apparatuses;

one or a plurality of key generation apparatuses; and a plurality of decryption apparatuses;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and plaintext, to obtain encryption information corresponding to the plaintext according to the functional encryption algorithm;

the decryption apparatus comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus;

a decryption unit adapted to use a decryption key sent from the key generation apparatus to apply a decryption process to the encryption information according to the functional encryption algorithm; and a transfer unit adapted to transfer the encryption information to at least one decryption apparatus other than the decryption apparatus; and each of the one or the plurality of key generation apparatuses comprises a key generation unit adapted to use the second attribute information or the second logic information, together with the private key of the key generation apparatus, to generate the decryption key used to decrypt the encryption information.

Item 17

A cryptographic system according to one of Items 13 and 14, wherein the encryption unit of the encryption apparatus encrypts plaintext with the common key to obtain ciphertext; and the decryption unit of the decryption apparatus uses the common key obtained in the decryption process to apply a second decryption process to the ciphertext or uses a common key generated from the information that is obtained in the decryption process and that is used to generate the common key to apply a second decryption process to the ciphertext.

Item 18

A decryption apparatus used in a cryptographic system that uses functional encryption and includes, at least, one or a plurality of encryption apparatuses, one or a plurality of key generation apparatuses, and a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising:

a decryption unit adapted to use a decryption key generated by the key generation apparatus to apply a decryption process to encryption information generated by the encryption apparatus, according to the functional encryption algorithm; and a transfer unit adapted to transfer the encryption information to at least one decryption apparatus other than the decryption apparatus.

Item 19

A decryption apparatus used in a cryptographic system that uses functional encryption and includes, at least, one or a plurality of encryption apparatuses, one or a plurality of key generation apparatuses, and a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising:

a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus;

a decryption unit adapted to use a decryption key generated by the key generation apparatus to apply a decryption process to encryption information generated by the encryption apparatus, according to the functional encryption algorithm; and a transfer unit adapted to transfer the encryption information to at least one decryption apparatus other than the decryption apparatus.

Item 20

A program for making a computer function as a decryption apparatus according to one of Items 18 and 19.

Item 21

A computer readable storage medium having stored thereon a program according to Item 20.

The present invention can be summed up from the third aspect in the following way. In the following description, item numbers will start again at one.

Item 1

A cryptographic system that uses functional encryption, comprising at least:

one or a plurality of encryption apparatuses;

one or a plurality of key generation apparatuses;

one or a plurality of decryption apparatuses; and one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm;

each of the one or the plurality of content servers comprises a storage unit adapted to store the encryption information and the encrypted content sent from each of the one or the plurality of encryption apparatuses; and a transmitter unit adapted to transmit the encrypted content and the encryption information corresponding thereto, in response to a request sent from the decryption apparatus, to the decryption apparatus;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encryption information; and each of the one or the plurality of decryption apparatuses comprises a browser unit adapted to perform a process of an acquisition request of the encrypted content for the content server and to display content obtained by decrypting the encrypted content; and a relay unit adapted to send to the content server the acquisition request sent from the browser unit, to use the decryption key to apply a decryption process to the encryption information obtained from the content server, according to the functional encryption algorithm, and to use the common key obtained in the decryption process to perform a content acquisition process for decrypting the encrypted content obtained from the content server.

Item 2

A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm;

each of the one or the plurality of content servers comprises a storage unit adapted to store the encryption information and the encrypted content sent from each of the one or the plurality of encryption apparatuses; and a transmitter unit adapted to transmit the encrypted content and the encryption information corresponding thereto, in response to a request sent from the decryption apparatus, to the decryption apparatus;

each of the one or the plurality of decryption apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus;

a browser unit adapted to perform a process of an acquisition request of the encrypted content for the content server and to display content obtained by decrypting the encrypted content; and a relay unit adapted to send to the content server the acquisition request sent from the browser unit, to use a decryption key sent from the key generation apparatus to apply a decryption process to the encryption information obtained from the content server, according to the functional encryption algorithm, and to use the common key obtained in the decryption process to perform a content acquisition process for decrypting the encrypted content obtained from the content server; and each of the one or the plurality of key generation apparatuses comprises a key generation unit adapted to use the second attribute information or the second logic information, together with the private key of the key generation apparatus, to generate the decryption key used to decrypt the encryption information.

Item 3

A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and content, to encrypt the content to obtain encrypted content, according to the functional encryption algorithm;

each of the one or the plurality of content servers comprises a storage unit adapted to store the encrypted content sent from each of the one or the plurality of encryption apparatuses; and a transmitter unit adapted to transmit the encrypted content, in response to a request sent from the decryption apparatus, to the decryption apparatus;

each of the one or the plurality of key generation apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus; and a key generation unit adapted to use the second attribute information or the second logic information, together with the private key of the key generation apparatus, to generate a decryption key used to decrypt the encrypted content; and each of the one or the plurality of decryption apparatuses comprises a browser unit adapted to perform a process of an acquisition request of the encrypted content for the content server and to display content obtained by decrypting the encrypted content; and a relay unit adapted to send to the content server the acquisition request sent from the browser unit, and to use the decryption key to apply a decryption process to the encrypted content obtained from the content server, according to the functional encryption algorithm.

Item 4

A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm;

policy information that identifies one of the attribute conversion rule information and the logical expression conversion rule information is determined in advance;

each of the one or the plurality of encryption apparatuses comprises a first propositional logic information acquisition unit adapted to use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information; and an encryption unit adapted to use the first attribute information or the first logic information, together with the public key of the key generation apparatus and content, to encrypt the content to obtain encrypted content, according to the functional encryption algorithm;

each of the one or the plurality of content servers comprises a storage unit adapted to store the encrypted content sent from each of the one or the plurality of encryption apparatuses; and a transmitter unit adapted to transmit the encrypted content, in response to a request sent from the decryption apparatus, to the decryption apparatus;

each of the one or the plurality of decryption apparatuses comprises a second propositional logic information acquisition unit adapted to use the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus;

a browser unit adapted to perform a process of an acquisition request of the encrypted content for the content server and to display content obtained by decrypting the encrypted content; and a relay unit adapted to send to the content server the acquisition request sent from the browser unit, and to use a decryption key sent from the key generation apparatus to apply a decryption process to the encrypted content obtained from the content server, according to the functional encryption algorithm; and each of the one or the plurality of key generation apparatuses comprises a key generation unit adapted to use the second attribute information or the second logic information, together with the private key of the key generation apparatus, to generate the decryption key used to decrypt the encrypted content.

Item 5

A cryptographic system according to one of Items 1 to 4, wherein the attribute designation information and/or the logical expression designation information corresponding to the user is stored in a storage medium; and the decryption apparatus comprises a user information acquisition unit adapted to acquire the attribute designation information or the logical expression designation information corresponding to the user of the decryption apparatus from the storage medium.

Item 6

A cryptographic system according to one of Items 1 and 3, wherein the attribute designation information or the logical expression designation information corresponding to the user of the decryption apparatus, the information being used by the key generation apparatus, is obtained from the decryption apparatus.

Item 7

A cryptographic system according to one of Items 1 to 6, wherein the cryptographic system further comprises one or a plurality of user information management apparatuses;

each of the one or the plurality of user information management apparatuses comprises a storage unit adapted to store the attribute designation information and/or the logical expression designation information corresponding to the user; and the key generation apparatus obtains the attribute designation information or the logical expression designation information corresponding to the user of the decryption apparatus from the user information management apparatus.

Item 8

A cryptographic system according to one of Items 1 to 7, wherein the one or the plurality of conversion rule information pairs are determined in advance for each of the one or the plurality of key generation apparatuses;

the cryptographic system further comprises one or a plurality of conversion rule information pair management apparatuses;

each of the one or the plurality of conversion rule information pair management apparatuses comprises a storage unit adapted to store the conversion rule information pair corresponding to each of the one or the plurality of key generation apparatuses;

the encryption apparatus comprises a conversion rule information pair acquisition unit adapted to acquire the conversion rule information pair from the conversion rule information pair management apparatus; and the decryption apparatus comprises a conversion rule information pair acquisition unit adapted to acquire the conversion rule information pair from the conversion rule information pair management apparatus Item 9

A cryptographic system according to one of Items 1 to 7, wherein the one or the plurality of conversion rule information pairs are determined in advance for each of the one or the plurality of key generation apparatuses;

each of the one or the plurality of key generation apparatuses further comprises a storage unit adapted to store the conversion rule information pair corresponding to the key generation apparatus;

each of the one or the plurality of encryption apparatuses further comprises a storage unit adapted to store the conversion rule information pair corresponding to at least one of the one or the plurality of the key generation apparatuses; and each of the one or the plurality of decryption apparatuses further comprises a storage unit adapted to store the conversion rule information pair corresponding to at least one of the one or the plurality of the key generation apparatuses.

Item 10

A cryptographic system according to one of Items 1 to 9, wherein whether the policy information identifies only the attribute conversion rule information, only the logical expression conversion rule information, or the attribute conversion rule information and the logical expression conversion rule information is determined in advance for each of the one or the plurality of key generation apparatuses.

Item 11

A cryptographic system according to one of Items 1 to 10, wherein an algebraic structure K is a finite ring or a finite field;

the first and second attribute information and the first and second logic information are vectors having elements of K as components; and the decryption process of the decryption unit performs a calculation depending on the result of the canonical inner product of the first logic information and the second attribute information, or of the canonical inner product of the first attribute information and the second logic information.

Item 12

A cryptographic system according to Item 11, wherein the public key is a set of elements of a module V on K;

the private key is a set of elements of a module V* dual of the module V;

the decryption key is an element of the dual module V*;

the encryption unit performs calculations that include a scalar multiplication in which the elements of the public key are multiplied by the components, used as coefficients, of the first attribute information or a scalar multiplication in which the elements of the public key are multiplied by the components, used as coefficients, of the first logic information, to obtain the encryption information;

the key generation unit performs calculations that include a scalar multiplication in which the elements of the private key are multiplied by the components, used as coefficients, of the second logic information or a scalar multiplication in which the elements of the private key are multiplied by the components, used as coefficients, of the second attribute information, to obtain the decryption key; and the calculation used in the decryption process of the decryption unit has bilinearity and the result of the calculation depends on the result of the canonical inner product of the first logic information and the second attribute information, or of the first attribute information and the second logic information, all the pieces of information being taken out from the encryption information or the encrypted content, and the decryption key according to bilinearity.

Item 13

A cryptographic communication method for a cryptographic system that uses functional encryption and includes: at least one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm in an encryption unit of the encryption apparatus;

a transmission step of transmitting the encrypted content and the encryption information corresponding thereto to the content server, in a transmitter unit of the encryption apparatus;

a storing step of storing the encryption information and the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content and the encryption information corresponding thereto, in response to the request sent from the decryption apparatus, to the decryption apparatus, in a transmitter unit of the content server;

a receiving step of receiving the encrypted content and the encryption information from the content server, in a receiving unit of the decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of each of the one or the plurality of key generation apparatuses;

a key generation step of using the second attribute information or the second logic information, together with the private key of the key generation apparatus, to generate a decryption key used to decrypt the encryption information, in a key generation unit of the key generation apparatus; and a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encryption information obtained from the content server, according to the functional encryption algorithm, and of using the common key obtained in the decryption process to perform a content acquisition process in which the encrypted content obtained from the content server is decrypted, in a relay unit of the decryption apparatus; and a displaying step of displaying content obtained by decrypting the encrypted content, in a browser unit of the decryption apparatus.

Item 14

A cryptographic communication method for a cryptographic system that uses functional encryption and includes: at least one or a plurality of encryption apparatuses;
one or a plurality of key generation apparatuses;
one or a plurality of decryption apparatuses; and
one or a plurality of content servers;
wherein a private key and a public key corresponding to the private key are determined in advance for each of the one or the plurality of key generation apparatuses;
one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and
policy information that identifies one of the attribute conversion rule information and the logical expression conversion rule information is determined in advance;
the cryptographic communication method comprising:
a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;
an encryption step of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm in an encryption unit of the encryption apparatus; a transmission step of transmitting the encrypted content and the encryption information corresponding thereto to the content server, in a transmitter unit of the encryption apparatus;
a storing step of storing the encryption information and the encrypted content sent from the encryption apparatus, in a storage unit of the content server;
an acquisition request processing step of performing a process of an acquisition request of the encrypted content for the content server, in a browser unit of the decryption apparatus;
a transmission step of transmitting the acquisition request sent from the browser unit, to the content server, in a relay unit of the decryption apparatus;
a transmission step of transmitting the encrypted content and the encryption information corresponding thereto, in response to the request sent from the decryption apparatus, to the decryption apparatus, in a transmitter unit of the content server;
a receiving step of receiving the encrypted content and the encryption information from the content server, in a receiving unit of the decryption apparatus;
a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of the decryption apparatus;
a logic information transmission step of transmitting the second attribute information or the second logic information to the key generation apparatus, in a transmitter unit of the decryption apparatus;
a logic information receiving step of receiving the second attribute information or the second logic information from the decryption apparatus, in a receiver unit of the key generation apparatus;
a key generation step of using the second attribute information or the second logic information, together with the private key of the key generation apparatus, to generate a decryption key used to decrypt the encryption information, in a key generation unit of the key generation apparatus; and
a decryption key transmission step of transmitting the decryption key to the decryption apparatus, in a transmitter unit of the key generation apparatus;
a decryption key receiving step of receiving the decryption key from the key generation apparatus, in a receiver unit of the decryption apparatus;
a decryption step of using the decryption key to apply a decryption process to the encryption information obtained from the content server, according to the functional encryption algorithm, and of using the common key obtained in the decryption process to perform a content acquisition process in which the encrypted content obtained from the content server is decrypted, in a relay unit of the decryption apparatus; and
a displaying step of displaying content obtained by decrypting the encrypted content, in a browser unit of the decryption apparatus.

Item 15

A cryptographic communication method for a cryptographic system that uses functional encryption and includes: at least one or a plurality of encryption apparatuses;
one or a plurality of key generation apparatuses;
one or a plurality of decryption apparatuses; and
one or a plurality of content servers;
wherein a private key and a public key corresponding to the private key are determined in advance for each of the one or the plurality of key generation apparatuses;
one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and content, to encrypt the content to obtain encrypted content, according to the functional encryption algorithm in an encryption unit of the encryption apparatus;

a transmission step of transmitting the encrypted content to the content server, in a transmitter unit of the encryption apparatus;

a storing step of storing the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content, in response to the request sent from the decryption apparatus, to the decryption apparatus, in a transmitter unit of the content server;

a receiving step of receiving the encrypted content from the content server, in a receiving unit of the decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of each of the one or the plurality of key generation apparatuses;

a key generation step of using the second attribute information or the second logic information, together with the private key of the key generation apparatus, to generate a decryption key used to decrypt the encrypted content, in a key generation unit of the key generation apparatus; and a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encrypted content obtained from the content server, according to the functional encryption algorithm, in a relay unit of the decryption apparatus; and a displaying step of displaying content obtained by decrypting the encrypted content, in a browser unit of the decryption apparatus.

Item 16

A cryptographic communication method for a cryptographic system that uses functional encryption and includes: at least one or a plurality of encryption apparatuses;

one or a plurality of key generation apparatuses;

one or a plurality of decryption apparatuses; and one or a plurality of content servers;

wherein a private key and a public key corresponding to the private key are determined in advance for each of the one or the plurality of key generation apparatuses;

one or a plurality of conversion rule information pairs are determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain attribute information (hereafter called first attribute information) or logic information (hereafter called first logic information) from the input information, in a first propositional logic information acquisition unit of each of the one or the plurality of encryption apparatuses;

an encryption step of using the first attribute information or the first logic information, together with the public key of the key generation apparatus and content, to encrypt the content to obtain encrypted content according to the functional encryption algorithm in an encryption unit of the encryption apparatus;

a transmission step of transmitting the encrypted content and the encryption information corresponding thereto to the content server, in a transmitter unit of the encryption apparatus;

a storing step of storing the encryption information and the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content and the encryption information corresponding thereto, in response to the request sent from the decryption apparatus, to the decryption apparatus, in a transmitter unit of the content server;

a receiving step of receiving the encrypted content and the encryption information from the content server, in a receiving unit of the decryption apparatus;

a second propositional logic information acquisition step of using the conversion rule information paired with the conversion rule information identified by the policy information to obtain attribute information (hereafter called second attribute information) or logic information (hereafter called second logic information) from attribute designation information or logical expression designation information corresponding to a user of the decryption apparatus, in a second propositional logic information acquisition unit of the decryption apparatus;

a logic information transmission step of transmitting the second attribute information or the second logic information to the key generation apparatus, in a transmitter unit of the decryption apparatus;

a logic information receiving step of receiving the second attribute information or the second logic information from the decryption apparatus, in a receiver unit of the key generation apparatus;

a key generation step of using the second attribute information or the second logic information, together with the private key of the key generation apparatus, to generate a decryption key used to decrypt the encryption information, in a key generation unit of the key generation apparatus; and a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encryption information obtained from the content server, according to the functional encryption algorithm, and of using the private key obtained in the decryption process to perform a content acquisition process in which the encrypted content obtained from the content server is decrypted, in a relay unit of the decryption apparatus; and a displaying step of displaying content obtained by decrypting the encrypted content, in a browser unit of the decryption apparatus.

Item 17

A decryption apparatus used in a cryptographic system that uses functional encryption and includes, at least, one or a plurality of encryption apparatuses that obtain a common key, encryption information corresponding to the common key or corresponding to information used to generate the common key, and encrypted content obtained by encrypting content with the common key, according to a functional encryption algorithm; one or a plurality of key generation apparatuses; one or a plurality of decryption apparatuses; and one or a plurality of content servers that store the encrypted content and the encryption information, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in the functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising:

a browser unit adapted to perform a process of an acquisition request of the encrypted content for the content server and to display content obtained by decrypting the encrypted content; and a relay unit adapted to send to the content server the acquisition request sent from the browser unit, to use the decryption key to apply a decryption process to the encryption information obtained from the content server, according to the functional encryption algorithm, and to use the common key obtained in the decryption process to perform a content acquisition process for decrypting the encrypted content obtained from the content server.

Item 18

A decryption apparatus used in a cryptographic system that uses functional encryption and includes, at least, one or a plurality of encryption apparatuses that encrypt content to obtain encrypted content according to a functional encryption algorithm; one or a plurality of key generation apparatuses; one or a plurality of decryption apparatuses; and one or a plurality of content servers that store the encrypted content, in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in the functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the decryption apparatus comprising:

a browser unit adapted to perform a process of an acquisition request of the encrypted content for the content server and to display content obtained by decrypting the encrypted content; and a relay unit adapted to send to the content server the acquisition request sent from the browser unit and to use the decryption key to apply a decryption process to the encrypted content obtained from the content server, according to the functional encryption algorithm.

Item 19

A content server used in a cryptographic system that uses functional encryption and includes, at least, one or a plurality of encryption apparatuses that obtain a common key, encryption information corresponding to the common key or corresponding to information used to generate the common key, and encrypted content obtained by encrypting content with the common key, according to a functional encryption algorithm; one or a plurality of key generation apparatuses; one or a plurality of decryption apparatuses; and one or a plurality of content servers;

in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the content server comprising:

a storage unit adapted to store the encryption information and the encrypted content sent from each of the one or the plurality of encryption apparatuses; and a transmitter unit adapted to transmit the encrypted content and the encryption information corresponding thereto, in response to a request sent from the decryption apparatus, to the decryption apparatus.

Item 20

A content server used in a cryptographic system that uses functional encryption and includes, at least, one or a plurality of encryption apparatuses that encrypt content to obtain encrypted content according to a functional encryption algorithm; one or a plurality of key generation apparatuses; one or a plurality of decryption apparatuses; and one or a plurality of content servers;

in the cryptographic system, a private key and a public key corresponding to the private key being determined in advance for each of the one or the plurality of key generation apparatuses;

one or a plurality of conversion rule information pairs being determined in advance, each pair of which has information (hereafter called attribute conversion rule information) prescribing a conversion rule for converting information that designates an attribute (hereafter called attribute designation information) to attribute information used in a functional encryption algorithm and information (hereafter called logical expression conversion rule information) prescribing a conversion rule for converting information that designates a logical expression (hereafter called logical expression designation information) to logic information used in the functional encryption algorithm; and policy information that identifies one of the attribute conversion rule information and the logical expression conversion rule information being determined in advance;

the content server comprising:

a storage unit adapted to store the encrypted content sent from each of the one or the plurality of encryption apparatuses; and a transmitter unit adapted to transmit the encrypted content, in response to a request sent from the decryption apparatus, to the decryption apparatus.

Item 21

A program for making a computer function as a decryption apparatus according to one of Items 17 and 18.

Item 22

A program for making a computer function as a content server according to one of Items 19 and 20.

Item 23

A computer readable storage medium having stored thereon a program according to Item 21 and/or a program according to Item 22.

What is claimed is:

1. A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;

policy information that identifies one of the attribute conversion rule information and the logical expression conversion rule information is determined in advance;

each of the one or the plurality of encryption apparatuses comprises circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus, to obtain a common key, and encryption information corresponding to the common key or corresponding to information used to generate the common key, according to the functional encryption algorithm;

each of the one or the plurality of key generation apparatuses comprises circuitry configured to:

use the conversion rule information paired with the conversion rule information identified by the policy information to obtain second attribute information or second logic information from attribute designation information or logical expression designation information corresponding to a user of the decryption apparatus; and use the second attribute information or the second logic information, together with the private key of the key generation apparatus, to generate a decryption key used to decrypt the encryption information; and each of the one or the plurality of decryption apparatuses comprises circuitry configured to use the decryption key to apply a decryption process to the encryption information according to the functional encryption algorithm.

2. A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;
policy information that identifies one of the attribute conversion rule information and the logical expression conversion rule information is determined in advance;
each of the one or the plurality of encryption apparatuses comprises circuitry configured to:
use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and
use the first attribute information or the first logic information, together with the public key of the key generation apparatus, to obtain a common key, and encryption information corresponding to the common key or corresponding to information used to generate the common key, according to the functional encryption algorithm;
each of the one or the plurality of decryption apparatuses comprises circuitry configured to:
use the conversion rule information paired with the conversion rule information identified by the policy information to obtain second attribute information or second logic information from attribute designation information or logical expression designation information corresponding to a user of the decryption apparatus; and
use a decryption key sent from the key generation apparatus to apply a decryption process to the encryption information according to the functional encryption algorithm; and
each of the one or the plurality of key generation apparatuses comprises circuitry configured to use the second attribute information or the second logic information, together with the private key of the key generation apparatus, to generate the decryption key used to decrypt the encryption information.

3. A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;
policy information that identifies one of the attribute conversion rule information and the logical expression conversion rule information is determined in advance;
each of the one or the plurality of encryption apparatuses comprises circuitry configured to:
use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information the input information; and
use the first attribute information or the first logic information, together with the public key of the key generation apparatus and plaintext, to obtain encryption information corresponding to the plaintext according to the functional encryption algorithm;
each of the one or the plurality of key generation apparatuses comprises circuitry configured to:
use the conversion rule information paired with the conversion rule information identified by the policy information to obtain second attribute information or second logic information from attribute designation information or logical expression designation information corresponding to a user of the decryption apparatus; and
use the second attribute information or the second logic information, together with the private key of the key generation apparatus, to generate a decryption key used to decrypt the encryption information; and
each of the one or the plurality of decryption apparatuses comprises circuitry configured to use the decryption key to apply a decryption process to the encryption information according to the functional encryption algorithm.

4. A cryptographic system that uses functional encryption, comprising at least:

one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;

policy information that identifies one of the attribute conversion rule information and the logical expression conversion rule information is determined in advance;

each of the one or the plurality of encryption apparatuses comprises circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus and plaintext, to obtain encryption information corresponding to the plaintext according to the functional encryption algorithm;

each of the one or the plurality of decryption apparatuses comprises circuitry configured to:

use the conversion rule information paired with the conversion rule information identified by the policy information to obtain second attribute information or second logic information from attribute designation information or logical expression designation information corresponding to a user of the decryption apparatus; and use a decryption key sent from the key generation apparatus to apply a decryption process to the encryption information according to the functional encryption algorithm; and each of the one or the plurality of key generation apparatuses comprises circuitry configured to use the second attribute information or the second logic information, together with the private key of the key generation apparatus, to generate the decryption key used to decrypt the encryption information.

5. A cryptographic system according to claim 1,
wherein the circuitry of the encryption apparatus encrypts plaintext with the common key to obtain ciphertext; and
the circuitry of the decryption apparatus uses the common key obtained in the decryption process to apply a second decryption process to the ciphertext or uses a common key generated from the information that is obtained in the decryption process to apply a second decryption process to the ciphertext.

6. A cryptographic system according to claim 2,
wherein the circuitry of the encryption apparatus encrypts plaintext with the common key to obtain ciphertext; and
the circuitry of the decryption apparatus uses the common key obtained in the decryption process to apply a second decryption process to the ciphertext or uses a common key generated from the information that is obtained in the decryption process to apply a second decryption process to the ciphertext.

7. A cryptographic system according to claim 1, 2, 3, 4, 5, or 6,
wherein the cryptographic system comprises the plurality of decryption apparatuses; and
at least one decryption apparatus of the plurality of decryption apparatuses comprises a transmitter that transfers the encryption information to at least one decryption apparatus of the plurality of decryption apparatuses, other than the decryption apparatus.

8. A cryptographic system that uses functional encryption, comprising at least:
one or a plurality of encryption apparatuses;
one or a plurality of key generation apparatuses;
one or a plurality of decryption apparatuses; and
one or a plurality of content servers;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;
policy information that identifies one of the attribute conversion rule information and the logical expression conversion rule information is determined in advance;
each of the one or the plurality of encryption apparatuses comprises circuitry configured to:
use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and
use the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm;
each of the one or the plurality of content servers comprises:
storage adapted to store the encryption information and the encrypted content sent from each of the one or the plurality of encryption apparatuses; and
a transmitter adapted to transmit the encrypted content and the encryption information corresponding thereto, in response to a request sent from the decryption apparatus, to the decryption apparatus;
each of the one or the plurality of key generation apparatuses comprises circuitry configured to:
use the conversion rule information paired with the conversion rule information identified by the policy information to obtain second attribute information or second logic information from attribute designation information or logical expression designation information corresponding to a user of the decryption apparatus; and use the second attribute information or the second logic information, together with the private key of the key generation apparatus, to generate a decryption key used to decrypt the encryption information; and each of the one or the plurality of decryption apparatuses comprises circuitry configured to:

perform a process of an acquisition request of the encrypted content for the content server and to display content obtained by decrypting the encrypted content;

send to the content server the acquisition request;

use the decryption key to apply a decryption process to the encryption information obtained from the content server, according to the functional encryption algorithm; and use the common key obtained in the decryption process to perform a content acquisition process for decrypting the encrypted content obtained from the content server.

9. A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;

policy information that identifies one of the attribute conversion rule information and the logical expression conversion rule information is determined in advance;

each of the one or the plurality of encryption apparatuses comprises circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm;

each of the one or the plurality of content servers comprises:

storage adapted to store the encryption information and the encrypted content sent from each of the one or the plurality of encryption apparatuses; and a transmitter adapted to transmit the encrypted content and the encryption information corresponding thereto, in response to a request sent from the decryption apparatus, to the decryption apparatus;

each of the one or the plurality of decryption apparatuses comprises circuitry configured to:

use the conversion rule information paired with the conversion rule information identified by the policy information to obtain second attribute information or second logic information from attribute designation information or logical expression designation information corresponding to a user of the decryption apparatus;

perform a process of an acquisition request of the encrypted content for the content server and to display content obtained by decrypting the encrypted content;

send to the content server the acquisition request;

use a decryption key sent from the key generation apparatus to apply a decryption process to the encryption information obtained from the content server, according to the functional encryption algorithm; and use the common key obtained in the decryption process to perform a content acquisition process for decrypting the encrypted content obtained from the content server; and each of the one or the plurality of key generation apparatuses comprises circuitry configured to use the second attribute information or the second logic information, together with the private key of the key generation apparatus, to generate the decryption key used to decrypt the encryption information.

10. A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;

policy information that identifies one of the attribute conversion rule information and the logical expression conversion rule information is determined in advance;

each of the one or the plurality of encryption apparatuses comprises circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus and content, to encrypt the content to obtain encrypted content, according to the functional encryption algorithm;

each of the one or the plurality of content servers comprises:

storage adapted to store the encrypted content sent from each of the one or the plurality of encryption apparatuses; and a transmitter adapted to transmit the encrypted content, in response to a request sent from the decryption apparatus, to the decryption apparatus;

each of the one or the plurality of key generation apparatuses comprises circuitry configured to:

use the conversion rule information paired with the conversion rule information identified by the policy information to obtain second attribute information or second logic information from attribute designation information or logical expression designation information corresponding to a user of the decryption apparatus; and use the second attribute information or the second logic information, together with the private key of the key generation apparatus, to generate a decryption key used to decrypt the encrypted content; and each of the one or the plurality of decryption apparatuses comprises circuitry configured to:

perform a process of an acquisition request of the encrypted content for the content server and to display content obtained by decrypting the encrypted content;

send to the content server the acquisition request; and use the decryption key to apply a decryption process to the encrypted content obtained from the content server, according to the functional encryption algorithm.

11. A cryptographic system that uses functional encryption, comprising at least:

one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm;

policy information that identifies one of the attribute conversion rule information and the logical expression conversion rule information is determined in advance;

each of the one or the plurality of encryption apparatuses comprises circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus and content, to encrypt the content to obtain encrypted content, according to the functional encryption algorithm;

each of the one or the plurality of content servers comprises:

storage adapted to store the encrypted content sent from each of the one or the plurality of encryption apparatuses; and a transmitter adapted to transmit the encrypted content, in response to a request sent from the decryption apparatus, to the decryption apparatus;

each of the one or the plurality of decryption apparatuses comprises circuitry configured to:

use the conversion rule information paired with the conversion rule information identified by the policy information to obtain second attribute information or second logic information from attribute designation information or logical expression designation information corresponding to a user of the decryption apparatus;

perform a process of an acquisition request of the encrypted content for the content server and to display content obtained by decrypting the encrypted content;

send to the content server the acquisition request; and use a decryption key sent from the key generation apparatus to apply a decryption process to the encrypted content obtained from the content server, according to the functional encryption algorithm; and each of the one or the plurality of key generation apparatuses comprises circuitry configured to use the second attribute information or the second logic information, together with the private key of the key generation apparatus, to generate the decryption key used to decrypt the encrypted content.

12. A cryptographic communication method for a cryptographic system that uses functional encryption and includes at least one or a plurality of encryption apparatuses;
one or a plurality of key generation apparatuses; and
one or a plurality of decryption apparatuses;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus, to obtain a common key and encryption information corresponding to the common key or corresponding to information used to generate the common key, according to the functional encryption algorithm, in an encryption unit of the encryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the key generation apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

13. A cryptographic communication method for a cryptographic system that uses functional encryption and includes at least one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus, to obtain a common key and encryption information corresponding to the common key or corresponding to information used to generate the common key, according to the functional encryption algorithm, in an encryption unit of the encryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the decryption apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

14. A cryptographic communication method for a cryptographic system that uses functional encryption and includes at least one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information in a first propositional logic information acquisition unit of the encryption apparatus;

an encryption step of using the first attribute information or the first logic information, together with the public key of the key generation apparatus and plaintext, to obtain encryption information corresponding to the plaintext, according to the functional encryption algorithm, in an encryption unit of the encryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the key generation apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

15. A cryptographic communication method for a cryptographic system that uses functional encryption and includes at least one or a plurality of encryption apparatuses;
one or a plurality of key generation apparatuses; and
one or a plurality of decryption apparatuses;
wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus and plaintext, to obtain encryption information corresponding to the plaintext, according to the functional encryption algorithm, in an encryption unit of the encryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the decryption apparatus;

a key generation step of using the second attribute information or the second logic information, together with the private key of the key generation apparatus, to generate a decryption key used to decrypt the encryption information, in a key generation unit of the key generation apparatus; and a decryption step of using the decryption key to apply a decryption process to the encryption information according to the functional encryption algorithm in a decryption unit of the decryption apparatus.

16. A cryptographic communication method for a cryptographic system that uses functional encryption and includes at least one or a plurality of encryption apparatuses;
one or a plurality of key generation apparatuses; and
a plurality of decryption apparatuses;
wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus, to obtain a common key and encryption information corresponding to the common key or corresponding to information used to generate the common key, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain second attribute information or second logic information from attribute designation information or logical expression designation information corresponding to a user of the first decryption apparatus, in a second propositional logic information acquisition unit of the key generation apparatus;

a key generation step of using the second attribute information or the second logic information, together with the private key of the key generation apparatus, to generate a first decryption key used to decrypt the encryption information, in a key generation unit of the key generation apparatus;

a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain third attribute information or third logic information from attribute designation information or logical expression designation information corresponding to a user of the second decryption apparatus, in the second propositional logic information acquisition unit of the key generation apparatus;

a key generation step of using the third attribute information or the third logic information, together with the private key of the key generation apparatus, to generate a second decryption key used to decrypt the encryption information, in the key generation unit of the key generation apparatus;

a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

17. A cryptographic communication method for a cryptographic system that uses functional encryption and includes at least one or a plurality of encryption apparatuses;
one or a plurality of key generation apparatuses; and
a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and
policy information that identifies one of the attribute conversion rule information and the logical expression conversion rule information is determined in advance;
the cryptographic communication method comprising:
a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus, to obtain a common key and encryption information corresponding to the common key or corresponding to information used to generate the common key, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain second attribute information or second logic information from attribute designation information or logical expression designation information corresponding to a user of the first decryption apparatus, in a second propositional logic information acquisition unit of the first decryption apparatus;

a logic information transmission step of transmitting the second attribute information or the second logic information to the key generation apparatus, in a transmitter unit of the first decryption apparatus;

a logic information receiving step of receiving the second attribute information or the second logic information from the first decryption apparatus, in a receiver unit of the key generation apparatus;

a key generation step of using the second attribute information or the second logic information, together with the private key of the key generation apparatus, to generate a first decryption key used to decrypt the encryption information, in a key generation unit of the key generation apparatus;

a decryption key transmission step of transmitting the first decryption key to the first decryption apparatus, in a transmitter unit of the key generation apparatus;

a decryption key receiving step of receiving the first decryption key from the key generation apparatus, in the receiving unit of the first decryption apparatus;

a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain third attribute information or third logic information from attribute designation information or logical expression designation information corresponding to a user of the second decryption apparatus, in the second propositional logic information acquisition unit of the second decryption apparatus;

a logic information transmission step of transmitting the third attribute information or the third logic information to the key generation apparatus, in a transmitter unit of the second decryption apparatus;

a logic information receiving step of receiving the third attribute information or the third logic information from the second decryption apparatus, in the receiver unit of the key generation apparatus;

a key generation step of using the third attribute information or the third logic information, together with the private key of the key generation apparatus, to generate a second decryption key used to decrypt the encryption information, in the key generation unit of the key generation apparatus;

a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

18. A cryptographic communication method for a cryptographic system that uses functional encryption and includes at least one or a plurality of encryption apparatuses;
one or a plurality of key generation apparatuses; and
a plurality of decryption apparatuses;
wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus and plaintext, to obtain encryption information corresponding to the plaintext, according to the functional encryption algorithm in an encryption unit of the encryption apparatus;

an encryption information transmission step of transmitting the encryption information to a first decryption apparatus, in a transmitter unit of the encryption apparatus;

an encryption information receiving step of receiving the encryption information from the encryption apparatus, in a receiving unit of the first decryption apparatus;

a second propositional logic information acquisition step of using the conversion rule information paired with the conversion rule information identified by the policy information to obtain second attribute information or second logic information from attribute designation information or logical expression designation information corresponding to a user of the first decryption apparatus, in a second propositional logic information acquisition unit of the key generation apparatus;
a key generation step of using the second attribute information or the second logic information, together with the private key of the key generation apparatus, to generate a first decryption key used to decrypt the encryption information, in a key generation unit of the key generation apparatus;
a decryption key transmission step of transmitting the first decryption key to the first decryption apparatus, in a transmitter unit of the key generation apparatus;
a decryption key receiving step of receiving the first decryption key from the key generation apparatus, in the receiving unit of the first decryption apparatus;
a decryption step of using the first decryption key to apply a decryption process to the encryption information according to the functional encryption algorithm in a decryption unit of the first decryption apparatus;
a transfer step of transferring the encryption information to a second decryption apparatus, other than the first decryption apparatus, in a transfer unit of the first decryption apparatus;
a receiving step of receiving the encryption information from the first decryption apparatus, in a receiving unit of the second decryption apparatus;
a third propositional logic information acquisition step of using the conversion rule information paired with the conversion rule information identified by the policy information to obtain third attribute information or third logic information from attribute designation information or logical expression designation information corresponding to a user of the second decryption apparatus, in the second propositional logic information acquisition unit of the key generation apparatus;
a key generation step of using the third attribute information or the third logic information, together with the private key of the key generation apparatus, to generate a second decryption key used to decrypt the encryption information, in the key generation unit of the key generation apparatus;
a decryption key transmission step of transmitting the second decryption key to the second decryption apparatus, in the transmitter unit of the key generation apparatus;
a decryption key receiving step of receiving the second decryption key from the key generation apparatus, in the receiving unit of the second decryption apparatus; and
a decryption step of using the second decryption key to apply a decryption process to the encryption information according to the functional encryption algorithm in a decryption unit of the second decryption apparatus.

19. A cryptographic communication method for a cryptographic system that uses functional encryption and includes at least
one or a plurality of encryption apparatuses;
one or a plurality of key generation apparatuses; and
a plurality of decryption apparatuses;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and
policy information that identifies one of the attribute conversion rule information and the logical expression conversion rule information is determined in advance;
the cryptographic communication method comprising:
a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;
an encryption step of using the first attribute information or the first logic information, together with the public key of the key generation apparatus and plaintext, to obtain encryption information corresponding to the plaintext, according to the functional encryption algorithm in an encryption unit of the encryption apparatus;
an encryption information transmission step of transmitting the encryption information to a first decryption apparatus, in a transmitter unit of the encryption apparatus;
an encryption information receiving step of receiving the encryption information from the encryption apparatus, in a receiving unit of the first decryption apparatus;
a second propositional logic information acquisition step of using the conversion rule information paired with the conversion rule information identified by the policy information to obtain second attribute information or second logic information from attribute designation information or logical expression designation information corresponding to a user of the first decryption apparatus, in a second propositional logic information acquisition unit of the first decryption apparatus;
a logic information transmission step of transmitting the second attribute information or the second logic information to the key generation apparatus, in a transmitter unit of the first decryption apparatus;
a logic information receiving step of receiving the second attribute information or the second logic information from the first decryption apparatus, in a receiver unit of the key generation apparatus;
a key generation step of using the second attribute information or the second logic information, together with the private key of the key generation apparatus, to generate a first decryption key used to decrypt the encryption information, in a key generation unit of the key generation apparatus;
a decryption key transmission step of transmitting the first decryption key to the first decryption apparatus, in a transmitter unit of the key generation apparatus;
a decryption key receiving step of receiving the first decryption key from the key generation apparatus, in the receiving unit of the first decryption apparatus;
a decryption step of using the first decryption key to apply a decryption process to the encryption information according to the functional encryption algorithm in a decryption unit of the first decryption apparatus;

a transfer step of transferring the encryption information to a second decryption apparatus, other than the first decryption apparatus, in a transfer unit of the first decryption apparatus;

a receiving step of receiving the encryption information from the first decryption apparatus, in a receiving unit of the second decryption apparatus;

a third propositional logic information acquisition step of using the conversion rule information paired with the conversion rule information identified by the policy information to obtain third attribute information or third logic information from attribute designation information or logical expression designation information corresponding to a user of the second decryption apparatus, in the second propositional logic information acquisition unit of the second decryption apparatus;

a logic information transmission step of transmitting the third attribute information or the third logic information to the key generation apparatus, in a transmitter unit of the second decryption apparatus;

a logic information receiving step of receiving the third attribute information or the third logic information from the second decryption apparatus, in the receiver unit of the key generation apparatus;

a key generation step of using the third attribute information or the third logic information, together with the private key of the key generation apparatus, to generate a second decryption key used to decrypt the encryption information, in the key generation unit of the key generation apparatus;

a decryption key transmission step of transmitting the second decryption key to the second decryption apparatus, in the transmitter unit of the key generation apparatus;

a decryption key receiving step of receiving the second decryption key from the key generation apparatus, in the receiving unit of the second decryption apparatus; and a decryption step of using the second decryption key to apply a decryption process to the encryption information according to the functional encryption algorithm in a decryption unit of the second decryption apparatus.

20. A cryptographic communication method for a cryptographic system that uses functional encryption and includes at least one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm in an encryption unit of the encryption apparatus;

a transmission step of transmitting the encrypted content and the encryption information corresponding thereto to the content server, in a transmitter unit of the encryption apparatus;

a storing step of storing the encryption information and the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content and the encryption information corresponding thereto, in response to the request sent from the decryption apparatus, to the decryption apparatus, in a transmitter unit of the content server;

a receiving step of receiving the encrypted content and the encryption information from the content server, in a receiving unit of the decryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the key generation apparatus;

a key generation step of using the second attribute information or the second logic information, together with the private key of the key generation apparatus, to generate a decryption key used to decrypt the encryption information, in a key generation unit of the key generation apparatus;

a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encryption information obtained from the content server, according to the functional encryption algorithm, and of using the common key obtained in the decryption process to perform a content acquisition process in which the encrypted content obtained from the content server is decrypted, in a relay unit of the decryption apparatus; and a displaying step of displaying content obtained by decrypting the encrypted content, in a browser unit of the decryption apparatus.

21. A cryptographic communication method for a cryptographic system that uses functional encryption and includes at least one or a plurality of encryption apparatuses;
one or a plurality of key generation apparatuses;
one or a plurality of decryption apparatuses; and
one or a plurality of content servers;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and
policy information that identifies one of the attribute conversion rule information and the logical expression conversion rule information is determined in advance;
the cryptographic communication method comprising:
a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;
an encryption step of using the first attribute information or the first logic information, together with the public key of the key generation apparatus and content, to obtain a common key, encryption information corresponding to the common key or corresponding to information used to generate the common key, and encrypted content obtained by encrypting the content with the common key, according to the functional encryption algorithm in an encryption unit of the encryption apparatus;
a transmission step of transmitting the encrypted content and the encryption information corresponding thereto to the content server, in a transmitter unit of the encryption apparatus;
a storing step of storing the encryption information and the encrypted content sent from the encryption apparatus, in a storage unit of the content server;

an acquisition request processing step of performing a process of an acquisition request of the encrypted content for the content server, in a browser unit of the decryption apparatus;
a transmission step of transmitting the acquisition request sent from the browser unit, to the content server, in a relay unit of the decryption apparatus;
a transmission step of transmitting the encrypted content and the encryption information corresponding thereto, in response to the request sent from the decryption apparatus, to the decryption apparatus, in a transmitter unit of the content server;
a receiving step of receiving the encrypted content and the encryption information from the content server, in a receiving unit of the decryption apparatus;
a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the decryption apparatus;
a logic information transmission step of transmitting the second attribute information or the second logic information to the key generation apparatus, in a transmitter unit of the decryption apparatus;
a logic information receiving step of receiving the second attribute information or the second logic information from the decryption apparatus, in a receiver unit of the key generation apparatus;
a key generation step of using the second attribute information or the second logic information, together with the private key of the key generation apparatus, to generate a decryption key used to decrypt the encryption information, in a key generation unit of the key generation apparatus;
a decryption key transmission step of transmitting the decryption key to the decryption apparatus, in a transmitter unit of the key generation apparatus;
a decryption key receiving step of receiving the decryption key from the key generation apparatus, in a receiver unit of the decryption apparatus;
a decryption step of using the decryption key to apply a decryption process to the encryption information obtained from the content server, according to the functional encryption algorithm, and of using the common key obtained in the decryption process to perform a content acquisition process in which the encrypted content obtained from the content server is decrypted, in a relay unit of the decryption apparatus; and
a displaying step of displaying content obtained by decrypting the encrypted content, in a browser unit of the decryption apparatus.

22. A cryptographic communication method for a cryptographic system that uses functional encryption and includes at least one or a plurality of encryption apparatuses;
one or a plurality of key generation apparatuses;
one or a plurality of decryption apparatuses; and
one or a plurality of content servers;
wherein a private key and a public key corresponding to the private key are determined in advance for each of the one or the plurality of key generation apparatuses;
one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or logic information first logic information from the input information, in a first propositional logic information acquisition unit of the encryption apparatus;

an encryption step of using the first attribute information or the first logic information, together with the public key of the key generation apparatus and content, to encrypt the content to obtain encrypted content, according to the functional encryption algorithm in an encryption unit of the encryption apparatus;

a transmission step of transmitting the encrypted content to the content server, in a transmitter unit of the encryption apparatus;

a storing step of storing the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content, in response to the request sent from the decryption apparatus, to the decryption apparatus, in a transmitter unit of the content server;

a receiving step of receiving the encrypted content from the content server, in a receiving unit of the decryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the key generation apparatus;

a key generation step of using the second attribute information or the second logic information, together with the private key of the key generation apparatus, to generate a decryption key used to decrypt the encrypted content, in a key generation unit of the key generation apparatus;

a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encrypted content obtained from the content server, according to the functional encryption algorithm, in a relay unit of the decryption apparatus; and a displaying step of displaying content obtained by decrypting the encrypted content, in a browser unit of the decryption apparatus.

23. A cryptographic communication method for a cryptographic system that uses functional encryption and includes at least one or a plurality of encryption apparatuses;
one or a plurality of key generation apparatuses;
one or a plurality of decryption apparatuses; and
one or a plurality of content servers;

wherein a private key and a public key corresponding to the private key are determined in advance for each of the one or the plurality of key generation apparatuses;

one or a plurality of conversion rule information pairs are determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information is determined in advance;

the cryptographic communication method comprising:

a first propositional logic information acquisition step of using one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information, in a first propositional logic information acquisition unit of the encryption apparatus;

an encryption step of using the first attribute information or the first logic information, together with the public key of the key generation apparatus and content, to encrypt the content to obtain encrypted content according to the functional encryption algorithm in an encryption unit of the encryption apparatus;

a transmission step of transmitting the encrypted content and the encryption information corresponding thereto to the content server, in a transmitter unit of the encryption apparatus;

a storing step of storing the encryption information and the encrypted content sent from the encryption apparatus, in a storage unit of the content server;

an acquisition request processing step of performing a process of an acquisition request of the encrypted content for the content server, in a browser unit of the decryption apparatus;

a transmission step of transmitting the acquisition request sent from the browser unit, to the content server, in a relay unit of the decryption apparatus;

a transmission step of transmitting the encrypted content and the encryption information corresponding thereto, in response to the request sent from the decryption apparatus, to the decryption apparatus, in a transmitter unit of the content server;

a receiving step of receiving the encrypted content and the encryption information from the content server, in a receiving unit of the decryption apparatus;

a second propositional logic information acquisition step of using the conversion rule information paired with the conversion rule information identified by the policy information to obtain second attribute information or second logic information from attribute designation information or logical expression designation information corresponding to a user of the decryption apparatus, in a second propositional logic information acquisition unit of the decryption apparatus;

a logic information transmission step of transmitting the second attribute information or the second logic information to the key generation apparatus, in a transmitter unit of the decryption apparatus;

a logic information receiving step of receiving the second attribute information or the second logic information from the decryption apparatus, in a receiver unit of the key generation apparatus;

a key generation step of using the second attribute information or the second logic information, together with the private key of the key generation apparatus, to generate a decryption key used to decrypt the encryption information, in a key generation unit of the key generation apparatus;

a decryption key transmission step of transmitting the decryption key to the decryption apparatus, in a transmitter unit of the key generation apparatus;

a decryption key receiving step of receiving the decryption key from the key generation apparatus, in a receiver unit of the decryption apparatus;

a decryption step of using the decryption key to apply a decryption process to the encryption information obtained from the content server, according to the functional encryption algorithm, and of using the private key obtained in the decryption process to perform a content acquisition process in which the encrypted content obtained from the content server is decrypted, in a relay unit of the decryption apparatus; and a displaying step of displaying content obtained by decrypting the encrypted content, in a browser unit of the decryption apparatus.

24. An encryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the encryption apparatus comprising circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus, to obtain a common key, and encryption information corresponding to the common key or corresponding to information used to generate the common key, according to the functional encryption algorithm.

25. An encryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the encryption apparatus comprising circuitry configured to:

use one kind of conversion rule information of the attribute conversion rule information and the logical expression conversion rule information included in one conversion rule information pair selected from the one or the plurality of conversion rule information pairs, the one kind of conversion rule information being selected together with the policy information according to whether input information input to the encryption apparatus is either attribute designation information or logical expression designation information, to obtain first attribute information or first logic information from the input information; and use the first attribute information or the first logic information, together with the public key of the key generation apparatus and plaintext, to obtain encryption information corresponding to the plaintext, according to the functional encryption algorithm.

26. A key generation apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the key generation apparatus comprising circuitry configured to:

use the conversion rule information paired with the conversion rule information identified by the policy information to obtain second attribute information or second logic information from attribute designation information or logical expression designation information corresponding to a user of the decryption apparatus; and use the second attribute information or the second logic information, together with the private key of the key generation apparatus, to generate a decryption key used to decrypt the encryption information.

27. A key generation apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the key generation apparatus comprising circuitry configured to use the private key of the key generation apparatus, together with second attribute information or second logic information generated from attribute designation information or logical expression designation information corresponding to a user of the decryption apparatus by using the conversion rule information paired with the conversion rule information identified by the policy information, to generate a decryption key used to decrypt the encryption information.

28. A decryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the decryption apparatus comprising circuitry configured to use a decryption key generated by the key generation apparatus to apply a decryption process to encryption information generated by the encryption apparatus, according to the functional encryption algorithm.

29. A decryption apparatus used in a cryptographic system that uses functional encryption and includes, at least, one or a plurality of encryption apparatuses, one or a plurality of key generation apparatuses, and one or a plurality of decryption apparatuses, in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the decryption apparatus comprising circuitry configured to:
  use the conversion rule information paired with the conversion rule information identified by the policy information to obtain second attribute information or second logic information from attribute designation information or logical expression designation information corresponding to a user of the decryption apparatus; and
  use a decryption key generated by the key generation apparatus to apply a decryption process to encryption information generated by the encryption apparatus, according to the functional encryption algorithm.

30. A decryption apparatus according to claim 28 or 29, further comprising, when the cryptographic system includes the plurality of decryption apparatuses, a transmitter configured to transfer the encryption information to at least one decryption apparatus other than the decryption apparatus.

31. A decryption apparatus used in a cryptographic system that uses functional encryption and includes, at least, one or a plurality of encryption apparatuses that obtain a common key, encryption information corresponding to the common key or corresponding to information used to generate the common key, and encrypted content obtained by encrypting content with the common key, according to a functional encryption algorithm; one or a plurality of key generation apparatuses; one or a plurality of decryption apparatuses; and one or a plurality of content servers that store the encrypted content and the encryption information,
  in the cryptographic system,
    a private key and a public key corresponding to the private key being determined in advance for each of the one or the plurality of key generation apparatuses;
    one or a plurality of conversion rule information pairs being determined in advance, each pair of which has attribute conversion rule information prescribing a conversion rule for converting attribute designation information that designates an attribute to attribute information used in the functional encryption algorithm and logical expression conversion rule information prescribing a conversion rule for converting logical expression designation information that designates a logical expression to logic information used in the functional encryption algorithm; and
    policy information that identifies one of the attribute conversion rule information and the logical expression conversion rule information being determined in advance;
    the decryption apparatus comprising circuitry configured to:
      perform a process of an acquisition request of the encrypted content for the content server and to display content obtained by decrypting the encrypted content;
      send to the content server the acquisition request;
      use the decryption key to apply a decryption process to the encryption information obtained from the content server, according to the functional encryption algorithm; and
      use the common key obtained in the decryption process to perform a content acquisition process for decrypting the encrypted content obtained from the content server.

32. A decryption apparatus used in a cryptographic system that uses functional encryption and includes, at least, one or a plurality of encryption apparatuses that encrypt content to obtain encrypted content according to a functional encryption algorithm; one or a plurality of key generation apparatuses; one or a plurality of decryption apparatuses; and one or a plurality of content servers that store the encrypted content,
  in the cryptographic system,
    a private key and a public key corresponding to the private key being determined in advance for each of the one or the plurality of key generation apparatuses;
    one or a plurality of conversion rule information pairs being determined in advance, each pair of which has attribute conversion rule information prescribing a conversion rule for converting attribute designation information that designates an attribute to attribute information used in the functional encryption algorithm and logical expression conversion rule information prescribing a conversion rule for converting logical expression designation information that designates a logical expression to logic information used in the functional encryption algorithm; and
    policy information that identifies one of the attribute conversion rule information and the logical expression conversion rule information being determined in advance;
    the decryption apparatus comprising circuitry configured to:
      perform a process of an acquisition request of the encrypted content for the content server and to display content obtained by decrypting the encrypted content;
      send to the content server the acquisition request; and
      use the decryption key to apply a decryption process to the encrypted content obtained from the content server, according to the functional encryption algorithm.

33. A content server used in a cryptographic system that uses functional encryption and includes, at least, one or a plurality of encryption apparatuses that obtain a common key, encryption information corresponding to the common key or corresponding to information used to generate the common key, and encrypted content obtained by encrypting content with the common key, according to a functional encryption algorithm; one or a plurality of key generation apparatuses; one or a plurality of decryption apparatuses; and one or a plurality of content servers;
  in the cryptographic system,
    a private key and a public key corresponding to the private key being determined in advance for each of the one or the plurality of key generation apparatuses;
    one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and
    policy information that identifies one of the attribute conversion rule information and the logical expression conversion rule information being determined in advance;
    the content server comprising:
      storage adapted to store the encryption information and the encrypted content sent from each of the one or the plurality of encryption apparatuses; and
      a transmitter adapted to transmit the encrypted content and the encryption information corresponding thereto, in response to a request sent from the decryption apparatus, to the decryption apparatus.

34. A content server used in a cryptographic system that uses functional encryption and includes, at least, one or a plurality of encryption apparatuses that encrypt content to obtain encrypted content according to a functional encryption algorithm; one or a plurality of key generation apparatuses; one or a plurality of decryption apparatuses; and one or a plurality of content servers;

in the cryptographic system, a private key and a public key corresponding to the private key being determined in advance for each of the one or the plurality of key generation apparatuses;

one or a plurality of conversion rule information pairs being determined in advance, each pair of which has attribute conversion rule information prescribing a conversion rule for converting attribute designation information that designates an attribute to attribute information used in a functional encryption algorithm and logical expression conversion rule information prescribing a conversion rule for converting logical expression designation information that designates a logical expression to logic information used in the functional encryption algorithm; and policy information that identifies one of the attribute conversion rule information and the logical expression conversion rule information being determined in advance;

the content server comprising:

storage adapted to store the encrypted content sent from each of the one or the plurality of encryption apparatuses; and a transmitter adapted to transmit the encrypted content, in response to a request sent from the decryption apparatus, to the decryption apparatus.

35. A non-transitory computer readable storage medium having stored thereon a program for making a computer function as an encryption apparatus according to claim 24 or 25.

36. A non-transitory computer readable storage medium having stored thereon a program for making a computer function as a key generation apparatus according to claim 26 or 27.

37. A non-transitory computer readable storage medium having stored thereon a program for making a computer function as a decryption apparatus according to claim 28, 29, 31 or 32.

38. A non-transitory computer readable storage medium having stored thereon a program for making a computer function as a content server according to claim 33 or 34.

* * * * *

UNITED STATES PATENT AND TRADEMARK OFFICE
CERTIFICATE OF CORRECTION

PATENT NO. : 8,995,660 B2               Page 1 of 2
APPLICATION NO. : 13/810797
DATED : March 31, 2015
INVENTOR(S) : Tetsutaro Kobayashi et al.

It is certified that error appears in the above-identified patent and that said Letters Patent is hereby corrected as shown below:

Specification

Column 19, line 53, change "Dec (pk, $sk_i$, $c_c$)→y: decryption algorithm" to
--Dec (pk, $sk_i$, $c_j$)→y: decryption algorithm--;

Column 19, line 64, change "k (a difference from 1 is negligible)," to --$\lambda$ (a difference from 1 is negligible),--;

Column 23, line 56, change "$Q^\chi \in G_T$ for $\chi \in F_q$" to --$\Omega^\chi \in G_T$ for $\chi \in F_q$--.

Column 24, line 23, change "$e_\psi(\nu \cdot \Gamma_1, \kappa \cdot \Gamma_2) = e_\psi(\Gamma_1, \Gamma_2)^{\Gamma \cdot \kappa}$" to --$e_\psi(\nu \cdot \Gamma_1, \kappa \cdot \Gamma_2) = e_\psi(\Gamma_1, \Gamma_2)^{\nu \cdot \kappa}$--;

Column 24, line 24, change "$\Gamma_1 \in G_1^{n(\psi)+\varsigma}{}_{(\psi)}, \Gamma_2 \in G_2^{n(\psi)+\varsigma(\psi)}$" to --$\Gamma_1 \in G_1^{n(\psi)+\varsigma(\psi)}, \Gamma_2 \in G_2^{n(\psi)+\varsigma(\psi)}$--;

Column 26, line 29, change "$e_X(a_i(\psi), a_j^*(\psi)) = \Pi_{i=1}^{n(\psi)+\varsigma(\psi)}$" to --$e_\psi(a_i(\psi), a_j^*(\psi)) = \Pi_{i=1}^{n(\psi)+\varsigma(\psi)}$--;

Column 26, line 31, change "the product of Pair($\kappa_1 \cdot g_i$, 0)," to --the product of Pair($\kappa_1 \cdot g_1$, 0),--;

Column 26, line 32, change "addition, Pair($g_1$, 0)=Pair(0, g)=Pair($g_1$, $g_2$)$^0$" to
--addition, Pair($g_1$, 0)= Pair(0, $g_2$) = Pair($g_1$,$g_2$)$^0$--;

Column 28, line 22, change "$\vec{\chi_i}(\psi) = (\chi_{i,1}(\psi), ..., \chi_{i,n(\psi)+\varsigma(\psi)}$     (18)" to
--"$\vec{\chi_i}(\psi) = (\chi_{i,1}(\psi), ..., \chi_{i,n(\psi)+\varsigma(\psi)}(\psi))$     (18)--;

Column 28, line 24, change "$\vec{\chi_i}(\psi) = (\chi_{i,1}(\psi), ..., \chi_{i,n(\psi)+\varsigma(\psi)}$     (19)"
--$\vec{\chi_i}^*(\psi) = (\chi_{i,1}^*(\psi), ..., \chi_{i,n(\psi)+\varsigma(\psi)}^*(\psi))$     (19)--;

Signed and Sealed this
First Day of December, 2015

Michelle K. Lee
*Director of the United States Patent and Trademark Office*

CERTIFICATE OF CORRECTION (continued)
U.S. Pat. No. 8,995,660 B2

Specification

Column 28, line 43, change "$b_i(\psi) = (\chi_{i,j}(\psi) \cdot \kappa_1 \cdot g_1, \chi_{i,2}(\psi) \cdot \kappa_1 \cdot g_1, ..., \chi_{i,n(\psi)+\varsigma(\psi)}(\psi) \cdot \kappa_1 \cdot g_1)$  (22)" to --$b_i(\psi) = (\chi_{i,1}(\psi) \cdot \kappa_1 \cdot g_1, \chi_{i,2}(\psi) \cdot \kappa_1 \cdot g_1, ..., \chi_{i,n(\psi)+\varsigma(\psi)}(\psi) \cdot \kappa_1 \cdot g_1)$  (22)--;

Column 29, line 5, change "elements $i=\kappa_1 \cdot \kappa_2$" to --elements $\tau=\kappa_1 \cdot \kappa_2$--;

Column 29, line 8, change "$e_\psi(b_i(\psi), b_j^*(\psi))=g_T^{\tau-\tau'-\delta(i,j)}$  25" to --$e_\psi(b_i(\psi), b_j^*(\psi))=g_T^{\tau \cdot \tau'-\delta(i,j)}$  25--.

UNITED STATES PATENT AND TRADEMARK OFFICE
CERTIFICATE OF CORRECTION

PATENT NO.         : 8,995,660 B2
APPLICATION NO.    : 13/810797
DATED              : March 31, 2015
INVENTOR(S)        : Tetsutaro Kobayashi et al.

It is certified that error appears in the above-identified patent and that said Letters Patent is hereby corrected as shown below:

In the Specification

Column 29, line 8, change "$e_\psi(b_i(\psi), b_j*(\psi))=g_T^{\tau \cdot \tau' \cdot \delta(i,j)}$ (25)" to --$e_\psi(b_i(\psi), b_j^*(\psi))=g_T^{\tau \cdot \tau' \cdot \delta(i,j)}$ (25)--.

Column 30, line 59, change "N (N≤2)" to --N (N≥2)--.

Column 35, line 55, change "VSET1={X, $v(\vec{\lambda}\,|\,\lambda=1,..., \Psi\}$" to --VSET1={$\lambda$, $v(\vec{\lambda}\,|\,\lambda=1,..., \Psi\}$--.

Column 37, line 45, change "A set $\{B^*(\psi^{\wedge})\}_{\psi=0,...,\psi}$" to --A set $\{B^*(\psi^{\wedge})\}_{\psi=0,...,\psi}$--.

Column 39, line 5, change "any one of $v_2(0), v_1(0)$." to --any one of $v_2(0), ..., v_1(0)$--.

Column 44, line 29, change "$e(v \cdot \Gamma_1, \kappa \cdot \Gamma_2)=e(\Gamma_1, \Gamma_2)^{\Gamma \cdot \kappa}$ (3)" to --$e(v \cdot \Gamma_1, \kappa \cdot \Gamma_2)=e(\Gamma_1, \Gamma_2)^{v \cdot \kappa}$ (3)--.

Column 53, line 28, change "$f(x)=\theta_0 \cdot x^0 \pm \theta_1 \cdot x + ... + \theta_{n-1} \cdot x^{n-1}$" to --$f(x)=\theta_0 \cdot x^0 + \theta_1 \cdot x + ... + \theta_{n-1} \cdot x^{n-1}$--.

Column 50, line 38, change "binary sequence $\chi_2 \in \{0, 1\}^*$," to --binary sequence $\omega_2 \in \{0, 1\}^*$,--.

Column 54, line 9, change "Predicate information: $\vec{w}=(w_1, ..., w_n)=(\theta_n, ..., \theta_{n-1})$" to --Predicate information: $\vec{w}=(w_1, ..., w_n)=(\theta_0, ..., \theta_{n-1})$--.

Column 87, line 44, change "$w = (w_i, ..., w_n)$," to --$w = (w_1, ..., w_n)$,--.

Signed and Sealed this
Twelfth Day of July, 2016

Michelle K. Lee
*Director of the United States Patent and Trademark Office*